US008755776B2

(12) United States Patent
Ramer et al.

(10) Patent No.: US 8,755,776 B2
(45) Date of Patent: *Jun. 17, 2014

(54) SYSTEM FOR TARGETING ADVERTISING CONTENT TO A PLURALITY OF MOBILE COMMUNICATION FACILITIES

(71) Applicant: Jumptap, Inc., Boston, MA (US)

(72) Inventors: Jorey Ramer, Cambridge, MA (US); Adam Soroca, Cambridge, MA (US); Dennis Dought, Brookline, MA (US)

(73) Assignee: Millennial Media, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/920,001

(22) Filed: Jun. 17, 2013

(65) Prior Publication Data

US 2013/0282482 A1    Oct. 24, 2013

Related U.S. Application Data

(63) Continuation of application No. 13/235,494, filed on Sep. 19, 2011, now Pat. No. 8,467,774, which is a continuation of application No. 13/166,972, filed on (Continued)

(51) Int. Cl.
*H04M 3/42* (2006.01)

(52) U.S. Cl.
USPC .................. 455/414.1; 705/14.49; 705/14.55

(58) Field of Classification Search
USPC ................ 455/414.1, 566, 575.1; 705/14.49, 705/14.55
See application file for complete search history.

(56) References Cited

U.S. PATENT DOCUMENTS 6,026,366 A    2/2000  Grube
6,233,448 B1   5/2001  Alperovich et al.
(Continued)

FOREIGN PATENT DOCUMENTS

WO         00/77978 A2    12/2000

OTHER PUBLICATIONS

Ishikawa et al., "Speech-Activated Text Retrieval System for Multimodal Cellular Phones", Proceedings of IEEE International Conference on Acoustics, Speech and Signal Processing, (ICASSP '04), 2004, pp. I-453-I-456.

*Primary Examiner* — Temica M Beamer
(74) *Attorney, Agent, or Firm* — Millennial Media

(57) ABSTRACT

A system for targeting advertising content includes the steps of: (a) receiving respective requests for advertising content corresponding to a plurality of mobile communication facilities operated by a group of users, wherein the plurality includes first and second types of mobile communication facilities with different rendering capabilities; (b) receiving a datum corresponding to the group; (c) selecting from a first and second sponsor respective content based on a relevancy to the datum, wherein each content includes a first and second item requiring respective rendering capabilities; (d) receiving bids from the first and second sponsors; (e) attributing a priority to the content of the first sponsor based upon a determination that a yield associated with the first sponsor is greater than a yield associated with the second sponsor; and (f) transmitting the first and second items of the first sponsor to the first and second types of mobile communication facilities respectively.

14 Claims, 20 Drawing Sheets

Related U.S. Application Data

Jun. 23, 2011, now Pat. No. 8,270,955, which is a continuation of application No. 12/771,249, filed on Apr. 30, 2010, now Pat. No. 7,907,940, which is a continuation of application No. 12/762,036, filed on Apr. 16, 2010, now Pat. No. 7,970,389, which is a continuation of application No. 11/355,915, filed on Feb. 16, 2006, now Pat. No. 7,702,318, which is a continuation of application No. 11/347,842, filed on Feb. 3, 2006, now abandoned, which is a continuation of application No. 11/347,825, filed on Feb. 3, 2006, now abandoned, which is a continuation of application No. 11/347,826, filed on Feb. 3, 2006, which is a continuation of application No. 11/337,112, filed on Jan. 19, 2006, which is a continuation of application No. 11/337,180, filed on Jan. 19, 2006, now Pat. No. 7,577,665, which is a continuation of application No. 11/336,432, filed on Jan. 19, 2006, now Pat. No. 7,860,871, which is a continuation of application No. 11/337,234, filed on Jan. 19, 2006, now abandoned, which is a continuation of application No. 11/337,233, filed on Jan. 19, 2006, now Pat. No. 7,603,360, which is a continuation of application No. 11/335,904, filed on Jan. 19, 2006, now Pat. No. 7,752,209, which is a continuation of application No. 11/335,900, filed on Jan. 18, 2006, now Pat. No. 7,769,764, which is a continuation-in-part of application No. 11/281,902, filed on Nov. 16, 2005, which is a continuation of application No. 11/282,120, filed on Nov. 16, 2005, now Pat. No. 7,660,581, which is a continuation of application No. 11/274,884, filed on Nov. 14, 2005, which is a continuation of application No. 11/274,905, filed on Nov. 14, 2005, which is a continuation of application No. 11/274,933, filed on Nov. 14, 2005, now Pat. No. 8,364,521, which is a continuation of application No. 11/271,164, filed on Nov. 11, 2005, which is a continuation of application No. 11/268,671, filed on Nov. 5, 2005, now Pat. No. 8,103,545, which is a continuation of application No. 11/267,940, filed on Nov. 5, 2005.

(60) Provisional application No. 60/731,991, filed on Nov. 1, 2005, provisional application No. 60/720,193, filed on Sep. 23, 2005, provisional application No. 60/717,151, filed on Sep. 14, 2005.

(56) References Cited

U.S. PATENT DOCUMENTS

| | | |
|---|---|---|
| 7,162,697 B2 | 1/2007 | Markel |
| 7,310,350 B1 | 12/2007 | Shao et al. |
| 2001/0014868 A1 | 8/2001 | Herz et al. |
| 2002/0151992 A1 | 10/2002 | Hoffberg et al. |
| 2003/0022700 A1 | 1/2003 | Wang |
| 2003/0110503 A1 | 6/2003 | Perkes |
| 2004/0203639 A1 | 10/2004 | Ozer et al. |
| 2004/0235459 A1 | 11/2004 | Juntunen |
| 2005/0070276 A1 | 3/2005 | McGarry |
| 2005/0192021 A1 | 9/2005 | Lee et al. |
| 2005/0262428 A1 | 11/2005 | Little et al. |
| 2005/0272452 A1 | 12/2005 | Khoury et al. |
| 2006/0094406 A1 | 5/2006 | Cortegiano |
| 2007/0123223 A1 | 5/2007 | Letourneau et al. |
| 2008/0153467 A1 | 6/2008 | Wyler et al. |
| 2009/0144171 A1 | 6/2009 | Whitehead |
| 2011/0093515 A1 | 4/2011 | Albanese |
| 2012/0010956 A1 | 1/2012 | Ramer et al. |

SYSTEM FOR TARGETING ADVERTISING CONTENT TO A PLURALITY OF MOBILE COMMUNICATION FACILITIES

CROSS-REFERENCE TO RELATED APPLICATIONS

This application is a continuation of U.S. application Ser. No. 13/235,494 filed on Sep. 19, 2011 and entitled "SYSTEM FOR TARGETING ADVERTISING CONTENT TO A PLURALITY OF MOBILE COMMUNICATION FACILITIES," which is a continuation of U.S. application Ser. No. 13/166,972 filed on Jun. 23, 2011 and entitled "PRESENTATION OF SPONSORED CONTENT ON MOBILE DEVICE BASED ON TRANSACTION EVENT," which is a continuation U.S. application Ser. No. 12/771,249 filed on Apr. 30, 2010 and entitled "PRESENTATION OF SPONSORED CONTENT BASED ON MOBILE TRANSACTION EVENT," which is a continuation of U.S. application Ser. No. 12/762,036 filed on Apr. 16, 2010 and entitled "PRESENTATION OF SPONSORED CONTENT BASED ON MOBILE TRANSACTION EVENT," which is a continuation of U.S. application Ser. No. 11/355,915 filed on Feb. 16, 2006 and entitled "PRESENTATION OF SPONSORED CONTENT BASED ON MOBILE TRANSACTION EVENT," which is a continuation of U.S. application Ser. No. 11/347,842 filed on Feb. 3, 2006 and entitled "MULTIMODAL SEARCH QUERY," which is a continuation of U.S. application Ser. No. 11/347,825 filed on Feb. 3, 2006 and entitled "SEARCH QUERY ADDRESS REDIRECTION ON A MOBILE COMMUNICATION FACILITY," which is a continuation of U.S. application Ser. No. 11/347,826 filed on Feb. 3, 2006 and entitled "PREVENTING MOBILE COMMUNICATION FACILITY CLICK FRAUD," which is a continuation of U.S. application Ser. No. 11/337,112 filed on Jan. 19, 2006 and entitled "USER TRANSACTION HISTORY INFLUENCED SEARCH RESULTS," which is a continuation of U.S. application Ser. No. 11/337,180 filed on Jan. 19, 2006 and entitled "USER CHARACTERISTIC INFLUENCED SEARCH RESULTS," which is a continuation of U.S. application Ser. No. 11/336,432 filed on Jan. 19, 2006 and entitled "USER HISTORY INFLUENCED SEARCH RESULTS," which is a continuation of U.S. application Ser. No. 11/337,234 filed on Jan. 19, 2006 and entitled "MOBILE COMMUNICATION FACILITY CHARACTERISTIC INFLUENCED SEARCH RESULTS," which is a continuation of U.S. application Ser. No. 11/337,233 filed on Jan. 19, 2006 and entitled "LOCATION INFLUENCED SEARCH RESULTS," which is a continuation of U.S. application Ser. No. 11/335,904 filed on Jan. 19, 2006 and entitled "PRESENTING SPONSORED CONTENT ON A MOBILE COMMUNICATION FACILITY," which is a continuation of U.S. application Ser. No. 11/335,900 filed on Jan. 18, 2006 and entitled "MOBILE ADVERTISEMENT SYNDICATION," which is a continuation-in-part of U.S. application Ser. No. 11/281,902 filed on Nov. 16, 2005 and entitled "MANAGING SPONSORED CONTENT BASED ON USER CHARACTERISTICS," which is a continuation of U.S. application Ser. No. 11/282,120 filed on Nov. 16, 2005 and entitled "MANAGING SPONSORED CONTENT BASED ON USAGE HISTORY", which is a continuation of U.S. application Ser. No. 11/274,884 filed on Nov. 14, 2005 and entitled "MANAGING SPONSORED CONTENT BASED ON TRANSACTION HISTORY", which is a continuation of U.S. application Ser. No. 11/274,905 filed on Nov. 14, 2005 and entitled "MANAGING SPONSORED CONTENT BASED ON GEOGRAPHIC REGION", which is a continuation of U.S. application Ser. No. 11/274,933 filed on Nov. 14, 2005 and entitled "PRESENTATION OF SPONSORED CONTENT ON MOBILE COMMUNICATION FACILITIES", which is a continuation of U.S. application Ser. No. 11/271,164 filed on Nov. 11, 2005 and entitled "MANAGING SPONSORED CONTENT BASED ON DEVICE CHARACTERISTICS", which is a continuation of U.S. application Ser. No. 11/268,671 filed on Nov. 5, 2005 and entitled "MANAGING PAYMENT FOR SPONSORED CONTENT PRESENTED TO MOBILE COMMUNICATION FACILITIES", and which is a continuation of U.S. application Ser. No. 11/267,940 filed on Nov. 5, 2005 and entitled "MANAGING SPONSORED CONTENT FOR DELIVERY TO MOBILE COMMUNICATION FACILITIES," which is a non-provisional of U.S. App. No. 60/731,991 filed on Nov. 1, 2005 and entitled "MOBILE SEARCH", U.S. App. No. 60/720,193 filed on Sep. 23, 2005 and entitled "MANAGING WEB INTERACTIONS ON A MOBILE COMMUNICATION FACILITY", and U.S. App. No. 60/717,151 filed on Sep. 14, 2005 and entitled "SEARCH CAPABILITIES FOR MOBILE COMMUNICATIONS DEVICES".

Each of these applications is incorporated herein by reference in its entirety.

FIELD OF THE INVENTION

This disclosure relates to the field of mobile communications and more particularly to improved presentation of sponsored content for mobile communication facilities based in part on transaction events.

DESCRIPTION OF RELATED ART

Online search driven by Web-based search engines has proven to be one of the most significant uses of computer networks such as the Internet. Computer users can employ a variety of search tools to search for content using different user interfaces and search methods. In some circumstances, mobile device users can also access Internet search tools to search for content. However, users of many mobile devices such as cell phones encounter difficulties using search technologies intended for conventional online use. Difficulties include the inability to display appropriate content, difficulty entering queries and taking other suitable actions such as navigation in an environment adapted to full screen displays, full-sized keyboards, and high-speed network connections. Furthermore, Internet search engines are currently unable to optimally deliver search results for a mobile communication facility because these search engines are specifically designed for the Internet and not mobile uses. A need exists for improved search capabilities adapted for use with mobile communication devices.

SUMMARY OF THE INVENTION

In one aspect, a method and system disclosed herein includes selecting content for presentation on a mobile communication facility, wherein the content selection is based at least in part on the relevance between the content and a transaction event associated with the mobile communication facility, and presenting the content to the mobile communication facility.

In embodiments, the mobile communication facility may be a cellular phone, phone, mobile phone, GSM phone, personal digital assistant, and or a "pocket" personal pc.

In embodiments, the transaction event may be a recent transaction, a plurality of transactions, a transaction history, a purchase, a phone call, a clickthrough, a webpage interaction (e.g. a webpage view period), a content download, sponsored content, a sponsored link, and sponsored call, downloadable content, an audio stream, a video, a graphic element, or the like.

In embodiments, the relevance may be influenced by user characteristics, user history, user transactions, geographic location, user device, time, a mobile subscriber characteristic, a mobile communication facility characteristic, and the like.

These and other systems, methods, objects, features, and advantages of the present invention will be apparent to those skilled in the art from the following detailed description of the preferred embodiment and the drawings.

BRIEF DESCRIPTION OF THE DRAWINGS

The invention and the following detailed description of certain embodiments thereof may be understood by reference to the following figures.

DETAILED DESCRIPTION OF THE INVENTION

The methods and systems disclosed herein relate to the domain of mobile communication facilities and to the domain of searches for content.

Figure 1:
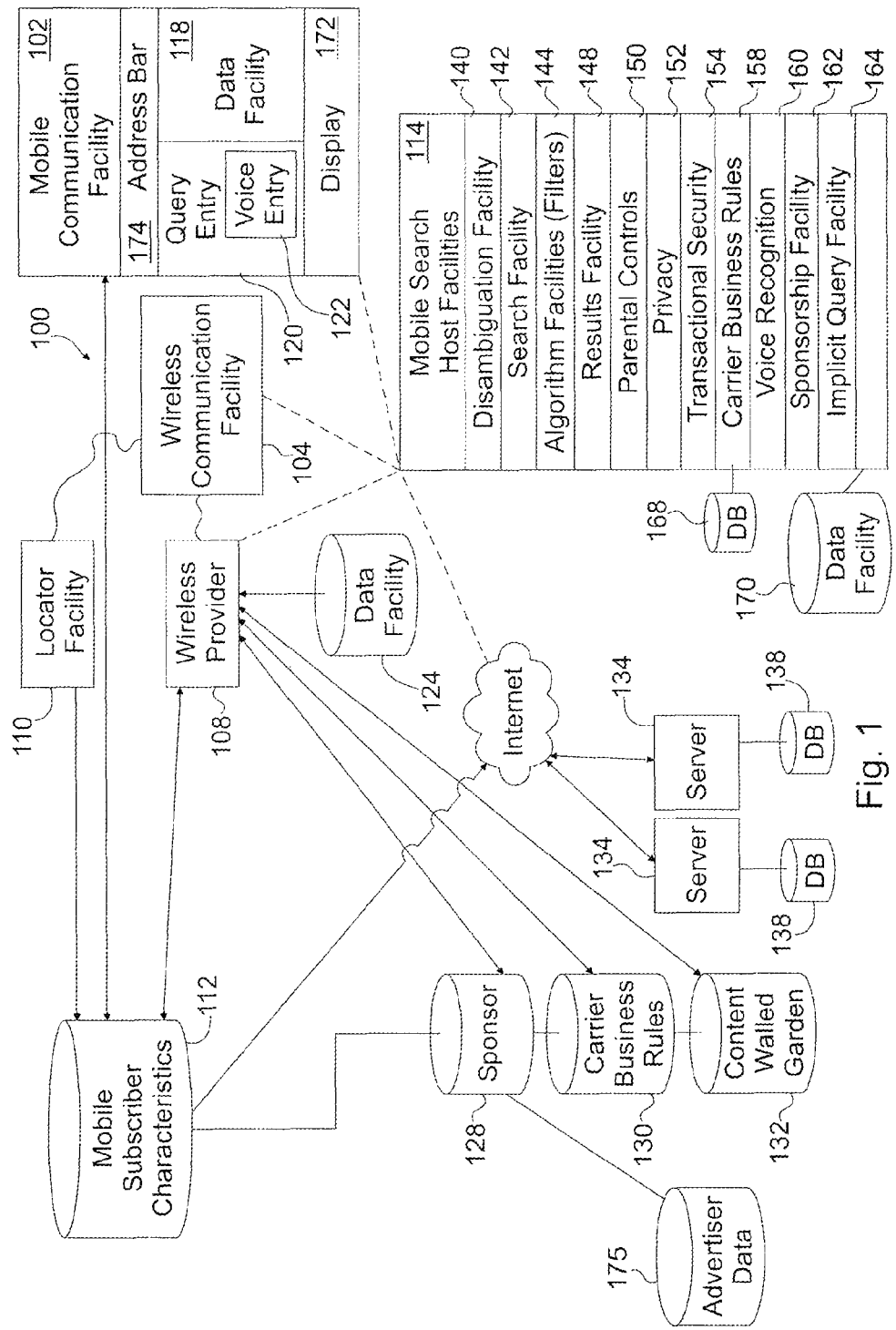
FIG. 1 illustrates a wireless platform.

FIG. 1 represents a wireless search platform 100 for facilitating the access to and integration of multiple data sources and data types for presentation on a mobile communication facility 102. The wireless search platform 100 includes a plurality of computer applications, devices, components, facilities, and systems, as well as a plurality of data facilities, including various data sources. The foregoing may be centrally located or geographically dispersed, may be locally and/or remotely interconnected, and may consist of distinct components or be integrated into combined systems. In the illustrated embodiment, the wireless search platform 100 architecture facilitates the processing of user-initiated queries entered into a query entry system 120 of a mobile communication facility 102. The mobile communication facility 102 may transmit this query to or via a wireless communication facility 104 for further processing and/or routing to data sources and/or processing facilities, such as one or more servers, such as HTTP servers or other servers that are suitable for handling data that are transmitted over computer networks. In embodiments, the wireless communication facility 104 may be linked to a locator facility 110 that generates information about the location of the user (including geographic location, proximity to other locations, network location, or other location information). The locator facility 110 may enable linkage of other information, such as information about a user query, with information about the user's geographic location at the time the query was initiated.

The wireless communication facility 104 may link directly to a wireless provider 108 such as a corporation or carrier providing the user's cellular phone service (e.g., Verizon, AT&T, Sprint, etc) or other wireless communication service. The wireless provider 108 may, in turn, have a number of proprietary databases from which it can obtain information that may be relevant to a user, such as to operate appropriately in response to a query entered by a user. For example, the wireless provider 108 may have access to a database containing carrier business rules 130 describing the proper handling of user queries. The wireless provider 108 may have access to a database containing the mobile subscriber characteristics 112 (e.g., age, address, customer history, call volumes, call histories, patterns in call histories, etc.) that, in turn, are linked to the Internet and through which it can access additional servers 134 and data sources 138. The wireless provider 108 may also have access to a "content walled garden" database 132 containing information from the wireless provider's 108 business partners from which the wireless provider 108 derives additional advertising or profit sharing revenues, such as content relating to cell phone offers, content relating to other services provided by the wireless provider, premium content that is paid for by the user, or content suitable for a mobile communication facility (such as a ringtone). The wireless provider 108 may also link the user query with sponsor information residing in a sponsor database 128 or with another data facility 124.

The wireless search platform 100 may include mobile search host facilities 114. The mobile search host facilities 114 may include one or more facilities for disambiguation 140, searching 142, algorithms/filters 144, results 148, parental controls 150, privacy 152, transactional security 154, carrier business rules 158, voice recognition 160, sponsorship 162, and/or implicit query 164, either alone or in combination. A search may be initiated on a phone idle screen (which may be coupled with one or more implicit queries), a Wireless Access Protocol ("WAP") site, a mobile storefront, or from a highlighted selection of text (e.g., from a website, email, SMS, or other format), or the search may be triggered by other website or local (e.g., cellular phone or other wireless device) activity. The mobile search host facilities 114 may link to additional databases 168 and data facilities 170. The mobile search host facilities may be accessed through the Internet, through the wireless provider 108, through the wireless communication facility 104, through other mobile communication facilities 104, or directly from the mobile communication facility 102. As indicated with the dashed lines on FIG. 1, the mobile search host facilities 114, either separately or in combination, may reside locally on the mobile communication facility 102, on the wireless communication facility 104, or on the wireless provider 108, or may be accessible externally through a network, or otherwise accessible, to perform the functions described herein.

The wireless search platform 100 illustrated in FIG. 1 may contain a mobile communication facility 102. The mobile communication facility 102 may be a device (e.g., a cellular phone, Blackberry, wireless electronic mail device, personal digital assistant, or device combining a number of these devices) utilizing a mobile communications protocol, system or technology, such as the advanced mobile phone system (AMPS), code division multiple access (CDMA), wideband code division multiple access (W-CDMA), global system for mobile communications (GSM), universal mobile telecommunications system (UTMS), integrated digital enhanced network (iDEN), and/or time division multiple access (TDMA). The mobile communication facility 102 may be a device utilizing one or more chipsets, such as the BREW chipset and/or operating system, and/or Bluetooth technologies.

In embodiments the mobile communication facility 102 may be any device capable of wireless communication, including, but not limited to a mobile phone, cell phone, satellite phone, walkie-talkie, handheld device, personal digital assistant (PDA), mobile network appliance, or an email, instant messaging, or chat device. The phone embodiment of the mobile communication facility 102 may be a cellular phone, satellite phone, a straight phone (i.e. "candy bar" phone), flip phone (i.e., "clamshell phone"). sliding top phone, wireless phone, 3G phone, global positioning system (GPS) phone, MP3 phone, music phone, or other mobile phone operating system utilizing MIDP compatible software, Symbian, or another proprietary operating system (e.g., Nokia, Sony Ericsson, Motorola, LG, Samsung, Sanyo, or Toshiba). The PDA embodiment of the mobile communication facility 102 may be a combination PDA/phone, and/or a GPS PDA, and may utilize operating systems including Palm, Windows, PocketPC, Psion, and/or PocketLinux. The mobile network appliance embodiment of the mobile communication facility 102 may be a web appliance, network appliance, or a GPS network appliance. Email, instant messaging, and chat device embodiments of the mobile communication facility 102 may include appliances, such as the Blackberry, Treo, or SideKick. The device may also, or instead, include a portable computer such as a laptop computer wireless coupled to a data network using, e.g., WiFi, WiMax, or cellular data communications.

The mobile communication facility 102 may facilitate the collection of data from data sources as a result of a query entry 120 or voice entry 122. Query entry 120 may be accomplished through the use of a numeric key pad entry, full mobile device keyboard entry (e.g., that found on a Blackberry or Treo device), partial mobile device keyboard entry (e.g., that found on a Blackberry device with only one key for every two letters), stylus/handwriting entry, bar code scanner (either 2D bar code or 3D bar code: "Quick Response Code"), or photographic entry using cellular phone-camera; through other navigational facilities (e.g., a stylus, arrow keys, scroll wheel, etc.); or through access to a computer network, such as through a physical connection (e.g., Ethernet or other network cable, wire, or the like), or through infrared, RF, Bluetooth or other wireless query entry. In embodiments, communication to the mobile communication facility may be compressed at the server and uncompressed at the mobile communication facility to accelerate data communication over a slow network.

Refer to FIG. 1, a mobile communication facility may be adapted with an address bar 174. The address bar 174 may be generated using a client application interface, for example. The address bar may be presented in a graphical user interface on a display associated with the mobile communication facility 102. The address bar 174 may be provided to allow a user to enter a URL, website, key words, search terms and the like. In embodiments, the user is presented with an address bar 174 and the user may enter a known URL (e.g. www.jumptap.com) into the address bar. Once entered, the user may initiate a process to facilitate the connection of the mobile communication facility 102 with the website associated with the URL. For example, the process may involve searching the Internet for a website with the entered URL. Once located, the website may be loaded and displayed on a display associated with the mobile communication facility 102.

The voice entry 122 function of the mobile communication facility may be used through the speaker-receiver device of the mobile communication facility 102 or by use of the standard SMS lexicon and syntax, and it may be adaptive to individual users' voice commands and usage patterns that are stored on and accessed from the mobile subscriber characteristics database 112. The voice entry 122 function may permit voice dialing, voice memo, voice recognition, speech recognition, or other functions related to audible input.

The mobile communication facility 102 may operate using a variety of operating systems, including, Series 60 (Symbian), UIQ (Symbian), Windows Mobile for Smartphones, Palm OS, and Windows Mobile for Pocket PC's. The display type used by the mobile communication facility 102 may be a black and white LCD, grayscale LCD, color LCD, color STN LCD, color TFT/TFD LCD, plasma, LED, OLED, fluorescent backlit, LED backlit, projection, flat screen, passive matrix, active matrix, or touch screen. The screen size may be small, medium, or large. In addition, the mobile communication facility 102 may have a secondary display, such as that situated on the outside of a clamshell-type cellular phone, that is visible to the user when the primary display is not, due to the clamshell phone being closed. In embodiments the mobile communication facility 102 may have more than one secondary display.

The mobile communication facility 102 may include one or more ports, slots, or similar facilities to accommodate expansion cards, such as a MultiMediaCard (MMC), a MMC/Secure Digital (SD), an RS-MMC 3v, an RS-MMC 1.8v/MMCmobile, miniSD, TransFlash/microSD, a USB-based memory device, SIM card, or a Memory Stick Duo. The mobile communication facility 102 may also accommodate high-speed data communications by utilizing GPRS, EGPRS (EDGE), 1×RTT, 1×EV-DO r0, WCDMA (UMTS), or iDEN protocols. Additional features of the mobile communication facility 102 may include any of the following: a hard drive, GPS/location capability, GAIT, an FM radio, infrared technology, an integrated PDA, Java (J2ME), MMS, music player, poly or mono ringtone capability, predictive text entry, push-to-talk technology, ringer ID, ringer profiles, side keys, speaker phone, SyncML, text keyboard, text messaging, text messaging templates, to-do list generation, touch screen, USB ports, Wi-Fi technology, and wireless Internet. The mobile communication facility 102 may also contain a data facility 118 for the storage of PIM data, IM logs, MMS logs, SMS logs, email logs, downloaded media, and a suggestion and results cache. The mobile communications facility 102 may include an operating system that is capable of running applications, such as multimedia applications, word processing applications, and the like.

The mobile communication facility 102 may transmit and/or receive data to/from the wireless communication facility 104, mobile subscriber characteristics database 112, and/or any of the mobile search host facilities 114 by utilizing an internal antenna, a stub antenna, a patch antenna, an antenna array, a stub/extendable antenna, or an extendable antenna.

The mobile communication facility 102 may have an embedded camera enabling it to capture and transmit graphic data to the wireless communication facility 104, mobile subscriber characteristics database 112, and/or any of the mobile search host facilities 114. The resolution of the camera may be any of the following, or any other suitable camera resolution: CIF (352×288), VGA (640×480), SVGA (800×600), 1+ megapixel, 2+ megapixels, or 3+ megapixels. The graphic capabilities of the mobile communication facility 102 may also include EMS picture messaging, picture ID, video capture, video calling, video messaging, PictBridge, and/or streaming multimedia.

The mobile communication facility 102 may have the hardware and/or software components enabling use of the mobile communication facility 102 via an optical mouse and/or wired mouse.

The wireless search platform 100 illustrated in FIG. 1 may contain a wireless communication facility 104. The wireless communication facility 104 may be, for example, a cellular telephone tower that routes the user's query. It may be associated with a wireless provider 108, a locator facility 110, or mobile search host facilities 114. The wireless search platform 100 may include a wireless provider 108.

The wireless search platform 100 illustrated in FIG. 1 may contain a locator facility 110 enabling the collection of geographic or other location data on users of mobile communication facilities 102. A locator facility 110 may be based upon (i) a Cell-sector System that collects information pertaining to cell and sector ID's, (ii) the Assisted-Global Positioning Satellite (A-GPS) technology utilizing a GPS chipset in the mobile communication facility 102, (iii) standard GPS technology, (iv) Enhanced-Observed Time Difference (E-OTD) technology utilizing software residing on a server and within the mobile communication facility 102 that uses signal transmission of time differences received by geographically dispersed wireless communication facilities 104 to pinpoint a user's location, (v) Time Difference of Arrival (TDOA), (vi) Time of Arrival (TOA), (vii) Angle of Arrival (AOA), (viii) TDOA-AOA, (ix) triangulation of cellular signals, (x) triangulation based on receipt of broadcast TV signals, (xi) location based on dead reckoning, (xii) location based on proximity to known locations (including locations of other mobile communications facilities 102), (xiii) map-based location, or any combination of any of the foregoing, as well as other location facilities known to those of skill in the art.

In embodiments, the mobile communication facility 102 may use a locator facility 110 (e.g. GPS system) to locate itself in its present location, or locations of interest to the user, whether explicitly stated or determined by PIM data, location history, or previous searches. In embodiments, the location may be transmitted back to the locator facility 110 for dissemination, processing, etc. Geographic information systems may also be used to determine a location point in a polygon, a location radius search, route calculation, points of interest, and/or geocoding and reverse geocoding. In embodiments, a user's location may also be self-entered into the wireless platform by the user. For example, the user may type in (or speak through a voice recognition system) an address, zip code, or other location information.

In an embodiment, a GPS system may be used as the locator facility. The GPS system consists of a group of satellites (>20) carrying atomic clocks that orbit the Earth twice a day. Earth-based observatories record orbital data related to the motion of the satellites. In order to determine global positioning, a GPS receiver (e.g. one disposed inside of the mobile communication facility) must communicate with four of the GPS satellites. The receiver computes its distance from each of the four satellites to determine its latitude, longitude, elevation, and time of day. The receiver computes the distance to each of the four satellites by calculating the difference between local time and the time the satellite signals were sent and then decodes the satellites' locations from their radio signals and an internal database. The location of the GPS receiver is located at the intersection of the four spheres created by the four satellites, where each radius is equal to the time delay between the satellite and the receiver multiplied by the speed of the radio signals. The differences permit calculation of three hyperboloids of revolution of two sheets, the intersection point of which gives the precise location of the receiver. If the elevation of the receiver is known, it is possible to compute precise location using only three satellites.

The wireless search platform 100 illustrated in FIG. 1 may contain a data facility containing mobile subscriber characteristics 112 pertaining to individual users of a mobile communication facility 102. This data may include, but is not limited to, data collected by the wireless provider 108 when an individual opens a wireless account, such as age, sex, race, religion, area code, home address, work address, billing address, credit card information, passwords, family information (e.g., mother's maiden name), birthplace, driver's license number, employer, position, annual income, income bracket, items purchased, friends and family information (including any of the foregoing types of information) and the like. The mobile subscriber characteristics facility 112 may continually, or periodically, update data for individual users, for example, bill amount(s), average bill total, payment history, on-time payment history, on-line usage amount, duration of on-line interactions, number of on-line interactions, family status and family information, number of children, shopping habits (e.g., views of or purchases of goods and services) click stream information, device type and device version, device characteristics, usage patterns (including those based on location, time of day, or other variables), device and/or subscriber unique identifiers, content viewing history, content presented for viewed by/not viewed by user, content and programs downloaded, videos, music, and audio listened to and/or downloaded, television watched, timing and duration of viewing/downloading, transaction history, and any other user or user defined characteristics. The purchase of physical goods may be facilitated by a wireless provider 108 by having the wireless provider 108 collect the user's credit card information as part of the billing cycle and adding goods transactions automatically to the wireless provider's bill to the user.

The mobile subscriber characteristics 112 database may also track data related to phone usage and location. For example, data collected could include a history of phone calls made, phone calls received, the mobile subscriber characteristics of the persons calling or called by the user, the duration of calls, a history of communications made via phone, Internet, email, instant messaging, or chat (and the entities communicated with by these technologies), history of phone calls made linked with geographic/location information at the time of each call, log of phone numbers, and a history of clicks and clickthroughs (or other keystroke or user interface equivalents thereof, including voice-initiated actions) made using the mobile communication facility 102.

FIG. 1 illustrates a sponsorship facility 175 associated with a sponsor database 128 according to the principles of the present invention. The sponsorship facility 175 may be provided by a corporation, an individual, or some other entity sponsoring results as described herein.

The wireless search platform 100 illustrated in FIG. 1 may contain mobile search host facilities 114. Within the mobile search host facility 114 there may be other facilities, including, but not limited to, a disambiguation facility 140, search facility 142, algorithm facility 144, results facility 148, parental control facility 150, privacy facility 152, transactional security facility 154, carrier business rules facility 158, voice recognition facility 160, sponsorship facility 162, and/or an implicit query facility 164. The mobile search host facility 114 may also link to another data facility 170.

The disambiguation facility 140 may complete or provide more meaning to ambiguous active user inputs. The disambiguation facility 140 may include SMS lingo translation, single word initial substring completion, multiple word substring completion, stem completion (e.g., single into plural format, verb into gerund), thesaurus lookups for homonyms or synonyms, spell check algorithms, spell check tables, phonetic spelling algorithms, phonetic spelling tables, phone number keypad to word conversion (including completion of possible substrings from number sequence), frequency-based algorithms, semantic analysis algorithms, location-based algorithms or other algorithms or facilities for reducing ambiguity as to the meaning of a query or partial query entered by a user.

The search facility 142 may initiate a search, such as by causing a query (optionally a disambiguated query) to be executed on a search facility, such as a search engine. The search engine might be a search facility that is based on Boolean search logic, categories of results, term frequencies, document frequencies, documents selected by other users who have entered similar queries, link structures of possible results, or any other known search facilities using any other known search algorithm.

The algorithm facility 144 may receive a user's input in the form of a problem and evaluate that problem by applying the set of all potential solutions available within the search space. At its most basic, the algorithm facility 144 may apply naïve/uninformed search algorithms consisting of the most intuitive solution(s) available within the search space. Alternatively, the algorithm facility 144 may also employ informed search algorithms, based on heuristics, that utilize intelligence about the elements of the search space in order to minimize search time and resource allocation of the algorithm facility 144. The algorithm may serve to promote or demote content for display 172 to the user based upon the frequency of queries, the frequency of clicks or clickthroughs, the velocity of queries; the site of the search launch, storefront visit, or mobile website; community tagging; mobile user scoring; or it may be based upon domain restrictions (e.g., only "espn.com").

An algorithm may be designed to create an index for information specific to the mobile communication facility 102. For example, the algorithm may look only for mobile tags (e.g., WML, xHTML—MP, MIME types, such as text, WAP, and/or WML, or mobile specific headers). An algorithm may also determine the aesthetic compatibility between the content and the capabilities of the display 172 of the mobile communication facility 102, including factors such as page width, page weight (e.g., the number of images and byte size), screen resolution and color capabilities, font types and sizes, client-side rendering capabilities, page complexity (e.g., features incompatible or specific to a mobile communication facility 102), and the like. This compatibility information may also be blended with other information, such as popularity data (e.g., WAP gateway, editorial scoring, and/or traffic market data).

The algorithm facility 144 may contain a collaborative filtering protocol, category filtering, a recommendation system and/or other process facilities for analyzing, refining, or filtering user input and/or search results. A collaborative filter may employ a two step process. During the first step, other users are identified who have similar rating patterns as those of the active user. Secondly, the ratings obtained from these similar users provide the empiric basis for predicting information of relevance to the active user. The collaborative filter can be both an inclusive and an exclusive process, gathering relevant information for the active user or removing incongruent information from the predictive information set.

A collaborative filtering protocol generally involves the collection of preference data from a large group of users. This preference data may be analyzed statistically to identify subgroups, or characteristics of subgroup members, with similar preference profiles. Various weighted average, fuzzy logic, or other techniques may be used to summarize or model a preference subgroup, and a preference function may be created using the model/summary. This function may then be used to match new users to an appropriate preference subgroup. In embodiments, such information may be collected from many individual mobile subscriber characteristic data sets, and data may be collected from many mobile communication facility users. For example, a wireless provider 108 may collect preference data from a large group of its customers. In embodiments, the data may be collected from non-mobile users and may relate to preference information collected from other on-line or off-line activities.

User preferences may be derived from user behavior or other implicit characteristics, or explicitly defined by a mobile communication facility user, or some combination of these. If users were to explicitly state their preferences (e.g. for types of restaurants, books, e-commerce, music, news, video, formats, audio, etc.), the explicit preference information may be stored in the mobile subscriber characteristic data bases associated with their phones. Users may implicitly register a preference through activity such as purchasing a product online, visiting a site on line, making a phone call from a mobile communication facility, making a phone call from another facility, viewing content, or engaging or not engaging in other activities. For example, if the user looks at a product and decides not to purchase the product, one can draw an inference that the user is not interested in the product, and this inference may be used as part of a collaborative filtering algorithm. In addition, inferences may be drawn from the types of establishments the user has been calling recently on the mobile communication facility. If he or she has been calling auto dealerships repeatedly over the past two weeks, an inference can be drawn that the user is presently looking for auto goods and/or services. Implicit preferences of users may also be collected by recording all pages that are visited by users and the frequency and/or duration of each visit. Using a binary coding scheme in which visited pages are coded "1" and unvisited pages "0," one may create user-based preference vectors and analyze statistically for both intra-user and inter-user cluster preferences or similarities. Other coding techniques may group certain sites along dimensions of commonality, with navigation behavior analyzed using any number of Euclidean or other distance and/or matching techniques. In embodiments, user preference data may be collected from within the mobile subscriber characteristics database. In embodiments, user preference data may be collected from outside of the mobile subscriber characteristics database. In embodiments, off-line behavior may also be used to characterize the preferences of the user.

In embodiments, a basic implementation of a collaborative filtering algorithm entails tracking the popularity of a product, service, business, transaction, or website by recording the total number of users in the set that rate it favorably (which may include a degree of favorability) or by recording the number of users that repeatedly visit the site. In essence, this algorithm assumes that what previous users liked, new users will like. In embodiments, a weighted averaging process is implemented to carve out subgroups of users who all highly ranked a product that has an overall unpopular rating with the overall user dataset.

A more robust collaborate filtering procedure, sometimes referred to as the K-nearest neighbor algorithm, uses a "training data set" that is based upon previous users' behavior to predict a variable of interest to members of a "target data set" comprised of new users. In addition to user preference data, the training data set may have additional predictor variables, such as might be contained in a mobile subscriber characteristics database (e.g., age, income, sex, date or place of birth, etc.). Variables of interest may include type of product purchased, amount of purchase, and so forth. For each row (single user data) in the target data set, the algorithm locates the "K" closest members of the training data set. Closeness, or distance, as used by the algorithm is generally a Euclidean Distance measure. Next, the algorithm finds the weighted sum of the variable of interest for the K nearest neighbors, where the weights are the inverse of the calculated distances. This process is then repeated for all remaining rows in the target set. From this information, models may be derived for future prediction. As the user population increases, the training data set may be updated to include new rows and thus capture any changes in user preference for use in revising the prediction model.

Other methods that may also be used successfully for statistical clustering of user preference groups include the weighted majority, Bayesian prediction, Pearson product correlation, and factor analysis.

In addition to the description of collaborative filtering summarized above, the following text may be referenced for more information relating to collaborative filtering and is incorporated herein by reference: Nakamura, A. and Abe, N., 1998. *Collaborative Filtering using Weighted Majority Prediction Algorithms in: Proceedings of ICML '98*, 395-403. Morgan Kaufman Eds. (see Appendix A).

In addition to, or instead of collaborative filtering, or other preferential treatment of various information as determined by other methods, non-preferential or objective type data may be employed to further target search results about the user of a mobile communication facility 102. For example, a location of the user may be determined through a GPS system (or other location based service), and this location may be used to filter results with or without the use of a collaborative filter. In embodiments, elements such as time of day, type of device, activities associated with time of day, activities associated with location, invoice activity, and the like may be used to further refine a search. In an embodiment, such information may be used in a category style filter (i.e. a filter designed to include or exclude results based on the data). In embodiments, such information may be used by a collaborative filter algorithm. In embodiments, such information may be used to filter results without being considered in the collaborative filter algorithm.

In embodiments, data used in the process of obtaining search results, refining search queries, making corrections, making suggestions, disambiguating search queries, categorizing results, performing explicit or implicit searches, filtering, collaboratively filtering, or performing other processes defined herein may be stored in a database (e.g. a relational database). In embodiments, the data may be mined, associating, linked, extracted, or otherwise manipulated or used. For more information relating to the association and mining of such data, refer to the following document, incorporated herein by reference: *Integrating Association Rule Mining with Relational Database Systems Alternatives and Implications*, by Sunita Sarawagi, Shiby Thomas, Rakesh Agrawal, published by the IBM Almaden Research Center (see Appendix B).

A recommendation system may use information from a user's profile to make predictions regarding other information/products that might interest the user. Data used in the recommendation system may be obtained through the use of explicit and implicit data collection. Explicit collection refers to data collected from users who, for example, are directly rating items, ranking products, stating preferences, listing favorites or least favorites, etc. Implicit collection refers to data collected as, for example, a byproduct of user behavior, such as products viewed in an online store or products purchased. The recommendation system may compare the collected data to similar data collected from others and calculates a list of recommended items for the active user.

Suggestions may be generated for display 172 based upon each keystroke the user enters into the mobile communication facility 102. Suggestions may be cached locally on the mobile communication facility 102 and blended with the performance of server updates in order to optimize the overall performance of the wireless platform 100. Updates may also be provided to the cache memory of the mobile communication facility 102 without requiring a user keystroke. Additional suggestions may be supplied to users by ranking content based upon popularity, the frequency of query activity, frequency within content, the acceleration of the frequency of content, the frequency of purchases, the sales conversion rate, as well as any changes that occur to any of these metrics. Suggestion lists can also be derived by "de-dupping" with frequent terms, such as "Tyra Banks out of 1, 2, 3," and categorizing, for instance, by title, artist, or a yellow pages-type taxonomy or other subject matter organization. The suggestions may be specific to a mobile communication facility 102, mobile subscriber characteristic 112, result facilities, carrier business rules 130, and/or search algorithm facilities 144. Suggestions may be dynamically displayed in a Java or BREW application. Suggestions may also be presented in a browser. For example, if a user types BR SP as their query, the responding WAP page may ask the user if they intended on entering Britney Spears or Bruce Springsteen. Then the user may click on the link of the intended query.

Recommendations may be specific to a mobile communication facility 102, mobile subscriber characteristic 112, result facilities, carrier business rules 130, and/or sponsor facilities 162. Providing a recommendation to the user about other relevant content may be done either during search result display 172 or after a search item has been selected. The relationships between items may be based on transactions, searches, and query behaviors and may include cross-selling products (e.g., recording artists within the same genre) or offering users additional products and services (e.g., offering a taxi service following a user's purchase of movie tickets in an urban setting). Query classification may use a yellow pages-type taxonomy (e.g., restaurants or physicians, or for inferring that a five digit number is a postal zip code) and may be specific to a mobile communication facility 102, mobile subscriber characteristic 112, delivery facility, disambiguation facility 140, and/or parental controls 150. The wireless platform 100 may also use keyword mapping to a query classification based upon taxonomy. For example, a user query of "screwdriver" may map onto the category "hardware." This keyword mapping may be specific to a mobile communication facility 102, mobile subscriber characteristic 112, delivery facility, disambiguation facility, and/or parental controls.

The results facility 148 may include general content and services, specific content catalogs, carrier premium content, carrier portal content, device based results, or home computer desktop search results. The general content and services provided in the results facility 148 could be podcasts, websites, general images available online, general videos available online, websites transcoded for MCF, or websites designed for mobile browser facilities. Specific content catalogs may include travel, driving directions, results displayed on a map, white and yellow page telephone directories, movie show times and reviews, comparison shopping and product reviews, weather, stock quotes, general knowledge questions, word definitions, a thesaurus, restaurant reviews and reservations, WiFi hotspot locations, horoscopes, area codes, zip codes, sports scores, flight times, fantasy sports statistics, drink recipes, pick-up lines, jokes, information within a physical store (e.g., inventory), a mobile wallet, an encyclopedia, adult content, gambling content, and FAQ's. The carrier premium content provided in the results facility 148 may include ringtones (monophonic, polyphonic, or real tones), ringback, music streaming, MP3, video, games, screensavers, images designed for cell phones, mobile books, or other mobile applications. Carrier portal content includes news, such as the current top stories, entertainment, business, technology, and finance, and sports, weather, stock quotes, and account information. Device based results provided in the results facility 148 may include messaging, such as SMS MMS and instant messaging, email, chat, PIM (address book), and monetary services for a mobile wallet. Finally, home computer desktop search results may include text documents, Portable Document Format ("PDF") documents, maps in various formats including annotated maps, or a similar facility, spreadsheets, presentations, photos and images, web pages, email, IM, and chat.

Ordering and displaying search results may be based upon a mobile communication facility 102, mobile subscriber characteristic 112, delivery facility, disambiguation facility, parental controls 150, search algorithm facilities 144, carrier business rules 158, and/or a sponsorship facility 162. The ordering of content for display may also be based upon the amount of content available within a category. The display 172 may be changed based upon the screen size of the mobile communication facility 102, and sounds or other multimedia content may adapt to capabilities of the mobile communication facility 102. Ordering and display of content may be organized by the type of content, the artist, the date, or concept (e.g., Jaguar as a car, or jaguar as an animal), and other categories may derive from deduction within the mobile search host facilities 114. In addition to ordering, content may be emphasized or deemphasized by weighting within the display 172. For example, weighting may occur through the use of size, motion, lack of symmetry, use of garish colors, sounds, multimedia, or other means of accenting content. For sponsored links, there may be opportunities for yield optimization (e.g., clicks multiplied by the bid cost).

The parental controls 150 function may be set up by the wireless provider 108 at the time that the user account is created. A web-based interface may be used for changing or modifying the parent controls and for entering/changing the password protection. Alternatively, the parental controls may also be managed via an interface contained within the mobile communication facility 102.

The privacy facility 152 may include one or more facilities for protecting user privacy, such as an encryption facility for encrypting sensitive user data. The privacy facility 152 may also include a facility for protecting the user from undesired content, such as unwanted commercial email, spam, spyware, viruses, or the like. A privacy facility may, for example, filter such content prior to revealing results or may, in other embodiments, suggest modified queries that are less likely to reveal a user's confidential information or that are less likely to return undesired content. A privacy facility 152 may also function in a manner similar to a secure channel, such as via VPN, with a wireless provider 108. This secure channel may permit sensitive information to be shared securely.

The transactional security facility 154 may contain additional privacy and parental control settings, transactional security settings for the protection of wireless shopping, and the management of digital rights. In embodiments such a facility may include password-based security, a public-key/private-key facility, or other suitable security protocol for ensuring the authenticity of the participants in a transaction that is executed using the mobile communications facility 102.

The carrier business rules 158 of the wireless provider 108 may be associated with, or included in, the mobile search host facilities 114. These rules may govern what content users may access (e.g., walled garden vs. non-walled garden), where within the user interface sponsor logos and links are placed, which sponsor facilities are included, rules for the inventory of advertisements, rules allowing categories of transactions by users (e.g., based on access conditions, employer controls, parental controls, or the like) and managing auctions. In the instance of duplicate information occurring in a search result, the preferred provider's content may be given priority over others.

In addition to voice recognition 160 residing on the mobile communication facility 102, it may be contained within the mobile search host facilities 114 and use both software algorithms and hardware-based solutions for accurate voice recognition.

The sponsorship facility 162 stores premium content from sponsors that pay the wireless provider 108 to display this content to relevant users. Sponsors' information may link to a web site visited by the user (i.e., pay-per-click), or link to a call (i.e., pay-per-call). Sponsor information may include information that is text only, graphic information in the form of photographs, graphic art designs, or video, as well as various combinations of these. Sponsor information may also take the form of an interactive software application (i.e., a game), or special ringtones (e.g., jamtones). Sponsor information may be displayed to users based on the relation of the sponsor information and user search queries, results lists, items or categories, and the websites visited by the user. Web pages may display content for syndicated ads or links for syndicated ads. Furthermore, the wireless search platform 100 illustrated in FIG. 1 may contain the sorts of sponsor information described above in a separate database 128.

The implicit query facility 164 provides for the display of relevant content to users based on user activities other than explicit search queries. For example, in GPS data the locator facility 110 may indicate that the cell phone user is in the vicinity of a sponsor's restaurant. In addition, the clock contained in the mobile communication facility 102 and/or the wireless communication facility may indicate that it is mid-evening. A predictive algorithm could merge this information and make the implicit query that the user is interested in restaurants in his immediate vicinity at which he could purchase dinner, and then push content (ads, phone numbers, menus, reviews) to his mobile communication facility 102 for immediate display. Other implicit queries could similarly be based upon a user's parental controls 150, the carrier business rules 158, results facility 148, and so forth, either alone or in combination.

The wireless search platform 100 illustrated in FIG. 1 may contain a server 134 and database 138 connected to the Internet. Databases 138 connected to the wireless platform 100 over the Internet may store information, such as individual business websites with which the user transacts.

The wireless search platform 100 illustrated in FIG. 1 may contain a database storing wireless carrier business rules 130. The carrier business rules 130 may prioritize advertising content (see walled garden content 132 below) based on the financial interests of the wireless provider 108 or the importance of the sponsor 128. Additional carrier business rules 130 may include those described herein and in the documents incorporated by reference herein.

The wireless search platform 100 illustrated in FIG. 1 may contain a database storing "walled garden" content 132. Walled garden content 132 may be content from which the wireless provider 108 derives additional revenues based, for example, on user clickthroughs or content downloads (e.g. ringtones, wall paper, ringbacks, music, videos). Because of this additional revenue, the wireless provider 108, through its carrier business rules 130, may ensure that this advantageous content is given priority over search results that are equally relevant but do not have financial benefits for the wireless provider 108.

Figure 2:
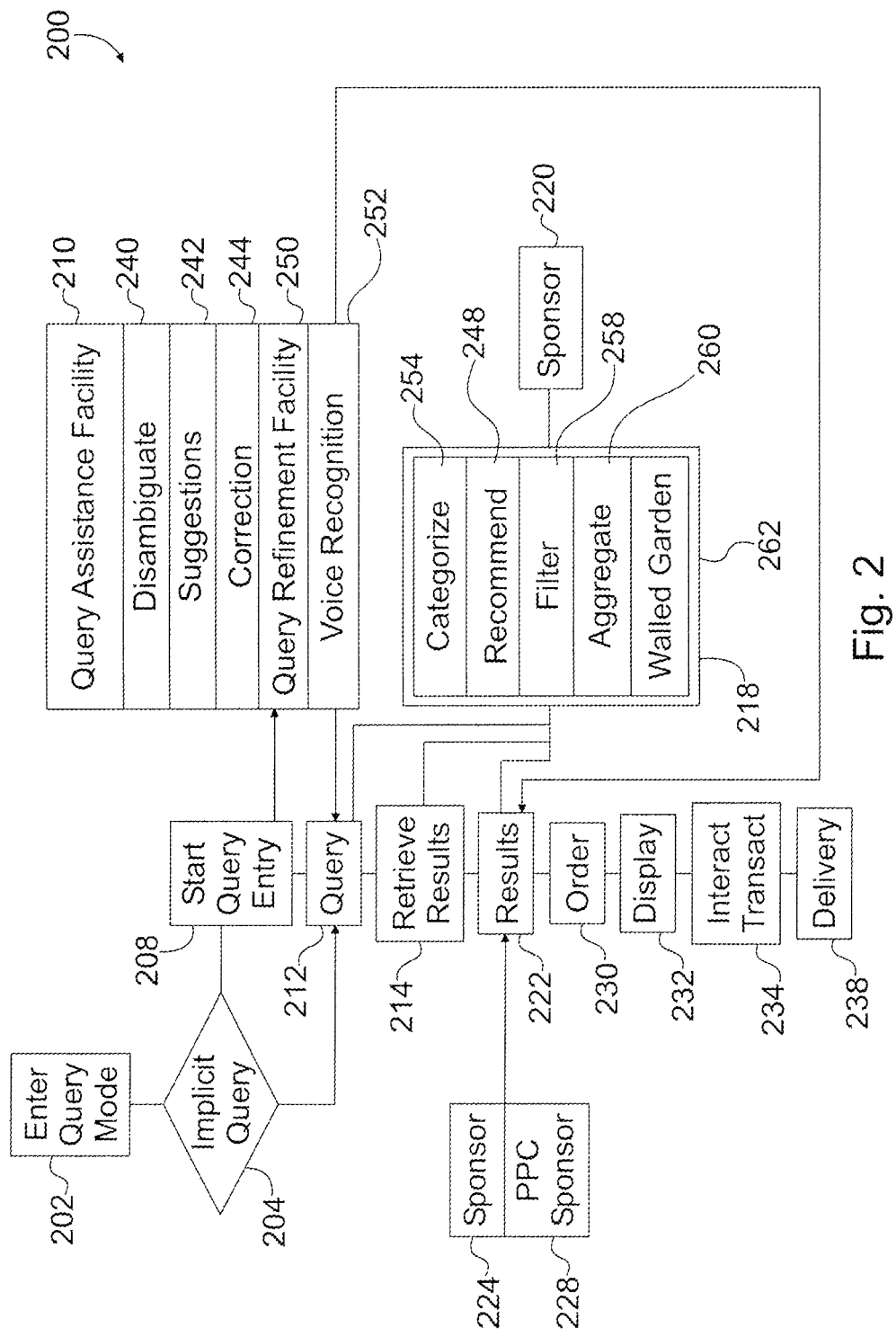
FIG. 2 illustrates a method for entering a search query, manipulating the query, and delivering search results.

FIG. 2 is a schematic diagram 200 showing a plurality of processes for handling a user query and producing a delivered result to the user. In the illustrated embodiment, the query mode 202 is entered. The query mode may be in the form of an explicit query entered by an active user, or it may be an implicit query initiated not by the user but by some characteristic related to the user and/or his behaviors (e.g., his GPS location). The start of the query entry 208 made explicitly by the user may be paired with additional information derived from a related implicit query 204. Depending on the clarity of the query entry 208, the query may need correction 244, disambiguation 240, or redirection 250. The query entry 208 may also be paired with recommendations 248, suggestions 242, or categorized 254 prior to further processing. If the start of the query entry 208 is made by voice, rather than text, it may be aligned with a voice recognition 252 program. Any or all of the processes used to optimize the search may be refined with information relating to the mobile communication facility, such as, for example, mobile subscriber characteristic information, location, time, filter algorithms, and the like.

Once the initial explicit and/or implicit query is made, the query 212 is processed and the initial results retrieved 214. Both the query 212 and the initial retrieved results 214 may undergo additional filtering 258 and aggregation 260. Walled garden content 262 and sponsored content 220 may also attach to the query 212 and present tailored results 222 to the user. The results 222 may also, in turn, trigger the posting of additional sponsor 224 messages and advertisements. Information from pay-per-click (PPC) sponsors 228 may link to the results, making it possible for the user to quickly learn about sponsors' services, phone numbers, addresses, hours of operation, sales, and so forth. If the start of the query entry 208, for example, undergoes redirection 250, it may either be routed back to the query stage 212 or immediately present the user with the results 222 based upon the query. Once results are retrieved, but prior to display 172, the content may be tested for compatibility with the user's mobile communication facility 102 by using a spider to run mock compatibility trials during which it emulates the processing characteristics of a broad array of commercially available wireless communication facilities, including the user's mobile communication facility 102 type, in order to determine the content within the result set that is compatible with the user's mobile communication facility 102.

The query results 222 may be ordered 230 prior to display 232 based, for example, upon the sponsor 224, mobile subscriber characteristics, information relating to the mobile communication facility, location, carrier rules, filter results, and/or walled garden 262 priorities. Once the results 222 are displayed 232, the user may initiate interactions/transactions 234 with the information (e.g., placing a call, click on a link, or an online order) that is then delivered 238 wirelessly through the wireless platform 100 described in FIG. 1.

Referring back to FIG. 1, a wireless communication facility 104 may be an equipment enclosure, antenna, antenna support structure, and any associated facility used for the reception or transmittal of a radio frequency, microwave, or other signal for communications. An antenna may include a system of poles, panels, rods, reflecting discs or similar devices used for the transmission or reception of radio frequency signals. An antenna may be an omni-directional antenna (such as a "whip" antenna) that transmits and receives radio frequency signals in a 360-degree radial pattern, a directional antenna (such as a "panel" antenna) that transmits and receives radio frequency signals in a specific directional pattern of less than 360 degrees, or a parabolic antenna (such as a "dish" antenna), a bowl-shaped device for the reception and/or transmission of radio frequency communication signals in a specific directional pattern. Other antennae that may be included in a wireless communication facility are accessory antenna devices, such as test mobile antennas and global positioning antennas which are less than 12 inches in height or width, excluding the support structure.

One or more wireless providers 108 may mount equipment on a single wireless communication facility 104.

Other examples of devices that may comprise a wireless communication facility include a lattice tower, a wireless communication support structure which consists of metal crossed strips or bars to support antennas and related equipment, a monopole which is a wireless communication facility 104 consisting of a support structure, and related equipment, including all equipment ancillary to the transmission and reception of voice and data. Such equipment may include, but is not limited to, cable, conduit and connectors, stanchions, monopoles, lattice towers, wood poles, or guyed towers.

A wireless provider 108 may include any for-profit, non-profit, or governmental entity offering wireless communication services. A wireless provider 108 may include services utilizing a broad array of wireless technologies and/or spectra, including, but not limited to, Cellular, Advanced Wireless Services (AWS) Spectrum, Broadband PCS, Narrowband PCS, Paging, Wireless Communications (WCS), Wireless Medical Telemetry (WMTS), Specialized Mobile, Private Land Mobile, Maritime Mobile, Low Power Radio Service (LPRS), Dedicated Short Range Communications (DSRC), 218-219 MHz, 220 MHz, 700 MHz Guard Bands, Air-Ground, Amateur, Aviation, Basic Exchange Telephone, Broadband Radio Service (BRS), Citizens Band (CB), Commercial Operators License Program, Educational Broadband Service (EBS), Family Radio Service (FRS), General Mobile Radio, Industrial/Business Radio Pool, Intelligent Transportation Systems (ITS), Instructional Television Fixed (ITFS) See Educational Broadband Service, Lower 700 MHz, Medical Implant Communications (MICS), Microwave, Millimeter Wave 70-80-90 GHz, Multipoint Distribution (MDS/MMDS), Multi-Use Radio Service (MURS), Offshore, Personal Locator Beacons (PLB), Personal Radio, Public Safety, Radio Control Radio Service (R/C), and Rural services.

A locator facility may work with the mobile communication facility 102 in identifying the current geographic or other location of the mobile communication facility. A locator facility 110 may, for example, be used to locate the geographic location of a wireless device through the use of geographically-tagged personally identifiable data or personally identifiable data. Geographically-tagged personally identifiable data describes personally identifiable data that is linked to a particular location through use of location-based services. Personally identifiable data is information that can be used to identify a person uniquely and reliably, including but not limited to name, address, telephone number, e-mail address and account, or other personal identification number, as well as any accompanying data linked to the identity of that person (e.g., the account data stored by the wireless provider 108). In addition to or as an alternative to geographic location, a locator facility 110 may identify other locations, such as proximity to other users, proximity to a network location, or position relative to other users (e.g., in a line).

As described above, mobile subscriber information may be stored in an accessible form in a mobile subscriber characteristics database 112. The information may be accessible directly from a mobile communication facility 102, from the wireless provider 108, or from another user and or handler of the information. In addition, the mobile subscriber database 112 may be loaded with information relating to a mobile communication facility 102, a user of the mobile communication facility (e.g. a customer of the wireless service provider 108), and a wireless service provider 108 or other source of useful information. The mobile subscriber information may be used in conjunction with a search for information on a mobile communication facility 102. For example, the mobile subscriber information may be used to help better assess the desired search targets of a user using a mobile communication facility. In embodiments, the user may perform a search based on key words (or disambiguated, corrected, suggested or other terms as described herein), and some or all of the mobile subscriber characteristic information may be used in addition to the key words as a way of refining or customizing the search to the particular user. For example, the user's age, location, time of day, past mobile communication facility transactions (e.g. phone calls, clicks or click throughs) may be used to predict what the user is more interested in. In embodiments, the information that is predicted as valuable may be listed at the top of the search results; they may be the only results produced or they may be highlighted in some way. The mobile subscriber characteristic information may be used in connection with an algorithm facility 144 for example. The mobile subscriber characteristic information may be used in connection with a category filter or other filter used to refine search results according to such information.

By way of another example, the mobile subscriber information stored in the mobile subscriber characteristics database 112 may be used in an implicit search as described in further detail herein. The wireless provider may gain information pertaining to the user's location, time of day, likes and dislikes (e.g. through interpretation of other transactions [e.g., phone activity or web activity] related to the mobile communication facility 102), and the wireless provider may facilitate the downloading of apparently relevant information to the mobile communication facility in anticipation of the user's desire for such information. For example, a location facility 110 may locate the mobile communication facility. The location may be associated with the time of day at which the location was obtained. The location information may be associated with the other mobile subscriber characteristic information through a phone number associated with the mobile communication facility. The location may be Harvard Square in Cambridge, Mass. The time may be 6:30 p.m. and the user may have called Chinese restaurants ten times over the past two months at about this same time. This may be determined based on previous queries or by history of phone calls that may then be reverse-searched to check for relevance to future queries.

With this information, the system may make an inference that the user is interested in dinner at a Chinese restaurant and download information pertaining to such in the area of Harvard Square. In addition, information pertaining to dinner categories or other results may be presented. In embodiments, this collection of user relevant information may be used in connection with sponsor information stored in the sponsor database 128, and some or all of the results presented to the user may be sponsored information. The sponsor information may be the result of a search result auction based on the user relevant information, or the sponsor information may be related to local restaurants wherein the sponsored link is a pay per call sponsored link, for example.

There are many ways in which the mobile subscriber characteristic information can be used in a mobile communication facility search for information, whether it is an explicit, implicit, or other form of search, and several such embodiments are presented in more detail below.

As described above, the sponsor database 128 may store sponsor information in an accessible form in the sponsor database 128 to be used in the searching for information, presentation of information, accessing of information, or other activity associated with the mobile communication facility 102. In embodiments, the sponsor information may be used to present syndicated sponsor links, advertising, content, or other information on the mobile communication facility 102.

A sponsored result may be presented to the user of a mobile communication facility 102 as a result of an auction for advertising space on the mobile communication facility 102. The auction may be keyword based, term based, phrase based, algorithm based, or some other system of associating information, a site, content, and the like with a search query or inquiry. For example, the user of a mobile communication facility 102 may conduct a network search by entering a search query, and the query, or some related form of the query (e.g., a disambiguation of the query, correction of the query, suggestion related to the query), may be processed through an auction in which the highest bidder for the auction receives an elevated right to advertise its content. The content may be presented as a sponsored link on a display associated with the mobile communication facility. The sponsored link may be highlighted, prioritized, or otherwise presented. In embodiments, the sponsored information may be presented on a site visited by the mobile communication facility user. For example, the user may click on a link other than the sponsored link. Once the website content is displayed on the mobile communication facility, information relating to the sponsored link may also be displayed, offering another chance for the user to click on the sponsored link.

In embodiments, a user of the mobile communication facility 102 may perform a search for information, or a search for relevant information may be performed in anticipation of the user desiring such information (e.g., an implicit search) and included in the results presented may be a sponsored link, content, or other information. The sponsored content may be the result of an auction (e.g., a keyword based auction, algorithm based auction, location based auction, mobile subscriber characteristics based auction, or combination auction wherein information, such as from the search query, is combined with other information, such as location or mobile subscriber characteristics), and it may be presented and displayed on a display associated with the mobile communication facility in a prioritized manner, highlighted manner, exclusive manner, or presented in some other manner.

In embodiments, sponsor information may be presented to a mobile communication facility 102 as the result of an auction. In embodiments sponsor information may be presented as a pay-per-call link or content. In a pay-per-call embodiment, there may not have been an auction for the right to post the information on the mobile communication facility 102. The information may have been presented because it appeared relevant or for some other reason. In such situations, the user of the mobile communication facility may be presented with a special phone number associated with the sponsor. When the special number is called, the receiver of the call (e.g., a vendor of goods or services) is presented with an option to receive the call and pay a commission to the poster of the information (e.g., the wireless service provider) or decline the call. In another somewhat similar scenario, the vendor may be allowed to accept the first call for free, or pay for/billed for the call later, but have to accept such charges in the future if referrals are desired. The user of the mobile communication facility 102 may store the sponsored or referred phone number in an address book of the mobile communication facility 102, and every time the number is called, the wireless service provider may be paid for the referral. In embodiments, the referral/sponsor fee may go down with use, go up with use, or remain stable with use. In embodiments, the referral/sponsor fee may change with time or other parameters. In embodiments, a pay per call number is the result of an auction process. Advertising syndication may be segmented by mobile communication facility 102, mobile subscriber characteristics 112, delivery facilities, and/or parental controls 150.

In embodiments, the carrier rules database includes information relating to search techniques, search methodologies, locations for searchable content, walled garden rules, out of garden rules, out-of-network searching rules, in-network searching rules, search result presentation rules, sponsor presentation rules, sponsor search rules, sponsor rules, content presentation rules, and other information and rules pertaining to the search, display, ordering, and/or presentation of information on the mobile communication facility 102.

Carrier business rules may provide guidance on how, for example, a search term is to be disambiguated or corrected, what search terms should be suggested as a result of an entered or submitted query, how results and in what order results should be presented, or how sponsors should be selected and or presented. The carrier business rules may provide guidance about when to search in-network databases (e.g., walled garden content 132) and when to search out-of network databases (e.g., database 138 through server 134). For example, a wireless provider 108 may want to cause users of mobile communication facilities 102 to order music, videos, ringtones, wallpaper, screensavers, and the like from an in-network database of walled garden content 132, while the wireless provider may want current news to come from an out-of-network source. The wireless provider may then set these rules and store them in a carrier business rules database 130. These rules can then be accessed by the wireless provider (or optionally from the mobile communication facility 102 or other related facility) during the search, presentation, or ordering, or other parameter according to the present invention.

A walled garden database 132 may be associated with a wireless provider and a mobile communication facility 102 according to an aspect of the present invention. The walled garden 132 refers to subset of carrier business rules 130 that determine the type of access to wireless content that a user is permitted. The walled garden may limit the scope of permitted content to a pre-defined content set that is determined by the wireless provider 108. For example, a wireless provider 108 may license content from third parties and offer the provider's subscribers a bundled package of the licensed content, while restricting access to other content. The wireless provider 108 may direct the content layout, authentication, royalty tracking and reporting, billing, quality of service, etc. through the provider's carrier business rules, or this function may be outsourced to a third party. The walled garden 132 permits a wireless provider 108 to offer its subscribers a suite of content as part of the subscriber's wireless basic account, thereby eliminating the need for the subscriber to individually pay for discrete licensed products within the licensed content package. The walled garden 132 restricts the choice of content that is available to subscribers. Typically, the wireless provider 108 is compensated for content distribution in a form of revenue split between itself and the licensed content providers.

Related to the walled garden 132 model of content distribution is the gated garden model. In the gated garden, the wireless provider 108 may create a virtual toll gate through which third parties may offer their proprietary content to the wireless provider's subscribers. In exchange, the wireless provider 108 shares in the revenues derived from its subscribers' accessing the third party content. Unlike the walled garden 132, in the gated garden model the wireless provider 108 typically does not assume responsibility for the content or customer service related to problems accessing the content.

The algorithm facility 144 may perform algorithms of all types including algorithms for combining information relating to a search, ordering results from a search, or displaying results, sponsoring results, and the like. For example, an algorithm facility may include an algorithm to define how to incorporate the mobile subscriber characteristics into a search query entered on the mobile communication facility 102. The algorithm may, for example, determine what information to use in combination with a search query, what information to use in an implicit search, what weight to provide to the various parts of the search (e.g. location receives a high weight in an implicit search), what sponsors are acceptable, how results should be ordered, how results should be displayed (e.g., highlighted), and/or determine other parameters related to the search. An algorithm facility 144 may also include sponsorship algorithms, algorithms related to auctions, algorithms related to pay per click, algorithms related to pay per call, or other algorithms related to the development of a search as described herein.

The algorithm facility 144 may be a software tool used for evaluating a number of possible solutions based upon a user query. The set of all possible solutions may be called the search space. In general, uninformed searching may employ brute force searching or "naïve" search algorithms for relatively simple, direct traversal of the search space. By contrast, informed search algorithms may use heuristics to apply knowledge about the structure of the search space during a search. Potential algorithms that may be used in the algorithm facility 142 include, but are not limited to, the uninformed search, informed search, tree search, list search, adversarial search, constraint satisfaction, genetic search, probabilistic search, simulated annealing, string search, taboo search, and/or federated search.

A parental control facility 150 may be a software-based means of restricting access to certain types of (user-defined) objectionable content. The parent control facility 150 may include multi-level and/or dynamic web filtering technology to filter and block out inappropriate content. The parental control facility 150 may link to other features of the wireless search platform 100 or mobile communication facility 102. For example, the parental control facility 150 may, upon blocking objectionable content, send an email notification or cell phone alert about inappropriate web browsing, instant messaging, and chat sessions, etc. Comprehensive log reports can summarize a child's activities. The parental control facility 150 may also include the means to control the total time that a user is permitted to use a mobile communication facility 102 or the Internet, filter web based email accounts, block objectionable pop up ads, etc.

A voice recognition facility 160 may be a software component enabling a machine or device (e.g., a cellular phone) to understand human spoken language and to carry out spoken commands. Typically, a human voice is received by the device and converted to analog audio. The analog audio may in turn be converted into a digital format using, for example, an analog-to-digital converter, which digital data may be interpreted using voice recognition techniques. Generally this is done through the use of a digital database storing a vocabulary of words or syllables, coupled with a means of comparing this stored data with the digital voice signals received by the device. The speech patterns of a unique user may be stored on a hard drive (locally or remotely) or other memory device, and may be loaded into memory, in whole or in part, when the program is run. A comparator may use, for example, correlation or other discrete Fourier transform or statistical techniques to compare the stored patterns against the output of the analog-digital converter.

The capacity of a voice recognition facility 160, such as vocabulary, speed, and length of digital samples that can be analyzed, may be constrained by hardware capabilities of the voice recognition facility 160, such as memory capacity, sampling rates, and processing speed, as well as the complexity of algorithms used for comparisons.

An implicit query facility 164 may automatically generate context-sensitive queries based on a user's current activities, characteristics, and/or the user's device characteristics. For example, the implicit query facility 164 may retrieve Internet links, music files, e-mails, and other materials that relate to an active user's query, but which the user did not specifically query. Other data linked to the user's mobile communication facility 102, for example geographic location obtained from the locator facility 110, may be used to initiate an implicit query for stores in the user's general facility that, based on the user's previous Internet usage, are of likely interest to the user. An implicit query facility may gather and download content onto the mobile communication facility 102 in anticipation of a mobile communication facility user's desire for such information. This technique of providing results in advance of the search query may be used to increase speed of content delivery, for example.

A client application interface may be associated with a mobile communication facility 102. The client application interface may be a software program operating through a processor (and operating system) on the mobile communication facility, and the program may facilitate processes used in the mobile communication facility and/or generate information through the display 172. The client application interface may perform a number of functions associated with the processes and devices as described herein. For example, the client application interface may produce the search query entry facility, operate in association with a voice activation facility, operate in association with transmission and reception circuitry on the mobile communication facility, operate in association with mobile host facilities 114, produce a graphical user interface on the mobile communication facility, or perform other functions related to the mobile communication facility and/or systems and processes as disclosed herein. The client application interface may perform several functions, such as producing a graphical user interface on the mobile communication facility. Another function may be expanding a line item (e.g. a category, a download configuration or option, etc.) when a cursor or other interface is hovering on the item or otherwise interacting with the item. Another function may be to represent a hierarchy by a visual cue (e.g. with an arrow, multifaceted arrow, plus sign, or the like) with the sub-items appearing below when the visual cue is selected. Another function may be representing a hierarchy as line items with selection scrolling in another screen with the sub-items. Another function may be to provide instrumentation to allow for tracking of user clicks just as web pages would be tracked for click patterns. Another function may be using a camera associated with the mobile communication facility to track phone movement as a method for navigating on the screen (e.g. scrolling up/down & left/right on a picture, map, or text to facilitate selection of an item, or the like). Another function may be to provide smooth visual transitions (e.g. hierarchy screen movements and expanding line item) which may provide further visual indication, thereby increasing usage and sales. Another function may be to provide tool tips for icons. The tool tips may be presented after a predetermined hover time is achieved or there may be a visual cue near an action icon, for example. Another function may be to download suggestions in the background while cached suggestions are already displayed. Another function may be to download suggestions to display next to cached suggestions. Another function may be to cache results (e.g. operate similarly to suggestions). Another function may be to operate with preinstalled cached suggestions. Another function may be to perform software update notification, wherein the user may have the option to update. Another function may be to present notifications. Such notifications may be phased in to prevent millions of handsets from trying to update at the same time, for example. The client application interface may be designed to handle multiple mobile communication facility variations without requiring different versions of the software. The client application interface may generate a gradient shading and/or dithering to give color depth without putting a bitmap in the application. This may be provided to reduce the application size to facilitate downloads (e.g. increase speed of downloads). Another function may be to provide multi-lingual support. Another function may be to allow a user to send to a friend results or an item result (e.g. this may apply to any of the delivery facilities presented herein). Another function may be to provide pagination for results to increase page load speed and minimize network costs. Another function may be to search history stored locally to allow quick access from every list screen. The client application interface may be designed to incorporate carrier branding and the carrier branding may be in color and a logo may be presented. Another function may be to provide different data transfer modes to allow for different mobile communication facilities, carrier network speeds, user data plans, or other situations. Another function may be to provide a thin visual cue for background network activity without taking significant screen real-estate and allowing for continued interactivity of application. Another function may be to provide a skinnable search application who's arrangement and/or appearance may be customized, or the client application interface may be locally skinnable. Another function may be to provide a dynamic font selection and display based on information relating to the mobile communication facility 102. Another function may be to provide a dynamic screen reformatting based on information relating to the mobile communication facility 102. Another function may be to provide for entry of a general topic with categories and associated results displayed to allow for selection of the rest of the query without having to type in the entire query on a limited Query Entry Facility 120. Another function may be to provide or associate with a dynamic cache size based on information relating to the mobile communication facility capabilities. Another function may be to pre-download information through search experience (e.g. downloading results in background before selecting content type). Another function may be to provide high speed and low speed network communication based on changing data usage pattern or on other factors (e.g. processing more transactions in the background when the mobile communication facility is associated with a slow network). Another function may be to provide query composition using a combination of suggestions. The client application interface may perform other functions as needed on the mobile communication facility in connection with the functions and facilities outlined herein as well as other conventional functions of the mobile communication facility 102. Another function may be to use dynamic memory management, specifically using more or less memory for previous screens, pre-fetched information or cached data based on the capabilities of the device, and based on the other memory demands of the device, such as other applications or content on the phone. Another function may be to automatically update the application, with the user's permission. This particular function may be deployed in a phased manner that does not force all devices do not require updating at the same time.

A client application interface may process or cause processes to occur in the background. For example, in embodiments, results may be presented to the mobile communication facility 102 as they are retrieved without waiting for the entire result set to be retrieved. In embodiments, certain results may be presented and displayed while other results are in the process of being presented or displayed. This background processing of results may increase the speed at which some results can be presented to a mobile communication facility 102. In embodiments, certain categories of results may be presented to the mobile communication facility 102 before other categories. For example, images may take longer to download, process, and/or collect as compared to ringtones, so the category of ringtones, or individual ringtones, may be presented to the mobile communication facility 102 before or while the image results or image category is presented.

Figure 3:
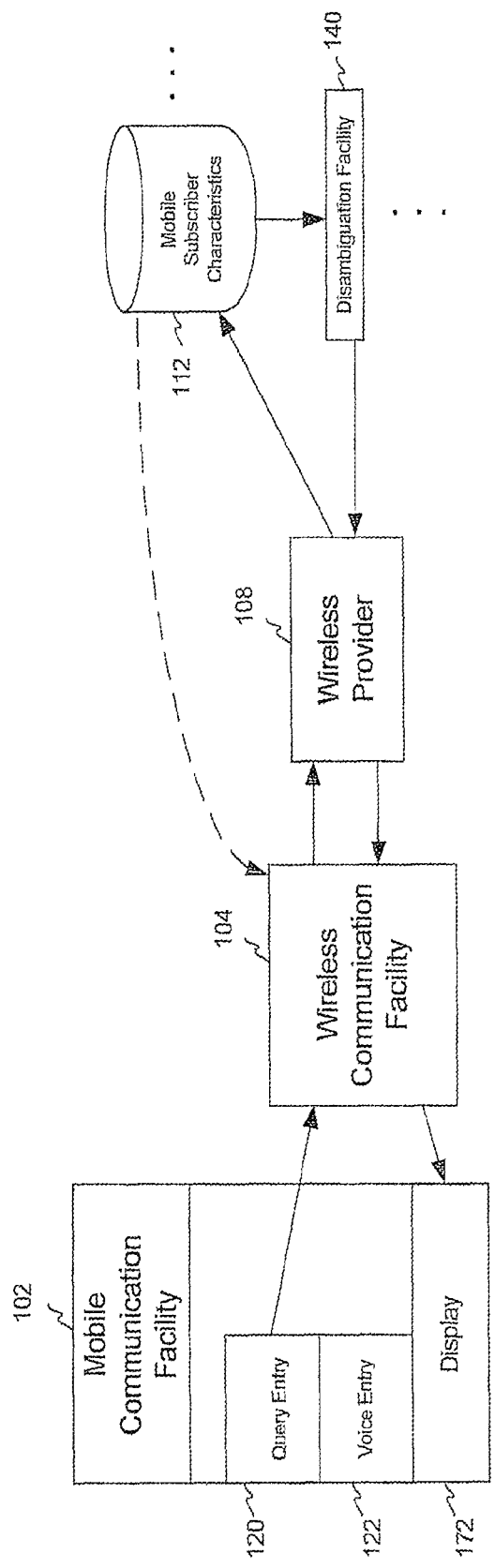
FIG. 3 illustrates sample elements involved in disambiguating a search query.

FIG. 3 illustrates a generalized disambiguation process for a disambiguation facility 140 associated with a mobile communication facility 102 and a data source, such as a mobile subscriber characteristics database 112, according to an aspect of the present invention. The disambiguation facility 140 is a means for deriving greater clarity from ambiguous user queries. As depicted in the FIG. 3 schematic, a query entry 120 may be processed through a wireless communication facility 104 and/or wireless provider 108 to a disambiguation facility 140. Although the example provided in FIG. 3 shows a disambiguation facility 140 linked to a mobile subscriber characteristics database 112, the disambiguation facility 140 may link to any number of other data sources (e.g., carrier business rules 130, content walled garden 132, etc.). Similarly, disambiguation may proceed through facilities other than a disambiguation facility 140 (e.g., a parent controls facility 150 or algorithm facility 144). As shown in FIG. 3, the disambiguation facility 140 may receive the query from the wireless communication facility 104 or the wireless provider 108 and link the query to information known about the user that is stored in the mobile subscriber database 112 (e.g., age, sex, past Internet usage, etc.). This additional information, coupled with the original query entry 120, may permit an unambiguous query to be processed. For example, a user may enter a query entry 120 of "Royals." This query entry 120 may be processed through the wireless communication facility 104 or a wireless provider 108 to a disambiguation facility 140 that is linked to a mobile subscriber database 112 containing, among other data, the user's residence of Kansas City, Mo. The disambiguation facility 140 may link this demographic information to the query entry 120 "Royals" and predict (i.e., disambiguate) that the user is more likely seeking information pertaining to the Kansas City Royals baseball team than information about the family of Swedish Royals. Disambiguation may include part-of-speech disambiguation, word sense disambiguation, phrase identification, named entry recognition, or full sentential parsing. Part-of-speech disambiguation refers to the process of assigning a part-of-speech tag (e.g., noun, verb, adjective) to each word in a query. By assigning the part-of-speech tag to each word, the device can draw inferences about each word by virtue of its context. For example, the word "house" may be a noun or a verb. By tagging this word with an appropriate part-of-speech tag, additional information about the user query, and its ultimate goal, may be derived. Word sense disambiguation refers to the process of sorting words that have multiple meanings. Phrase identification refers to the process of relating each word to others within a phrase to derive the context of individual words. Named entity recognition generally refers to recognition of proper nouns that refer to specific names, places, countries, etc. Full sentential parsing is the process of decomposing a sentence into smaller units and identifying the grammatical role of each and its relation to the other units. These and other techniques may be employed within the disambiguation facility 140 to infer a user's intended meaning for a search or search string.

Figure 4:
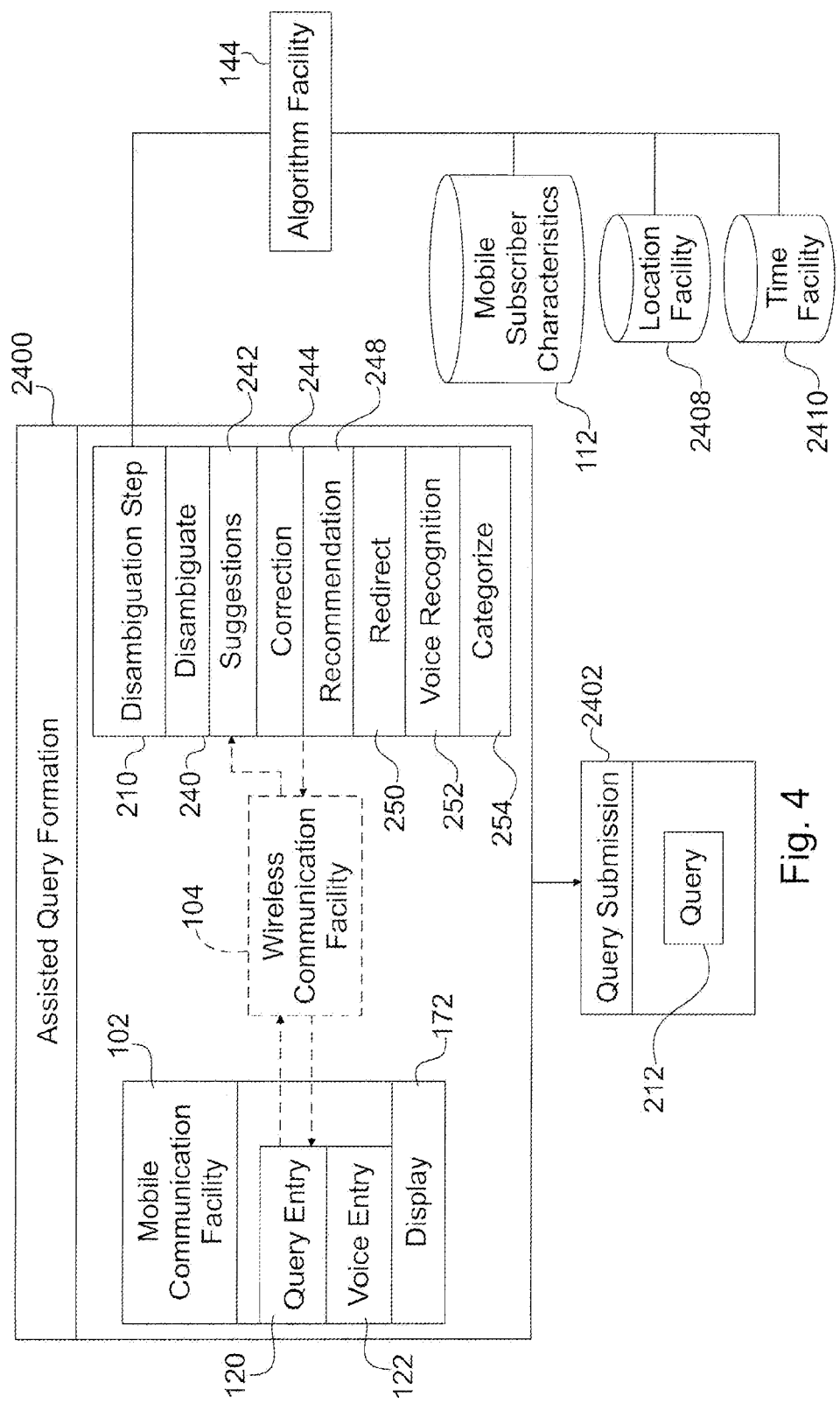
FIG. 4 illustrates a generalized method for disambiguating a search query.

FIG. 4 depicts an interactive process between the mobile communication facility 102 and the query assistance facility 210 that may be used for assisted query formation 2400. Once a user submits a query entry 120 to the mobile communication facility 102, a process of correction 244 may be necessary for assisted query formation 2400 that is sufficient to yield intelligible and useful result set(s). This process may occur on the client side 102 and/or within the mobile communication facility 104. As part of the correction 244 process, information specific to the type of mobile communication facility 102 may be used; for example, if the device has unique delivery capabilities, the query may need correction in order to derive a result set compatible with these capabilities. Information stored in the mobile subscriber characteristics database 112, location information 2408, or time information 2410 may also be used with the correction 244 process.

For example, a user may provide a query entry 120 "Coltrain" that is sent through a wireless communication facility 104 so that the query assistance facility 210 may begin. Because the query assistance facility 210 is linked to other data sources, as part of the correction 244 process, information from the filter algorithm facility 144 may be linked to the query entry 120 to provide more information to be used in the process of producing a more useful search query. In this example, the user's filter algorithm facility 144 may use information such as a history of online purchases, product names, numbers, purchase amounts, and purchase dates and times. Within the databases associated with the filter algorithm facility 144 there may be a history of many recent purchases of compact discs recorded by the saxophonist, John Coltrane. Because the original user query entry 120, "Coltrain" is not a known word, the query assistance facility 210 may predict a correction 244, taking into account user-specific data contained in the purchase history of the filter algorithm facility 144, such as that the user seeks information pertaining to "Coltrane," as opposed to "Coal Train" or "Soul Train," etc. In various embodiments, or particular user searches within one embodiment, the query assistance facility 210 may involve one of these additional data facilities, a plurality of the data facilities, or none of the data facilities.

It is possible that a user's query entry 120 returns a null result set or an improbable result set. In this case, the search facility, in conjunction with the mobile communication facility 102, could automatically trigger correction 244 and iteratively cycle through alternative query entries 120 until a non-null or higher probability result set is delivered.

In embodiments, additional recommendations may be made following a user's query entry based upon the information related to the mobile communication facility. For example, mobile subscriber characteristics, carrier business rules, or sponsor information, in conjunction with the query entry, may suggest relevant recommendations for the user. The recommendations may be paired with the query entry search results or presented prior to, or following, the display of the search results.

A user's prior search activities and search results may also be used to create recommendations for the user. Prior search activities may include transactions, search queries, visits to websites, and other acts initiated by the user on the mobile communication facility. The geographic location of the mobile communication facility may foster recommendations including, but not limited to, sponsor information (e.g. products and services) in the user's current geographic vicinity. The current time may be used independently or in conjunction with other information to create user recommendations. For example, the independent fact that it is noon, may create recommendations for restaurants serving lunch. This information may be further filtered by the location of the mobile communication facility to recommend only those restaurants that are in the user's immediate vicinity and further filtered by the subscriber's characteristics to recommend only that subset of restaurants serving lunch in the user's current vicinity that have received high ratings by restaurant patrons with a demographic profile similar to the user's. As with the above restaurant example, similar processes for generating meaningful recommendations may be applied to other services and products, including transportation, food, theater, sports, entertainment, movies, corporations, work, banks, post offices, mail facilities; location of and directions to gas stations, taxis, buses, trains, cars, airports, baby sitters, and other service and goods providers such as drug stores, drive through restaurants, bars, clubs; times of movies and entertainment; news; and local information.

Various aspects of the assisted query formulation 2400 may be activated or de-activated under user or provider control. For example, a user with a particular search, such as a phone number for a particular individual, may wish to suppress corrections or suggestions that might be generated with assisted query formulation 2400, which might otherwise try to replace a correct, but unusual, name spelling with more conventional or popular subject matter. Thus in one aspect, a user interface for an assisted query formation system may include controls for selectively activating various ones of the tools available to the system. The tools may include, for example, the recommendations, predictions, disambiguations, categorizations, and the like discussed above. In another aspect, a service provider such as the wireless provider 108 or mobile communication facility 102 described above may offer selected ones of the tools as value-added services that may be provided to select customers, such as full-service or premium customers, or offered on an a la carte basis individually or in packages. In such embodiments, query assistance may be requested by a customer using, e.g., a web site, cellular phone data access, or telephone voice access, and may be requested on a subscription basis, such as recurring monthly, or on a daily or per search basis.

Figure 5:
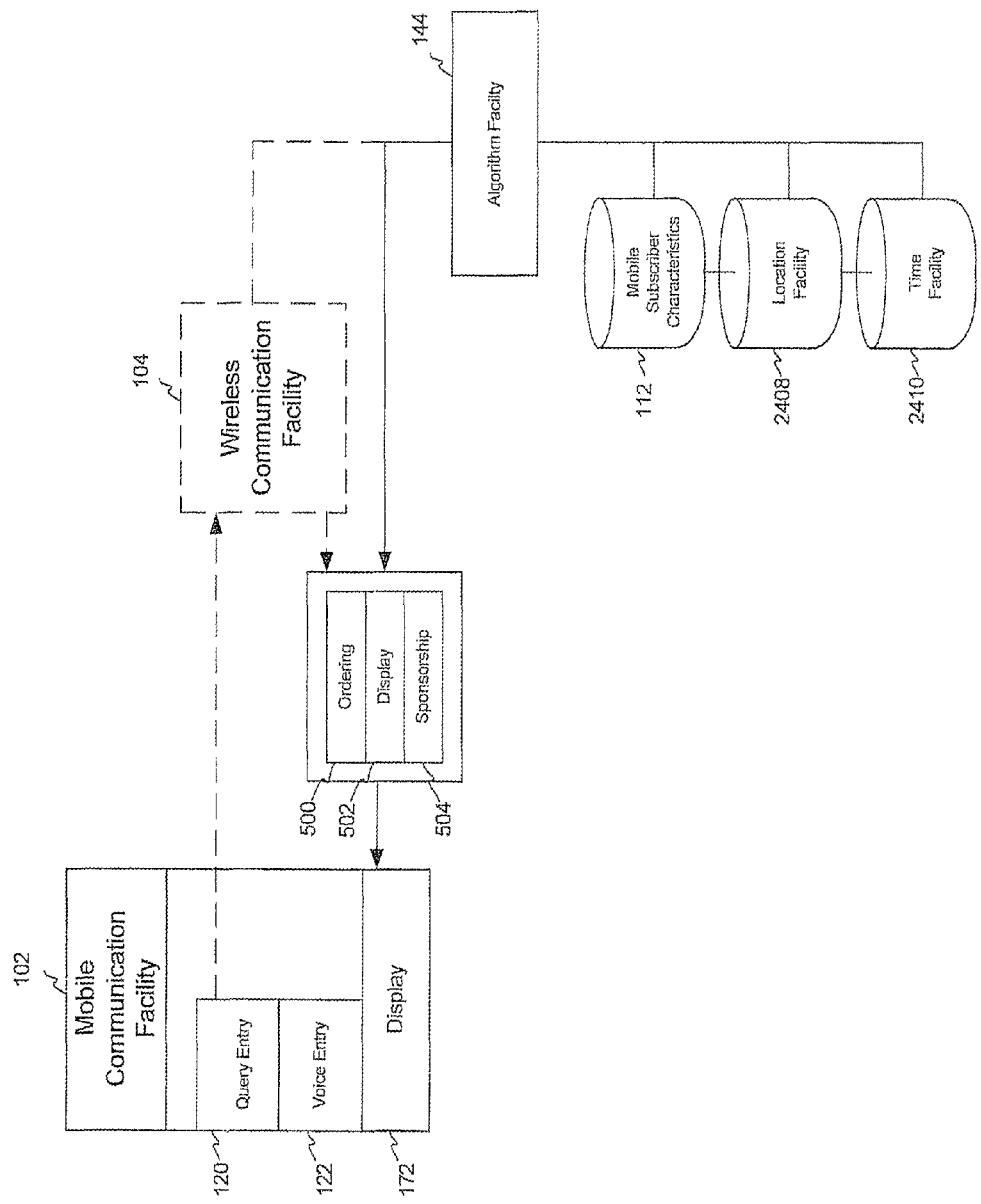
FIG. 5 illustrates a generalized method for ordering, displaying, and adding sponsorship information to search results.

FIG. 5 shows a generalized process for the ordering 500, displaying 502, and sponsorship 504 prioritization of query results based upon the association of a query entry 120 with additional data sources, such as a mobile subscriber characteristics database 112, a filter algorithm facility 144, a location database 2408, and/or a time data 2410. The ordering 500, display 502, and sponsorship 504 prioritization may involve one of these additional data facilities, a plurality of the data facilities, or none of the data facilities as appropriate.

In embodiments, the methods and systems disclosed herein can be adapted to provide an optimized search based on mobile subscriber characteristics 112, including any of the characteristics 112 described herein and in the documents incorporated by reference herein. Thus, these methods and systems may include providing a search function adapted for a mobile device and adapting the search function based on characteristics of the subscriber of the mobile device, wherein the subscriber characteristics are derived at least in part from a mobile subscriber data facility that is maintained by a carrier of mobile device services.

In embodiments the adapted search function may be an implicit query, an active query, a disambiguation action, a retrieval function, a filtering function, a presentation function, a routing function, or another function or action related to initiation, processing, or completion of a search or presentation of search results.

In one embodiment the search function is adapted based on age. The age-adapted search function may be an implicit query, an active query, a disambiguation action, a retrieval function, a filtering function, a presentation function, a routing function, or another function or action relating to the initiation, processing, or completion of a search. For example, a mobile communication facility 102 may have an implicit query 204 running, so that upon viewing a user interface of the mobile communication facility 102, the user sees results of a query that is automatically pre-formulated for the user. The implicit query 204 may be based on the age of the user, such as running the query most frequently run by persons of similar age on the same day. For example, a teenager might have an implicit query 204 that relates to a music group or movie, an adult might have an implicit query that relates to major new headlines, and a retired person might have an implicit query that relates to information relevant to financial markets. An age-adapted search function may also operate in connection with an active query; for example, a given query may return results that are age-appropriate, age-filtered, age-ranked, or age-disambiguated. For example, entering "Pink" might return results for Pink Floyd if the user is over age 30, while it might return results for the female artist Pink if the user is under 30. A user might be prompted to resolve such an ambiguity, or the ambiguity might be automatically resolved for the user. Thus, an age-adapted search function may be provided for a mobile communication facility. In embodiments, the age of the user may be obtained from a mobile subscriber data facility that stores mobile subscriber characteristics 112.

In one embodiment the search function is adapted based on gender. The gender-adapted search function may be an implicit query, an active query, a disambiguation action, a retrieval function, a filtering function, a presentation function, a routing function, or another function or action relating to the initiation, processing, or completion of a search. Gender may be determined by reference to a database that stores mobile subscriber characteristics 112, such as a database of a carrier of wireless services. A gender-adapted search function may, for example, inform an implicit query 204, such as presenting results of the searches that are most popular for that gender for that day. Similarly, results may be disambiguated by a disambiguation process 210 that is informed by gender. For example, the search process might run a query on a database of female-oriented sites if the user is female while running a query on male-oriented sites if the user is male. Similarly, a disambiguation process 210 may filter results based on gender. For example, a query such as "uprights" might return results for vacuum cleaners for a female user while returning results for football kickers for a male user.

In one embodiment the search function is adapted based on ethnicity. The ethnicity-adapted search function may be an implicit query, an active query, a disambiguation action, a retrieval function, a filtering function, a presentation function, a routing function, or another function or action relating to the initiation, processing, or completion of a search. For example, an implicit query 204 may generate results that are most popular among members of an ethnic group. A search or query formation process may search for results that relate to a targeted ethnic group. A disambiguation process 210 (either upon query formation or upon result retrieval or presentation) may disambiguate based on ethnicity. For example, a query related to "paris" might return results for Paris, France, for a French person, while returning results for Paris Hilton for an American. Ethnicity information may be obtained from a database of mobile subscriber characteristics 112, or it might be entered by the user in the user interface.

In one embodiment the search function is adapted based on religion or cultural affinity. The religion-adapted search function may be an implicit query, an active query, a disambiguation action, a retrieval function, a filtering function, a presentation function, a routing function, or another function or action relating to the initiation, processing, or completion of a search. The information may be obtained from a mobile subscriber characteristics 112 database, either obtained by a carrier based on application or transactions, or inferred based on past behavior or searches of the user. The religion-adapted search function may, for example, run implicit queries that are most popular among members of the same religious affiliation. A religion-adapted disambiguation facility may disambiguate queries based on religious affiliation. For example, a query for "Muhammed" might return information about the prophet for members of Islamic religions, while it might return information about the boxer for those who don't have religious affiliations.

In one embodiment the search function is adapted based on area code. The area code-adapted search function may be an implicit query, an active query, a disambiguation action, a retrieval function, a filtering function, a presentation function, a routing function, or another function or action relating to the initiation, processing, or completion of a search. For example, a user with a given area code could receive implicit query results based on other searches by members of the same area code. Also, queries may be disambiguated or results filtered, sorted, or presented based on area code (or other location information). For example, a user entering "Paris" in the 270 area code might receive results for Paris, Tenn.; a user entering "Paris" in the 310 area code might receive results for Paris, Hilton; and a user entering the same word in the 617 area code might receive results for Paris, France.

In one embodiment the search function is adapted based on home address. The address-adapted search function may be an implicit query, an active query, a disambiguation action, a retrieval function, a filtering function, a presentation function, a routing function, or another function or action relating to the initiation, processing, or completion of a search. As with the area code-adapted search function example above, the implicit query, disambiguation, or results can be varied based on the location of the user's home address (information that can be obtained from, for example, a carrier's database of mobile subscriber characteristics 112).

In one embodiment the search function is adapted based on work address. The work-address-adapted search function may be an implicit query, an active query, a disambiguation action, a retrieval function, a filtering function, a presentation function, a routing function, or another function or action relating to the initiation, processing, or completion of a search. For example, a user may see results of an implicit query 204 that is the same as other queries from the user's employer, such as press releases that mention the employer. A disambiguation facility 210 may resolve ambiguity (including with help of the user) based on work address. For example, a user with a work address at a location of General Electric might receive search results on that company when entering the term "light" in a search engine, while a user with a different work address might receive results relating to lighting products. Again, the work address information may be obtained from a database of mobile subscriber characteristics 112, such as maintained by a carrier of wireless services.

In one embodiment the search function is adapted based on billing address. The billing-address-adapted search function may be an implicit query, an active query, a disambiguation action, a retrieval function, a filtering function, a presentation function, a routing function, or another function or action relating to the initiation, processing, or completion of a search. The billing address information may be obtained from a database of mobile subscriber characteristics 112, such as may be maintained by a carrier of wireless services. The billing-address-adapted search function may, for example, present implicit query results similar to those of other users with the same billing address (such as queries relevant to the business enterprise that exists at that billing address). Similarly, queries may be disambiguated or results filtered, sorted, presented, or routed based on billing address. For example, a user with a billing address at a location of a large company may be presented with results that relate to that company, while a user with a residential address as the billing address may receive results that are tailored to users in the general area of that location.

In embodiments, information about the user's home address, area code, billing address, or other location information may be combined with information about a user's current location as determined by a location facility 110, such as to determine whether a user is in proximity to the user's home or workplace. If so, a user may receive query results suitable for one of those environments (such as receiving work-related information while at work and consumer information while at home). If the user is far from home and work, then the user may receive (by implicit query, or as a result of a search) results that are pertinent to travel in the location where the user is located, such as hotel, car rental, and restaurant information. Similarly, an away-from-home user may have an implicit query formed, or a partial query disambiguated, based on the user's status as a traveler. For example, a partial entry for "hot" might return shopping bargains for a user close to home, while it might return hotels for a user who is traveling.

In one embodiment the search function is adapted based on credit card information. The credit card information-adapted search function may be an implicit query, an active query, a disambiguation action, a retrieval function, a filtering function, a presentation function, a routing function, or another function or action relating to the initiation, processing, or completion of a search. The credit card information may be obtained from a database of mobile subscriber characteristics 112 or from a credit card provider. The information may include information relating to current balances, credit limits, or the like. For example, an implicit query may present results based on the available credit balance for a user, such as presenting searches or results for expensive goods for a user who has a low balance and high credit limit, while presenting searches or results for financial counselors for users who have high balances and low credit limits.

In one embodiment the search function is adapted based on passwords. The password-adapted search function may be an implicit query, an active query, a disambiguation action, a retrieval function, a filtering function, a presentation function, a routing function, or another function or action relating to the initiation, processing, or completion of a search. Thus, a mobile search facility may include a password-protected search capability, such as allowing searches for certain types of content only if the user enters the correct password. For example, walled garden content like ringtones or video clips might be available only if the user enters a password that is stored in the database of mobile subscriber characteristics 112.

In one embodiment the search function is adapted based on family information (e.g., mother's maiden name, number of siblings, marital status, or the like). The family information-adapted search function may be an implicit query, an active query, a disambiguation action, a retrieval function, a filtering function, a presentation function, a routing function, or another function or action relating to the initiation, processing, or completion of a search. For example, an implicit search may be running that presents searches or results that are similar to those recently run by family members or friends of the user. A disambiguation process 210 may operate based on family information, such as resolving ambiguity in queries based on searches conducted by family members, or based on the status of the family. Similarly, results may be filtered, sorted, presented, or routed based on family information. For example, a search for the term custody might lead to results on child custody for a divorced user, while it might reveal information on trust and custody accounts for a married user.

In one embodiment the search function is adapted based on birthplace. The birthplace adapted search function may be an implicit query, an active query, a disambiguation action, a retrieval function, a filtering function, a presentation function, a routing function, or another function or action relating to the initiation, processing, or completion of a search. Thus, an implicit search based on birthplace may include searches or results that are similar to those of other users with the same birthplace or users currently located in proximity to the birthplace. Similarly, results may be filtered or queries disambiguated based on birthplace. For example, entering "derby" may retrieve results relating to horse racing for users born in Kentucky, while it may retrieve results relating to hats for users born elsewhere.

In one embodiment the search function is adapted based on driver's license information. The license-information-adapted search function may be an implicit query, an active query, a disambiguation action, a retrieval function, a filtering function, a presentation function, a routing function, or another function or action relating to the initiation, processing, or completion of a search. License information may include age and address information, which may be used as contemplated by the various age- and location-based search function examples provided herein. License information may also include height, weight, hair color, eye color, vision status, and the like. For example, a user may be presented results that are similar to those of persons of similar appearance.

In one embodiment the search function is adapted based on employment data. The position-adapted search function may be an implicit query, an active query, a disambiguation action, a retrieval function, a filtering function, a presentation function, a routing function, or another function or action relating to the initiation, processing, or completion of a search. The employment data may be obtained from a database of mobile subscriber characteristics 112, such as that maintained by a carrier of wireless services. The employment data may, for example, indicate a user's status as an officer of a company, as an employee of a certain type (e.g., sales and marketing, supply chain management, finance, human resources, or the like) or level (e.g., associate, manager, vice-president, etc.), length of employment, or other status. For example, an implicit query 204 may present results similar to those for searches run by users holding similar positions in other companies. Similarly, a query may be disambiguated, or a result retrieved, sorted, filtered, presented, or routed, based on the user's position. For example, a sales manager entering "incentive" might receive information on promotions related to his employer's products, while a human resources manager might receive information relating to employee incentive stock options.

In one embodiment the search function is adapted based on employer. The employer-adapted search function may be an implicit query, an active query, a disambiguation action, a retrieval function, a filtering function, a presentation function, a routing function, or another function or action relating to the initiation, processing, or completion of a search. An employer-adapted implicit query may show results similar to those for other searches run by employees of the same employer on the same day or in recent days. An employer-adapted disambiguation facility 204 may resolve ambiguities as to the query or results based on the status of the employer, and an employer-adapted search function may retrieve, sort, present, or route results based on employer characteristics, such as obtained from a database of mobile subscriber characteristics 112. For example, a user whose employer is the United States Patent Office might receive information on processing patents in response to a query on "application", while a Microsoft employee might receive information on software applications in response to the same query.

In one embodiment the search function is adapted based on annual income. The annual income adapted search function may be an implicit query, an active query, a disambiguation action, a retrieval function, a filtering function, a presentation function, a routing function, or another function or action relating to the initiation, processing, or completion of a search. Annual income may be obtained from a database of mobile subscriber characteristics 112, such as that maintained by a carrier of wireless services. An implicit query 204 may thus present results that are for searches by incomes of similar annual income, or searches that are designed to fit the demographic characteristics for that annual income. For example, middle-income individuals may be presented results for mid-sized, value-based cars, while high-income individuals may be presented results for luxury items, vacations, or the like. A disambiguation facility 204 may resolve ambiguities about queries, and a search function may retrieve, sort, present, or route results based on annual income. For example, a query for "boat" might run a query or reveal results for commuter boat schedules for individuals of middle income but might run a query or reveal results for yachts for high-income individuals.

As with annual income-adapted searches, in one embodiment the search function is adapted based on income bracket. The income-bracket adapted search function may be an implicit query, an active query, a disambiguation action, a retrieval function, a filtering function, a presentation function, a routing function, or another function or action relating to the initiation, processing, or completion of a search.

In one embodiment the search function is adapted based on items purchased. The items-purchased-adapted search function may be an implicit query, an active query, a disambiguation action, a retrieval function, a filtering function, a presentation function, a routing function, or another function or action relating to the initiation, processing, or completion of a search. Items purchased may be obtained from a database maintained by a carrier, such as showing transactions made using a mobile communication facility 102. For example, implicit queries may be run and results presented based on transaction history, such as presenting results for peripherals and software applications for individuals who have recently purchased a computer, or the like. Similarly, queries may be disambiguated, or search results retrieved, sorted, presented, or routed based on items purchased by a user. For example, a user who has recently purchased a car and who enters "car" in a user interface may receive information about registering the car, obtaining insurance, or the like, while a user who has recently shopped for, but not purchased, a car may receive results showing ratings of cars.

In one embodiment the search function 142 is adapted based on friends and family information (including any of the foregoing types of information as stored in a database of mobile subscriber characteristics 112). The friend-and-family information-adapted search function 142 may be an implicit query 164, an active query, a disambiguation action, a retrieval function, a filtering function, a presentation function, a routing function, or another function or action relating to the initiation, processing, or completion of a search. For example, a user may be presented implicit query 164 results similar to those of family members or friends. A user query may be disambiguated, or search results retrieved, sorted, presented, or routed based on friends and family information. For example, a user entering "sister" in a user interface may receive results obtained by a sister's most recent searches, while a user who does not have friends and family might receive results relating to nuns.

In one embodiment the search function 142 is adapted based on bill amount(s). The bill-amount-adapted search function 142 may be an implicit query 164, an active query, a disambiguation action, a retrieval function, a filtering function, a presentation function, a routing function, or another function or action relating to the initiation, processing, or completion of a search. For example, a user whose bill is declining may be presented with offers to obtain more mobile services, while a user whose bill is very high might receive information about making choices that will reduce the cost of wireless services.

In one embodiment the search function 142 is adapted based on average bill total. The average bill-adapted search function 142 may be an implicit query 164, an active query, a disambiguation action, a retrieval function, a filtering function, a presentation function, a routing function, or another function or action relating to the initiation, processing, or completion of a search. For example, a user whose current bill exceeds the average may be presented with results relating to saving money, while a user whose current bill is less than the average may be presented with opportunities to purchase other services or content, such as walled garden content 132.

In one embodiment the search function 142 is adapted based on payment history. The payment-history-adapted search function 142 may be an implicit query 164, an active query, a disambiguation action, a retrieval function, a filtering function, a presentation function, a routing function, or another function or action relating to the initiation, processing, or completion of a search. For example, a user who is up-to-date on payments may receive offers for additional services, while a user who is delayed may receive reminders or may receive results that relate to managing debt. Similarly, users whose payment histories are favorable may be presented with results that relate to more expensive goods and services.

In one embodiment the search function 142 is adapted based on on-time payment history. The on-time payment-history adapted search function 142 may be an implicit query 164, an active query, a disambiguation action, a retrieval function, a filtering function, a presentation function, a routing function, or another function or action relating to the initiation, processing, or completion of a search. For example, users with very good records of making payments on time may be presented with more favorable offers, such as incentives or promotions, based on the prediction that their payment histories will continue to be favorable.

In one embodiment the search function 142 is adapted based on on-line usage amount. The on-line usage amount-adapted search function 142 may be an implicit query 164, an active query, a disambiguation action, a retrieval function, a filtering function, a presentation function, a routing function, or another function or action relating to the initiation, processing, or completion of a search. The usage amount may be obtained from a database maintained by a wireless service provider. On-line usage amount may be used to generate implicit query 164 results. For example, heavy users may be presented with results similar to other heavy users (such as more specialized types of results), while less heavy users may be presented with more general results, such as news headlines. Queries may be disambiguated, or results retrieved, sorted, presented or routed, based on on-line usage amount. For example, a heavy on-line user entering "blog" may be sent to the day's most popular blogs, while a light user might be presented with more general results describing the blogging phenomenon.

In one embodiment the search function 142 is adapted based on duration of on-line interactions. The duration-adapted search function 142 may be an implicit query 164, an active query, a disambiguation action, a retrieval function, a filtering function, a presentation function, a routing function, or another function or action relating to the initiation, processing, or completion of a search. For example, in an implicit query 164 204, a user with a history of long interactions may be presented with a more complex or extensive result set, while a user with a history of short interactions may be presented only with basic information. Similarly, a disambiguation facility 204 or a search function 142 that retrieves, sorts, presents, or routes results may do so based on duration of on-line interactions. For example, a user whose interactions are long may be presented with long articles, scientific research, or the like, while a user with shorter duration interactions may be presented only with news headlines or the like. Similarly, for example, a short-duration user entering "football" may receive a list of the day's scores, while a long-duration user may receive articles on football.

In one embodiment the search function 142 is adapted based on number of on-line interactions. The interaction-adapted search function 142 may be an implicit query 164, an active query, a disambiguation action, a retrieval function, a filtering function, a presentation function, a routing function, or another function or action relating to the initiation, processing, or completion of a search. For example, in an implicit query 204, a user with a history of many interactions may be presented with more results, while a user with few interactions may be presented only with the most pertinent results. Similarly, a disambiguation facility 204 or a search function 142 that retrieves, sorts, presents, or routes results may do so based on number or frequency of on-line interactions, such as indicated by a database of a wireless provider 108. For example, a user whose interactions are many may be presented with long result sets, while a user with fewer interactions may be presented only with the most relevant results. Similarly, for example, a frequent user entering "Peter" may receive only information relating to uses of that name in the day's news, while a less frequent visitor might receive more general results, ranging from Peter the Great to Pete Townsend to Peter Rabbit.

In one embodiment the search function 142 is adapted based on family status and family information. The family-information adapted search function 142 may be an implicit query 164, an active query, a disambiguation action, a retrieval function, a filtering function, a presentation function, a routing function, or another function or action relating to the initiation, processing, or completion of a search. For example, an implicit search may present results about dating or relationships to a single user, while a married user may receive results relating to child rearing. Similarly, a disambiguation process 210 or a search function 142 that retrieves, sorts, presents, or routes results may use family status and family information. For example, a single user entering "love" may receive results relating to dating and relationships, while a married user might receive information relating to anniversaries.

In one embodiment the search function 142 is adapted based on number of children. The number-of-children-adapted search function 142 may be an implicit query 164, an active query, a disambiguation action, a retrieval function, a filtering function, a presentation function, a routing function, or another function or action relating to the initiation, processing, or completion of a search. The number of children may be obtained from a database of mobile subscriber characteristics 112, such as that maintained by a wireless provider 108. An implicit query 204 may run based on number of children. For example, a childless user may receive results based on other factors, while a user with four children might receive implicit query 204 results that relate to childrearing or to educational funding products. Similarly, queries may be disambiguated, or results returned, sorted, presented, or routed based on number of children. For example, a user with children entering the term "cold" might receive health-related information relating to outbreaks of the common cold, while a user with no children might receive general weather information.

In one embodiment the search function 142 is adapted based on shopping habits (e.g., views of or purchases of goods and services made with a technology like Mobile Lime). The shopping-habit-adapted search function 142 may be an implicit query 164, an active query, a disambiguation action, a retrieval function, a filtering function, a presentation function, a routing function, or another function or action relating to the initiation, processing, or completion of a search. For example, a user who shops frequently for music may be presented with music-oriented content in an implicit search 204, while the implicit search may present different items to other users whose shopping habits are different. Similarly, queries may be disambiguated, or results returned, sorted, presented, or routed, based on shopping habits. For example, a frequent book purchaser may be presented with Stephen King books upon entering "King" in a query interface, while a frequent music purchaser may be presented with results related to Elvis Presley.

In one embodiment the search function 142 is adapted based on click stream information. The click stream-adapted search function 142 may be an implicit query 164, an active query, a disambiguation action, a retrieval function, a filtering function, a presentation function, a routing function, or another function or action relating to the initiation, processing, or completion of a search. The click stream information may be stored on the mobile communication facility 102 or in a remote location, such as a database or server maintained by a wireless provider 108 or an entity operating on behalf of a wireless provider 108. A click stream-adapted search function 142 may run implicit queries 204 based on past behavior, such as running queries for new cars if the user has recently viewed cars with the mobile communications facility 102. Similarly, queries may be disambiguated, or results returned, sorted, presented, or routed, based on click stream information. For example, a user entering a partial URL into a query facility may be directed to a recently visited web site, while another user would be directed to a process for resolving ambiguity. Click stream information may be used to infer a wide range of behaviors and characteristics. Thus, the other embodiments described herein may take place in combination with deriving one or more mobile subscriber characteristics 112 from click stream information. For example, if click stream information shows that a user has visited twenty female-oriented sites, then the information can be used to infer the gender of the user, after which various embodiments of gender-adapted search function 142s described herein are enabled.

In one embodiment the search function 142 is adapted based on device type. The device type-adapted search function 142 may be an implicit query 164, an active query, a disambiguation action, a retrieval function, a filtering function, a presentation function, a routing function, or another function or action relating to the initiation, processing, or completion of a search. For example, implicit queries may be run to retrieve results that are suitable for the type of device and filter out other results. For example, if a mobile communications facility 102 does not have a video rendering capability, then video-related results can be filtered out of the process. Similarly, queries may be disambiguated, or results retrieved, sorted, presented, or routed based on device type. For example, a user may be presented with results of walled garden content 132 that is consistent with a device. Upon entering a query, a user may receive results that are filtered to include content items that are viewable/downloadable for the device and to exclude other content. Device type, which may be obtained from the database of mobile subscriber characteristics 112, may also be used to infer other items. For example, a particular device may be most popular with a particular age or gender of users, in which case the results can be adapted in a manner similar to that described in connection with the age-adapted search function 142 described herein.

In one embodiment the search function 142 is adapted based on device version. The device version-adapted search function 142 may be an implicit query 164, an active query, a disambiguation action, a retrieval function, a filtering function, a presentation function, a routing function, or another function or action relating to the initiation, processing, or completion of a search. The device version may be retrieved from a database of mobile subscriber characteristics 112, such as that maintained by a wireless provider 108. For example, implicit queries may be run to retrieve results that are suitable for the particular version of a device and filter out other results. For example, if a mobile communication facility 102 does not have a video rendering capability, then video-related results can be filtered out of the process. Similarly, queries may be disambiguated, or results retrieved, sorted, presented, or routed based on device version. For example, a user may be presented with results of walled garden content 132 that is consistent with the correct version of a device. Upon entering a query, a user may receive results that are filtered to include content items that are viewable/downloadable for the version of the device and to exclude other content. Device version, which may be obtained from the database of mobile subscriber characteristics 112, may also be used to infer other items. For example, a particular device version may be most popular with a particular age or gender of users, in which case the results can be adapted in a manner similar to that described in connection with the age-adapted search function 142 described herein.

In one embodiment the search function 142 is adapted based on device characteristics. The device characteristics-adapted search function 142 may be an implicit query 164, an active query, a disambiguation action, a retrieval function, a filtering function, a presentation function, a routing function, or another function or action relating to the initiation, processing, or completion of a search. The device characteristics may be retrieved from a database of mobile subscriber characteristics 112, such as that maintained by a wireless provider 108. Characteristics may include the type of device, applications running on the device (e.g., capability to show photos, render video, play music, or the like). For example, implicit queries may be run to retrieve results that are suitable for the particular characteristics of a version of a device and filter out other results. For example, if a mobile communications facility 102 does not have a photo imaging capability, then photo-related results can be filtered out of the process. Similarly, queries may be disambiguated, or results retrieved, sorted, presented, or routed based on device characteristics. For example, a user may be presented with results of walled garden content 132 that is consistent with the correct characteristics of a device. Upon entering a query, a user may receive results that are filtered to include content items that are viewable and/or downloadable for the characteristics of the device and to exclude other content. For example, a user with a device that plays .mp3 files may receive music files upon entering a query for "bruce", while a user without music capabilities may receive web search results related to Bruce Springsteen. Device characteristics, which may be obtained from the database of mobile subscriber characteristics 112, may also be used to infer other items. For example, particular device characteristics may be most popular with a particular age of user or gender, in which case the results can be adapted in a manner similar to that described in connection with the age-adapted search function 142 described herein.

In one embodiment the search function 142 is adapted based on usage patterns (including those based on location, time of day, or other variables). The usage-pattern-adapted search function 142 may be an implicit query 164, an active query, a disambiguation action, a retrieval function, a filtering function, a presentation function, a routing function, or another function or action relating to the initiation, processing, or completion of a search. For example, if a user frequently searches for restaurants on weekends, then an implicit query 204 may run restaurant searches on weekends. Similarly, the same query (e.g., "rest" may return restaurant-related results on weekends, while revealing results related to restructured text during work hours (particularly if the usage pattern indicates that the user is a software engineer). Thus, a disambiguation process 210 or a search function 142 to retrieve, sort, present, or route results may use usage patterns to accomplish those functions. Usage patterns may be obtained from a database of mobile subscriber characteristics 112, such as that maintained by a wireless provider 108. A wide range of usage patterns may be used to assist with formation of queries (implicit and explicit) and with retrieval and organization of results. The algorithm facility 144 may include one or more modules or engines suitable for analyzing usage patterns to assist with such functions. For example, an algorithm facility 144 may analyze usage patterns based on time of day, day of week, day of month, day of year, work day patterns, holiday patterns, time of hour, patterns surrounding transactions, patterns surrounding incoming and outgoing phone calls, patterns of clicks and clickthroughs, patterns of communications (e.g., Internet, email and chat), and any other patterns that can be discerned from data that is collected by a wireless provider 108 or Internet service provider. Usage patterns may be analyzed using various predictive algorithms, such as regression techniques (least squares and the like), neural net algorithms, learning engines, random walks, Monte Carlo simulations, and others. For example, a usage pattern may indicate that a user has made many work-related phone calls during a holiday (such as by determining that the user was located at work and making calls all day). Such a user may be presented preferably with content that is related to a vacation, such as showing hotels, rental cars, or flight promotions in an implicit query 164, or preferentially presenting such items in response to explicit queries (including disambiguating partial queries or ambiguous queries). For example, such a user might receive hotel information in response to entering the partial query "hot," while another user receives weather information. In one such embodiment the search function 142 is adapted based on phone usage. The phone usage-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on device and/or subscriber unique identifiers. The identifier-adapted search function 142 may be an implicit query 164, an active query, a disambiguation action, a retrieval function, a filtering function, a presentation function, a routing function, or another function or action relating to the initiation, processing, or completion of a search. Here, as with usage-pattern-adapted search functions 142, the identifier may be used to identify the user in the search facility 142, allowing targeted queries, disambiguation, and results.

In one embodiment the search function 142 is adapted based on content viewing history. The viewing-history-adapted search function 142 may be an implicit query 164, an active query, a disambiguation action, a retrieval function, a filtering function, a presentation function, a routing function, or another function or action relating to the initiation, processing, or completion of a search. Viewing history may be obtained by a local facility on the mobile communication facility 102, such as a database or cache on a cellular phone, or it may be obtained at a central facility, such as an Internet server, or a central office for phone services. Such data may be retrieved, for example, from a database of mobile subscriber characteristics 112. Viewing history may be analyzed, in embodiments, by an algorithm facility 144, such as to infer behavior based on content viewing patterns. In embodiments viewing history may include content viewed using a mobile communication facility 102. In other embodiments viewing history may include history with respect to other content provided by the same entity that is the wireless provider 108. For example, such a provider may provide television content via DSL or cable, Internet content to a home, or other content. Viewing histories for all such content may be analyzed to assist with improving search function 142s, including assisting with development of implicit queries, resolving ambiguities with explicit queries, and retrieving, sorting, filtering, presenting, and routing search results. For example, if a database of mobile subscriber characteristics 112 shows that a particular viewer watched the first six episodes of "24" but missed the seventh episode, then a search for the element "24" may retrieve online sources for the seventh episode, while another user entering a similar query might receive general information about the show or information about 24-hour fitness centers. Viewing history should be understood to encompass all types of interactions with content, such as downloading, listening, clicking through, sampling or the like, including all types of content, such as text, data, music, audio, sound files, video, broadcast content, and the like.

In one embodiment the search function 142 is adapted based on content presented for viewed by/not viewed by user. The declined-content-adapted search function 142 may be an implicit query 164, an active query, a disambiguation action, a retrieval function, a filtering function, a presentation function, a routing function, or another function or action relating to the initiation, processing, or completion of a search. Information about declined content may be obtained from a database of mobile subscriber characteristics 112, such as that maintained by a wireless provider 108, which may also be a provider of various other content sources that have been presented and declined (such as by explicitly declining an option to view content or by implicitly declining—ignoring—the content, such as upon repeated opportunities to view it). Wireless providers 108 frequently have access to such viewing histories, because the same carriers also provide television, Internet, and other content sources. Declined content can be analyzed, with an algorithm facility 144, to assist with forming implicit queries, resolving explicit queries, and with retrieving, sorting, filtering, presenting, and routing results. For example, if a user has consistently declined, or failed to view, music-oriented programming content (whether on a cellular phone, TV, or Internet), then a query for the term "U2" might return information on Soviet-era spy planes, notwithstanding that for other users such a query would return content related to the rock group U2. As in analysis of usage patterns, a wide range of algorithms, including learning algorithms, regression analyses, neural nets, and the like may be used to understand patterns in declined content that assist with handling queries and results.

In one embodiment the search function 142 is adapted based on content and programs downloaded. The download-history-adapted search function 142 may be an implicit query 164, an active query, a disambiguation action, a retrieval function, a filtering function, a presentation function, a routing function, or another function or action relating to the initiation, processing, or completion of a search. Downloaded content and programs may be determined from a database of mobile subscriber characteristics 112, such as based on cellular phone usage, television viewing, Internet usage, email usage or the like. Such content and programs may be analyzed and used in the manner described above for usage pattern-adapted search functions 142. In one such embodiment the search function 142 is adapted based on videos, music, and audio listened to and/or downloaded. Again, the content-action-adapted search function 142 may be an implicit query 164, an active query, a disambiguation action, a retrieval function, a filtering function, a presentation function, a routing function, or another function or action relating to the initiation, processing, or completion of a search. In another such embodiment the search function 142 is adapted based on television watched. The television viewing-adapted search function 142 may be an implicit query 164, an active query, a disambiguation action, a retrieval function, a filtering function, a presentation function, a routing function, or another function or action relating to the initiation, processing, or completion of a search. In another such embodiment the search function 142 is adapted based on television subscriptions. The subscription-adapted search function 142 may be an implicit query 164, an active query, a disambiguation action, a retrieval function, a filtering function, a presentation function, a routing function, or another function or action relating to the initiation, processing, or completion of a search. In one such embodiment the search function 142 is adapted based on timing and duration of viewing/downloading. The view/download timing- and duration-adapted search function 142 may be an implicit query 164, an active query, a disambiguation action, a retrieval function, a filtering function, a presentation function, a routing function, or another function or action relating to the initiation, processing, or completion of a search.

In embodiments, the search facility 142 may be a high-volume, scalable, redundant search engine specifically tuned for mobile content. The engine may be implemented in Java and deployed in a two-tier architecture in which the presentation logic runs on web servers which format the results returned by passing the actual search requests off to search servers. Search servers may use proprietary algorithms that blend results from full-text metadata indices with results from 3rd-party (partner) APIs. The search engine may be accessed via a query API. A query is a set of words, possibly restricted to specific fields, coupled with restrictions on content type, category, and format.

In embodiments, the search facility 142 may use a ranking algorithm which incorporates a number of features, including one or more of full-text relevance (using, e.g., term frequency/inverse document frequency or "TFIDF", or variants and enhancements thereto), word order and proximity scores, number of words matching scores (with thresholds), popularity (overall and within-demographic), editorial boosts, and field-by-field boosts. The wireless provider 108 may control the editorial boosts.

In embodiments, the search facility 142 may be optimized for mobile input methods by using, for example, partial word matching, suggestions, and mobile communication facility 102 compatibility. Partial word matching coupled with popularity scoring may provide the best possible results for the user. Partial word matching may also work for multiple word phrases. Thus, a search for "ro st" may suggest results matching "Rolling Stones". A suggestion is a recommended search string. For example, for the query string "piz" a suggestion could be "pizza". Suggestions may permit users to enter the wanted search terms with the fewest number of characters. Suggestions may be provided by the engine and cached locally for performance enhancement.

In embodiments, the mobile communication facility 102 may customize the search engine results to the capabilities of the mobile communication facility 102. For example, the search engine may not present search results that are inappropriate for the device (e.g., a ringtone that is incompatible). When compatibility information cannot be determined, results that require particular hardware or software may receive lower rankings or scores. The recommendation engine may also, or instead, use the device type as one of the attributes when calculating recommendations.

In embodiments, content may be segregated such that the search facility 142 may take contextual queues based on where the user enters the search experience. For example, users entering search from the ringtone area may receive ringtone-restricted results. In addition, the wireless provider 108 may have multiple content partners and may wish to restrict the search to certain content partners in certain situations. For example, the wireless provider 108 may wish to provide a search box in an entertainment section which only searches content from a specific partner, where a search box in the travel section would search different content. The search facility 142 may limit results to a specific partner or set of partners.

In embodiments, discovery services may be provided to end users in order to build a content index. This index may be populated by means of an explicit data feed of content elements or by spidering a Web or WAP site containing the metadata about the content. A data feed may be provided with a regularly scheduled transfer of data from the wireless provider 108. Feeds may consist of content, taxonomy, and transaction history data. Content may include one record per item including metadata about handset compatibility, previews, price, artists, size, purchase location, etc. Taxonomy may include a description of the categorization system used for the data elements. (Sometimes content and taxonomy data may be distributed separately; sometimes they may be intermingled into one data file.) Transaction History may include the data associating a unique subscriber with the content elements he or she has interacted with. The content and taxonomy feeds may be processed to extract the metadata associated with each element. From this metadata a search index may be built. Data Feeds may be scheduled to run at predefined times or may be triggered upon request. If the wireless provider 108 supplies content in multiple languages each collection of language-specific content may be set up as a separate data feed. A content data feed may be a single XML or CSV file containing one record per item.

In embodiments, for carriers that create an editorial categorization of items, a content data feed may be blended with a taxonomy data feed. A taxonomy data feed may describe the specific taxonomy of the wireless provider 108 content For example, the ring tone for Britney Spears' "Oops, I did it again" might exist in the "Pop" and "Female Vocalists" categories. A taxonomy feed may consist of a single XML or CSV file.

In embodiments, the transaction history data may enumerate specific behavior for specific users. This may be used to compute popularity information and be used as an input to the recommendation engine. This data feed may be used whether or not the content index is built via regular data feeds or by spidering. A common format for this information is the Apache Log Format.

In embodiments, full-text relevance may compute a TFIDF metric in which the frequency of words within the overall item set influences the relevancy score. In embodiments, "stop words" may be used to improve search result relevancy. Stop Words may be words which do not contribute to the overall ranking of a document and are not searched, or not used in query formulation. The search facility 142 that does not use stop words explicitly may nonetheless specify certain words that influence relevance less than others. In embodiments, the search facility 142 may use query analysis to identify specific verticals with specific queries in certain contexts. Thus, it may be possible for a search for "ice cream" to prefer local listing results to general web pages.

In one embodiment the search function 142 is adapted based on services purchased from a carrier (e.g., phone lines, television packages, wireless services, DSL, cable services, broadband services, data services, and other services). The carrier-services-adapted search function 142 may be an implicit query 164, an active query, a disambiguation action, a retrieval function, a filtering function, a presentation function, a routing function, or another function or action relating to the initiation, processing, or completion of a search. Such information may be retrieved from a database of mobile subscriber characteristics 112, such as that stored by a wireless provider 108 who may also be a provider of various other services. The other services may be analyzed, such as by an algorithm facility 144, to infer information about a user's intent when executing a search function 142, including for presenting implicit queries, resolving ambiguous queries, or retrieving, sorting, filtering, presenting, or routing results. For example, if a user has DSL, has purchased a premium sports television package, and has bookmarked sports-related sites, then the user may be presented with implicit queries that retrieve sports results for that day. Similarly, upon entering "Jason", such a user might receive results on the Red Sox or Jason Varitek, while another user might receive information about the Friday the 13th series of movies, or the JASON foundation. Again, the algorithm facility 144 may use a wide range of techniques, including simple category-based inferences, learning algorithms, neural nets, regression analysis and other statistical techniques, or the like to draw inferences about how purchasing various services relates to query formation. Such techniques may include collaborative filtering techniques (as described elsewhere herein and in the documents incorporated by reference herein) for determining how a user's preferences align with other users having similar characteristics.

In one embodiment the search function 142 is adapted based on transaction history. The transaction history-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on history of phone calls made using, for example, the telephone numbers or identities of called parties, or portions of telephone numbers such as area codes or exchanges. The call history-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on phone calls received using, for example, the telephone numbers or identities of called parties, or portions of telephone numbers such as area codes or exchanges. The calls-received-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on the mobile subscriber characteristics 112 of the persons calling, or called by, the user. This may include, for example, usage patterns, usage plans, mobile device type, firmware, capabilities, and so forth, as well as demographic and other information concerning the parties, to the extent that it is available, and as described generally above. The characteristic-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on the duration of calls. The call-duration-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on a history of communications made via phone. The communications-history-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on Internet usage. This may include, for example, histories of URLs or specific IP addresses, as well as topical or semantic information concerning same. The Internet-usage-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on email usage. The email usage-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on instant messaging. This adaptation (and other adaptations discussed herein) may be based on such usage specific to a particular device, a particular time of day, a particular day of the week, a particular season, or the like, or may be based on all traffic associated with the user, regardless of other factors. The IM-usage-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on chat (and the entities communicated with by these technologies). The chat usage-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on history of phone calls made linked with geographic/location information at the time of each call. The location- and call history-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on log of phone numbers. The phone number log-adapted search function 142 may be an implicit query 164, an active query, a disambiguation action, a retrieval function, a filtering function, a presentation function, a routing function, or another function or action relating to the initiation, processing, or completion of a search.

In one embodiment the search function 142 is adapted based on history of clicks and clickthroughs (or other keystroke or user interface equivalents thereof, including voice-initiated actions). The user-action-history adapted search function 142 may be an implicit query 164, an active query, a disambiguation action, a retrieval function, a filtering function, a presentation function, a routing function, or another function or action relating to the initiation, processing, or completion of a search.

Figure 6:
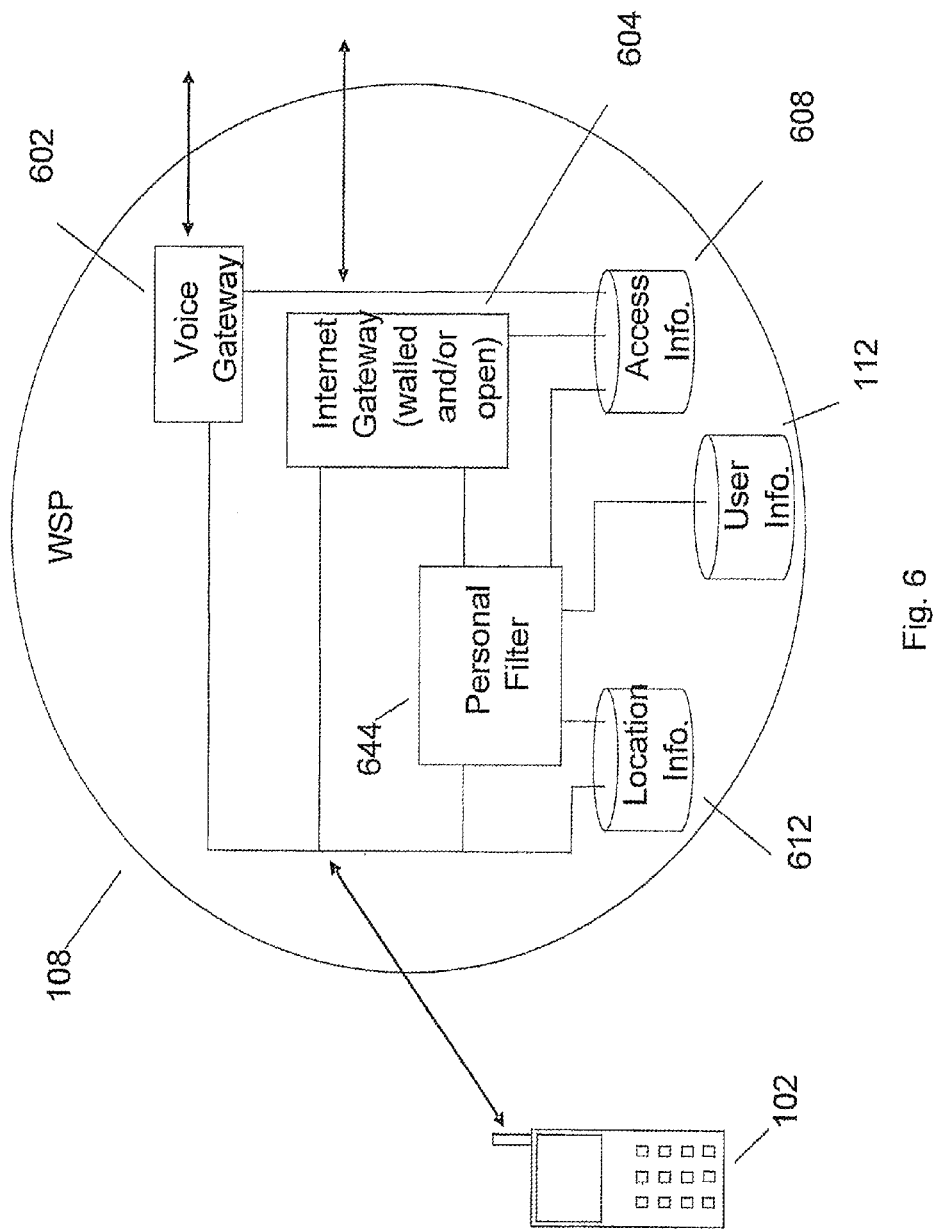
FIG. 6 illustrates a mobile communication search facility.

FIG. 6 illustrates a mobile communication search facility 142 according to the principles of the present invention. In this embodiment, the wireless provider 108 facilitates voice access from the mobile communication facility 102 through a voice gateway 602. The voice gateway 602 may be a telecommunication router for example. Information pertaining to what voice calls have been made or received by the mobile communication facility 102 may be stored in access information database 608. Once the voice access information is stored in the access information database 608, the information may be retrieved by the personal filter 644, and the personal filter 644 may also process the voice activation information to gain more information about the access. For example, the personal filter 644 may perform a reverse phone number process on calls received by or made from the mobile communication facility 102 to determine information about the establishments and individuals called. Such information may also be matched with the time of day the call was made, the duration of the call, who initiated the call, etc. The information relating to voice calls may be further processed or inferences may be made from the information indicating user preferences. For example, if the user is making calls most days at lunch time to take out restaurants, one may infer that the user is going to make more calls to take out places for lunch. Likewise, if the user has made ten phone calls to different new car dealers in the past two weeks, an inference may be made that the user is in the market for a car. The information may also be used in connection with a collaborative style filter (a process within the personal filter 644) to predict future behavior or likes and dislikes based on other people's similar behaviors.

Access information may also be collected based on internet activities through an internet gateway 604. Search queries, click throughs, and the like may be tracked and stored in an access database 608 for retrieval from the personal filter 644. As with the voice information, the web interaction data may be manipulated, and predictions of future behavior, likes, and dislikes may be made. In the monitoring of internet behavior, in garden and out of garden activities may be tracked.

Location information and time of day information may also be tracked and stored in a location information database 612. As with the voice information and the web interaction information, the location and time of day information may also be used by the personal filter 644.

User information 112, such as personal information or information used to set up the user account with the wireless provider 108, may be kept in a database that is accessible by the personal filter 644.

The personal filter 144 may receive a search query from a mobile communication facility 102, extract information from each of the databases 612, 112, and 608, process all of the information through an optimization algorithm, and perform an optimized search for results. Likewise, results may be obtained, and the personal filter 644 may be used to process the results, along with the other mobile communication related information, and produce filtered results to the mobile communication facility 102.

While the databases 612, 112, and 608 are illustrated as separate databases, it should be understood that these may be combined into one or more databases, such as a relational database. While the personal filter 644 is illustrated as residing in the wireless provider 108 domain, it should be understood that the personal filter 644 may reside elsewhere, including on the mobile communication facility 102 or in another related facility.

Figure 7B:
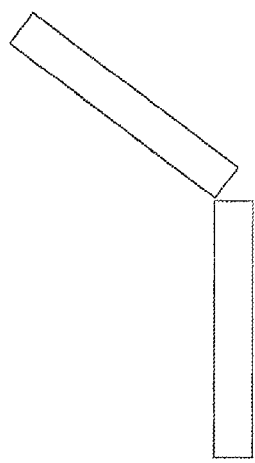
FIG. 7B illustrates a mobile communication facility.
Figure 7A:
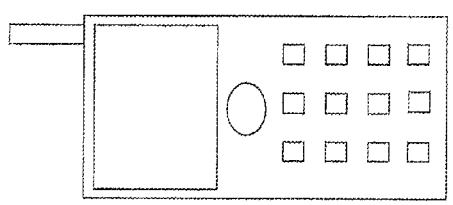
FIG. 7A illustrates a mobile communication facility.
Figure 7C:
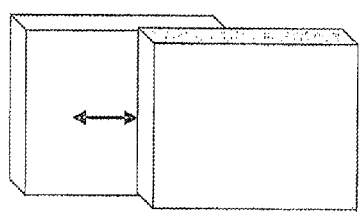
FIG. 7C illustrates a mobile communication facility.

FIGS. 7A-7C illustrate various form factors of mobile communication facilities that may be used with the systems described herein. FIG. 7A illustrates a candy bar or open faced fixed cell phone. FIG. 7B illustrates a flip phone and FIG. 7C illustrates a slide phone.

Figure 8C:
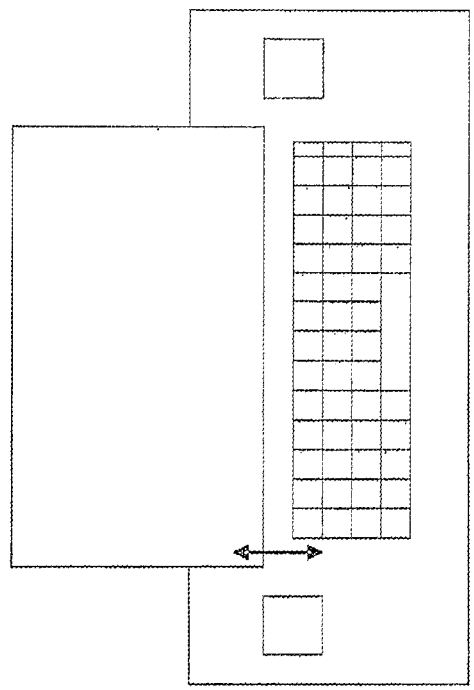
FIG. 8C illustrates a mobile communication facility.
Figure 8B:
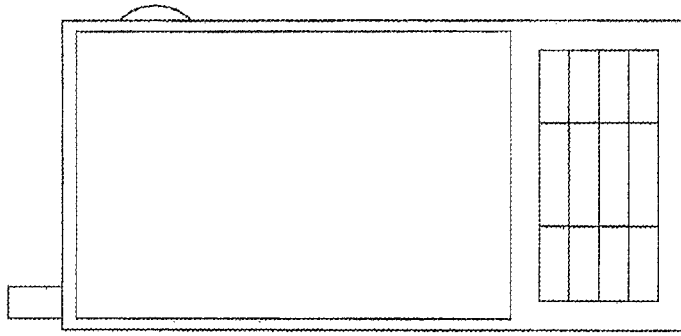
FIG. 8B illustrates a mobile communication facility.
Figure 8A:
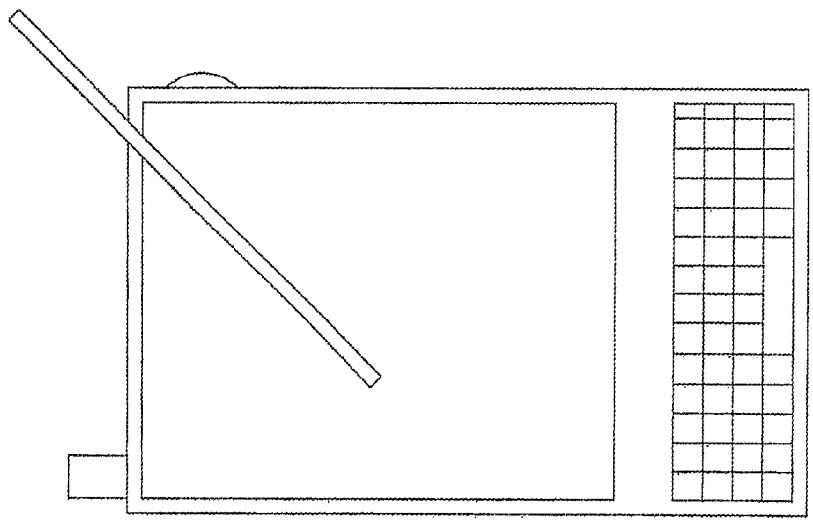
FIG. 8A illustrates a mobile communication facility.
Figure 9:
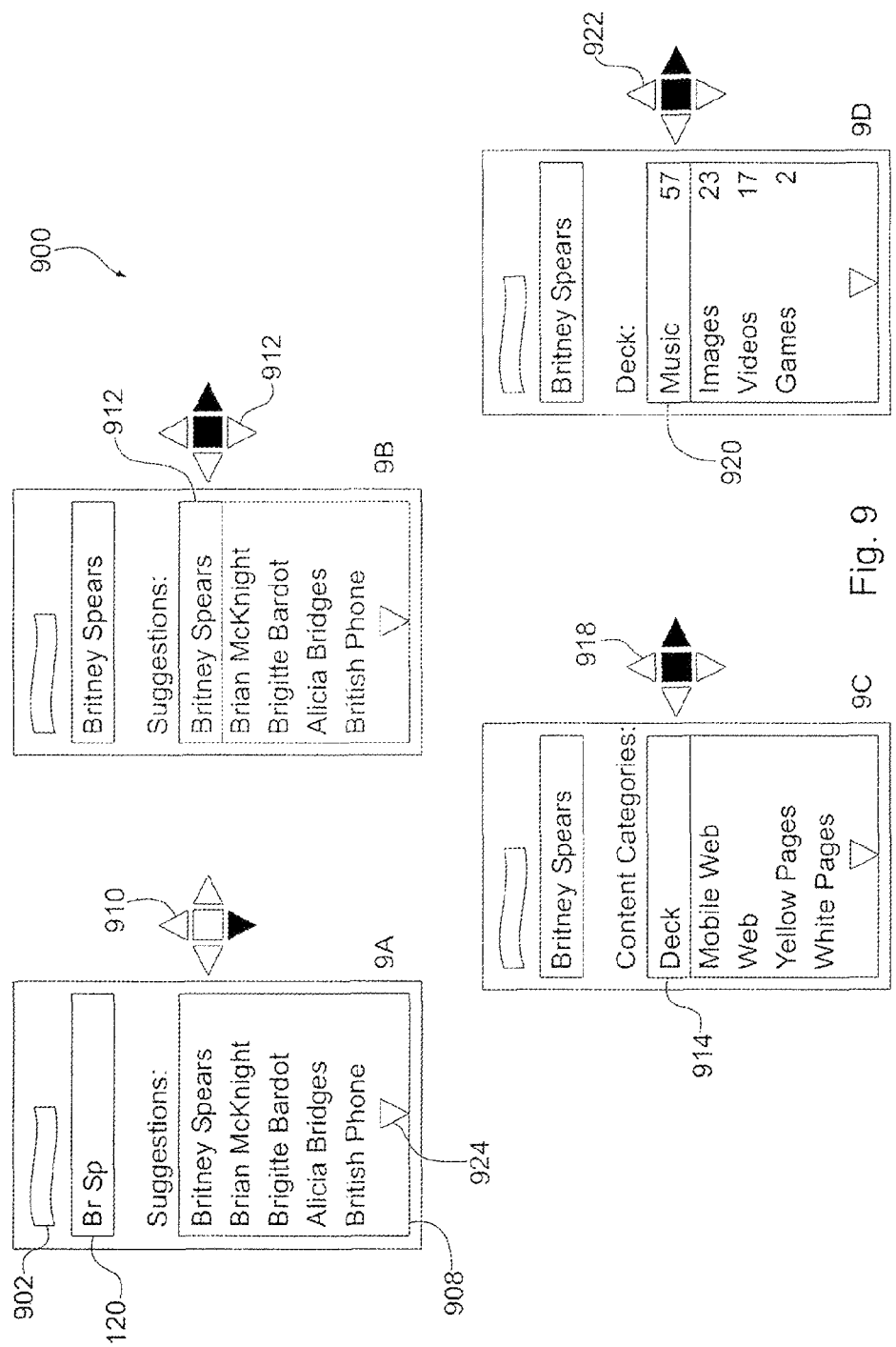
FIGS. 9A-9D illustrate a series of screen shots associated with a search on a mobile communication facility.

FIGS. 8A-8C illustrate various form factors of mobile communication facilities that may be used with the systems described herein. FIG. 8A illustrates a PDA phone with a touch screen and a full QWERTY keyboard. FIG. 8B illustrates a PDA phone with a two-letter-per-key keypad. FIG. 8C illustrates a slide-up phone revealing the keypad.

FIGS. 9A-9D illustrate a progression of user interface screens 400 associated with a search on a mobile communication device 102. The user interface screens may be generated by the client application interface described above. Beginning with screen shot 9A, a query entry facility 120 is provided. The screen may be labeled with a logo 902 and a suggestion box 908 may be provided. As an example based upon this interface, an abbreviated search query "Br Sp" may be typed into the search query entry facility 120. A disambiguation facility 140 (not shown in this figure) may operate in conjunction with a personal filter 644 (not shown in this figure) to disambiguate the partially entered terms. In addition, a suggestion facility may be operational (not shown in this figure) such that suggestions to the partially entered search query are presented in the search box 908. In the event that the first page of suggestions does not include the desired search query, more results may be displayed by activating the down arrow 924. A navigation facility 910 may be provided (e.g. a multi-directional joystick style keypad on the face of the mobile communication facility 102, a touch screen, keypad, or the like). The navigation facility 910 may be used (shown in the down position as indicated by the darkened arrow) to highlight "Britney Spears." Once "Britney Spears" is highlighted 910, the navigation facility 912 may be used to select (as indicated by the darkened center square) and expand the category (as indicated by the darkened right side arrow). Once the suggestion "Britney Spears" is selected and expanded, categories of search results 914 may be presented.

In the following discussion, the term "deck" is generally used to refer to in-garden content, or optionally, a discrete group of explicitly interrelated content items, while "mobile web" generally refers to WAP sites, and "web" generally refer to open web search results. Thus an effort is made in the following description to distinguish between in-garden content, general mobile device content, and general web content. However, it will be appreciated that these distinctions are not always exclusive, and not rigidly followed in the following discussion, so the context may appropriately suggest or require a narrower or broader meaning to any of these terms.

As indicated by the navigation facility, the category "Deck" has been selected and expanded to reveal sub categories 920 related to the category "Deck." Again, the user can select the sub category (in this embodiment "Music" is selected) to drill down into further categories or results.

Figure 10:
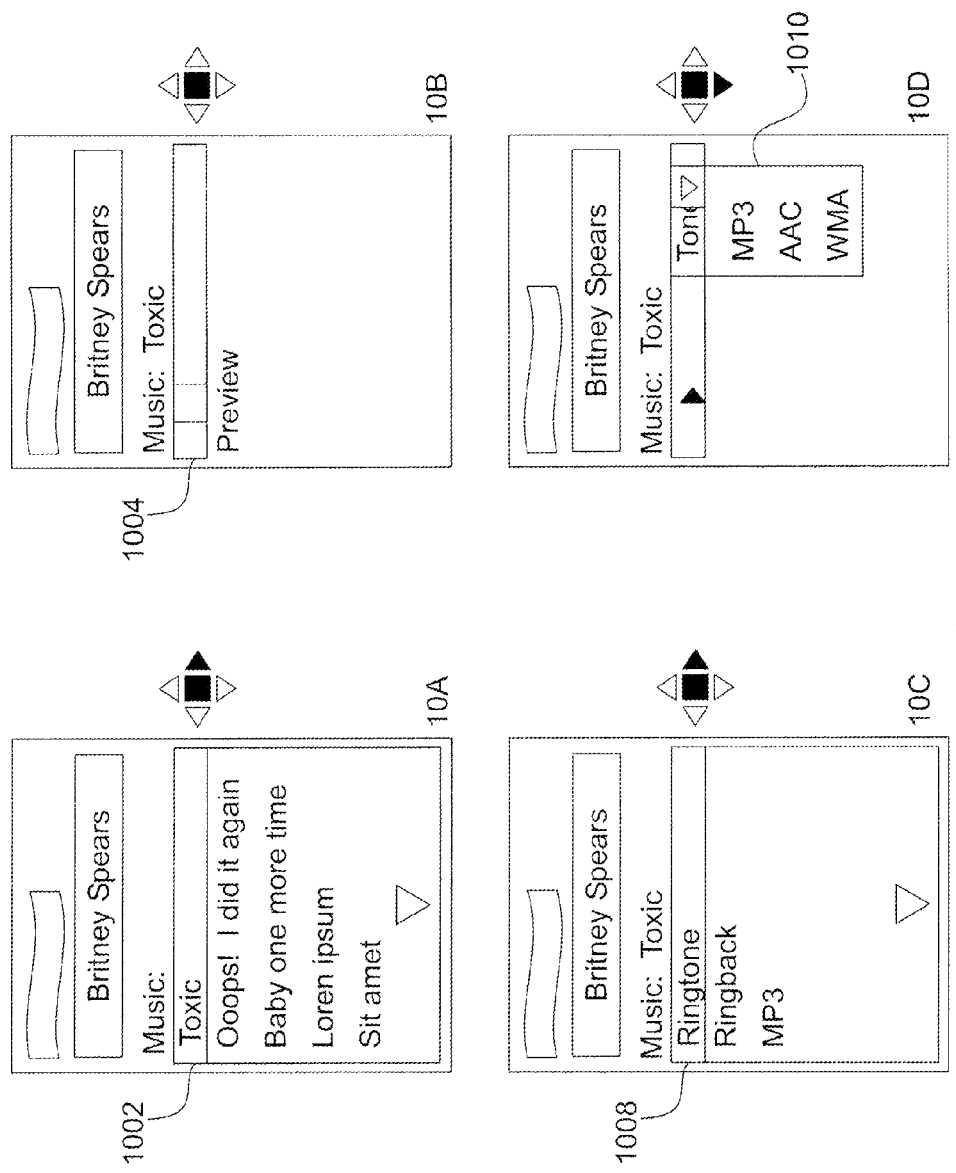
FIGS. 10A-10D illustrate screen shots associated with a mobile communication facility.

FIGS. 10A-10B illustrate several more screen shots in a progression of screen shots associated with a search from a user interface of a mobile communication facility 102. A search result is selected 1002, in this case a song related to Britney Spears; once the song is selected, the user may be presented with options of delivery. For example, the user may be provided with a preview option 1004 to sample the song. The user may also be presented with an option relating to the content, indicating the content use 1008, so it can be properly formatted, installed, and associated with the appropriate application(s) or device(s), and/or the user may be presented with an option of different file types 1010.

In embodiments, results may be presented to the mobile communication facility 102 as they are retrieved without waiting for the entire result set to be retrieved. In embodiments, certain results may be presented and displayed while other results are in the process of being presented or displayed This background processing of results may increase the speed at which some results can be presented to a mobile communication facility 102. In embodiments, certain categories of results may be presented to the mobile communication facility 102 before other categories. For example, images may take longer to download, process, and/or collect as compared to ringtones, so the category of ringtones, or individual ringtones, may be presented to the mobile communication facility 102 before or while the image results or image category is being locally loaded for presentation.

Figure 11:
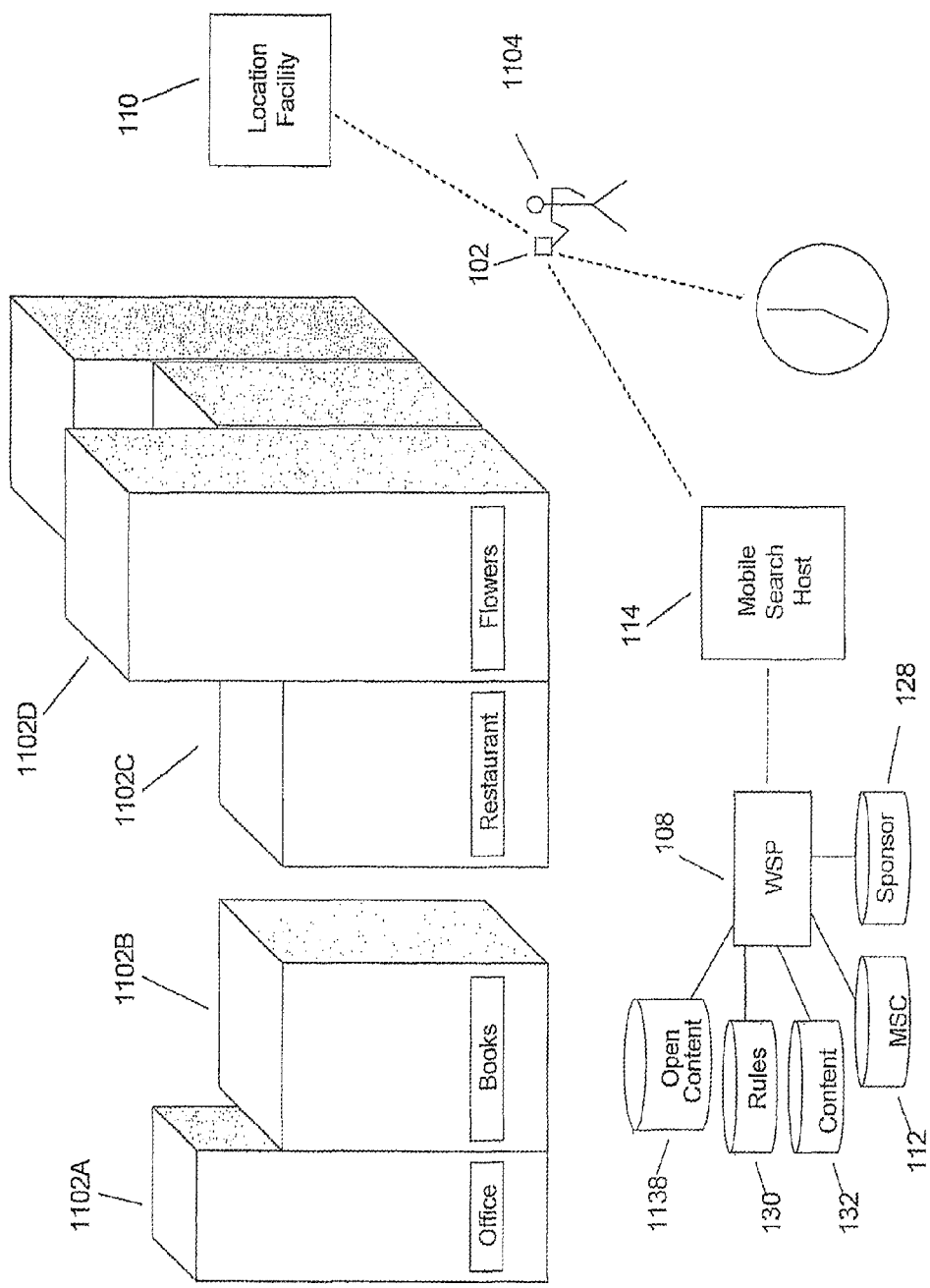
FIG. 11 illustrates a method of obtaining relevant search results for a user and displaying the results on a mobile communication facility.

FIG. 11 illustrates a scenario where a user 1104 of a mobile communication facility 102 would like to obtain relevant search results through the use of his mobile communication facility 102. Prior to making the search, there is already information relating to his presence, his person, his calling habits, his web habits, other people's habits, information relating to inferences about other people's behavior when presented with options, and other information that may be used in the development of results to this particular user 1104. For example, the user may be connected with a wireless service provider 108 either directly or through another facility. By interacting with the wireless service provider 108, the user can obtain information through the internet, such as open content 1138, information within the confines of the wireless provider's 108 domain, walled garden content 132, carrier rules 130, mobile subscriber characteristic information 112, sponsor information 128, time of day (e.g. either local time, or time related to another region), and location information as indicated by or provided through a location facility 110. Any or all of this information may be processed through a personal filter 644 (e.g. a collaborative filter) within the mobile search host facility 114 to refine a search query or refine (filter) results before they are presented to the user 1104 on the mobile communication facility 102.

As described in connection with FIG. 1, the mobile search host facility 114 may include an algorithm facility/filter 144 (e.g. a collaborative filter or personal filter). The personal filter 144 may be used in conjunction with a search query entered and transmitted from the mobile communication facility 102 along with information from one of the associated databases and/or its location information. The personal filter 144 may use an algorithm that predicts the desired results based on information collected from other searchers (e.g. collaborative filtering), as well information relating to the user (e.g. mobile subscriber characteristic information from database 112, or location information).

An implicit search scenario associated with the illustration of FIG. 11 could be as follows. The person 1104 is walking down the street at 7:00 p.m. The location of the mobile communication facility 102 is assessed using a GPS system (i.e. in association with the location facility 110). The location is then stored. An implicit search is initiated either because it is the time of day for the periodic implicit search, because user habits indicate the user is going to be looking for results soon, because there are advertisers interested in pushing an advertisement, there is a local sale, there is an activity nearby, or there are other temporal, activity based, or other reasons to initiate the implicit search. Once the search is initiated, the stored location information may be transmitted to a mobile search host facility. The mobile host search facility 142 may also collect information from other associated sources (e.g. the mobile subscriber characteristics 112 database 112, the sponsor information database 128, carrier rules 130). The mobile search host facility is now prepared to perform a search based on the personal filter in the mobile search host facility 114 in conjunction with the user's location, time of day, and/or other information relating to the several data sources available to the mobile search host facility 114 (e.g. the mobile subscriber characteristics 112 database 112, the sponsor data base 128, the content 132, the carrier rules 130, and the open web content 1138). All of the information may indicate that this is the general time when the user 1104 eats dinner, so the mobile search host facility 114 may provide results to the mobile communication facility 102 that pertain to dinner. In these results, a sponsor may have participated in a search marketing auction in an attempt to get his information onto the user's mobile communication facility 102. For example, a restaurant located in a building 1102C may be the high bidder on a keyword auction related to dinners within five miles of another building 1102C where the user 1104 is located, so the information the restaurant wanted sponsored and displayed on the mobile communication facility 102 will be displayed if the user 1104 interacts with the restaurant information presented. The information may not be presented until the user decides to look at search results, which may not ever happen. If the user 1104 does not interact with the sponsored result that was downloaded to the mobile communication facility 102, the sponsor may or may not have to pay a fee to the wireless provider 108 for the sponsored content. If the user 1104 does interact with the restaurant information that was downloaded on the mobile communication facility 102, the restaurant may or may not have to pay a fee to the wireless provider 108.

To continue with this implicit search scenario, the user may enter into a results mode or search mode on the mobile communication facility 102. In a results mode, results may appear without the need for a search. In this mode, the user may simply be presented with information that he may be interested in, given all of the prior information that is known about him (e.g. location, time of day, and mobile subscriber information). In a search mode, the user may enter a search query, and, if there is a relationship between the search query and the previously downloaded results, the previously downloaded results may be presented. The user may perceive this as a very fast search or a high bandwidth connection because the search results are presented from local memory.

The previously downloaded results presented may include a sponsored link from the restaurant, and the user may activate the sponsored link (e.g. by clicking on it). Once activated, or clicked or interacted with, the user may be presented with information relating to the restaurant. The information may include contact information (e.g. phone, address, email, URL) as well as a description of the restaurant. The user may be presented with a general section of the restaurant's website or a space tailored for the user 1104. For example, the restaurant may present users with a coupon or other sale if they arrive at the restaurant within a predetermined time. Knowing they are in the area and knowing the volume of restaurant traffic, the restaurant may be able to offer a more targeted sale offer.

Likewise, the bookstore in a building 1102B may want to advertise to the user 1104 because he is in the area and has some history of searching amazon.com and the like. The restaurant may have signed up to participate in an auction for mobile communication facility 102 advertising space relating to people in the area of the building 1102B, within the hours the store is open, where the people have a history of activities related to the purchase of books (e.g. searching amazon.com, purchasing books on-line, or are frequent travelers).

A flower shop in a building 1102D may employ similar techniques to target suitable users in the area.

While embodiments involving implicit searching have been described in connection with FIG. 11, it will be appreciated that the same, or similar techniques may be applied to explicit searches. For example, the user 1104 may be in the area of an office building 1102A and may be looking for the office building 1102A. The user 1104 may enter a search query with the name of the office building 1102B, and the name of the office building may be combined with the user's location and time of day to better target search results for the user.

An explicit search scenario associated with the illustration of FIG. 11 could be as follows. The person 1104 is walking down the street at 7:00 p.m. The location of the mobile communication facility 102 is assessed using a GPS system (i.e. in association with the location facility 110). The location is then stored. An explicit search is initiated by the user 1104. Once the search is initiated, the stored location information may be transmitted to a mobile search host facility. The mobile host search facility 142 may also collect information from other associated sources (e.g. the mobile subscriber characteristics database 112, the sponsor information database 128, or carrier rules 130). The mobile search host facility is now prepared to perform a search based on the personal filter in the mobile search host facility 114 in conjunction with the user's location, time of day, and other information relating to the several data sources available to the mobile search host facility 114 (e.g. the mobile subscriber characteristics 112 database 112, the sponsor data base 128, the content 132, the carrier rules 130, and the open web content 1138). The search may be performed in conjunction with the personal filter and other relevant filtering information to obtain results. In these results, a sponsor may have participated in a search marketing auction in an attempt to get his information onto the user's mobile communication facility 102. For example, the restaurant located in a building 1102C may be the high bidder on a keyword auction related to dinners within five miles of the building 1102C, so the information the restaurant wanted sponsored and displayed on the mobile communication facility 102 will be displayed if the user 1104 interacts with the restaurant information presented. If the user does not interact with the sponsored result that was downloaded to the mobile communication facility 102, the sponsor may or may not have to pay a fee to the wireless provider 108 for the right to post. If the user 1104 does interact with the restaurant information that was downloaded on the mobile communication facility 102, the restaurant may or may not have to pay a fee to the wireless provider 108.

The downloaded results presented may include a sponsored link from the restaurant, and the user may activate the sponsored link (e.g. by clicking on it). Once activated, or clicked or interacted with, the link may present the user with information relating to the restaurant. The information may include contact information (e.g. phone, address, email, URL) as well as a description of the restaurant. In one embodiment, the information may include a form or active control (such as a button) for making reservations. The user may be presented with a general section of the restaurant's website or a space tailored for the user 1104. For example, the restaurant may present the user with a coupon or other sale if he or she arrives at the restaurant within a predetermined time. Knowing they are in the area and knowing the volume of restaurant traffic, the restaurant may be able to offer a more targeted sale offer.

Likewise, the bookstore in a building 1102B may want to advertise to the user 1104 because he is in the area and has some history of searching amazon.com and the like. The restaurant may have signed up to participate in an auction for mobile communication facility 102 advertising space relating to people in the area of the building 1102B, within the hours the store is open, where the people have a history of activities related to the purchase of books (e.g. searching amazon.com, purchasing books on-line, is a frequent traveler).

In embodiments, search results are presented to the user 1104 on the mobile communication facility 102 that are targeted to the user based on information relating to the user, the mobile communication facility 102, the location, and/or other information as described herein in conjunction with a personal filter. In embodiments, the information is also used to better target advertising, and sponsored advertisements may be provided to the mobile communication facility 102 through a pay for auction advertisement scheme. Such a scheme could be similar to the desktop featured Google AdWords and AdSense by Google, Inc. of Mountain View, Calif.

By way of another example made in connection with FIG. 11, the user 1104 may receive a search result that includes a pay per call link, where the vendor associated with the call (typically the company being called) pays a fee when receiving a call through the pay per call number. For example, the user 1104 may search for results related to flowers and receive back a phone number and possibly other contact information for the flower shop in building 1102D. The link may have been provided as a result of processing a search through a process involving a personal filter in conjunction with information relating to the user, the mobile communication facility 102, and/or the mobile subscriber characteristic information (as indicated in the implicit search example and the explicit search example illustrated in connection with FIG. 11). Once the user activates the phone number for the flower shop, the flower shop may be able to receive the call for a fee, or reject the call.

In embodiments of the present invention, methods and systems may include presenting a link in a user interface of a mobile communication device, where the link is configured to link to a commercial item that is available via a computer network, thus enabling a party to sponsor the link. The link may be to an item of goods or services for sale, to a promotion, to a content item, to an advertisement, or to other material of a commercial provider, such as a vendor of goods or services. The link may, for example, be to an item on an electronic commerce site, to an auction site, to a reverse auction site, to a news site, to an information site, or to other content on a computer network, such as web content, content located on other networks, or the like. The link may include or be associated with various e-commerce features, such as those enabling single click purchasing, bidding, targeted advertising, instant purchasing (e.g., "buy it now"), tracking of clicks or transactions, tracking of referrals, affiliate program features, or the like. In embodiments the link is a sponsored link that is presented to a user on the user interface of a mobile communication facility 102, such as a cell phone. The sponsored link may be presented in association with an implicit query 164 (and may be related to such a query). The sponsored link may be presented in response to entering an explicit query (or partial entry of such a query). The sponsored link may be presented upon making of a telephone call or other action of a user of the mobile communication facility 102. The sponsored link may be presented upon retrieval of results, sorting of results, filtering of results, presentation of results, or routing of results, such as in response to a search function 142 that is executed in response to a query.

In embodiments the right to sponsor a link is obtained via a bidding process among a plurality of candidate sponsors. The bidding process may be automated, whereby a bid (or a reserve bid, reserve price, or the like) is automatically compared to other bids made by other candidate sponsors for a link in an auction format. In other embodiments bids need only meet a required price in order to be accepted. An algorithm facility 144 may determine what link or links relate to "winning" bids for sponsoring particular links. Bids can be for presenting links at a particular position in the user interface, at a particular point in a navigation sequence (such as on a home page, on a search screen, after a call has been made, after a transaction has been executed, after navigation to a particular screen, upon presentation of an implicit query 164, upon entry of an explicit query, upon retrieval of results, upon routing of results, and/or upon consummation of a transaction, or the like). Bids can be made for associating a link with particular content, such as particular forms of queries, particular results, or particular content items. For example, a sponsor who sells golf equipment might bid to sponsor links whenever an implicit or explicit query uses the terms "golf," "tee," or "par," while a sponsor who sells video content might seek to sponsor links when a query uses the terms "movie," "film," "cinema" or "show." In embodiments a bidding process may occur in close proximity in time to the presentation of the link.

In embodiments, an advertisement may be presented to a mobile communication facility based at least in part on receiving a webpage request from the query facility of a mobile communication facility, receiving information associated with the mobile communication facility, and associating at least one advertisement with a webpage at least in part based on the information relating to the mobile communication facility. For example, a user of a mobile communication facility may initiate a search query for "Sonny Rollins." The potential search results that may be presented to the user's mobile communication facility may include advertisements and websites for CD's of Sonny Rollin's music, videos of his performances, etc. Information about the mobile communication facility (e.g., its video streaming capabilities) may be used in order to determine which of the advertisement/ webpage results may be presented successfully to the user's mobile communication facility. This information may, in turn, be used to pair webpages and advertisements that are each capable of presenting in the display of the user's mobile communication facility.

In certain embodiments, the right to sponsor the link is obtained via an auction, which may be an online auction.

In embodiments a link may be associated with a disambiguated version of a query, so that a link appears only after the relevancy of a query has been assessed.

In embodiments a sponsored link may be associated with a result that is retrieved via a search that is executed using the mobile communication device 102. For example, a link for a camera vendor may appear only when one of the highest-ranked search results uses the words "digital camera."

In embodiments, the sponsored link may be associated with the sorting of results that are retrieved via a search function 142 that is executed using the mobile communication device. For example, a link may be sponsored (including after a bidding process), only if associated results are ranked sufficiently high after they are sorted (such as being sorted as a result of a ranking or disambiguation process).

In embodiments, a sponsored link may be associated with the filtering of results that are retrieved via a search function 142 that is executed using the mobile communication device. For example, the sponsored link may only appear after certain types of results have been filtered out. For example, a sponsor of travel to Paris, France, might bid to sponsor a link only in situations where results relating to Paris Hilton have been filtered out before results are presented to the user.

In embodiments a sponsored link may be associated with the presentation of results that are retrieved via a search function 142 that is executed using the mobile communication device. For example, if certain results are modified or filtered, such as based on the capability of a particular device to present certain content, a sponsored link may be sponsored only for situations where relevant results can be presented on the mobile communications facility. For example, a sponsor may bid to sponsor links to instructional videos for yoga, but only for presentation on devices that are capable of rendering sample video.

In embodiments a sponsored link may be associated with the routing of results that are retrieved via a search function 142 that is executed using the mobile communication device. For example, if an algorithm facility 144 includes rules for routing certain types of results, a sponsored link may be associated with the execution of such rules. For example, rules related to parental controls 150 may route content or messages to parents if children appear to be attempting to access inappropriate content. A sponsored link may allow a provider of parental control software or services to present a link that is associated with the routed results.

In embodiments, a link may be provided to a commercial item of a party who has not yet sponsored the link. The party may then be offered the opportunity to sponsor the continued presentation of the link. In embodiments, the offer to continue to sponsor the link may be presented to a commercial entity contemporaneously with or upon a user's execution of the link. In embodiments such an offer may include an invitation for the commercial entity to participate in an auction or bidding process for continued sponsorship of the link or for sponsorship of at least one additional link.

In embodiments, the link to a commercial entity may include a phone number for a provider of the commercial item. In embodiments, the phone number may be a dedicated phone number, which, when called by a user, conveys an intermediate message to the commercial entity that includes an offer to continue the link in exchange for an agreement by the commercial entity to pay some consideration, which may be a sponsored link basis, an auction basis, a pay per call basis, or the like.

In embodiments, a generalized process may be used for disambiguating a user query entry 120 by pairing the query information with at least one element from the mobile subscriber characteristics 112 database 112. Once the user submits a query entry 120 via the mobile communication facility 102, the query is wirelessly routed to the wireless communication facility 104 and then to the wireless provider 108. The wireless provider 108 may then abstract data stored in the mobile subscriber characteristics 112 database 112 that is relevant to the user query entry 120. Relevance may be based upon semantic similarities, temporal factors, and geographic and/or demographic congruence between the substance of the query entry 120 and that found in the mobile subscriber characteristics 112 database 112. Once this information is linked, the disambiguation facility 140 may carry out operations to elucidate the probable best meaning of the user's query entry 120 and route the result(s) back through the wireless provider 108 and wireless communication facility 104 to the mobile communication facility 102 for display 172 to the user.

Representative elements that may be stored within the mobile subscriber characteristics 112 database 112 include location, personal information relating to a user, web interactions, email interactions, messaging interactions, billing history, payment history, typical bill amount, time of day, duration of on-line interactions, number of on-line interactions, family status, occupation, transactions, previous search queries entered, history of locations, phone number, device identifier, type of content previously downloaded, content previously viewed, and sites visited.

Similarly, the query entry 120 may be disambiguated based upon characteristics of the user's mobile communication facility 102 (e.g., unique phone number, device identifier, or other unique identifier), information stored within the mobile communication facility 102 (e.g., information stored in the memory of the device), or information stored on a database associated with a server.

In embodiments, mobile search host facilities 114 may be used for providing mobile communications facility 102 users additional relevant result set(s) based upon a query entry 120. For example, the mobile communication facility 102 may have a cache 2300 of memory wherein salient information is stored, such as aspects of the mobile communication facility 102, the user's profile, and a user behavioral history (e.g., phone calls, websites visited, search queries, frequency of queries, frequency of downloading content, rate changes in the frequency of events, and frequency of purchases).

This information may be automatically refreshed and transferred, at set temporal intervals, from the mobile communication facility 102 to the wireless communication facility 104, and then on to either the user's wireless provider 108 or directly to the mobile search host facilities 114. Within the mobile search host facilities 114, the query content may be filtered by an algorithm facility 144 that scrutinizes the query content for the purpose of providing the user additional suggestions in the result set(s). For example, the frequency of terms used by the user in the query entry 120 may be used by the algorithm facility 144 to suggest related results based upon similar frequency indexing of key words or upon the popularity of query terms and results. As the user amends his query entry 120, the cache 2300 may implicitly transfer the content to the mobile search host facilities 114 for real time processing within the disambiguation facility 140, search facility 142, or other facility within the mobile host search facilities 114.

Additional facilities within the mobile search host facilities 114 may be used to add meaningfulness to the query entry 120. For example, the disambiguation facility 140 may categorize the query entry 120 based upon key words, word frequency, and/or word combinations, thereby enabling the resulting categories, such as title, artist, and yellow page-type categories. Carrier business rules 158, parental controls 150, and a sponsorship facility 162 may also be used to generate suggestions for these and related search query and/or result set(s).

An interactive process between the mobile communication facility 102 and the disambiguation step 210 may be used for unambiguous query formation 2400. Once a user submits a query entry 120 to the mobile communication facility 102, a process of correction 244 may be necessary or helpful for unambiguous query formation 2400 that is sufficient to yield intelligible and useful result set(s). As part of the correction 244 process, information specific to the type of mobile communication facility 102 may be used; for example, if the device has unique delivery capabilities, the query may need correction in order to derive a result set compatible with these capabilities. Information stored in the mobile subscriber characteristics database 112 or parental controls facility 150 may also be integral to the correction 244 process. In embodiments, the search engine may automatically suggest corrections for common misspellings, including those which are unique to the mobile experience (e.g., "2nite")

A user's query entry 120 may return a null result set or an improbable results set. In this case, the search facility 142, in conjunction with the mobile communication facility 102, could automatically trigger correction 244 and iteratively cycle through alternative query entries 120 until a non-null or higher probability result set is delivered.

In embodiments, items which have been more recently added or updated may receive a ranking priority indicative of their freshness.

In embodiments, additional recommendations may be made following a user's query entry 120 based upon the information related to the mobile communication facility 102. For example, mobile subscriber characteristics 112, carrier business rules 130, or sponsor information, in conjunction with the query entry 120, may suggest relevant recommendations for the user. The recommendations may be paired with the query entry 120 search results or presented prior to, or following, the display of the search results.

A user's prior search activities and search results may also be used to create recommendations for the user. Prior search activities may include transactions, search queries, visits to websites, phone calls, and/or other acts initiated by the user on the mobile communication facility 102. The geographic location of the mobile communication facility 102 may foster recommendations including, but not limited to, sponsor information (e.g. products and services) in the user's current geographic vicinity. The current time may be used independently or in conjunction with other information to create user recommendations. For example, the independent fact that it is noon may create recommendations for restaurants serving lunch. This information may be further filtered by the location of the mobile communication facility 102 to recommend only those restaurants that are in the user's immediate vicinity, and it may be further filtered by the subscriber's characteristics to recommend only that subset of restaurants serving lunch in the user's current vicinity that have received high ratings by restaurant patrons with a demographic profile similar to the user's. As with the above restaurant example, similar processes for generating meaningful recommendations may be applied to other services and products, including transportation (navigation, taxis, buses, trains, cars, airports, etc.), food and drink (groceries, drive through restaurants, bars, etc.), entertainment (theater, sports, movies, clubs, etc.), business (corporations, workplaces, banks, post offices and other mailing or shipping facilities. etc.), consumer needs (gas stations, drug or clothing stores, baby sitters, parking, etc.), and information specific to the locale (directions, locations, starting times, news, etc.)

In embodiments, classifications of search categories may be presented that relate to the search query on a display associated with the mobile communication facility 102.

In embodiments, a query entry 120 may be mapped to a taxonomy of query categories and classification schema (e.g., the yellow pages phone book taxonomy).

In embodiments, results may be retrieved based on submitting a query entry 120 in conjunction with information relating to the mobile communication facility 102. This information may include the mobile subscriber characteristics 112, carrier business rules 130, and sponsor information. The additional information stored in these databases may form search parameters that limit the search query and the display of result set(s) by omitting information, prioritizing information (e.g., presenting sponsor links prior to all others), highlighting a subset of the search result set, or ordering the display of information based upon a sponsor auction (i.e., highest bidder presented first). In the case of the sponsor auction, sponsors may bid on keywords that they would like to be associated with their products, services, and links thereto.

In embodiments, results may be ordered in relation to the query entry 120 based at least in part on information relating to the mobile communication facility 102. This information may include mobile subscriber characteristics 112, a search algorithm facility 144, parental controls 150, carrier business rules 130, and/or sponsor information. Ordering results related to a query entry 120 based on sponsor information may be done by associating sponsors with key words used in query entries, and/or associating query entries with sponsor content. When a query entry 120 matches a sponsor's keyword(s) or content, that sponsor's information may be prioritized in the search result display, highlighted, or otherwise given superiority over other content related to the query entry 120. Association of key words with sponsors may occur through an auction in which bidders compete for sole association with keywords or for a shared frequency of keyword association (e.g., every other occurrence of a keyword). Furthermore, the auction process could include bidding to determine the size of the resulting sponsor content display (e.g., expressed as a percentage of the user's total display space on the mobile communication facility 102) and the addition of multimedia content to the results display, such as adding graphics, audio, or a video stream.

Query results may also be ordered, at least in part, based on the capabilities of the mobile communication facility 102, wherein the capability is an audio, visual, processing, or screen capability.

In embodiments, a query entry 120 may be made by producing predictive text based, at least in part, on information relating to the mobile communication facility 102, such as mobile subscriber characteristics 112, a search algorithm facility 144, a personal filter, parental controls 150, carrier business rules 130, or sponsorship information. Additionally, predictive text may be based on the mobile communication facility's 102 SMS conversion and/or keypad sequence conversion. Additionally, T9 errors may be corrected. For example, if a user seeks "Britney" and dials 2748639. T9 may interpret that as "Argumenw" instead.

In embodiments, a voice-based query entry 120 may be associated with information relating to the mobile communication facility 102, such as voice interpretation based, at least in part, on SMS conversion.

In embodiments, an auction may be associated with a query entry 120. Performing the auction may involve using information relating to the mobile communication facility 102, for example, mobile subscriber characteristics 112, a search algorithm facility 144, a personal filter, parental controls 150, or carrier business rules 130. The result set(s) display may prioritize or highlight sponsor results.

In embodiments, a search query may be entered on a mobile communication facility 102 and results presented on a screen associated with the mobile communication facility 102, and a transaction may be performed in association with a sponsored link, where the transaction may occur by the user clicking on a sponsored link or engaging in a commercial transaction, such as purchasing downloadable content.

In embodiments, aggregated content may be presented to the mobile communication facility 102. Content may be aggregated through a spider, including, for example, ringtone content, music content, or video content. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first, or extraction from content type sites first, where the content was aggregated in relation to information relating to the mobile communication facility 102.

In embodiments, spiders may be used to determine the compatibility between content and the capabilities of mobile communication facilities. For example, a spider may present to a content provider as a particular type of mobile communication facility in order to detect the level of compatibility between that type of mobile communication facility and the content offered by the content provider. Furthermore, a content provider, such as a mobile storefront, may provide different content for each type or class of mobile communication facility. The spider may be able to present to the content provider and determine the associations between a given provider's content classes and types or classes of mobile communication facilities.

In embodiments, spiders may be able to determine the compatibility of content with mobile communication facility types by detecting webpage content qualities that are specific to a type or class of mobile communication facility (e.g., HTML tags, color depth, number of images, size of images, etc). Once the compatibility data is compiled by a spider, the data may be stored in a database and used in conjunction with a search engine to optimize content presentation by sending only compatibile content, or the most compatible content available, to the mobile communication facility from which the search query is sent.

In embodiments, a sponsored link may be displayed on a display associated with a mobile communication facility 102 that allows a vendor associated with the sponsored link to selectively receive a connection or receive search results (including a sponsored phone number) where an economic transaction takes place when the sponsored number is at least one of those called and answered.

In embodiments, content may be delivered to a mobile communication facility 102 based at least in part on information relating to the mobile communication facility 102, and later content may be produced as the result of a search query. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated based upon the click through performance following one or more search query entries on a mobile communication facility 102. The report may contain information relating to search result quality, keyword management, and revenue generation, and it may be segmented by the type of mobile communication facility 102 used.

In embodiments, a query entry 120 may be made in a search box of a mobile communication facility 102 where the search box is presented on an idle screen.

In embodiments, a search query may be entered into a search facility 142 that is adapted to produce results based on the mobile compatible page rank. The mobile compatible page rank may derive from the page's compatibility with the screen, the processing capability of the mobile communication facility 102, or upon the complexity of the page(s).

In embodiments, a relationship may be generated between a query entry 120 and at least one mobile subscriber characteristic. The mobile subscriber characteristics 112 may include location, personal information, history of the user's web interactions, and or other characteristics, which may also be used in combination with other data concerning the subscriber, the mobile device, and so forth.

In embodiments, a relationship may be generated between a query entry 120 and the location of a mobile communication facility 102 using a location-based service. The relationship may be between at least one query entry 120 and the location and a time of day. Location may be provided by a GPS system or a cell phone triangulation service.

In embodiments, the location of a mobile communication facility may be used by its user to perform comparison shopping. For example, a user searching for electronics may be provided with the contact information (e.g., web address, street address, email address, phone number, etc.). for electronics retailers within a given distance of the current location of the user's mobile communication facility. Both the online and offline (bricks-and-mortar) inventories of stores may be presented to the mobile communication facility user in order to comparing stores' offerings.

In embodiments, results may be produced based at least in part on a query entry 120 used in conjunction with a filter algorithm, where the filter algorithm uses information gathered by a wireless provider 108. The algorithm facility 144 may be a collaborative filter where the search is an open web search, or it may be a recommendation system.

In embodiments, a query entry 120 may be processed through a results facility 148 in which the results facility 148 is associated with information derived from the mobile communication facility 102, such as mobile subscriber characteristics 112 information.

In embodiments, a search query may be disambiguated on the mobile communication facility 102. Disambiguation may take place on the mobile communication facility 102 or on a server application. Disambiguation may involve SMS translation, a spell check algorithm, a spell check table, a phonetic spelling algorithm, a phonetic spelling table, or a numeric keypad word translation In embodiments, a query entry 120 on a mobile communication facility 102 may be, in part, processed through a voice recognition facility 160 residing on the mobile communication facility 102. Alternatively, the voice recognition facility 160 may reside on a remote server or in part on the mobile communication facility 102 and in part on a server.

In embodiments, a query entry 120 on a mobile communication facility 102 may be processed in association with information relating to the mobile communication facility 102. This information may reside locally on the mobile communication facility 102, or it may be stored remotely, for example, in a mobile subscriber characteristics 112 database.

In embodiments, a query entry 120 may be processed on a mobile communication facility 102 that provides a parental control facility to regulate the results produced on the mobile communication facility 102. The parental controls 150 may be regulated through a server application or through the mobile communication facility 102.

In embodiments, a query entry 120 may be processed on a mobile communication facility 102 that provides a privacy facility 152 associated with the mobile communication facility 102 to protect a user from loss of personal or other sensitive information relating to the search query.

In embodiments, a query entry 120 may be processed on a mobile communication facility 102 that provides a transactional security facility 154 associated with the mobile communication facility 102, in which the transactional security facility 154 is adapted to enable secure transactions associated with the query entry 120. The transactional security facility 154 may involve the protection of privacy 152 and may be operated in association with parental controls 150 or digital rights management.

In embodiments, a query entry 120 may be processed in conjunction with carrier business rules 130 and with information relating to a mobile communication facility 102. Carrier business rules 130 may include walled garden results, presenting out of garden content, sponsor information, or auctions. Information relating to the mobile communication facility 102 may be mobile subscriber characteristic information.

In embodiments, a query entry 120 may be processed on a mobile communication facility 102 that produces sponsored results on the display of the mobile communication facility 102. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link, presented as text, as a picture, as a video, or as an interactive application. Content may be formatted for the mobile communication facility 102 and relate to webpage content or links for syndicated advertisements.

In embodiments, a query entry 120 may be disambiguated on a mobile communication facility 102 and a related query suggested based, in part, on information relating to a mobile communication facility 102. The information relating to the mobile communication facility 102 may be the frequency of queries, frequency of downloading content, rate changes in the frequency of events, and frequency of purchases. This information may be stored locally, on the mobile communication facility 102 in the device cache, or remotely. The cache may be updated during inactive search periods.

Disambiguation may occur by suggesting additional queries based upon the frequency of terms used in the initial query entry 120 or upon the category of terms used (e.g., title, artist, or yellow pages taxonomy). Suggestions may be updated following the entry of new keystrokes on the mobile communication facility 102. Disambiguation may also be based upon information contained in a mobile subscriber characteristics 112 database, the type of mobile communication facility 102 used to make the query, carrier business rules 130, a search algorithm facility 144, a term frequency algorithm (based upon the popularity of results or query terms), or parental controls 150.

In embodiments, a disambiguated query entry 120 may be corrected based, in part, on information relating to the mobile communication facility 102 (e.g., device capabilities), mobile subscriber characteristics 112, or parental controls 150. During disambiguation, if no results are received from the search facility 142, the query may be corrected automatically prior to displaying the results. If the received result from the search facility 142 is estimated as unlikely, the mobile communication facility 102 may present an indication of this result on its display, for example, the LCD screen of a cellular phone.

In embodiments, a query entry 120 may be disambiguated on a mobile communication facility 102 by making recommendations based, in part, on information relating to the mobile communication facility 102, such as the subscriber characteristics, carrier business rules 130, or sponsor information. The recommendation may be presented in coordination with presentation of the search results, in the same display as the search results, or prior to, or following, the presentation of the search results.

Disambiguating a query entry 120 on a mobile communication facility 102 may also occur by providing recommendations based upon the relationship between prior search activity and search results developed from the query entry 120. Prior search activity may include transactions, searches, or other query behavior. Carrier business rules 130 may also be used to disambiguate a query entry 120, as may the location of the mobile communication facility 102, the time of day, the time of a query entry 120, or personal filters (e.g., a collaborative filter). For example, the pairing of location and time of day information may offer recommendations to a user that is looking for transportation (navigation, taxis, buses, trains, cars, airports, etc.), food and drink (groceries, drive through restaurants, bars, etc.), entertainment (theater, sports, movies, clubs, etc.), business (corporations, workplaces, banks, post offices and other mailing or shipping facilities. etc.), consumer needs (gas stations, drug or clothing stores, baby sitters, parking, etc.), and information specific to the locale (directions, locations, starting times, news, etc.)

In embodiments, a query entry 120 may be disambiguated on a mobile communication facility 102 and classifications presented of search categories related to the disambiguated search query on a display associated with the mobile communication facility 102.

In embodiments, a query entry 120 may be disambiguated on a mobile communication facility 102 by mapping the disambiguated search query to a query classification of category taxonomies (e.g., the yellow pages taxonomy).

In embodiments, a query entry 120 may be disambiguated on a mobile communication facility 102 by retrieving results based on the disambiguated search query in conjunction with information relating to the mobile communication facility 102, such as mobile subscriber characteristics 112, carrier business rules 130, or sponsor information. Sponsor information may be used to determine the display parameters of the results. For example, results may be prioritized, highlighted, or restricted based upon sponsor information. Sponsor information may derive, in part, from a sponsor auction in which competitive bidding takes place to determine what sponsor information is associated with keywords that may be used in users' query entries.

In embodiments, a search query may be disambiguated on a mobile communication facility 102 by ordering the results based, in part, on information relating to the mobile communication facility 102, such as mobile subscriber characteristics 112, a search algorithm facility 144, parental controls 150, carrier business rules 130, or sponsorship information. Disambiguation based on sponsor information may be done by using the sponsor of the key word used in the query entry 120 or the sponsor of the resulting search content. The sponsored content may be prioritized or highlighted for display. Sponsor information used for this prioritizing may result from an auction in which sponsors bid for the right for their content to be associated with certain keywords that may be used in users' query entries.

Other disambiguation ordering rules may be related, in part, to the amount of content within a result category, the carrier business rules 130, mobile subscriber characteristics 112, a search algorithm facility 144, a personal filter, parental controls 150, sponsorship information, or the capabilities of the mobile communication facility 102, such as display screen size or audio, visual, or processing capabilities.

In embodiments, a query entry 120 may be disambiguated on a mobile communication facility 102 by producing predictive text based, in part, on information relating to the mobile communication facility 102, such as the carrier business rules 130, mobile subscriber characteristics 112, a search algorithm facility 144, a personal filter, parental controls 150, or sponsorship information. The predictive text may involve SMS conversion or keypad sequence conversion and may be based, in part, on a custom generated dictionary derived from information relating to the mobile communication facility 102.

In embodiments, an ambiguous voice query entry 120 may be disambiguated on a mobile communication facility 102 where the interpretation of the voice is based, in part, on information relating to the mobile communication facility 102, is based on weighted probabilities relating to a user, or is based on SMS conversion.

In embodiments, a query entry 120 may be disambiguated on a mobile communication facility 102 by performing an auction related to the query, where the results are based, in part, on the auction. Auction results may be used to prioritize the display of sponsor results or to highlight information from high-bidding sponsors. Performance of the auction may be based in part on mobile subscriber characteristics 112, a search algorithm facility 144, a personal filter, parental controls 150, or carrier business rules 130.

In embodiments, a query entry 120 may be disambiguated on a mobile communication facility 102 by presenting results on the screen of the mobile communication facility 102 and performing a transaction in association with a sponsored link. An economic transaction may arise from the user clicking on a sponsored link or purchasing downloadable content.

In embodiments, a query entry 120 may be disambiguated on a mobile communication facility 102 by presenting aggregated content to the mobile communication facility 102. Aggregation may occur through the use of a spider. Aggregated content may include ringtone content, music content, or video content. A spider may also be used to determine the compatibility between the available content and the capabilities of the user's mobile communication facility 102. Compatibility may be determined through mock mobile communication facility 102 trials during which the spider extracts results from sites on a preferred basis (based upon WAP compatible content or content type).

In embodiments, a query entry 120 may be disambiguated on a mobile communication facility 102 by selecting a sponsored link for display on the mobile communication facility 102 and allowing a vendor associated with the sponsored link to selectively receive a connection. Alternatively, a query entry 120 may be disambiguated by receiving search results that include a sponsored phone number, and an economic transaction takes place when the sponsored number is called and answered.

In embodiments, disambiguated content may be delivered to a mobile communication facility 102 based, in part, on information relating to the mobile communication facility 102. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated based upon the click through performance and, in turn, based in part on one or more disambiguated search query entries on a mobile communications facility. The report may contain information relating to search result quality, keyword management, and revenue generation, and it may be segmented by the type of mobile communication facility 102 used.

In embodiments, a query entry 120 may be disambiguated in a search box of a mobile communication facility 102 where the search box is presented on an idle screen.

In embodiments, a query entry 120 may be disambiguated that is entered into a query entry 120 facility on a mobile communication facility 102.

In embodiments, a query entry 120 may be disambiguated in a search facility 142 that is adapted to produce results based on the mobile compatible page rank. The mobile compatible page rank may derive from the page's compatibility with the screen, the processing capability of the mobile communication facility 102, or upon the complexity of the page(s).

In embodiments, a relationship between a query entry 120 and at least one mobile subscriber characteristic may be disambiguated. The mobile subscriber characteristics 112 may include location, personal information, history of the user's web interactions, or a plurality of characteristics, such as location and the time of day.

In embodiments, a query may be disambiguated by generating a relationship between a query entry 120 and the location of a mobile communication facility 102 using a location-based service. The relationship may be between at least one query entry 120 and the location and a time of day. Location may be provided by a GPS system or a cell phone triangulation service.

In embodiments, results may be disambiguated based at least in part on a disambiguated query entry 120 used in conjunction with a filter algorithm, where the filter algorithm uses information gathered by a wireless provider 108. The algorithm facility 144 may be a collaborative filter where the search is an open web search, or it may be a recommendation system.

In embodiments, a disambiguated query entry 120 may be processed through a results facility 148 where the results facility 148 is associated with information derived from the mobile communication facility 102, such as mobile subscriber characteristics 112 information.

In embodiments, a search query may be disambiguated on the mobile communication facility 102. Disambiguation may take place on the mobile communication facility 102 or on a server application. Disambiguation may involve SMS translation, a spell check algorithm, a spell check table, a phonetic spelling algorithm, a phonetic spelling table, or a numeric keypad word translation In embodiments, a query entry 120 may be disambiguated on a mobile communication facility 102 where the query is at least in part processed through a voice recognition facility 160 residing on the mobile communication facility 102. Alternatively, the voice recognition facility 160 may reside on a remote server or in part on the mobile communication facility 102 and in part on a server.

In embodiments, a query entry 120 may be disambiguated on a mobile communication facility 102 that processes the query in association with information relating to the mobile communication facility 102. This information may reside locally on the mobile communication facility 102, or it may be stored remotely, for example, in a mobile subscriber characteristics 112 database.

In embodiments, a query entry 120 may be disambiguated on a mobile communication facility 102 that provides a parental control facility to regulate the results produced on the mobile communication facility 102. The parental controls 150 may be regulated through a server application or through the mobile communication facility 102.

In embodiments, a query entry 120 may be disambiguated on a mobile communication facility 102 that provides a privacy facility 152 associated with the mobile communication facility 102 to protect a user from loss of personal or other sensitive information relating to the search query.

In embodiments, a query entry 120 may be disambiguated on a mobile communication facility 102 that provides a transactional security facility 154 associated with the mobile communication facility 102, where the transactional security facility 154 is adapted to enable secure transactions associated with the query entry 120. The transactional security facility 154 may involve the protection of privacy 152 and may be operated in association with parental controls 150 or digital rights management.

In embodiments, a disambiguating query entry 120 may be processed in conjunction with carrier business rules 130 and with information relating to a mobile communication facility 102. Carrier business rules 130 may include walled garden results, presenting out of garden content, sponsor information, or auctions. Information relating to the mobile communication facility 102 may be mobile subscriber characteristic information.

In embodiments, a query entry 120 may be disambiguated on a mobile communication facility 102 that produces sponsored results on the display of the mobile communication facility 102. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, pay-per-click and pay-per-call program integration onto mobile communication facilities 102 may enable a wireless provider 108 to deliver targeted, keyword-based ads and content to mobile users searching for specific goods and services at the precise moment a user expresses a need. Pay-per-click advertising, often referred to as "search engine marketing" or "keyword advertising," operates on the principle of pay-for-performance; through this channel, advertisers may pay only for the "clicks," or web site visits, they receive through their text-based advertisement. Businesses may place their ads for specific search phrases (or "keywords") that best describe their company or products. Advertisers generally use several different keywords for their ads, trying to maximize the number of searches for which they will appear (e.g., Sony may try to advertise for the search phrases "DVD player," "Television," "Mobile phone," etc.). Search engine marketing operates through a real-time auction-based pricing model in which advertisers "bid" to appear for their relevant keywords. The advertiser's position, or rank, in the paid listings is determined by the bid price, with the top position going to the highest bidder. Given the wide range of popularity for keywords, competition varies drastically for keywords; bid prices for the most popular keywords are driven up as they attract more advertisers. Keyword competition may be driven by several factors, including: a product's average sale price, customer acquisition cost, and number of competitors. Advertisers may create their own ads through a self-service or sales-assisted web interface. Examples of web-based pay-per-click products include Google AdWords, Yahoo! Search Marketing, MIVA and Lycos InSite™ AdBuyer.) When creating an ad, the advertiser may supply information, such as, an ad title, URL, description, and/or website URL. Pay-Per-Call advertising combines search functionality 142 with live on-the-phone interaction, resulting in a powerful marketing opportunity for local businesses.

Pay-per-call advertising operates on the same principle as pay-per-click, in that advertisers "bid" to appear in specific search results or directory categories, and are charged only when a consumer who sees their ad places a call to the advertiser's listed phone number (a system-generated toll-free number that redirects the user to the company's true number). An advertiser's position in the list of paid results is determined by the bid amount, with the highest bid yielding the top position. Unlike traditional search advertising, however, Pay-per-call advertising may be able to tap into the uniquely high level of user "intent," by connecting qualified mobile consumers directly with businesses—at the exact moment they are searching for specific goods and services. Pay-per-call listings may be presented above traditional directory or "yellow pages" results.

In embodiments, third-party pay-per-call inventory may be supplied to in the form of XML feeds, each of which returns specific results data on a per-query basis about the keyword match, the advertiser and ad information, bid price, and geographic filter settings. This information may then be parsed and packaged in a result set stacked on top of "natural" yellow page listings. A yield optimization algorithm may be used to ensure that each query is answered with a relevant and monetizable set of paid content. The yield optimization algorithm considers several variables to determine placement and rank simultaneously, including, relevancy, geography, click-through/call-through rate, and bid price. Relevancy may be, in part, determined by the query string including keyword, location, and ultimately demographic/behavioral factors that may be matched to information supplied in the advertisement and/or the assigned business categories. For geography, it may be possible to present only those businesses serving the respective geographical areas (zip code, city, state) as specified by the advertiser. The algorithm for the click-through/call-through rate may also consider the frequency with which users actually place the call to the advertiser in determining best query match. Bid price refers to the placement and rank of a given advertisement as determined, in part, by the amount paid by the advertiser.

In embodiments, advertisers may create and manage their mobile search pay-per-click advertising campaigns through a user interface that permits ad creation, selection of keywords to associate with the ad(s), and/or service area(s) in which to make the ad accessible, and place a bid for the service. For example the advertiser may begin by entering the ad creative content, including the ad title, a "Landing page" URL/address (page to which user will be brought—not displayed), the "Display" URL/address (address to be displayed in ad), and an ad description (1-2 lines; for display in ad). The advertiser may then enter keywords (search phrases) for which the ad should appear. There may be several ways of entering the keywords, including: manual entry (the advertiser may type/copy the keywords manually), use of a keyword suggestion tool/thesaurus (advertisers can view synonyms or related keywords, along with estimated monthly search volume and top bids), and/or bulk upload (advertisers may upload keywords in bulk when dealing with a high volume of keywords). Finally, the advertiser may wish that the ad(s) target only a subset of users, such as, only users residing in a particular geographic region, meeting a set of demographic user characteristics, and/or users with a particular mobile communication facility 102.

Once an advertiser has selected one or more of the above criteria, the advertiser may then set a specific, or maximum, price that they are willing to pay for a click through to their web site. Bids may be for each keyword associated with a given ad, or any other criterion, or combination of criteria used by the advertiser to target the placement of their ad(s). Bids may be placed individually by keyword, or an advertiser can apply one bid price across all new keywords for the new ad. Advertisers will also be able to view the top bids for each keyword directly through the user interface, in order to gauge keyword competition and to ensure their ad appears in the desired position. The bidding process may also include "Auto-Bid" functionality that allows the platform to manage an advertiser's bids directly. For instance, by specifying the desired position for the ad and a maximum amount that an advertiser is willing to pay for each click, the advertiser may allow the system to monitor the competitive landscape and adjust the advertiser's bids to pay only the minimum that is required to secure the desired spot (up to but not exceeding the specified maximum).

In embodiments, advertisers may create and manage their mobile search pay-per-call advertising campaigns through a user interface that permits ad creation, selection of details to associate with the ad(s), and/or service area(s) in which to make the ad accessible, and place a bid for the service. The advertiser may begin by entering the general contact information for the business, including: the business name, mailing/contact address, phone number (number where advertiser wishes to receive call; ad may display system-generated toll-free number), and/or the ad description. The advertiser may also enter additional pieces of information and functionality pertaining to each ad, including: setting the daily callable hours/schedule (the advertiser may specify a time of day when it wants an ad to appear), upload company logo to appear with ad, enter coupon information (e.g., the advertiser may set campaign-specific discounts for users who reach a specific ad. The advertiser may then enter keywords (search phrases) in response to which the ad should appear. There may be several ways of entering the keywords, including: manual entry (the advertiser may type/copy the keywords manually), use of a keyword suggestion tool/thesaurus (advertisers can view synonyms or related keywords, along with estimated monthly search volume and top bids), and/or bulk upload (advertisers may upload keywords in bulk when dealing with a high volume of keywords). The advertiser may choose that the ad(s) target only a subset of users such as users residing in a particular geographic region, meeting a set of demographic user characteristics, and/or having particular types of a mobile communication facility 102. Advertisers may set the specific price they will be charged whenever they receive a call through the pay-per-call system. They may have the ability to view in real-time competitors' prices per category in order to ensure their ad appears in the desired position and to optimize their performance.

In embodiments, keyword sales sponsored listings (both pay-per-click and pay-per-call) may go through an administrative and editorial review to ensure an ad pertains to the business and the categories selected by the advertiser, and that the ad will be deemed appropriately relevant by a yield optimization algorithm.

In embodiments, pay-per-click and pay-per-call advertisements may be priced as "pay-for-performance," in that the advertiser is charged only for those calls successfully placed through the mobile communication facility 102 interface. It may be possible to configure the platform such that advertisers are not charged for repeat calls, short calls (e.g., a wrong number or other unintentional call), and/or hang-ups or disconnections. In addition to flat per-call charges, some specific calls (e.g., calls exceeding a given time threshold) may be subject to overage fees.

In embodiments, a search query may be suggested by correcting the suggested search query based, in part, on information relating to a client device. Once a user receives a suggested query entry 120, a process of correction may be necessary for unambiguous query formation that is sufficient to yield intelligible and useful result set(s). As part of the correction process, information specific to the type of mobile communication facility 102 may be used; for example, if the device has unique delivery capabilities, the suggested query may need correction in order to derive a result set compatible with these capabilities. Information stored in the mobile subscriber characteristics 112 database or parental controls 150 facility may also be integral to the correction process.

It is possible that a suggested query returns a null result set or improbable results set. In this case, the search facility 142, in conjunction with the mobile communication facility 102, could automatically trigger correction and iteratively cycle through alternative suggested queries until a non-null or higher probability result set is delivered.

In embodiments, additional recommendations may be made following a suggested query entry 120 based upon the information related to the mobile communication facility 102. For example, mobile subscriber characteristics 112, carrier business rules 130, or sponsor information, in conjunction with the suggested query entry 120, may suggest relevant recommendations for the user. The recommendations may be paired with the suggested query entry 120 search results or presented prior to, or following, the display of the search results.

A user's prior search activities and search results may also be used to create recommendations for the user. Prior search activities may include transactions, search queries, visits to websites, and other acts initiated by the user on the mobile communication facility 102. The geographic location of the mobile communication facility 102 may foster recommendations including, but not limited to, sponsor information (e.g. products and services) in the user's current geographic vicinity. The current time may be used independently or in conjunction with other information to create user recommendations. For example, the independent fact that it is noon may create recommendations for restaurants serving lunch. This information may be further filtered by the location of the mobile communication facility 102 to recommend only those restaurants that are in the user's immediate vicinity, and it may be further filtered by the subscriber's characteristics to recommend only that subset of restaurants serving lunch in the user's current vicinity that have received high ratings by restaurant patrons with a demographic profile similar to the user's. As with the above restaurant example, similar processes for generating meaningful recommendations may be applied to other services and products, including transportation (navigation, taxis, buses, trains, cars, airports, etc.), food and drink (groceries, drive through restaurants, bars, etc.), entertainment (theater, sports, movies, clubs, etc.), business (corporations, workplaces, banks, post offices and other mailing or shipping facilities. etc.), consumer needs (gas stations, drug or clothing stores, baby sitters, parking, etc.), and information specific to the locale (directions, locations, starting times, news, etc.)

In embodiments, classifications of search categories may be presented related to the suggested search query on a display associated with the mobile communication facility 102.

In embodiments, a suggested query entry 120 may be mapped to a taxonomy of query categories and classification schema (e.g., the yellow pages phone book taxonomy).

In embodiments, results may be retrieved based on submitting a suggested query entry 120 in conjunction with information relating to the mobile communication facility 102. This information may include the mobile subscriber characteristics 112, carrier business rules 130, and sponsor information. The additional information stored in these databases may form search parameters that limit the suggested search query and the display of result set(s) by omitting information, prioritizing information (e.g., presenting sponsor links prior to all others), highlighting a subset of the search result set, or ordering the display of information based upon a sponsor auction (i.e., highest bidder presented first). In the case of the sponsor auction, sponsors may bid on keywords that they would like to be associated with their products, services, and links thereto.

In embodiments, results may be ordered in relation to the suggested query entry 120 based at least in part on information relating to the mobile communication facility 102. This information may include mobile subscriber characteristics 112, a search algorithm facility 144, parental controls 150, carrier business rules 130, and/or sponsor information. Ordering results related to a suggested query entry 120 based on sponsor information may be done by associating sponsors with key words used in suggested query entries and/or associating suggested query entries with sponsor content. When a suggested query entry 120 matches a sponsor's keyword(s) or content, that sponsor's information may be prioritized in the search result display, highlighted, or otherwise given superiority over other content related to the suggested query entry 120. Association of key words with sponsors may occur through an auction in which bidders compete for sole association with keywords or for a shared frequency of keyword association (e.g., every other occurrence of a keyword). Furthermore, the auction process could include bidding to determine the size of the resulting sponsor content display (e.g., expressed as a percentage of the user's total display space on the mobile communication facility 102) and the option to add multimedia content to the results display, such as graphics, audio or a video stream.

Suggested query results may also be ordered, in part, on the capabilities of the mobile communication facility 102, wherein the capability is an audio, visual, processing, or screen capability.

In embodiments, a query entry 120 may be suggested by producing predictive text based, at least in part, on information relating to the mobile communication facility 102, such as mobile subscriber characteristics 112, a search algorithm facility 144, a personal filter, parental controls 150, carrier business rules 130, or sponsorship information. Additionally, predictive text may be based on the mobile communication facility 102's SMS conversion and/or keypad sequence conversion.

In embodiments, a query entry 120 may be suggested by associating a voice-based query entry 120 with information relating to the mobile communication facility 102, such as voice interpretation based, at least in part, on SMS conversion.

In embodiments, an auction may be associated with a suggested query entry 120. Performing the auction may involve using information relating to the mobile communication facility 102, such as mobile subscriber characteristics 112, a search algorithm facility 144, a personal filter, parental controls 150, or carrier business rules 130. The result set(s) display may prioritize or highlight sponsor results.

In embodiments, a search query may be suggested on a mobile communication facility 102, results presented on a screen associated with the mobile communication facility 102, and a transaction performed in association with a sponsored link, where the transaction may occur by the user clicking on a sponsored link or engaging in a commercial transaction, such as purchasing downloadable content.

In embodiments, a search query may be suggested by presenting aggregated content to the mobile communication facility 102. Content may be aggregated through a spider, for example ringtone content, music content, or video content. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, a query entry 120 may be suggested by displaying a sponsored link on a display associated with a mobile communication facility 102 that allows a vendor associated with the sponsored link to selectively receive a connection or receive search results (including a sponsored phone number) wherein an economic transaction takes place when the sponsored number is at least one of those called and answered.

In embodiments, content may be delivered to a mobile communication facility 102 based at least in part on information relating to the mobile communication facility 102 and later produce content as a result of a suggested search query. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102. For example, it may be cached locally with the cache memory and blended with server updates and/or periodically updated in the background (i.e., without requiring user keystrokes) according to the time of day and/or changes in location of the mobile communication facility 102.

In embodiments, a wireless carrier report may be generated based upon the click through performance following one or more suggested search query entries on a mobile communications facility. The report may contain information relating to search result quality, keyword management, or revenue generation, and it may be segmented by the type of mobile communication facility 102 used.

In embodiments, a query entry 120 may be suggested in a search box of a mobile communication facility 102 where the search box is presented on an idle screen.

In embodiments, a search query may be suggested related to a query entered on a mobile communication facility 102, where the suggestion is a plurality of suggestions that may be presented on a display associated with the mobile communication facility 102.

In embodiments, a query entry 120 may be suggested that is entered into a query entry 120 facility on a mobile communication facility 102.

In embodiments, a search query may be suggested into a search facility 142 that is adapted to produce results based on the mobile compatible page rank. The mobile compatible page rank may derive from the page's compatibility with the screen, the processing capability of the mobile communication facility 102, or upon the complexity of the page(s).

In embodiments, a search query may be suggested by generating a relationship between a query entry 120 and at least one mobile subscriber characteristic. The mobile subscriber characteristics 112 may include location, personal information, history of the user's web interactions, or a plurality of characteristics, such as location and the time of day.

In embodiments, a search query may be suggested by generating a relationship between a query entry 120 and the location of a mobile communication facility 102 using a location-based service. The relationship may be among at least one query entry 120 and the location and a time of day. Location may be provided by a GPS system or a cell phone triangulation service.

In embodiments, a query may be suggested by producing results based at least in part on a query entry 120 used in conjunction with a filter algorithm, where the filter algorithm uses information gathered by a wireless provider 108. The algorithm facility 144 may be a collaborative filter where the search is an open web search, or it may be a recommendation system.

In embodiments, a query entry 120 may be suggested by processing a query entry 120 through a results facility 148 where the results facility 148 is associated with information derived from the mobile communication facility 102, such as mobile subscriber characteristics 112 information. Suggested queries and their corresponding results may adapt to changes in the popularity rank of content, the frequency of queries regarding content, acceleration/deceleration in query activity associated with content, frequency of purchases, high/low sales conversion rate, and any change in these measures associated with content. Content may also be "de-dupped" with frequent terms, such as "Tyra Banks out of 1, 2, 3," and categorized by title, artist, and/or a yellow pages taxonomy.

In embodiments, a search query may be suggested on the mobile communication facility 102. Disambiguation of the suggested query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, query entries may be suggested on a mobile communication facility 102 where an original search query related to the suggested search query is, in part, processed through a voice recognition facility 160 residing on the mobile communication facility 102. Alternatively, the voice recognition facility 160 may reside on a remote server or in part on the mobile communication facility 102 and in part on a server.

In embodiments, a query entry 120 may be suggested on a mobile communication facility 102 that processes the suggested query in association with information relating to the mobile communication facility 102. This information may reside locally on the mobile communication facility 102, or it may be stored remotely, for example, in a mobile subscriber characteristics 112 database.

In embodiments, a query entry 120 may be suggested on a mobile communication facility 102 that provides a parental control facility to regulate the results produced on the mobile communication facility 102 based. The parental controls 150 may be regulated through a server application or through the mobile communication facility 102.

In embodiments, a query entry 120 may be suggested on a mobile communication facility 102 that provides a privacy facility 152 associated with the mobile communication facility 102 to protect a user from loss of personal or other sensitive information relating to the search query.

In embodiments, a query entry 120 may be suggested on a mobile communication facility 102 that provides a transactional security facility 154 associated with the mobile communication facility 102, where the transactional security facility 154 is adapted to enable secure transactions associated with the query entry 120. The transactional security facility 154 may involve the protection of privacy 152 and may be operated in association with parental controls 150 or digital rights management.

In embodiments, a query may be suggested by processing a query entry 120 in conjunction with carrier business rules 130 and with information relating to a mobile communication facility 102. Carrier business rules 130 may include walled garden results, presenting out of garden content, sponsor information, or auctions. Information relating to the mobile communication facility 102 may be mobile subscriber characteristic information 112.

In embodiments, a query entry 120 may be suggested on a mobile communication facility 102 that produces sponsored results on the display of the mobile communication facility 102. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, additional recommendations may be made following a corrected query entry 120 based upon the information related to the mobile communication facility 102. For example, mobile subscriber characteristics 112, carrier business rules 130, or sponsor information, in conjunction with the query entry 120, may suggest relevant recommendations for the user. The recommendations may be paired with the corrected query entry 120 search results or presented prior to, or following, the display of the search results.

A user's prior search activities and search results may also be used to create recommendations for the user. Prior search activities may include transactions, search queries, visits to websites, and other acts initiated by the user on the mobile communication facility 102. The geographic location of the mobile communication facility 102 may foster recommendations including, but not limited to, sponsor information (e.g. products and services) in the user's current geographic vicinity. The current time may be used independently or in conjunction with other information to create user recommendations. For example, the independent fact that it is noon may create recommendations for restaurants serving lunch. This information may be further filtered by the location of the mobile communication facility 102 to recommend only those restaurants that are in the user's immediate vicinity, and it may be further filtered by the subscriber's characteristics to recommend only that subset of restaurants serving lunch in the user's current vicinity that have received high ratings by restaurant patrons with a demographic profile similar to the user's. As with the above restaurant example, similar processes for generating meaningful recommendations may be applied to other services and products that may be used independently or in relationship to one another, including transportation (navigation, taxis, buses, trains, cars, airports, etc.), food and drink (groceries, drive through restaurants, bars, etc.), entertainment (theater, sports, movies, clubs, etc.), business (corporations, workplaces, banks, post offices and other mailing or shipping facilities. etc.), consumer needs (gas stations, drug or clothing stores, baby sitters, parking, etc.), and information specific to the locale (directions, locations, starting times, news, etc.) By combining such information, cross-selling opportunities may exist between products (e.g., recording artists of a similar genre), as well as better targeting new products to users based on predicted needs (e.g., recommending a taxi service when a user purchases movie tickets).

In embodiments, classifications of search categories may be presented related to the corrected search query on a display associated with the mobile communication facility 102.

In embodiments, a corrected query entry 120 may be mapped to a taxonomy of query categories and classification schema (e.g., the yellow pages phone book taxonomy).

In embodiments, results may be retrieved based on submitting a corrected query entry 120 in conjunction with information relating to the mobile communication facility 102. This information may include the mobile subscriber characteristics 112, carrier business rules 130, and sponsor information. The additional information stored in these databases may form search parameters that limit the corrected search query and the display of result set(s) by omitting information, prioritizing information (e.g., presenting sponsor links prior to all others), highlighting a subset of the search result set, or ordering the display of information based upon a sponsor auction (i.e., highest bidder presented first). In the case of the sponsor auction, sponsors may bid on keywords that they would like to be associated with their products, services, and links thereto.

In embodiments, results may be ordered in relation to the corrected query entry 120 based at least in part on information relating to the mobile communication facility 102. This information may include mobile subscriber characteristics 112, a search algorithm facility 144, parental controls 150, carrier business rules 130, and/or sponsor information. Ordering results related to a corrected query entry 120 based on sponsor information may be done by associating sponsors with key words used in corrected query entries and/or associating corrected query entries with sponsor content. When a corrected query entry 120 matches a sponsor's keyword(s) or content, that sponsor's information may be prioritized in the search result display, highlighted, or otherwise given superiority over other content related to the suggested query entry 120. Association of key words with sponsors may occur through an auction in which bidders compete for sole association with keywords or for a shared frequency of keyword association (e.g., every other occurrence of a keyword). Furthermore, the auction process could include bidding to determine the size of the resulting sponsor content display (e.g., expressed as a percentage of the user's total display space on the mobile communication facility 102) and adding multimedia content to the results display, such as graphics, audio or a video stream.

Corrected query results may also be ordered, at least in part, on the capabilities of the mobile communication facility 102, wherein the capability is an audio, visual, processing, or screen capability.

In embodiments, a query entry 120 may be corrected by producing predictive text based, at least in part, on information relating to the mobile communication facility 102, such as mobile subscriber characteristics 112, a search algorithm facility 144, a personal filter, parental controls 150, carrier business rules 130, or sponsorship information. Additionally, predictive text may be based on the mobile communication facility's 102 SMS conversion and/or keypad sequence conversion.

In embodiments, a query entry 120 may be corrected by associating a voice-based query entry 120 with information relating to the mobile communication facility 102, such as voice interpretation based, at least in part, on SMS conversion.

In embodiments, an auction may be associated with a corrected query entry 120. Performing the auction may involve using information relating to the mobile communication facility 102, for example mobile subscriber characteristics 112, a search algorithm facility 144, a personal filter, parental controls 150, or carrier business rules 130. The result set(s) display may prioritize or highlight sponsor results.

In embodiments, a search query may be corrected on a mobile communication facility 102, presenting results on a screen associated with the mobile communication facility 102 and performing a transaction in association with a sponsored link, where the transaction may occur by the user clicking on a sponsored link or engaging in a commercial transaction, such as purchasing downloadable content.

In embodiments, a search query may be corrected by presenting aggregated content to the mobile communication facility 102. Content may be aggregated through a spider, for example ringtone content, music content, or video content. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, a query entry 120 may be corrected by displaying a sponsored link on a display associated with a mobile communication facility 102 that allows a vendor associated with the sponsored link to selectively receive a connection or receive search results (including a sponsored phone number) wherein an economic transaction takes place when the sponsored number is at least one of those called and answered.

In embodiments, content may be delivered to a mobile communication facility 102 based at least in part on information relating to the mobile communication facility 102 and later producing the content as the result of a corrected search query. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated based upon the click through performance following one or more corrected search query entries on a mobile communication facility 102. The report may contain information relating to search result quality, keyword management, revenue generation, and it may be segmented by the type of mobile communication facility 102 used.

In embodiments, a query entry 120 may be corrected in a search box of a mobile communication facility 102 where the search box is presented on an idle screen.

In embodiments, a search query may be corrected in relation to a query entered on a mobile communication facility 102, where the correction is a plurality of corrections that may be presented on a display associated with the mobile communication facility 102.

In embodiments, a query entry 120 may be corrected that is entered into a query entry 120 facility on a mobile communication facility 102.

In embodiments, a search query may be corrected in a search facility 142 that is adapted to produce results based on the mobile compatible page rank. The mobile compatible page rank may derive from the page's compatibility with the screen, the processing capability of the mobile communication facility 102, or upon the complexity of the page(s).

In embodiments, a search query may be corrected by generating a relationship between a query entry 120 and at least one mobile subscriber characteristic. The mobile subscriber characteristics 112 may include location, personal information, history of the user's web interactions, or a plurality of characteristics, such as location and the time of day.

In embodiments, a search query may be corrected by generating a relationship between a query entry 120 and the location of a mobile communication facility 102 using a location-based service. The relationship may be among at least one query entry 120 and the location and a time of day. Location may be provided by a GPS system or a cell phone triangulation service. In embodiments, the mobile communication facility 102 may have location services that permit a facility's location to be used as a parameter during the query formation process. The interface may allow a user to either use the detected facility location or override the location.

In embodiments, a query may be corrected by producing results based at least in part on a query entry 120 used in conjunction with a filter algorithm, where the filter algorithm uses information gathered by a wireless provider 108. The algorithm facility 144 may be a collaborative filter where the search is an open web search, or it may be a recommendation system.

In embodiments, a query entry 120 may be corrected by processing a query entry 120 through a results facility 148 where the results facility 148 is associated with information derived from the mobile communication facility 102, such as mobile subscriber characteristics 112 information.

In embodiments, a search query may be corrected on the mobile communication facility 102. Disambiguation of the corrected query may take place on the mobile communication facility 102 or on a server application. Disambiguation may involve SMS translation, a spell check algorithm, a spell check table, a phonetic spelling algorithm, a phonetic spelling table, or a numeric keypad word translation In embodiments, query entries may be corrected on a mobile communication facility 102 where an original search query related to the corrected search query is, in part, processed through a voice recognition facility 160 residing on the mobile communication facility 102. Alternatively, the voice recognition facility 160 may reside on a remote server or in part on the mobile communication facility 102 and in part on a server.

In embodiments, a query entry 120 may be corrected on a mobile communication facility 102 that processes the corrected query in association with information relating to the mobile communication facility 102. This information may reside locally on the mobile communication facility 102, or it may be stored remotely, for example, in a mobile subscriber characteristics 112 database.

In embodiments, a query entry 120 may be corrected on a mobile communication facility 102 that provides a parental control facility to regulate the results produced on the mobile communication facility 102 based. The parental controls 150 may be regulated through a server application or through the mobile communication facility 102.

In embodiments, a query entry 120 may be corrected on a mobile communication facility 102 that provides a privacy facility 152 associated with the mobile communication facility 102 to protect a user from loss of personal or other sensitive information relating to the search query.

In embodiments, a query entry 120 may be corrected on a mobile communication facility 102 that provides a transactional security facility 154 associated with the mobile communication facility 102, where the transactional security facility 154 is adapted to enable secure transactions associated with the query entry 120. The transactional security facility 154 may involve the protection of privacy 152 and may be operated in association with parental controls 150 or digital rights management.

In embodiments, a query may be corrected by processing a query entry 120 in conjunction with carrier business rules 130 and with information relating to a mobile communication facility 102. Carrier business rules 130 may include walled garden results, presenting out of garden content, sponsor information, or auctions. Information relating to the mobile communication facility 102 may be mobile subscriber characteristic information.

In embodiments, a query entry 120 may be corrected on a mobile communication facility 102 that produces sponsored results on the display of the mobile communication facility 102. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements. In embodiments, a variety of content types may be accommodated, including maps/traffic: (checking the latest accident reports and road conditions); shopping comparison (search, browse and compare prices of merchants); PIM data (PIM data can be found, numbers called with a single click, and address books updated); white pages (find addresses and phone numbers from your mobile phone); news, weather, and sports (get up to the minute information on the go); multimedia content (search and preview video); movies (find a movie, show time, theater and purchase tickets); travel updates/flight information (check your flight status and more); RSS & Blogs (search and read RSS feeds and blogs); adult (Find mature content).

In embodiments, the mobile communication facility 102 may be able to display certain Internet content without having to launch a WAP browser. In such cases, content may be directly displayed. Such content may optionally receive a preferential ranking, particularly on devices with relatively slow processing of WAP content.

In embodiments, content may be recommended in relation to a search query on a mobile communication facility 102 where the recommendation is presented in classifications of search categories. The recommendation may optionally specify the category rather than particular results.

In embodiments, a search query may be mapped to a query classification of category taxonomies (e.g., yellow page taxonomies) and recommend content related to the mapped search query.

In embodiments, results may be retrieved based on a search query in conjunction with information relating to the mobile communication facility 102. This information may include the mobile subscriber characteristics 112, carrier business rules 130, and sponsor information. The additional information stored in these databases may form search parameters that limit the suggested search query and the display of result set(s) by omitting information, prioritizing information (e.g., presenting sponsor links prior to all others), highlighting a subset of the search result set, or ordering the display of information based upon a sponsor auction (i.e., highest bidder presented first). In the case of the sponsor auction, sponsors may bid on keywords that they would like to be associated with their products, services, and links thereto.

In embodiments, results may be recommended based on a search query by ordering the recommended results based, in part, on information relating to the mobile communication facility 102. This information may include mobile subscriber characteristics 112, a search algorithm facility 144, parental controls 150, carrier business rules 130, and/or sponsor information. Ordering recommended results related to a corrected search query entry 120 based on sponsor information may be done by associating sponsors with key words used in search query entries and/or associating query entries with sponsor content. When a corrected query entry 120 matches a sponsor's keyword(s) or content, that sponsor's information may be prioritized in the search result display, highlighted, or otherwise given visual superiority or other preferential ranking over other content related to the corrected query entry 120. Association of key words with sponsors may occur through an auction in which bidders compete for sole association with keywords or for a shared frequency of keyword association (e.g., every other occurrence of a keyword). Furthermore, the auction process could include bidding to determine the size of the resulting sponsor content display (e.g., expressed as a percentage of the user's total display space on the mobile communication facility 102) and adding multimedia content to the results display, such as graphics, audio, or a video stream.

Recommended results based on a search query may also be ordered, in part, on the capabilities of the mobile communication facility 102, wherein the capability is an audio, visual, processing, or screen capability.

In embodiments, one or more results detail pages may display 172 expanded item information to assist a user in making a purchase decision. This may include, for example, content that is available in source metadata. The content on these pages may vary based on type, but share a number of common elements. For example, an artist name may be presented with a link to an artist search, a detailed item description, and/or a preview image if available. Furthermore, a list of the sub types (for example, for "Music" an item may be available as a Ringtone, Ringback, MOD, MP3, Video, etc) and an option to purchase these items. Related content may be offered to users seeking to browse similar items.

In embodiments, results pages may display 172 a hint-of-the-day of the day and/or other promotional content may be displayed to communicate with users. The content for this screen may derive from server calls made during idle time in the application. That is, during periods of inactivity, the device may periodically download content based upon prior implicit or explicit searches, and display the content at random or preselected times. The content may consist of a combination of text and images.

In embodiments, content may be recommended by producing predictive text based, at least in part, on information relating to the mobile communication facility 102, such as mobile subscriber characteristics 112, a search algorithm facility 144, a personal filter, parental controls 150, carrier business rules 130, or sponsorship information. Additionally, predictive text may be based on the mobile communication facility's 102 SMS conversion and/or keypad sequence conversion.

In embodiments, a search query may be processed through a voice recognition facility 160 and a recommendation made in association with information about a mobile communication facility 102. For example, the voice recognition facility 160 may be employed to search for a particular restaurant. Based upon previous calls to other restaurants, a recommendation may be made for alternative restaurants of the same food genre in the user's area, or a suggestion may be made that the user is trying to find a restaurant with a similar-sounding name that the user has called before.

In embodiments, an auction may be performed related to a search query. Performing the auction may involve using information relating to the mobile communication facility 102, for example mobile subscriber characteristics 112, a search algorithm facility 144, a personal filter, parental controls 150, or carrier business rules 130. The result set(s) display may prioritize or highlight sponsor results.

In embodiments, alternative content may be recommended that is related to search results received through a mobile communication search, and a transaction related to the alternative content may be performed. The transaction may occur by the user clicking on a sponsored link or engaging in a commercial transaction, such as purchasing downloadable content.

In embodiments, recommendations of alternate content may be aggregated in relation to search results associated with a mobile communication search query. Content, for example ringtone content, music content, or video content, may be aggregated through a spider. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for extraction from a WAP compatible content site first or extraction from content type sites first, where the content was aggregated in relation to information relating to the mobile communication facility 102.

In embodiments, alternate content may be recommended that is related to search results associated with a mobile communication query 120, where the content is associated with outbound pay per call marketing.

In embodiments, content may be downloaded that is related to information associated with a mobile communication facility 102 by making a recommendation of alternate content related to the downloaded content. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated based upon the click through performance of recommended alternate content. The report may contain information relating to search result quality, keyword management, or revenue generation, and it may be segmented by the type of mobile communication facility 102 used.

In embodiments, alternative content may be recommended in relation to an open web search result on a mobile communication facility 102. The alternative content may be ringtones, music, video, and downloadable content or purchasable downloadable content.

In embodiments, a query may be entered in a query entry 120 facility associated with a mobile communication facility 102 and present recommended alternative content relating to results received.

In embodiments, content may be recommended in relation to search results associated with a mobile communication facility 102 query, where the alternative content is based at least in part on mobile compatible page rank. The mobile compatible page rank may derive from the page's compatibility with the screen, processing capability of the mobile communication facility 102, or upon the complexity of the page(s).

In embodiments, alternative content may be recommended in relation to search results associated with a mobile communication facility 102 query, where the alternative content is provided by a data facility (e.g., a WAP facility or a carrier facility).

In embodiments, content may be recommended in relation to search results associated with a mobile communication facility 102 query, where the recommendation is, in part, related to a mobile subscriber characteristic. The mobile subscriber characteristics 112 may include location, personal information, history of the user's web interactions, phone calls, or a plurality of characteristics, such as location and the time of day.

In embodiments, alternative content may be recommended in relation to search results and providing recommendations based, in part, on the location of a mobile communication facility 102 using a location-based service. The relationship may be among at least one query entry 120 and the location and a time of day. Location may be provided by a GPS system or a cell phone triangulation service.

In embodiments, alternative content may be recommended in relation to search results based at least in part on a query entry 120 used in conjunction with a filter algorithm, where the filter algorithm uses information gathered by a wireless provider 108. The algorithm facility 144 may be a collaborative filter where the search is an open web search, or it may be a recommendation system.

In embodiments, alternative content may be recommended in relation to search results associated with a mobile communication facility 102 query. Content may be received from a result facility based on a selected recommendation. The results facility 148 may be associated with information derived from the mobile communication facility 102, such as mobile subscriber characteristics 112 information.

In embodiments, alternative content may be recommended in relation to search results associated with a mobile communication facility 102 query through a mobile browser facility.

In embodiments, alternative content may be recommended in relation to search results associated with a mobile communication facility 102 based, in part, on a disambiguated search query using a disambiguation facility 140. Disambiguation of the suggested query may take place on the mobile communication facility 102 or on a server application. Disambiguation may involve SMS translation, a spell check algorithm, a spell check table, a phonetic spelling algorithm, a phonetic spelling table, or a numeric keypad word translation In embodiments, alternative content may be recommended in relation to search results where an original search query is processed through a voice recognition facility 160 residing on the mobile communication facility 102. Alternatively, the voice recognition facility 160 may reside on a remote server or in part on the mobile communication facility 102 and in part on a server.

In embodiments, alternative content may be recommended in relation to search results on a mobile communication facility 102 that processes a query in association with information relating to the mobile communication facility 102. This information may reside locally on the mobile communication facility 102 or it may be stored remotely, for example in a mobile subscriber characteristics 112 database.

In embodiments, alternative content may be recommended in relation to search results on a mobile communication facility 102 that provides a parental control facility to regulate the results produced on the mobile communication facility 102 based. The parental controls 150 may be regulated through a server application or through the mobile communication facility 102.

In embodiments, alternative content may be recommended in relation to search results on a mobile communication facility 102 that provides a privacy facility 152 associated with the mobile communication facility 102 to protect a user from loss of personal or other sensitive information relating to the search query.

In embodiments, alternative transactional content may be recommended in relation to search results on a mobile communication facility 102 that provides a transactional security facility 154 associated with the mobile communication facility 102. The transactional security facility 154 may be adapted to enable secure transactions associated with the alternative transactional content. The transactional security facility 154 may involve the protection of privacy 152 and may be operated in association with parental controls 150 or digital rights management.

In embodiments, alternative content may be recommended in relation to search results in conjunction with carrier business rules 130 and with information relating to a mobile communication facility 102. Carrier business rules 130 may include walled garden results, presenting out of garden content, sponsor information, or auctions. Information relating to the mobile communication facility 102 may be mobile subscriber characteristic information.

In embodiments, alternative content may be recommended in relation to search results on a mobile communication facility 102 that produces sponsored results on the display of the mobile communication facility 102. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a search query entry 120 may be mapped to a taxonomy of query categories and classification schema (e.g., the yellow pages phone book taxonomy).

In embodiments, a search query entered on a mobile communications facility may be classified in conjunction with information relating to the mobile communication facility 102. This information may include the mobile subscriber characteristics 112, carrier business rules 130, and sponsor information. The additional information stored in these databases may form search parameters that limit the search query and the display of result set(s) by omitting information, prioritizing information (e.g., presenting sponsor links prior to all others), highlighting a subset of the search result set, or ordering the display of information based upon a sponsor auction (i.e., highest bidder presented first). In the case of the sponsor auction, sponsors may bid on keywords that they would like to be associated with their products, services, and links thereto.

In embodiments, a query may be to classify, order and display results on a mobile communication facility 102 associated with the classified query. This information may include mobile subscriber characteristics 112, a search algorithm facility 144, parental controls 150, carrier business rules 130, and/or sponsor information. Ordering results related to a classified query entry 120 based on sponsor information may be done by associating sponsors with key words used in classified query entries and/or associating classified query entries with sponsor content. When a classified query entry 120 matches a sponsor's keyword(s) or content, that sponsor's information may be prioritized in the search result display, highlighted, or otherwise given superiority over other content related to the classified query entry 120. Association of key words with sponsors may occur through an auction in which bidders compete for sole association with keywords or for a shared frequency of keyword association (e.g., every other occurrence of a keyword). Furthermore, the auction process could include bidding to determine the size of the resulting sponsor content display (e.g., expressed as a percentage of the user's total display space on the mobile communication facility 102) and the adding of multimedia content to the results displayed, such as graphics, audio or a video stream.

Classified query results may also be ordered, in part, on the capabilities of the mobile communication facility 102, wherein the capability is an audio, visual, processing, or screen capability.

In embodiments, searching may be performed using keyword formation and/or vertical selection. For example, a search may be performed using exactly what is entered into the text box. Alternatively, a user may enter characters to receive keyword completion suggestions that span the available verticals, and/or pick a vertical for specific category suggestions. The user may select a vertical by using the up and down directionals, then press select or right to move into that vertical. Pressing left at any time moves the user to the previous screen (excluding when the previous screen was the splash screen or the hint/promo screen).

In embodiments, once a user has selected a vertical and enters characters into the text entry box, suggestions appropriate to that vertical may be displayed. These suggestions come from the local cache if any previous suggestion matches the entered string, or the remote server if the local cache cannot provide all the suggestions for the entered string. Once the user has found a suggestion that they wish to use, or selects "Search" from the menu, a query is sent to the server and the view may be switched to a results categories screen.

In embodiments, a search query may be classified into a category by producing predictive text based, in part, on information relating to the mobile communication facility 102, such as mobile subscriber characteristics 112, a search algorithm facility 144, a personal filter, parental controls 150, carrier business rules 130, or sponsorship information. Additionally, predictive text may be based on the mobile communication facility's 102 SMS conversion and/or keypad sequence conversion.

In embodiments, a search query may be classified by associating a voice-based query entry 120 with information relating to the mobile communication facility 102, such as voice interpretation based, at least in part, on SMS conversion.

In embodiments, a search query may be classified and an auction performed in relation to the class. Performing the auction may involve using information relating to the mobile communication facility 102, such as mobile subscriber characteristics 112, a search algorithm facility 144, a personal filter, parental controls 150, or carrier business rules 130. The result set(s) display may prioritize or highlight sponsor results.

In embodiments, a search query may be classified on a mobile communication facility 102, results presented on a screen associated with the mobile communication facility 102, and a transaction performed in association with a sponsored link, where the transaction may occur by the user clicking on a sponsored link or engaging in a commercial transaction, such as purchasing downloadable content. Alternatively, the transaction may also be a non-economic transaction.

In embodiments, a search query may be classified on a mobile communication facility 102 by aggregating results within the classification. Content, for example ringtone content, music content, or video content, may be aggregated through a spider. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, a search query may be classified and entered on a mobile communication facility 102 associating at least one result within a search with an outbound PPC.

In embodiments, when results are returned from the server, they may be grouped into categories. Once the user selects a category, the view may be switched to the results listing page. In embodiments, the results listing page may be a list of all the items in a specific category. The listing may be presented in an expanded or an unexpanded items mode, where the unexpanded items show only the results title, while the expanded items mode contains a small description of the result as well as an action bar that provides specific functionality for a result. With the exception of more information action, which displays the result details page, the actions available on the results listing page are available on the more information page. A result expanded view may appear when the user has paused on a particular title for short duration for the purpose of helping the user decide whether to take action on the item, seek more information about the item, or move onto the next item. When the item first expands, pressing right moves to the more information page and pressing down moves the focus into the action bar, selecting the first action. Pressing down moves the focus into the action bar, and pressing up again returns to the title bar. If down is pressed while in the action bar, the item reverts to its unexpanded view and focus is moved to the result below.

In embodiments, the item details page may provide further information about the item, as well as the ability to perform actions from the action bar and specialized functionality. Pressing left at this screen may return the user to the item listings page. Pressing down first puts the focus in the action bar, and then scrolls down the page if there is further content to be displayed. This further content may consist of static text as well as dynamic content.

In embodiments, an action bar may provide functionality to be performed on an item on both the results listing page and the results detail page. These actions may include: buy, preview, call, and more information. With the exception of more information, which displays the item details page, the actions may be available both on the result listings page as well as the item details page. Pressing left and right inside the action bar moves focus between actions. Pressing up and down moves focus from the action bar to whatever item is above or below. Pressing select may execute the action or display a confirmation screen. If a confirmation screen is displayed, pressing select may then execute the action and pressing left may return to the previous screen.

In embodiments, the search history may provide a means of navigating to the results of specific queries that have been performed in the past. Pressing select on a search history item may perform a search query with the elements of the original search and display the results.

In embodiments, there may be application background activity performed, such as a throbber, suggestions, results, previews, and a hint-of-the-day and/or other promotional material. A throbber refers to a graphical notification to the user that data traffic is occurring and that the screen will change as more content is received. In general, a throbber indicates data retrieval in the following ways: On the suggestion screen, the throbber may run until all suggestions are fully downloaded; on the results categories screen until the full list of categories have been received; on a results listing screen the throbber may run until all results, minus previews, are downloaded. The throbber may also run while an audio or video preview is being downloaded once the user has selected the Preview action from the Action Bar.

Suggestions may be retrieved from the cache on text entry input. If the cache cannot provide a full list of suggestions, a request may be sent to the server. These updated suggestions may then be cached to speed up future suggestion queries. Independent of the suggestions retrieved from the cache and server are the suggestions provided by searching the Personal Information Manager (PIM) data. This may include Contacts, Events, and Notes entries. The suggestion cache may also be updated during idle time by asking the server for an updated set of suggestions to store in the cache. Idle time may be defined as any point at which the application is running but not making other HTTP requests.

Results may be downloaded when the user requests the list of results. The results may come in two parts, a categories header and the results body. The header may be parsed first to show users the categories in which their results will return, and then each result entry placed into one or more of those categories.

Previews may be downloaded in one of two ways: a direct user request (e.g. the user pressing play on a preview), or pre-fetching after the result stream has ended. If the user has not directly requested the preview to be downloaded, the throbber may not be animated and the user may have no indication that the preview is being fetched in the background.

The hint-of-the-day or other promotional content may be downloaded during idle time of the application. This content may consist of text and/or images that are saved to the phone's memory for display on the next time the application launches.

In embodiments, content may be downloaded to a mobile communication facility 102 based, in part, on information relating to the mobile communication facility 102, classifying a search query, and displaying the results within the search query class(es). The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated based upon the click through performance of classified search queries on a mobile communications facility. The report may contain information relating to search result quality, keyword management, or revenue generation, and it may be segmented by the type of mobile communication facility 102 used.

In embodiments, a query entry 120 may be entered in a search box of a mobile communication facility 102 and the search may be classified prior to executing any searches. Optionally, the search may be executed against the class, or search results may be filtered against the class, or the user may be presented with an option to refine or alter the search based upon the classification. The result may be a single class or a plurality of classes. More generally, the search query may be classified in relation to a query entered on a mobile communication facility 102.

In embodiments, a search query may be classified and entered on a mobile communication facility 102 and the classified search query may be processed through a search algorithm facility 144.

In embodiments, a search query may be classified and entered on a mobile communication facility 102; content produced may be related to the classified search query from a data facility. The data facility may be, for example, a WAP facility or a carrier facility.

In embodiments, a search query may be classified by generating a relationship between a query entry 120 and at least one mobile subscriber characteristic. The mobile subscriber characteristics 112 may include location, personal information, history of the user's web interactions, or a plurality of characteristics, such as location and the time of day.

In embodiments, a search query may be classified by generating a relationship between a classified query entry 120 and the location of a mobile communication facility 102 using a location-based service. The relationship may be among at least one query entry 120 and the location and a time of day. Location may be provided by a GPS system or a cell phone triangulation service.

In embodiments, a query may be classified based, in part, on associating a classified query entry 120 with a filter algorithm, where the filter algorithm uses information gathered by a wireless provider 108. The algorithm facility 144 may be a collaborative filter where the search is an open web search, or it may be a recommendation system.

In embodiments, a query entry 120 may be classified and content received from a result facility based on the categorized search query, where the result facility is associated with information derived from the mobile communication facility 102, such as mobile subscriber characteristics 112 information.

In embodiments, a search query may be classified and entered on a mobile communication facility 102, where the classified search query is associated with a mobile browser facility.

In embodiments, a search query may be classified on the mobile communication facility 102. Disambiguation of the classified query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a search query may be classified on a mobile communication facility 102 where an original search query is processed through a voice recognition facility 160 residing on the mobile communication facility 102. Alternatively, the voice recognition facility 160 may reside on a remote server or in part on the mobile communication facility 102 and in part on a server.

In embodiments, a search query may be classified and entered on a mobile communication facility 102 that processes the suggested query in association with information relating to the mobile communication facility 102. This information may reside locally on the mobile communication facility 102, or it may be stored remotely in a data facility, for example in a mobile subscriber characteristics 112 database.

In embodiments, a query entry 120 may be classified on a mobile communication facility 102 that provides a parental control facility to regulate the results produced on the mobile communication facility 102 based. The parental controls 150 may be regulated through a server application or through the mobile communication facility 102.

In embodiments, a search query may be classified on a mobile communication facility 102 that provides a privacy facility 152 to protect a user from loss of personal or other sensitive information relating to the search query category. The privacy facility 152 may be adapted to protect information during a transaction.

In embodiments, a query entry 120 may be classified on a mobile communication facility 102 that provides a transactional security facility 154 that is adapted to enable secure transactions associated with the query entry 120 classification. The transactional security facility 154 may involve the protection of privacy 152 and may be operated in association with parental controls 150 or digital rights management.

In embodiments, a query may be classified by processing a query entry 120 in conjunction with carrier business rules 130 and with information relating to a mobile communication facility 102. Carrier business rules 130 may include walled content garden results, presenting out of garden content, sponsor information, or auctions. Information relating to the mobile communication facility 102 may be mobile subscriber characteristic information.

In embodiments, a query entry 120 may be classified on a mobile communication facility 102 that is based, in part, on an interaction with a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, results may be retrieved based on keyword mapping a query entry 120 in conjunction with information relating to the mobile communication facility 102. This information may include the mobile subscriber characteristics 112, carrier business rules 130, and sponsor information. The additional information stored in these databases may form search parameters that limit the keyword mapped search query and the display of result set(s) by omitting information, prioritizing information (e.g., presenting sponsor links prior to all others), highlighting a subset of the search result set, or ordering the display of information based upon a sponsor auction (i.e., highest bidder presented first). In the case of the sponsor auction, sponsors may bid on keywords that they would like to be associated with their products, services, and links thereto.

In embodiments, a search query may be keyword mapped and entered on a mobile communications facility, ordering and displaying results on a mobile communication facility 102 associated with the mapped query. This information may include mobile subscriber characteristics 112, a search algorithm facility 144, parental controls 150, carrier business rules 130, and/or sponsor information. Results related to a mapped query entry 120 based on sponsor information may be ordered by associating sponsors with key words used in mapped query entries and/or associating mapped query entries with sponsor content. When a mapped query entry 120 matches a sponsor's keyword(s) or content, that sponsor's information may be prioritized in the search result display, highlighted, or otherwise given superiority over other content related to the suggested query entry 120. Association of key words with sponsors may occur through an auction in which bidders compete for sole association with keywords or for a shared frequency of keyword association (e.g., every other occurrence of a keyword). Furthermore, the auction process could include bidding to determine the size of the resulting sponsor content display (e.g., expressed as a percentage of the user's total display space on the mobile communication facility 102) and adding multimedia content to the results display, such as graphics, audio, or a video stream.

Results based on a mapped search query may also be ordered, in part, on the capabilities of the mobile communication facility 102, wherein the capability is an audio, visual, processing, or screen capability.

In embodiments, a query entry 120 may be keyword mapped by producing predictive text based, at least in part, on information relating to the mobile communication facility 102, such as mobile subscriber characteristics 112, a search algorithm facility 144, a personal filter, parental controls 150, carrier business rules 130, or sponsorship information. Additionally, predictive text may be based on the SMS conversion and/or keypad sequence conversion of the mobile communication facility 102.

In embodiments, a query entry 120 may be keyword mapped by associating a voice-based query entry 120 with information relating to the mobile communication facility 102, such as voice interpretation based, at least in part, on SMS conversion.

In embodiments, an auction may be associated to a keyword mapped search query entry 120. Performing the auction may involve using information relating to the mobile communication facility 102, for example mobile subscriber characteristics 112, a search algorithm facility 144, a personal filter, parental controls 150, or carrier business rules 130. The result set(s) display may prioritize or highlight sponsor results.

In embodiments, a search query may be keyword mapped on a mobile communication facility 102, presenting results on a screen associated with the mobile communication facility 102 and performing a transaction in association with a sponsored link, where the transaction may occur by the user clicking on a sponsored link or engaging in a commercial transaction, such as purchasing downloadable content.

In embodiments, a search query may be keyword mapped and entered on a mobile communication facility 102, aggregating results relating to the mapped query for display on a mobile communication facility 102. Content, for example ringtone content, music content, or video content, may be located and aggregated through a spider. The spider may evaluate the compatibility of the content with the capabilities of one or more mobile communication facilities 102. Compatibility may, for example, be determined by running a series of mock mobile communication facility 102 trials and using the results to extract results from sites on a preferred basis. Compatibility may also, or instead, be determined using known hardware and/or software capabilities of devices according to manufacturers and/or service providers. One technique may provide for the extraction from a WAP compatible content site first or extraction from content type sites first, where the content was aggregated in relation to information relating to the mobile communication facility 102.

In embodiments, a query entry 120 may be keyword mapped and associated with at least one result within a search result relating to the mapped search query with an outbound PPC.

In embodiments, content may be downloaded in relation to information associated with a mobile communication facility 102 and a search query mapped, providing the previously downloaded content within a map. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated on the click through performance of mapped search queries content. The report may contain information relating to search result quality, keyword management, or revenue generation, and it may be segmented by the type of mobile communication facility 102 used.

In embodiments, a search query entered in a search box on a mobile communication facility 102 may be processed using various techniques described herein, such as through a query entry 120 facility. For example, a search query may be mapped using keyword mapping. The mapped search query may be processed through a search algorithm facility 144. Content may be produced in relation to a classified search query from a data facility. The data facility may be a WAP facility or a carrier facility.

In embodiments, a search query may be mapped based on at least one mobile subscriber characteristic. The mobile subscriber characteristics 112 may include location, personal information, history of the user's web interactions, or a plurality of characteristics, such as location and the time of day.

In embodiments, a search query may be mapped and entered on a mobile communication facility 102 based on the location of a mobile communication facility 102 using a location-based service. The relationship may be between at least one query entry 120 and the location and a time of day. Location may be provided by a GPS system or a cell phone triangulation service.

In embodiments, a search query may be mapped by processing the query in association with a filter algorithm, where the filter algorithm uses information gathered by a wireless provider 108. The algorithm facility 144 may be a collaborative filter where the search is an open web search or it may be a recommendation system.

In embodiments, a search query may be mapped and entered on a mobile communication facility 102 and content received from a result facility based on the mapped search. The results facility 148 may be associated with information derived from the mobile communication facility 102, such as mobile subscriber characteristics 112 information.

In embodiments, a search query may be mapped and entered on a mobile communication facility 102, where the mapped search query is associated with a mobile browser facility.

In embodiments, a search query may be mapped on the mobile communication facility 102. Disambiguation of the mapped query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, query entries may be mapped on a mobile communication facility 102 where an original search query was entered through a voice recognition facility 160 residing on the mobile communication facility 102, or the voice recognition facility 160 may be used to refine or modify searches or to select search results. The voice recognition facility 160 may also, or instead, reside on a remote server or in part on the mobile communication facility 102 and in part on a server.

In embodiments, a query entry 120 may be mapped on a mobile communication facility 102 where the mapping may be accomplished using mobile communication related information stored in a data facility associated with the mobile communication facility 102. This information may reside locally on the mobile communication facility 102 or it may be stored remotely, for example in a mobile subscriber characteristics 112 database.

In embodiments, a query entry 120 may be mapped on a mobile communication facility 102 that provides a parental control facility to regulate the results produced on the mobile communication facility 102. The parental controls 150 may be regulated through a server application or through the mobile communication facility 102.

In embodiments, a query entry 120 may be mapped on a mobile communication facility 102 that provides a privacy facility 152 associated with the mobile communication facility 102 to protect a user from loss of personal or other sensitive information relating to the search query category. The privacy facility 152 may be adapted to protect information during a transaction.

In embodiments, a search query may be mapped and entered on a mobile communication facility 102 and associate the mapping with a transaction security facility to enable secure transactions associated with the classification. The transactional security facility 154 may be adapted to enable secure transactions associated with the query classification. The transactional security facility 154 may involve the protection of privacy 152 and may be operated in association with parental controls 150 or digital rights management.

In embodiments, a query may be mapped in association with carrier business rules 130. Carrier business rules 130 may include walled garden results, presenting out of garden content, sponsor information, or auctions. Information relating to the mobile communication facility 102 may be mobile subscriber characteristic information.

In embodiments, a query entry 120 may be mapped on a mobile communication facility 102 based in part on a sponsor facility interaction. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be a link presented as text, as a picture, as a video, or as an interactive application. Content may be formatted for the mobile communication facility 102 and relate to webpage content or links for syndicated advertisements.

In embodiments, the results of a search query may be retrieved and entered on a mobile communications facility and the results ordered and displayed on a mobile communication facility 102 associated with the mapped query. This information may include mobile subscriber characteristics 112, a search algorithm facility 144, parental controls 150, carrier business rules 130, and/or sponsor information. Results related to a mapped query entry 120 based on sponsor information may be ordered by associating sponsors with key words used in query entries and/or associating query entries with sponsor content. When a mapped query entry 120 matches a sponsor's keyword(s) or content, that sponsor's information may be prioritized in the search result display, highlighted, or otherwise given superiority over other content related to the suggested query entry 120. Association of key words with sponsors may occur through an auction in which bidders compete for sole association with keywords or for a shared frequency of keyword association (e.g., every other occurrence of a keyword). Furthermore, the auction process could include bidding to determine the size of the resulting sponsor content display (e.g., expressed as a percentage of the user's total display space on the mobile communication facility 102) and adding multimedia content to the results display, such as graphics, audio, or a video stream.

Results based on a mapped search query may also be ordered, in part, on the capabilities of the mobile communication facility 102, wherein the capability is an audio, visual, processing, or screen capability.

In embodiments, the results of a query entry 120 may be retrieved by producing predictive text based, at least in part, on information relating to the mobile communication facility 102, such as mobile subscriber characteristics 112, a search algorithm facility 144, a personal filter, parental controls 150, carrier business rules 130, or sponsorship information. Additionally, predictive text may be based on the mobile communication facility 102's SMS conversion and/or keypad sequence conversion.

In embodiments, a search query may be entered on a mobile communication facility 102 using voice recognition and retrieve results based on the search query.

In embodiments, results may be retrieved based, in part, on a search query entered on a mobile communications facility, where a portion of the results is based on an auction for search marketing. Performing the auction may involve using information relating to the mobile communication facility 102, for example mobile subscriber characteristics 112, a search algorithm facility 144, a personal filter, parental controls 150, or carrier business rules 130. The result set(s) display may prioritize or highlight sponsor results.

In embodiments, the results of a search query may be retrieved on a mobile communication facility 102 based, in part, on information relating to the mobile communication facility 102, and a transaction may be performed in relation to the received results. The transaction may occur by the user clicking on a sponsored link or engaging in a commercial transaction, such as purchasing downloadable content. The transaction may also be a non-economic transaction.

In embodiments, a plurality of results may be retrieved based, in part, on a search query entered on a mobile communications facility and the results aggregated. Content, for example ringtone content, music content, or video content, may be aggregated through a spider. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, results may be retrieved based, in part, on a search query entered on a mobile communications facility and associated with at least one result within the search results with an outbound PPC.

In embodiments, content may be retrieved relating to information associated with a mobile communication facility 102 before a search query relating to the information is entered. This search may be an implicit search. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to retrieved results based, in part, on a search query entered on a mobile communications facility. The report may contain information relating to search result quality, keyword management, or revenue generation, and it may be segmented by the type of mobile communication facility 102 used.

In embodiments, a search query may be entered in a search box on a mobile communication facility 102 and the search query associated with mobile communication information. The retrieved results may be based at least in part on a search query entered on a mobile communications facility.

In embodiments, results may be retrieved based, in part, on a search query entered on a mobile communications facility and, in part, based on mobile communication facility 102 information.

In embodiments, a query may be entered in a search query entry facility 120 and associate the query with mobile communication information. The retrieved results may be based, in part, on a query and based, in part, on the mobile communication information.

In embodiments, a search query may be processed through a search algorithm facility 144 and mobile communication optimized results retrieved based at least in part on the search query. The search query may be entered on a mobile communications facility, where the results are optimized based on information relating to the mobile communication facility 102.

In embodiments, results may be retrieved based, in part, on a search query entered on a mobile communications facility and based, in part, on a mobile subscriber characteristic. The mobile subscriber characteristics 112 may include location, personal information, history of the user's web interactions, or a plurality of characteristics, such as location and the time of day.

In embodiments, results may be retrieved based, in part, on a search query entered on a mobile communications facility and based, in part, on a location based service. The relationship may be among at least one query entry 120 and the location and a time of day. Location may be provided by a GPS system or a cell phone triangulation service.

In embodiments, a search query may be processed and entered on a mobile communication facility 102 through a filter or search algorithm facility 144. The retrieved results may be based, in part, on a filter algorithm, where the filter algorithm uses information related to the mobile communication facility 102. The algorithm facility 144 may be a collaborative filter where the search is an open web search, or it may be a recommendation system.

In embodiments, results may be retrieved from a results facility 148 based, in part, on a search query entered on a mobile communications facility. The results facility 148 may be associated with information relating to the mobile communication facility 102, such as mobile subscriber characteristics 112 information.

In embodiments, a mobile browser facility may be used in the process of retrieving results from a results facility 148, where the results facility 148 is adapted to produce results related to carrier premium content and an open web search. Carrier premium content may include ringtones, ringbacks, downloaded content, or purchased content. The results facility 148 may also be adapted to produce results related to a mobile communication facility 102, such as subscriber characteristic information.

In embodiments, results may be retrieved based, in part, on a search query entered on a mobile communications facility. The results may be, in part, related to information associated with a query processed through a disambiguation facility 140. Disambiguation of the mapped query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, results may be retrieved based, in part, on a search query entered on a mobile communications facility using a voice recognition facility 160. The original search query may be entered through a voice recognition facility 160 residing on the mobile communication facility 102. Alternatively, the voice recognition facility 160 may reside on a remote server or in part on the mobile communication facility 102 and in part on a server.

In embodiments, results may be retrieved based, in part, on a search query entered on a mobile communications facility, where the results are, in part, related to information associated with the mobile communication facility 102. This information may reside locally on the mobile communication facility 102 or it may be stored remotely, for example in a mobile subscriber characteristics 112 database.

In embodiments, results may be retrieved based, in part, on a search query entered on a mobile communication facility 102 that provides a parental control facility to regulate the results produced on the mobile communication facility 102 based. The parental controls 150 may be regulated through a server application or through the mobile communication facility 102.

In embodiments, results may be retrieved based, in part, on a search query on a mobile communication facility 102 that provides a privacy facility 152 associated with the mobile communication facility 102 to protect a user from loss of personal or other sensitive information relating to the search query category. The privacy facility 152 may be adapted to protect information during a transaction.

In embodiments, results may be retrieved based, in part, on a search query entered on a mobile communication facility 102, and the results may be associated with a transaction security facility to enable secure transactions associated with the classification. The transactional security facility 154 may be adapted to enable secure transactions associated with the query. The transactional security facility 154 may involve the protection of privacy 152 and may be operated in association with parental controls 150 or digital rights management.

In embodiments, results may be retrieved based, in part, on a search query in association with carrier business rules 130. Carrier business rules 130 may include walled garden results, presenting out of garden content, sponsor information, or auctions. Information relating to the mobile communication facility 102 may be mobile subscriber characteristic information.

In embodiments, results may be retrieved based, in part, on a search query entered on a mobile communication facility 102 based, in part, on a sponsor facility interaction. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, results may be ordered and displayed based on a search query by producing predictive text based, at least in part, on information relating to the mobile communication facility 102, such as mobile subscriber characteristics 112, a search algorithm facility 144, a personal filter, parental controls 150, carrier business rules 130, or sponsorship information. Additionally, predictive text may be based on the mobile communication facility 102's SMS conversion and/or keypad sequence conversion.

In embodiments, results may be ordered and displayed by associating a voice-based query entry 120 with information relating to the mobile communication facility 102, such as voice interpretation based, at least in part, on SMS conversion.

In embodiments, results may be ordered and displayed based, in part, on a search query entered on a mobile communications facility, where a portion of the results is based on an auction for search marketing. Performing the auction may involve using information relating to the mobile communication facility 102, for example mobile subscriber characteristics 112, a search algorithm facility 144, a personal filter, parental controls 150, or carrier business rules 130. The result set(s) display may prioritize or highlight sponsor results.

In embodiments, results may be ordered and displayed based, in part, on a search query on a mobile communication facility 102 and the results presented on a screen associated with the mobile communication facility 102, and a transaction may be performed in association with a sponsored link, where the transaction may occur by the user clicking on a sponsored link or engaging in a commercial transaction, such as purchasing downloadable content.

In embodiments, results may be ordered and displayed on the mobile communication facility 102 and the results aggregated by relating to a search query for display on a mobile communication facility 102. Content, for example ringtone content, music content, or video content, may be aggregated through a spider. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, results may be ordered and displayed based, in part, on a search query entered on a mobile communications facility and associated with at least one result within a search result relating to the query with an outbound PPC.

In embodiments, content may be retrieved relating to information associated with a mobile communication facility 102 before a search query relating to the information is entered. Following the entry of the search query the information may be ordered and displayed. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to the ordering of results retrieved on a mobile communications facility. The report may contain information relating to search result quality, keyword management, or revenue generation, and it may be segmented by the type of mobile communication facility 102 used.

In embodiments, a search query may be entered in a search box on a mobile communication facility 102, the search query associated with mobile communication information, and results ordered and displayed based, in part, on a search query entered and based, in part, on the mobile communication information.

In embodiments, results may be ordered and displayed based, in part, on a search query entered on a mobile communications facility and, in part, based on mobile communication facility 102 information.

In embodiments, a query may be entered in a search query entry 120 facility, the query associated with mobile communication information, and the results ordered and displayed based, in part, on a query and based, in part, on the mobile communication information.

In embodiments, a search query may be processed through a search algorithm facility 144 and mobile communication optimized results retrieved based, in part, on the search query, where the optimized results are optimized based on information relating to the mobile communication facility 102. The information relating to the mobile communication facility 102 may be screen size, screen shape, processing capability, processing speed, audio system, visual system, aural system, mobile subscriber characteristics 112, and location.

In embodiments, search results may be received from a delivery facility and the results ordered and displayed on a display associated with a mobile communication facility 102, where the ordering is made in association with information relating to the mobile communication facility 102. The information relating to the mobile communication facility 102 may be screen size, screen shape, processing capability, processing speed, audio system, visual system, aural system, mobile subscriber characteristics 112, and location.

In embodiments, results may be ordered and displayed on a mobile communication facility 102 display based on at least one mobile subscriber characteristic. The mobile subscriber characteristics 112 may include location, personal information, history of the user's web interactions, or a plurality of characteristics, such as location and the time of day.

In embodiments, search results may be ordered and displayed on a mobile communication facility 102 display based on the location of a mobile communication facility 102 using a location-based service. The relationship may be among at least one query entry 120 and the location and a time of day. Location may be provided by a GPS system or a cell phone triangulation service.

In embodiments, a search query may be processed and entered on a mobile communication facility 102 through a filter algorithm facility 144 and order the results based, in part, on the filter algorithm, where the filter algorithm uses information related to the mobile communication facility 102. The algorithm facility 144 may be a collaborative filter where the search is an open web search, or it may be a recommendation system.

In embodiments, results may be ordered from a results facility 148 based, in part, on a search query entered on a mobile communications facility. The results facility 148 may be associated with information derived from the mobile communication facility 102, such as mobile subscriber characteristics 112 information.

In embodiments, a mobile browser facility may be used in the process of ordering and displaying results from a results facility 148. The results facility 148 may be adapted to produce results related to carrier premium content and an open web search. The results facility 148 may also be associated with information derived from the mobile communication facility 102, such as mobile subscriber characteristics 112 information.

In embodiments, results may be ordered based, in part, on a search query entered on a mobile communications facility.

Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, results may be ordered based, in part, on a search query entered on a mobile communication facility 102 through a voice recognition facility 160 residing on the mobile communication facility 102. Alternatively, the voice recognition facility 160 may reside on a remote server or in part on the mobile communication facility 102 and in part on a server.

In embodiments, results may be ordered based, in part, on a search query entered on a mobile communication facility 102 where the results are based, in part, on information stored in a data facility associated with the mobile communication facility 102. This information may reside locally on the mobile communication facility 102, or it may be stored remotely, for example in a mobile subscriber characteristics 112 database.

In embodiments, results may be ordered and displayed based, in part, on a search query entered on a mobile communication facility 102 that provides a parental control facility to regulate the results produced on the mobile communication facility 102. The parental controls 150 may be regulated through a server application or through the mobile communication facility 102.

In embodiments, results may be ordered and displayed based, in part, on a search query entered on a mobile communication facility 102 that provides a privacy facility 152 associated with the mobile communication facility 102 to protect a user from loss of personal or other sensitive information relating to the search query category. The privacy facility 152 may be adapted to protect information during a transaction.

In embodiments, results may be ordered and displayed based, in part, on a search query entered on a mobile communication facility 102 and associate the results with a transaction security facility to enable secure transactions associated with the results. The transactional security facility 154 may be adapted to enable secure transactions associated with the query classification. The transactional security facility 154 may involve the protection of privacy 152 and may be operated in association with parental controls 150, digital rights management, or identity protection.

In embodiments, results may be ordered and displayed based, in part, on a search query entered on a mobile communications facility in association with carrier business rules 130. Carrier business rules 130 may include walled garden results, presenting out of garden content, sponsor information, or auctions. Information relating to the mobile communication facility 102 may be mobile subscriber characteristic information.

In embodiments, results may be ordered and displayed based, in part, on a search query entered on a mobile communication facility 102 associated with a sponsor facility interaction. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, text may be predicted and associated with a search query entered on a mobile communication facility 102 using voice recognition. The predictive text may be based, in part, on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102 and an auction for search marketing performed in relation to the predicted text. Performing the auction may involve using information relating to the mobile communication facility 102, for example mobile subscriber characteristics 112, a search algorithm facility 144, a personal filter, parental controls 150, or carrier business rules 130. The result set(s) display may prioritize or highlight sponsor results.

In embodiments, text may be predicted and associated with a search query entered on a mobile communication facility 102 and a transaction performed based at least in part on the predicted text. The transaction may occur by the user clicking on a sponsored link or engaging in a commercial transaction, such as purchasing downloadable content or performing a non-economic transaction. The predictive text may be based at least in part on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102 and the results aggregated based, in part, on the predicted text. Content, for example ringtone content, music content, or video content, may be aggregated through a spider and presented by category in a high level aggregated form. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, text may be predicted and associated with a search query entered on a mobile communication facility 102 and an outbound PPC marketing activity performed in association with the predicted text. The predictive text may be based, in part, on at least one of mobile communication facility 102 information, SMS conversion, mobile subscriber characteristic information, user specific dictionary, numeric keypad conversion, and multi-letter keypad conversion.

In embodiments, results may be downloaded to a mobile communication facility 102 based, in part, on information relating to a mobile communication facility 102 and text predicted in association with a search query entered on a mobile communication facility 102. Following the predictive text step, the results may be presented on a display associated with the mobile communication facility 102. The predictive text may be based, in part, on at least one of mobile communication facility 102 information, SMS conversion, mobile subscriber characteristic information, user specific dictionary, numeric keypad conversion, and multi-letter keypad conversion. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to predicting text associated with a search query entered on a mobile communication facility 102. The predictive text may be based, in part, on at least one of mobile communication facility 102 information, SMS conversion, mobile subscriber characteristic information, user specific dictionary, numeric keypad conversion, and multi-letter keypad conversion. The report may contain information relating to search result quality, keyword management, revenue generation, and it may be segmented by the type of mobile communication facility 102 used.

In embodiments, text may be predicted and associated with a search query entered in a search box on a mobile communication facility 102. The predictive text may be based, in part, on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102. The predictive text may be based, in part, on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a query entry 120 facility associated with a mobile communication facility 102 using voice recognition. The predictive text may be based, in part, on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102 and a request processed through a search algorithm facility 144, where the request is at least based on the predicted text. The predictive text may be based, in part, on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102 and the results received, in part, in association with the predicted text from a delivery facility. The predictive text may be based, in part, on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102 based, in part, on at least one mobile subscriber characteristic. The mobile subscriber characteristics 112 may include location, personal information, history of the user's web interactions, or a plurality of characteristics, such as location and the time of day. The predictive text may be based at least in part on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102, where the predicted text is based, in part, on a location as determined by a location based service. The relationship may be among at least one query entry 120 and the location and a time of day. Location may be provided by a GPS system or a cell phone triangulation service. The predictive text may be based, in part, on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102, where the predicted text is based, in part, on filter algorithm facility 144. The algorithm facility 144 may be a collaborative filter where the search is an open web search, or it may be a recommendation system. The predictive text may be based, in part, on at least one of mobile communication facility 102 information, SMS conversion, mobile subscriber characteristic information, user specific dictionary, numeric keypad conversion, and multi-letter keypad conversion.

In embodiments, text may be predicted and a search query entered on a mobile communication facility 102 where the results are produced from a results facility 148 in association with the predicted text. The predictive text may be based, in part, on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102. The predictive text may be based, in part, on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102, where the predicted text may be processed through a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation. The predictive text may be based, in part, on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102, where the predicted text may be based, in part, on a search query entered through a voice recognition facility 160 residing on the mobile communication facility 102. Alternatively, the voice recognition facility 160 may reside on a remote server or in part on the mobile communication facility 102 and in part on a server. The predictive text may be based, in part, on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102, wherein the predicted text may be based, in part, on mobile communication related information residing in a data facility. This information may reside locally on the mobile communication facility 102, or it may be stored remotely, for example, in a mobile subscriber characteristics 112 database. The predictive text may be based, in part, on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102, where the predicted text is based, in part, on a parental control parameter. The parental controls 150 may be regulated through a server application or through the mobile communication facility 102. The predictive text may be based, in part, on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102, where the predicted text is based, in part, on a privacy 152 parameter. The privacy facility 152 may be adapted to protect information during a transaction. The predictive text is based, in part, on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102 and the predicted text associated with a transactional facility to enable a transaction associated with the predicted text. The transactional security facility 154 may be adapted to enable secure transactions associated with the query classification. The transactional security facility 154 may involve the protection of privacy 152 and may be operated in association with parental controls 150, digital rights management, or identity protection. The predictive text may be based, in part, on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102, where the predicted text is based, in part, on carrier business rules 130. Carrier business rules 130 may include walled garden results, presenting out of garden content, sponsor information, or auctions. Information relating to the mobile communication facility 102 may be mobile subscriber characteristic information. The predictive text may be based, in part, on at least one of mobile communication facility 102 information, SMS conversion, mobile subscriber characteristic information, user specific dictionary, numeric keypad conversion, and multi-letter keypad conversion.

In embodiments, text may be predicted and associated with a search query entered on a mobile communication facility 102, where the predicted text is based, in part, on sponsor facility information. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements. The predictive text may be based, in part, on at least one of mobile communication facility 102 information, SMS conversion, mobile subscriber characteristic information, user specific dictionary, numeric keypad conversion, and multi-letter keypad conversion.

In embodiments, a search query may be entered on a mobile communication facility 102 using voice recognition and an auction for search marketing performed that is associated with the search query. Performing the auction may involve using information relating to the mobile communication facility 102, for example mobile subscriber characteristics 112, a search algorithm facility 144, a personal filter, parental controls 150, or carrier business rules 130. The result set(s) display may prioritize or highlight sponsor results.

In embodiments, a search query may be entered on a mobile communication facility 102 using voice recognition and a transaction made in association with results received based at least in part on the search query. The transaction may occur by the user clicking on a sponsored link or engaging in a commercial transaction, such as purchasing downloadable content or performing a non-economic transaction.

In embodiments, a search query may be entered on a mobile communication facility 102 using voice recognition and the results aggregated based, in part, on the search query. Content, for example ringtone content, music content, or video content, may be aggregated through a spider and presented by category in a high level aggregated form. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, a search query may be entered on a mobile communication facility 102 using voice recognition and an activity performed in relation to outbound PPC marketing based at least in part on the search query.

In embodiments, results may be downloaded to a mobile communication facility 102 based at least in part on information relating to the mobile communication facility 102 and, later, a search query entered using voice recognition to receive the results. Following the predictive text step, the results may be presented on a display associated with the mobile communication facility 102. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to predicting text associated with a search query entered through voice recognition on a mobile communication facility 102. The report may contain information relating to search result quality, keyword management, revenue generation, and it may be segmented by the type of mobile communication facility 102 used.

In embodiments, a search query may be entered on a mobile communication facility 102 using voice recognition. The voice activation may be activated using a search box entry, button, or other suitable activation technique. The voice recognition facility 160 may include a query entry 120 facility. The search query may be processed through a search algorithm facility 144, a delivery facility, and/or any other facility suitable for processing searches as described herein. The search query may be associated with a mobile subscriber characteristic. The mobile subscriber characteristics 112 may include location, personal information, history of the user's web interactions, or a plurality of characteristics, such as location and the time of day.

In embodiments, a search query may be entered on a mobile communication facility 102 using voice recognition, where the search query is associated with a location as determined by a location based service. The relationship may be among at least one query entry 120 and the location and a time of day. Location may be provided by a GPS system or a cell phone triangulation service.

In embodiments, a search query may be entered on a mobile communication facility 102 using voice recognition and associating the search query with a filter algorithm facility 144. The algorithm facility 144 may be a collaborative filter where the search is an open web search, or it may be a recommendation system.

In embodiments, a search query may be entered on a mobile communication facility 102 using voice recognition and the search query presented to a results facility 148.

In embodiments, a search query may be entered on a mobile communication facility 102 using voice recognition and the search query processed using a mobile browser facility.

In embodiments, a search query may be entered on a mobile communication facility 102 using voice recognition, where the search query is processed through a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a search query may be entered on a mobile communication facility 102 using voice recognition facility 160 residing on the mobile communication facility 102. Alternatively, the voice recognition facility 160 may reside on a remote server or in part on the mobile communication facility 102 and in part on a server.

In embodiments, a search query may be entered on a mobile communication facility 102 using voice recognition, where the voice recognition process uses information relating to the mobile communication facility 102 that may reside in a data facility. This information may reside locally on the mobile communication facility 102, or it may be stored remotely, for example in a mobile subscriber characteristics 112 database.

In embodiments, a search query may be entered on a mobile communication facility 102 using voice recognition, where the search query is associated with a parental control parameter. The parental controls 150 may be regulated through a server application or through the mobile communication facility 102.

In embodiments, a search query may be entered on a mobile communication facility 102 using voice recognition, where the search query is associated with a privacy 152 parameter. The privacy facility 152 may be adapted to protect information during a transaction.

In embodiments, a search query may be entered on a mobile communication facility 102 using voice recognition, where the search query is associated with a security facility. The transactional security facility 154 may be adapted to enable secure transactions associated with the query classification. The transactional security 154 facility may involve the protection of privacy 152 and may be operated in association with parental controls 150, digital rights management, or identity protection.

In embodiments, a search query may be entered on a mobile communication facility 102 using voice recognition, where the search query is associated with a carrier business rule. Carrier business rules 130 may include walled garden results, presenting out of garden content, sponsor information, or auctions. Information relating to the mobile communication facility 102 may be mobile subscriber characteristic information.

In embodiments, a search query may be entered on a mobile communication facility 102 using voice recognition, wherein the search query is associated with a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, an auction for search marketing may be performed related to a presentation of sponsored content on a mobile communication facility 102, where the sponsored content is adapted to be associated with a transaction. The transaction may occur by the user clicking on a sponsored link or engaging in a commercial transaction, such as purchasing downloadable content or performing a non-economic transaction.

In embodiments, an auction for search marketing may be performed related to a presentation of sponsored content on a mobile communication facility 102, wherein the sponsored content is related to aggregated content. Content, for example ringtone content, music content, or video content, may be aggregated through a spider, and presented by category in a high level aggregated form. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, an auction for search marketing may be performed related to a presentation of sponsored content on a mobile communication facility 102, where the sponsored content is related to PPC marketing.

In embodiments, an auction for search marketing may be performed related to a presentation of sponsored content on a mobile communication facility 102; the sponsored content may be downloaded to the mobile communication facility 102 and, later, a search performed wherein the sponsored content is then presented. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to auctions for search marketing related to a presentation of sponsored content on a mobile communication facility 102. The report may contain information relating to search result quality, keyword management, revenue generation, and it may be segmented by the type of mobile communication facility 102 used.

In embodiments, an auction for search marketing may be performed related to a presentation of sponsored content on a mobile communication facility 102, where the auction is related at least in part to a search query entered in a search box on a mobile communication facility 102.

In embodiments, an auction for search marketing may be performed related to a presentation of sponsored content on a mobile communication facility 102.

In embodiments, an auction for search marketing may be performed related to a presentation of sponsored content on a mobile communication facility 102, where the auction is, in part, based on a search query entered on the mobile communication facility 102.

In embodiments, an auction for search marketing may be performed related to a presentation of sponsored content on a mobile communication facility 102, where the auction is, in part, related to a search algorithm facility 144. The search algorithm facility 144 may produce a search algorithm, and the search algorithm may be provided to an auction facility.

In embodiments, an auction for search marketing may be performed related to a presentation of sponsored content on a mobile communication facility 102, where auction results are provided through a delivery facility associated with the mobile communication facility 102.

In embodiments, an auction for search marketing may be performed related to a presentation of sponsored content on a mobile communication facility 102, wherein the auction is associated with a mobile subscriber characteristic. The mobile subscriber characteristics 112 may include location, personal information, history of the user's web interactions, or a plurality of characteristics, such as location and the time of day.

In embodiments, an auction for search marketing may be performed related to a presentation of sponsored content on a mobile communication facility 102, where the auction is associated with a location as determined by a location based service. The relationship may be among at least one query entry 120 and the location and a time of day. Location may be provided by a GPS system or a cell phone triangulation service.

In embodiments, an auction for search marketing may be performed related to a presentation of sponsored content on a mobile communication facility 102, where the auction is associated with a filter algorithm facility 144. The algorithm facility 144 may be a collaborative filter where the search is an open web search, or it may be a recommendation system.

In embodiments, an auction for search marketing may be performed related to a presentation of sponsored content on a mobile communication facility 102, where the results produced by the auction are presented to the mobile communication facility 102 through a results facility 148.

In embodiments, an auction for search marketing may be performed related to a presentation of sponsored content on a mobile communication facility 102, where the auction results are presented to the mobile communication facility 102 through a mobile browser facility.

In embodiments, an auction for search marketing may be performed related to a presentation of sponsored content on a mobile communication facility 102, where the auction is the result of a query processed through a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, an auction for search marketing may be performed related to a presentation of sponsored content on a mobile communication facility 102, where the auction is the result of a query processed through a voice recognition facility 160 residing on the mobile communication facility 102. Alternatively, the voice recognition facility 160 may reside on a remote server or in part on the mobile communication facility 102 and in part on a server.

In embodiments, an auction for search marketing may be performed related to a presentation of sponsored content on a mobile communication facility 102, where the auction is performed in coordination with information relating to the mobile communication facility 102 that resides in a data facility. This information may reside locally on the mobile communication facility 102, or it may be stored remotely, for example in a mobile subscriber characteristics database 112.

In embodiments, an auction for search marketing may be performed related to a presentation of sponsored content on a mobile communication facility 102, where the auction is associated with a parental control parameter. The parental controls 150 may be regulated through a server application or through the mobile communication facility 102.

In embodiments, an auction for search marketing may be performed related to a presentation of sponsored content on a mobile communication facility 102, where the auction is associated with a privacy 152 parameter.

In embodiments, an auction for search marketing may be performed related to a presentation of sponsored content on a mobile communication facility 102, where the auction is associated with a security facility. The transactional security 154 facility may be adapted to enable secure transactions associated with the query classification. The transactional security facility 154 may involve the protection of privacy 152 and may be operated in association with parental controls 150, digital rights management, or identity protection.

In embodiments, an auction for search marketing may be performed related to a presentation of sponsored content on a mobile communication facility 102, where the auction is associated with a carrier business rule. Carrier business rules 130 may include walled garden results, presenting out of garden content, sponsor information, or auctions. Information relating to the mobile communication facility 102 may be mobile subscriber characteristic information.

In embodiments, an auction for search marketing may be performed related to a presentation of sponsored content on a mobile communication facility 102, where the auction is associated with a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a transaction may be made on a mobile communication facility 102, where the transaction is related to aggregate results relating to mobile communication information. Content, for example ringtone content, music content, or video content, may be aggregated through a spider and presented by category in a high level aggregated form. The spider may determine the compatibility of the content with the capabilities of the mobile communication facility 102. Compatibility may be determined by running a series of mock mobile communication facility 102 trials and using the results to extract results from sites on a preferred basis. The preferred basis may provide for the extraction from a WAP compatible content site first or extraction from content type sites first, where the content was aggregated in relation to information relating to the mobile communication facility 102.

In embodiments, an action may be performed relating to PPC marketing on a mobile communication facility 102, wherein the PPC marketing is related to mobile communication information.

In embodiments, a transaction may be made on a mobile communication facility 102, wherein the transaction is related to content previously downloaded to the mobile communication facility 102 in anticipation of a search. The search may be an implicit search. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to transactions made on a mobile communication facility 102. The report may contain information relating to search result quality, keyword management, revenue generation, and it may be segmented by the type of mobile communication facility 102 used.

In embodiments, a transaction may be made on a mobile communication facility 102, where the transaction is related to results associated with mobile communication information and related in part, to a query entered in a search box associated with the mobile communication facility 102.

In embodiments, a transaction may be made on a mobile communication facility 102, where the transaction is, in part, related to mobile communication information, such as mobile subscriber characteristic information.

In embodiments, a transaction may be made on a mobile communication facility 102, where the transaction is, in part, related to a query entered in a query entry 120 facility and, in part, related to mobile communication information, such as mobile subscriber characteristic information.

In embodiments, a transaction may be made on a mobile communication facility 102, where the transaction is, in part, related to result obtained through a search algorithm facility 144. The search algorithm facility 144 may use mobile communication information in the performance of a search. For example, the search algorithm facility 144 may produce a search algorithm and provide it to an auction facility.

In embodiments, a transaction may be made on a mobile communication facility 102, where the transaction is at least in part related to a delivery facility type.

In embodiments, a transaction may be made on a mobile communication facility 102, where the transaction is at least in part related to a mobile subscriber characteristic. The mobile subscriber characteristics 112 may include location, personal information, history of the user's web interactions, or a plurality of characteristics, such as location and the time of day.

In embodiments, a transaction may be made on a mobile communication facility 102, where the transaction is associated with a location as determined by a location based service. The relationship may be among at least one query entry 120 and the location and a time of day. Location may be provided by a GPS system or a cell phone triangulation service.

In embodiments, a transaction may be made on a mobile communication facility 102, where the transaction is associated with a filter algorithm facility 144. The algorithm facility 144 may be a collaborative filter where the search is an open web search, or it may be a recommendation system.

In embodiments, a transaction may be made on a mobile communication facility 102, where results produced by the auction are presented to the mobile communication facility 102 through a results facility 148.

In embodiments, a transaction may be made on a mobile communication facility 102, where the transaction at least is processed through the mobile communication facility 102 through a mobile browser facility.

In embodiments, a transaction may be made on a mobile communication facility 102, where the transaction is at least in part related to a result of a query processed through a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a transaction may be made on a mobile communication facility 102, where the transaction is a related to a query processed through a voice recognition facility 160 residing on the mobile communication facility 102. Alternatively, the voice recognition facility 160 may reside on a remote server or in part on the mobile communication facility 102 and in part on a server.

In embodiments, a transaction may be made on a mobile communication facility 102, where the transaction is performed in coordination with information relating to the mobile communication facility 102 that may reside in a data facility. This information may reside locally on the mobile communication facility 102, or it may be stored remotely, for example in a mobile subscriber characteristics database 112.

In embodiments, a transaction may be made on a mobile communication facility 102, where the transaction is associated with a parental control parameter. The parental controls 150 may be regulated through a server application or through the mobile communication facility 102.

In embodiments, a transaction may be made on a communication facility, where the transaction is associated with a privacy 152 parameter.

In embodiments, a transaction may be made on a mobile communication facility 102, where the transaction is associated with a security facility. The transactional security facility 154 may be adapted to enable secure transactions associated with the query classification. The transactional security facility 154 may involve the protection of privacy 152 and may be operated in association with parental controls 150, digital rights management, or identity protection.

In embodiments, a transaction may be made on a mobile communication facility 102, where the transaction is associated with a carrier business rule. Carrier business rules 130 may include walled garden results, presenting out of garden content, sponsor information, or auctions. Information relating to the mobile communication facility 102 may be mobile subscriber characteristic information.

In embodiments, a transaction may be made on a mobile communication facility 102, where the transaction is associated with a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a vendor may be selected in association with a sponsored link and the sponsored link presented in association with aggregated results. The vendor may be presented with an option of receiving further leads, such as phone or web leads.

In embodiments, results may be aggregated in association with a mobile communication facility 102, the aggregated results downloaded to the mobile communication facility 102, and the aggregated results presented to a user of the mobile communication facility 102 as a result of a search query entered following the download. The search may be an implicit search. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to aggregated results presented on a mobile communication facility 102. The report may contain information relating to search result quality, keyword management, revenue generation, and it may be segmented by the type of mobile communication facility 102 used.

In embodiments, a search query may be entered in a search box on a mobile communication facility 102, the aggregated results associated with the search query, and aggregated results presented on the mobile communication facility 102. The aggregated results may be presented in an aggregated form that includes a high level descriptor that may be activated to reveal the results. Activation may be a link. A second set of results may also be aggregated and presented on the mobile communication facility 102. The second aggregated results may be presented associated with high level descriptors.

In embodiments, results may be aggregated and the aggregated results categorized into a plurality of aggregated results, where the plurality of aggregated results are presented on a mobile communication facility 102.

In embodiments, an aggregation facility may be associated with a query entry 120 facility of a mobile communication facility 102, where the aggregation facility is adapted to present categorized aggregated results. The mobile communication facility 102 may be adapted to facilitate selection of the categorized aggregated results and reveal individual results within the aggregated results. Facilitation may involve the presentation of a link.

In embodiments, a search query may be produced in association with a search algorithm facility 144, the results retrieved based on the search query, and the results aggregated into categories for presentation on a mobile communication facility 102.

In embodiments, content may be delivered from a delivery facility, the content aggregated into categories, and the categories presented on a mobile communication facility 102.

In embodiments, at least one mobile subscriber characteristic may be used as a parameter for aggregating search results into categories. The mobile subscriber characteristics 112 may include location, personal information, history of the user's web interactions, or a plurality of characteristics, such as location and the time of day.

In embodiments, location as determined by a location based service may be used as a parameter for aggregating search results into categories. Location may be provided by a GPS system or a cell phone triangulation service.

In embodiments, a search query may be produced in association with a filter algorithm facility 144, the results aggregated in association with the search query, and the aggregated results presented on a mobile communication facility 102. The algorithm facility 144 may be a collaborative filter where the search is an open web search, or it may be a recommendation system. The aggregated search results may be filtered through an algorithm facility 144 and the results presented on a mobile communication facility 102.

In embodiments, results may be aggregated and produced by a results facility 148 and the aggregated results presented on a mobile communication facility 102, where the results facility 148 operates in association with information relating to the mobile communication facility 102. Information relating to the mobile communication facility 102 may be mobile subscriber characteristics 112 information.

In embodiments, results may be aggregated into categories of results and the categories of results presented through a mobile browser facility.

In embodiments, results may be aggregating based, in part, on a search query processed through a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, results may be aggregated based, in part, on a search query processed through a voice recognition facility 160 residing on the mobile communication facility 102. Alternatively, the voice recognition facility 160 may reside on a remote server or in part on the mobile communication facility 102 and in part on a server.

In embodiments, results may be aggregated based at least in part on information relating to the mobile communication facility 102, where the information resides in a data facility. This information may reside locally on the mobile communication facility 102, or it may be stored remotely, for example in a mobile subscriber characteristics 112 database.

In embodiments, search results may be aggregated into categories, where the aggregation is based at least in part on a parental control parameter and the aggregated results presented on a mobile communication facility 102. The parental controls 150 may be regulated through a server application or through the mobile communication facility 102.

In embodiments, search results may be aggregated into categories, where the aggregation is based at least in part on a privacy 152 control parameter and the aggregated results presented on a mobile communication facility 102.

In embodiments, search results may be aggregated into categories, where the aggregation is associated with a transaction security facility and the aggregated results presented on a mobile communication facility 102. The transactional security 154 facility may be adapted to enable secure transactions associated with the query classification. The transactional security 154 facility may involve the protection of privacy 152 and may be operated in association with parental controls 150, digital rights management, or identity protection.

In embodiments, search results may be aggregated into categories, where the aggregation is based at least in part on carrier business rules 130 and the aggregated results presented on a mobile communication facility 102. Carrier business rules 130 may include walled garden results, presenting out of garden content, sponsor information, or auctions. Information relating to the mobile communication facility 102 may be mobile subscriber characteristic information.

In embodiments, search results may be aggregated into categories, where the aggregation is based at least in part on a sponsor facility and the aggregated results presented on a mobile communication facility 102. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a vendor may be selected in association with a sponsored link and the sponsored link downloaded to a mobile communication facility 102 in preparation for an implicit search. The vendor may be presented with an option of receiving further leads, such as phone or web leads. The content presented may be information relating to the location of the mobile communication facility 102, such as restaurants, entertainment, theaters, and show times. Information may also relate to the time of day, mobile subscriber characteristics 112, or parental controls 150. The content may include advertisements and may be stored locally on the mobile communication facility 102 (e.g., in the cache memory) and periodically updated according to the time of day and/or changes in location of the mobile communication facility 102.

In embodiments, a wireless carrier report may be generated in relation to outbound PPC marketing activities. The report may contain information relating to search result quality, keyword management, revenue generation, and may be segmented by the type of mobile communication facility 102 used.

In embodiments, a search query may be entered in a search box associated with a mobile communication facility 102, a vendor selected in association with a sponsored link, and the sponsored link presented on the mobile communication facility 102 in response to the search query. The vendor may be presented with an option of receiving further leads, such as phone or web leads.

In embodiments, a vendor may be selected in association with a sponsored link and presented the sponsored link on a mobile communication facility 102. The vendor may be presented with an option of receiving further leads, such as phone or web leads, and may be selected, in part, by information relating to the mobile communication facility 102.

In embodiments, a vendor may be selected in association with a sponsored link and the sponsored link presented on a mobile communication facility 102 in response to a query entered in a query entry 120 facility. The vendor may be presented with an option of receiving further leads, such as phone or web leads.

In embodiments, a search may be performed in conjunction with a search algorithm facility 144, a search result selected, and a vendor associated with the search result to form a sponsored link, and the sponsored link may be presented on a mobile communication facility 102. The vendor may be presented with an option of receiving further leads, such as phone or web leads.

In embodiments, content may be delivered from a delivery facility, a vendor associated with the content to form a sponsored link, and the sponsored link presented on a mobile communication facility 102.

In embodiments, a vendor may be selected in association with a sponsored link, where the selection is based at least in part on at least one mobile subscriber characteristic, and the sponsored link may be presented on a mobile communication facility 102. The vendor may be presented with an option of receiving further leads, such as phone or web leads. The mobile subscriber characteristics 112 may include location, personal information, history of the user's web interactions, or a plurality of characteristics, such as location and the time of day.

In embodiments, a search may be performed in conjunction with a location based facility, a search result selected, a vendor associated with the search result to form a sponsored link, and the sponsored link presented on a mobile communication facility 102. The vendor may be presented with an option of receiving further leads, such as phone or web leads. Location may be provided by a GPS system or a cell phone triangulation service.

In embodiments, a search may be performed in conjunction with a filter algorithm facility 144, a search result selected, a vendor associated with the search result to form a sponsored link, and the sponsored link presented on a mobile communication facility 102. The vendor may be presented with an option of receiving further leads, such as phone or web leads. The algorithm facility 144 may be a collaborative filter where the search is an open web search, or it may be a recommendation system.

In embodiments, results may be produced from a result facility, a vendor associated with the search result to form a sponsored link, and the sponsored link presented on a mobile communication facility 102. The vendor may be presented with an option of receiving further leads, such as phone or web leads.

In embodiments, a search may be performed using a mobile browser facility to facilitate the search, a search result selected, a vendor associated with the search result to form a sponsored link, and the sponsored link presented on a mobile communication facility 102. The vendor may be presented with an option of receiving further leads, such as phone or web leads.

In embodiments, a search may be performed in conjunction with a disambiguation facility 140, a search result selected, a vendor associated with the search result to form a sponsored link, and the sponsored link presented on a mobile communication facility 102. The vendor may be presented with an option of receiving further leads, such as phone or web leads. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a search may be performed in conjunction with a voice recognition facility 160, a search result selected, a vendor associated with the search result to form a sponsored link, and the sponsored link presented on a mobile communication facility 102. The vendor may be presented with an option of receiving further leads, such as phone or web leads. The voice recognition facility 160 may reside on the mobile communication facility 102, on a remote server, or, in part, on a mobile communication facility 102 and, in part, on a remote server.

In embodiments, a search may be performed in conjunction with information relating to a mobile communication facility 102, where the information relating to the mobile communication facility 102 resides in a data facility. A sponsor link may be formed by selecting a search result and associating a vendor with the search result. The sponsor link may be presented on a mobile communication facility 102. The vendor may be presented with an option of receiving further leads, such as phone or web leads. This information may reside locally on the mobile communication facility 102, or it may be stored remotely, for example in a mobile subscriber characteristics 112 database.

In embodiments, a search may be performed in conjunction with a parental control parameter, a search result selected, a vendor associated with the search result to form a sponsored link, and the sponsored link presented on a mobile communication facility 102. The vendor may be presented with an option of receiving further leads, such as phone or web leads. The parental control parameter may be regulated through a server application or through the mobile communication facility 102.

In embodiments, a search may be performed in conjunction with a privacy 152 facility, a search result selected, a vendor associated with the search result to form a sponsored link, and the sponsored link presented on a mobile communication facility 102. The vendor may be presented with an option of receiving further leads, such as phone or web leads.

In embodiments, a search may be performed in conjunction with a transactional security 154 facility, a search result selected, a vendor associated with the search result to form a sponsored link, and the sponsored link presented on a mobile communication facility 102. The vendor may be presented with an option of receiving further leads, such as phone or web leads. The transactional security 154 facility may be adapted to enable secure transactions associated with the query classification. The transactional security 154 facility may involve the protection of privacy 152 and may be operated in association with parental controls 150, digital rights management, or identity protection.

In embodiments, a search may be performed in conjunction with carrier business rules 130, a search result selected, a vendor associated with the search result to form a sponsored link, and the sponsored link presented on a mobile communication facility 102. The vendor may be presented with an option of receiving further leads, such as phone or web leads. Carrier business rules 130 may include walled garden results, presenting out of garden content, sponsor information, or auctions. Information relating to the mobile communication facility 102 may be mobile subscriber characteristic information.

In embodiments, a search may be performed in conjunction with a sponsored facility, a search result selected, a vendor associated with the search result to form a sponsored link, and the sponsored link presented on a mobile communication facility 102. The vendor may be presented with an option of receiving further leads, such as phone or web leads. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a wireless carrier report may be generated in relation to implicit search results. The report may contain information relating to the success of the implicit search (e.g., based upon click activity and related searches), search result quality, keyword management, revenue generation, and it may be segmented by the type of mobile communication facility 102 used.

In embodiments, a result may be downloaded to a mobile communication facility 102, where the result is selected based, in part, on information relating to the mobile communication facility 102. Following this, a search may be performed on the mobile communication facility 102 and the results presented in response to the search entered in a search box on a mobile communication facility 102. The information relating to the mobile communication facility 102 may be mobile subscriber characteristic information, such as location and time of day or a user interface. The user interface may be adapted to facilitate a user's selection of what type of results to download or further adapted to facilitate the selection of at least one of keywords and other information to select the results to download automatically.

In embodiments, a result may be downloaded to a mobile communication facility 102, where the result is selected based at least in part on information relating to the mobile communication facility 102. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to the mobile communication facility 102. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to a search algorithm facility 144. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to a delivery facility. Following this, a search may be performed on the mobile communication facility 102 and the results presented in response to the search entered in a search box on a mobile communication facility 102.

In embodiments, a result may be downloaded to a mobile communication facility 102, wherein the result is selected based at least in part on information relating to a mobile subscriber characteristic. Following this, a search may be performed on the mobile communication facility 102 and the results presented in response to the search entered in a search box on a mobile communication facility 102. The mobile subscriber characteristics 112 may include location, personal information, history of the user's web interactions, or a plurality of characteristics, such as location and the time of day.

In embodiments, a result may be downloaded to a mobile communication facility 102, where the result is selected based, in part, on information relating to a location as determined by a location based service. Location may be provided by a GPS system or a cell phone triangulation service. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to a filter algorithm facility 144. The algorithm facility 144 may be a collaborative filter where the search is an open web search, or it may be a recommendation system. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to a results facility 148. Following this, a search may be performed on the mobile communication facility 102 and the results presented in response to the search entered in a search box on a mobile communication facility 102.

In embodiments, a result may be downloaded to a mobile communication facility 102, where the result is selected based at least in part on information relating to the mobile communication facility 102. Following this, a search may be performed on the mobile communication facility 102 and the results presented in response to the search entered in a search box on a mobile communication facility 102. The presentation may be facilitated by a mobile browser facility.

In embodiments, a result may be downloaded to a mobile communication facility 102, where the result is selected based at least in part on information relating to the mobile communication facility 102. Following this, a search may be performed on the mobile communication facility 102 and the results presented in response to the disambiguated search. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a result may be downloaded to a mobile communication facility 102, where the result is selected based, in part, on information relating to the voice recognition facility 160 of the mobile communication facility 102. Following this, a search may be performed on the mobile communication facility 102 and the results presented in response to the search. The voice recognition facility 160 may reside on the mobile communication facility 102, on a remote server, or, in part, on a mobile communication facility 102 and, in part, on a remote server.

In embodiments, a result may be downloaded to a mobile communication facility 102, where the result is selected based, in part, on information relating to the mobile communication facility 102. This information may reside locally on the mobile communication facility 102, or it may be stored remotely, for example in a mobile subscriber characteristics 112 database. Following this, a search may be performed on the mobile communication facility 102 and the results presented in response to the search In embodiments, a result may be downloaded to a mobile communication facility 102, where the result is selected based, in part, on information relating to a parental control parameter. The parental control parameter may be regulated through a server application or through the mobile communication facility 102. Following this, a search may be performed on the mobile communication facility 102 and the results presented in response to the search.

In embodiments, a result may be downloaded to a mobile communication facility 102, where the result is selected based, in part, on information relating to a privacy 152 parameter.

In embodiments, a result may be downloaded to a mobile communication facility 102, where the result is selected based, in part, on information relating to the mobile communication facility 102. A search may be performed on the mobile communication facility 102 and the result associated with a transactional security facility 154. The transactional security 154 facility may involve the protection of privacy 152 and may be operated in association with parental controls 150, digital rights management, or identity protection.

In embodiments, a result may be downloaded to a mobile communication facility 102, where the result is selected based at least in part on information relating to carrier business rules 130, a search performed on a mobile communication facility 102, and the result presented in response to the search. Carrier business rules 130 may include walled garden results, presenting out of garden content, sponsor information, or auctions. Information relating to the mobile communication facility 102 may be mobile subscriber characteristic information.

In embodiments, a result may be downloaded to a mobile communication facility 102, where the result is selected based at least in part on information relating to a sponsor facility, a search performed on a mobile communication facility 102, and the result presented in response to the search. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a search query may be entered in a search box on a mobile communicating facility and a syndicated advertising result produced. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a search query may be entered in a query entry 120 facility on a mobile communication facility 102 and a syndicated advertising result produced. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102, where the syndicated advertising results are produced in association with a search algorithm facility 144. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102, where the syndicated advertising result is produced in association with a delivery facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102, where the syndicated advertising result is produced in association with mobile subscriber characteristic information. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The mobile subscriber characteristics 112 may include location, personal information, history of the user's web interactions, or a plurality of characteristics, such as location and the time of day.

In embodiments, a syndicated advertising result may be produced on a mobile communication facility 102, where the syndicated advertising result is produced in association with a location as determined through the use of a location based service. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. Location may be provided by a GPS system or a cell phone triangulation service.

In embodiments, a syndicated advertising result may be produced on a mobile communication facility 102, where the syndicated advertising result is produced in association with a filter algorithm facility 144. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The algorithm facility 144 may be a collaborative filter where the search is an open web search, or it may be a recommendation system.

In embodiments, a syndicated advertising result may be produced on a mobile communication facility 102, where the syndicated advertising result is produced in association with a results facility 148. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102, where the syndicated advertising result is produced in association with a mobile browser facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112.

In embodiments, a syndicated advertising result may be produced on a mobile communication facility 102, where the syndicated advertising result is produced in association with a search query processed through a disambiguation facility 140. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a syndicated advertising result may be produced on a mobile communication facility 102, where the syndicated advertising result is produced in association with a query entered through a voice recognition facility 160. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The voice recognition facility 160 may reside on the mobile communication facility 102, on a remote server, or, in part, on a mobile communication facility 102 and, in part, on a remote server.

In embodiments, a syndicated advertising result may be produced on a mobile communication facility 102, where the syndicated advertising result is produced in association with information relating to the mobile communication facility 102. The information relating to the mobile communication facility 102 may be stored in a data facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. This information related to the mobile communication facility 102 may reside locally on the mobile communication facility 102, or it may be stored remotely, for example in a mobile subscriber characteristics 112 database.

In embodiments, a syndicated advertising result may be produced on a mobile communication facility 102, where the syndicated advertising result is produced in association with a parental control parameter. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The parental control parameter may be regulated through a server application or through the mobile communication facility 102.

In embodiments, a syndicated advertising result may be produced on a mobile communication facility 102 where the syndicated advertising result is produced in association with a privacy 152 facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The privacy facility 152 may be adapted to provide secure search transaction and secure economic transactions.

In embodiments, a syndicated advertising result may be produced on a mobile communication facility 102, where the syndicated advertising result is associated with a transactional security 154 facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. The transactional security 154 facility may involve the protection of privacy 152 and may be operated in association with parental controls 150, digital rights management, or identity protection.

In embodiments, a syndicated advertising result may be produced on a mobile communication facility 102, where the syndicated advertising result is produced in association with a carrier's business rules. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. Carrier business rules 130 may include walled garden results, presenting out of garden content, sponsor information, or auctions. Information relating to the mobile communication facility 102 may be mobile subscriber characteristic information.

In embodiments, a syndicated advertising result may be produced on a mobile communication facility 102, where the syndicated advertising result is produced in association with a sponsor facility. The syndicated advertising result may be displayed on a mobile communication facility 102 as a sponsored link. Syndicated advertising may be placed in, and prioritized within, the result set on the basis of an auction among sponsors. Furthermore, the auction may be associated with information relating to the mobile communication facility 102, such as mobile subscriber characteristics 112. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a search query entry 120 facility may be associated with a mobile communication facility 102 where the search query entry 120 facility is further associated with information relating to the mobile communication facility 102, such as mobile subscriber characteristic information.

In embodiments, a search algorithm facility 144 may be associated with a mobile communication facility 102 where the search algorithm facility 144 is further associated with information relating to the mobile communication facility 102.

In embodiments, a results delivery facility may be associated with a mobile communication facility 102 where the delivery facility is further associated with information relating to the mobile communication facility 102.

In embodiments, a search may be performed on a mobile communication facility 102, where the search is at least in part based on a mobile subscriber characteristic. The mobile subscriber characteristics 112 may include location, personal information, history of the user's web interactions, or a plurality of characteristics, such as location and the time of day.

In embodiments, a search may be performed on a mobile communication facility 102, where the search is at least in part based on a location as determined by a location based service. Location may be provided by a GPS system or a cell phone triangulation service.

In embodiments, a search may be performed on a mobile communication facility 102, where the search is, in part, based on a location as determined by a location based service. Location may be provided by a GPS system or a cell phone triangulation service. A search may also be performed on a mobile communication facility 102, where the search is at least in part based on a filter algorithm facility 144. The algorithm facility 144 may be a collaborative filter where the search is an open web search, or it may be a recommendation system.

In embodiments, a results facility 148 may be associated with a mobile communication facility 102, where the results facility 148 is adapted to produce results, in part, based on information relating to the mobile communication facility 102.

In embodiments, a mobile browser facility may be associated with a mobile communication facility 102, where the mobile browser facility is adapted to facilitate the selection of results, in part, based on information relating to the mobile communication facility 102.

In embodiments, a disambiguation facility 140 may be associated with a mobile communication facility 102. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a voice recognition search query entry 120 facility may be associated with a mobile communication facility 102. The voice recognition facility 160 may reside on the mobile communication facility 102, on a remote server, or, in part, on a mobile communication facility 102 and, in part, on a remote server.

In embodiments, a data facility may be associated with a mobile communication facility 102, where the data facility stores information relating to the mobile communication facility 102 and the data facility is adapted to be accessed in relation to providing search results to the mobile communication facility 102. The data facility may reside locally on the mobile communication facility 102, or it may be stored remotely, for example in a mobile subscriber characteristics 112 database.

In embodiments, a parental control facility may be associated with a mobile communication facility 102. The parental control parameter may be regulated through a server application or through the mobile communication facility 102.

In embodiments, a privacy facility 152 may be associated with a mobile communication facility 102. The privacy facility 152 may be adapted to provide secure search transactions and secure economic transactions.

In embodiments, a transactional security facility 154 may be associated with a mobile communication facility 102, where the transactional security facility 154 is adapted to provide secure transactions associated with search results obtained on the mobile communication facility 102. The transactional security facility 154 may involve the protection of privacy 152 and may be operated in association with parental controls 150, digital rights management, or identity protection.

In embodiments, a carrier business rule facility may be associated with a mobile communication facility 102, where the carrier business rule facility is adapted to be accessed in the process of providing search results to the mobile communication facility 102. Carrier business rules 130 may include walled garden results, presenting out of garden content, sponsor information, or auctions. Information relating to the mobile communication facility 102 may be mobile subscriber characteristic information.

In embodiments, a sponsor facility may be associated with a mobile communication facility 102, where the sponsor facility is adapted to be accessed in the process of providing results to the mobile communication facility 102. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a search query may be entered on a search query entry 120 facility associated with a mobile communication facility 102 and a search performed through a search algorithm facility 144. The search may be based, in part, on information relating to the mobile communication facility 102, such as mobile subscriber characteristic information.

In embodiments, a search may be performed through a search algorithm facility 144, where the search is based, in part, on information relating to a mobile communication facility 102 and delivers search results through the use of a delivery facility.

In embodiments, a search may be performed through a search algorithm facility 144, where the search is based at least in part on mobile subscriber characteristic information. The mobile subscriber characteristics 112 may include location, personal information, history of the user's web interactions, or a plurality of characteristics, such as, location and the time of day.

In embodiments, a search may be performed through a search algorithm facility 144, where the search is based at least in part on a location as determined through the use of a location based facility. The search may be further based on information relating to the mobile communication facility 102, such as mobile subscriber characteristics 112. Location may be provided by a GPS system or a cell phone triangulation service.

In embodiments, a search may be performed through a search algorithm facility 144 associated with a mobile communication facility 102, where the search is based at least in part on information relating to a filter algorithm facility 144. The algorithm facility 144 may be a collaborative filter where the search is an open web search, or it may be a recommendation system.

In embodiments, a search may be performed through a search algorithm facility 144 associated with a mobile communication facility 102 and produce search results from a results facility 148. The search may be based on information relating to the mobile communication facility 102, such as mobile subscriber characteristics 112.

In embodiments, a search may be performed through a search algorithm facility 144, where the search is facilitated through a mobile browser facility. The search may be based on information relating to the mobile communication facility 102, such as mobile subscriber characteristics 112.

In embodiments, a search may be performed through a search algorithm facility 144 associated with a mobile communication facility 102, where the search is based at least in part on a search query processed through a disambiguation facility 140. The search may be based on information relating to the mobile communication facility 102, such as mobile subscriber characteristics 112. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a search may be performed through a voice recognition facility 160 associated with a mobile communication facility 102 and a search performed through a search algorithm facility 144. The search may be based on information relating to the mobile communication facility 102, such as mobile subscriber characteristics 112. The voice recognition facility 160 may reside on the mobile communication facility 102, on a remote server, or, in part, on a mobile communication facility 102 and, in part, on a remote server.

In embodiments, a search may be performed through a search algorithm facility 144, where the search is based, in part, on information relating to the mobile communication facility 102 and resides in a data facility. The data facility may reside locally on the mobile communication facility 102, or it may be stored remotely, for example in a mobile subscriber characteristics 112 database.

In embodiments, a search may be performed through a search algorithm facility 144 associated with a mobile communication facility 102, where the search is based, in part, on a parental control parameter. The parental control parameter may be regulated through a server application or through the mobile communication facility 102.

In embodiments, a search may be performed through a search algorithm facility 144, where the search is based at least in part on a privacy facility 152. The privacy facility 152 may be adapted to provide secure search transactions and secure economic transactions.

In embodiments, a search may be performed through a search algorithm facility 144, where a search result based on the search is associated with a transactional security facility 154. The transactional security facility 154 may involve the protection of privacy 152 and may be operated in association with parental controls 150, digital rights management, or identity protection.

In embodiments, a search may be performed through a search algorithm facility 144, where the search is based at least in part on carrier business rules 130. Carrier business rules 130 may include walled garden results, presenting out of garden content, sponsor information, or auctions. Information relating to the mobile communication facility 102 may be mobile subscriber characteristic information.

In embodiments, a search may be performed through a search algorithm facility 144, where the search is related to a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a search may be performed based, in part, on a mobile subscriber characteristics 112 facility, where the search is further based, in part, on a location as determined by a location based service. Location may be provided by a GPS system or a cell phone triangulation service.

In embodiments, a search may be performed based, in part, on a mobile subscriber characteristics 112 facility, where the search is further based at least in part on a filter algorithm facility 144. The algorithm facility 144 may be a collaborative filter where the search is an open web search, or it may be a recommendation system.

In embodiments, a search may be performed based, in part, on a mobile subscriber characteristics facility 112 and produce results related to the search from a results facility 148.

In embodiments, a search may be performed based, in part, on a mobile subscriber characteristics facility 112, where the search is facilitated through the use of a mobile browser facility.

In embodiments, a search may be performed based, in part, on a mobile subscriber characteristics facility 112, where the search is further based at least in part on a disambiguated search query. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a search may be performed based, in part, on a mobile subscriber characteristics facility 112, where the search is further based, in part, on a search query processed through a voice recognition facility 160. The voice recognition facility 160 may reside on the mobile communication facility 102, on a remote server, or, in part, on a mobile communication facility 102 and, in part, on a remote server.

In embodiments, a search may be performed based, in part, on a mobile subscriber characteristics facility 112, where the mobile subscriber characteristics 112 facility stores information in a data facility. The data facility may reside locally on the mobile communication facility 102, or it may be stored remotely, for example in a mobile subscriber characteristics database 112.

In embodiments, a search may be performed based, in part, on a mobile subscriber characteristics facility 112, where the search is further based at least in part on a parental control parameter. The parental control parameter may be regulated through a server application or through the mobile communication facility 102.

In embodiments, a search may be performed based, in part, on a mobile subscriber characteristics facility 112, where the search is further based, in part, on a privacy facility 152.

In embodiments, a search may be performed based, in part, on a mobile subscriber characteristics facility 112, where a search result produced in response to the search is associated with a transactional security facility 154. The transactional security facility 154 may involve the protection of privacy 152 and may be operated in association with parental controls 150, digital rights management, or identity protection.

In embodiments, a search may be performed based, in part, on a mobile subscriber characteristics facility 112, where the search is further based, in part, on a carrier business rule. Carrier business rules 130 may include walled garden results, presenting out of garden content, sponsor information, or auctions. Information relating to the mobile communication facility 102 may be mobile subscriber characteristic information.

In embodiments, a search may be performed based, in part, on a mobile subscriber characteristics facility 112, where a result produced in response to the search is associated with a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, the user of a mobile communication facility may use the query facility of the mobile communication facility to search for radio and or television programming. The search result may provide a schedule list of current and or upcoming programs. The search result may provide links to listen to and or view the radio or television content. The search result may provide a means for selecting a radio or television program to be recorded. The mobile communication facility may be adapted to permit the query facility to play, pause, rewind, or fast-forward the radio or television content.

In embodiments, a mobile communication facility 102 may be located through the use of a location based service and the location used in association with a filter algorithm facility 144 to perform a search. The algorithm facility 144 may be a collaborative filter where the search is an open web search, or it may be a recommendation system.

In embodiments, a mobile communication facility 102 may be located through the use of a location based service and the location used in association with a result facility to obtain search results.

In embodiments, a mobile communication facility 102 may be located through the use of a location based service and the location used in association with a mobile browser facility to obtain search results.

In embodiments, a mobile communication facility 102 may be located through the use of a location based service and the location used in association with a disambiguation facility 140 to obtain search results. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a mobile communication facility 102 may be located through the use of a location based service and the location used in association with a voice recognition facility 160 to obtain search results. The voice recognition facility 160 may reside on the mobile communication facility 102, on a remote server, or, in part, on a mobile communication facility 102 and, in part, on a remote server.

In embodiments, a mobile communication facility 102 may be located through the use of a location based service and the location used in association with a data facility to obtain search results. The data facility may reside locally on the mobile communication facility 102, or it may be stored remotely, for example, in a mobile subscriber characteristics 112 database.

In embodiments, a mobile communication facility 102 may be located through the use of a location based service and the location used in association with a parental control facility to obtain search results. The parental control parameter may be regulated through a server application or through the mobile communication facility 102.

In embodiments, a mobile communication facility 102 may be located through the use of a location based service and the location used in association with a privacy 152 facility to obtain search results. The privacy 152 facility may be adapted to provide secure search transactions or secure economic transactions.

In embodiments, a mobile communication facility 102 may be located through the use of a location based service and the location used in association with a search facility 142 to obtain a search result, where the search result is associated with a transactional security 154 facility. The transactional security 154 facility may involve the protection of privacy 152 and may be operated in association with parental controls 150, digital rights management, or identity protection.

In embodiments, a mobile communication facility 102 may be located through the use of a location based service and the location used in association with a carrier business rule to obtain search results. Carrier business rules 130 may include walled garden results, presenting out of garden content, sponsor information, or auctions. Information relating to the mobile communication facility 102 may be mobile subscriber characteristic information.

In embodiments, a mobile communication facility 102 may be located through the use of a location based service and the location used in association with a sponsor facility to obtain search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a filter algorithm facility 144 may be associated with a mobile communication facility 102 and the filter algorithm facility 144 may be used in the process of obtaining a search result.

In embodiments, a filter algorithm facility 144 may be associated with a mobile browser facility and the filter algorithm facility 144 used in the process of obtaining a search result.

In embodiments, a filter algorithm facility 144 may be associated with a mobile communication facility 102 and a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a filter algorithm facility 144 may be associated with a mobile communication facility 102 and a voice recognition facility 160. The voice recognition facility 160 may reside on the mobile communication facility 102, on a remote server, or, in part, on a mobile communication facility 102 and, in part, on a remote server.

In embodiments, a filter algorithm facility 144 may be associated with a mobile communication facility 102 and a data facility. The data facility may reside locally on the mobile communication facility 102, or it may be stored remotely, for example, in a mobile subscriber characteristics 112 database.

In embodiments, a filter algorithm facility 144 may be associated with a mobile communication facility 102 and a parental control facility. The parental control parameter may be regulated through a server application or through the mobile communication facility 102.

In embodiments, a filter algorithm facility 144 may be associated with a mobile communication facility 102 and a privacy 152 facility. The privacy 152 facility may be adapted to provide secure search transactions or secure economic transactions.

In embodiments, a filter algorithm facility 144 may be associated with a mobile communication facility 102 and a transactional security facility 154. The transactional security facility 154 may involve the protection of privacy 152 and may be operated in association with parental controls 150, digital rights management, or identity protection.

In embodiments, a filter algorithm facility 144 may be associated with a mobile communication facility 102 and a carrier business rule. Carrier business rules 130 may include walled garden results, presenting out of garden content, sponsor information, or auctions. Information relating to the mobile communication facility 102 may be mobile subscriber characteristic information.

In embodiments, a filter algorithm facility 144 may be associated with a mobile communication facility 102 and a sponsor facility. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a mobile browser facility may be associated with a disambiguation facility 140. Disambiguation of the query may take place on the mobile communication facility 102 or on a server application. Disambiguation may involve SMS translation, a spell check algorithm, a spell check table, a phonetic spelling algorithm, a phonetic spelling table, or a numeric keypad word translation.

In embodiments, a mobile browser facility may be associated with a voice recognition facility 160, and the mobile browser facility may be used in the process of obtaining search results. Additionally, a filter algorithm facility 144 may be used in the process of obtaining results. The voice recognition facility 160 may reside on the mobile communication facility 102, on a remote server, or, in part, on a mobile communication facility 102 and, in part, on a remote server.

In embodiments, a mobile browser facility may be associated with a data facility, where information relating to a mobile communication is stored in an associated data facility. The data facility may reside locally on the mobile communication facility 102, or it may be stored remotely, for example in a mobile subscriber characteristics 112 database.

In embodiments, a mobile browser facility may be associated with a parental control facility, and the mobile browser facility may be used in the process of obtaining search results. The parental control parameter may be regulated through a server application or through the mobile communication facility 102.

In embodiments, a mobile browser facility may be associated with a privacy 152 facility, and the mobile browser facility may be used in the process of obtaining search results. The privacy 152 facility may be adapted to provide secure search transactions or secure economic transactions.

In embodiments, a mobile browser facility may be associated with a transactional security facility 154. The transactional security facility 154 may involve the protection of privacy 152 and may be operated in association with parental controls 150, digital rights management, or identity protection.

In embodiments, a mobile browser facility may be associated with a carrier business rules facility 130. Carrier business rules 130 may include walled garden results, presenting out of garden content, sponsor information, or auctions. Information relating to the mobile communication facility 102 may be mobile subscriber characteristic information.

In embodiments, a mobile browser facility may be associated with a sponsor facility, and the mobile browser facility may be used in the process of obtaining search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a disambiguation facility 140 may be associated with a voice recognition facility 160 and a mobile communication facility 102, and a disambiguation facility 140 or algorithm facility 144 may be used in the process of obtaining search results. The voice recognition facility 160 may reside on the mobile communication facility 102, on a remote server, or, in part, on a mobile communication facility 102 and, in part, on a remote server.

In embodiments, a disambiguation facility 140 may be associated with a voice data facility, where information relating to a mobile communication facility 102 is stored in the data facility. The data facility may reside locally on the mobile communication facility 102 or it may be stored remotely, for example in a mobile subscriber characteristics 112 database.

In embodiments, a disambiguation facility 140 may be associated with a voice parental control facility and a mobile communication facility 102, and the disambiguation facility 140 may be used in the process of obtaining search results. The parental control parameter may be regulated through a server application or through the mobile communication facility 102.

In embodiments, a disambiguation facility 140 may be associated with a voice privacy 152 facility and a mobile communication facility 102, and the disambiguation facility 140 may be used in the process of obtaining search results. The privacy 152 facility may be adapted to provide secure search transactions or secure economic transactions.

In embodiments, a disambiguation facility 140 may be associated with a voice transactional security facility 154 and a mobile communication facility 102, and the disambiguation facility 140 may be used in the process of obtaining search results. The transactional security facility 154 may involve the protection of privacy 152 and may be operated in association with parental controls 150, digital rights management, or identity protection.

In embodiments, a disambiguation facility 140 may be associated with a voice carrier rules facility and a mobile communication facility 102, and the disambiguation facility 140 may be used in the process of obtaining search results. Carrier business rules 130 may include walled garden results, presenting out of garden content, sponsor information, or auctions. Information relating to the mobile communication facility 102 may be mobile subscriber characteristic information.

In embodiments, a disambiguation facility 140 may be associated with a voice sponsor facility and a mobile communication facility 102, and the disambiguation facility 140 may be used in the process of obtaining search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a voice recognition facility 160 may be associated with a data facility, where information relating to a mobile communication facility 102 is stored in the data facility, and the voice recognition facility 160 is used in the process of obtaining search results. The data facility may reside locally on the mobile communication facility 102, or it may be stored remotely, for example, in a mobile subscriber characteristics 112 database.

In embodiments, a voice recognition facility 160 may be associated with a parental control facility and a mobile communication facility 102, and the voice recognition facility 160 may be used in the process of obtaining search results. The parental control parameter may be regulated through a server application or through the mobile communication facility 102.

In embodiments, a voice recognition facility 160 may be associated with a privacy facility 152 and a mobile communication facility 102, and the voice recognition facility 160 may be used in the process of obtaining search results. The privacy facility 152 may be adapted to provide secure search transactions or secure economic transactions.

In embodiments, a voice recognition facility 160 may be associated with a transactional control facility and a mobile communication facility 102, and the voice recognition facility 160 may be used in the process of obtaining search results. The transactional security facility 154 may involve the protection of privacy 152 and may be operated in association with parental controls 150, digital rights management, or identity protection.

In embodiments, a voice recognition facility 160 may be associated with a carrier business rules 130 facility and a mobile communication facility 102, and the voice recognition facility 160 may be in the process of obtaining search results. Carrier business rules 130 may include walled garden results, presenting out of garden content, sponsor information, or auctions. Information relating to the mobile communication facility 102 may be mobile subscriber characteristic information.

In embodiments, a voice recognition facility 160 may be associated with a sponsor facility and a mobile communication facility 102, and the voice recognition facility 160 may be used in the process of obtaining search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a parental control facility may be associated with a privacy 152 facility and a mobile communication facility 102 and use the parental control facility in the process of obtaining search results. The privacy 152 facility may be adapted to provide secure search transactions or secure economic transactions.

In embodiments, a parental control facility may be associated with a transactional security facility 154 and a mobile communication facility 102, and the parental control facility may be used in the process of obtaining search results. The transactional security facility 154 may involve the protection of privacy 152 and may be operated in association with parental controls 150, digital rights management, or identity protection.

In embodiments, a parental control facility may be associated with a carrier business rules 130 facility and a mobile communication facility 102, and the parental control facility may be used in the process of obtaining search results. Carrier business rules 130 may include walled garden results, presenting out of garden content, sponsor information, or auctions. Information relating to the mobile communication facility 102 may be mobile subscriber characteristic information.

In embodiments, a parental control facility may be associated with a sponsor facility and a mobile communication facility 102, and the parental control facility may be used in the process of obtaining search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, a privacy 152 facility may be associated with a transactional security 154 facility and a mobile communication facility 102, and the privacy 152 facility may be used in the process of obtaining search results. The transactional security facility 154 may involve the protection of privacy 152 and may be operated in association with parental controls 150, digital rights management, or identity protection.

In embodiments, a privacy 152 facility may be associated with a carrier business rules 130 facility and a mobile communication facility 102, and the privacy 152 facility may be used in the process of obtaining search results. Carrier business rules 130 may include walled garden results, presenting out of garden content, sponsor information, or auctions. Information relating to the mobile communication facility 102 may be mobile subscriber characteristic information.

In embodiments, a privacy 152 facility may be associated with a sponsor facility and a mobile communication facility 102, and the privacy 152 facility may be used in the process of obtaining search results. Sponsor results may be paid inclusion results, auction results, or pay-per-click results (in connection with a WAP site or a phone number). A sponsor of the sponsored result may receive compensation as a result of activity associated with a mobile communication facility 102 phone number. The presentation of the sponsored results may be formatted as a link or presented as text, as a picture, as a video, or as an interactive application. Content may be formatted for the mobile communication facility 102 and relate to webpage content or links for syndicated advertisements.

In embodiments, mobile communication facility 102 compatible content may be identified by tracking a plurality of web interactions from a mobile user device and storing information pertaining to the web interaction in a database, where at least a portion of the information comprises identification of the mobile device. The prediction of compatibility of the mobile communication facility 102 with content related to the web interaction may be based, in part, on how many interactions there were in the user's past. Content may be a download, program, file, executable file, zipped file, compressed file, audio, and video. A web interaction may be a click on a hyperlink, an indication to download content, and/or an indication to download a program. Prediction includes a prediction of compatibility when the number of interactions exceeds one or when the number of interactions exceeds two, and it may be further based on the time of each interaction. The identification of the mobile communication facility 102 may be, in part, based on an associated phone number that is also associated with a user. A mobile communication facility 102 may be a cell phone, satellite phone, PDA, combination PDA/cell phone, web device, and/or web appliance.

In embodiments, a method of determining mobile communication facility 102 compatible content may include tracking a plurality of mobile communication facility 102 interactions with network content. Information may be stored pertaining to the web interactions in a database, where a portion of the information comprises identification of at least one mobile communication facility 102 from the plurality of mobile communication facilities and predicts the compatibility of the mobile communication facility 102 with the network content based, in part, on how many content interactions there were. The prediction of compatibility of the mobile communication facility 102 with content related to the web interaction may be based, in part, on how many interactions there were in the user's past. Content may be a download, program, file, executable file, zipped file, compressed file, audio, and video. A web interaction may be a click on a hyperlink, an indication to download content, and/or an indication to download a program. Prediction includes a prediction of compatibility when the number of interactions exceeds one or when the number of interactions exceeds two, and it may be further based on the time of each interaction. The identification of the mobile communication facility 102 may be, in part, based on an associated phone number, that is also associated with a user. A mobile communication facility 102 may be a cell phone, satellite phone, PDA, combination PDA/cell phone, web device, and/or web appliance.

In embodiments, a method of determining mobile communication facility 102 compatible content may include identifying a mobile communication facility 102 by its association with a phone number, identifying a first network content interaction of the mobile device, and identifying a second network content interaction of the mobile device, wherein the second interaction is associated with the first interaction. The prediction of compatibility of the first network content with the mobile communication facility 102 may be based, in part, on the existence of the second interaction. The first interaction may be downloading content from a website, interacting with a website, downloading a program, viewing video (streaming video or downloading a video file), or listening to audio (streaming audio or downloaded audio files or music).

In embodiments, a method of providing a mobile communication facility 102 compatible content may include collecting click histories from a plurality of mobile content users, analyzing the click histories for repeat user visits, analyzing the repeat user visits for type of mobile communication facility 102 used, and generating a list of repeat user visited sites on corresponding mobile communication facilities to create a compatibility list. The type of mobile communication facility 102 may be identified, in part, from an associated phone number. The click histories may be collected by the wireless provider 108, processed as a batch, processed in real-time, or processed in quasi-time. This method may be used to develop a user specific content compatibility list which may be stored on the user's mobile communication facility 102 or stored on a server.

In embodiments, a method for providing only device compatible search results to a mobile communication facility 102 may include deriving compatibility from web interactions of similar mobile communication facilities.

In embodiments, a method for providing verified device search results compatible with a mobile communication facility 102 may include verified device compatible results that are highlighted on a user interface of the mobile communication facility 102.

In embodiments, a method for locating a mobile communication facility 102 may include providing a personal search filter, searching for information on a network using the mobile communication facility 102, or providing results based, in part, on the mobile communication facility 102 location and the personal search filter. The personal search filter may reside within the mobile communication facility 102, on a server, or on a network (e.g., the Internet). A personal search filter may be a collaborative filter and may also include at least two sub filters, such as filters related to personal information, business information, selectable filters, or filters based, in part, on the time of day or time of year. Personal filters may be configurable to include a local services search engine, a local product search engine, a business search engine, personal search engine, travel search engine, financial search engine, news search engine, video search engine, music search engine, and/or restaurant search engine. The mobile communication facility 102 may be a cell phone, satellite phone, PDA, combination PDA/cell phone, web device, and web appliance. The mobile communication facility 102 may include an SMS search interface, a voice recognition search interface, or wireless applications protocol. The search may be performed, in part, through a carrier website or through a carrier partner's website.

In embodiments, a method may be used for searching for network content using a mobile communication facility 102, where the mobile communication facility 102 connects to a network through a wireless communications service provider and is provided search results. A portion of the search results may be from an open network search and another portion of the search results may be based on content controlled by the wireless communications service provider. Search results may be provided in a predetermined order, where the predetermined order places the search results based on content controlled by the wireless communications service provider first. The method may also include highlighting the search results based on content controlled by the wireless provider 108, where the highlighted results are provided first. The content controlled by the wireless communications service provider may include ringtones, video, music video, music, music formatted for download, and video games. The content may be transcoded for wireless communication facilities in general or for specific wireless communication facilities. Transcoded content may be highlighted on a user interface of the wireless communication facility 104. The method may also include highlighting the open network search results and highlighting sponsor links, where the sponsored links are paid inclusion links (e.g., resulting from a competitive bid auction process). A mobile communication facility 102 may be a cell phone, satellite phone, PDA, combination PDA/cell phone, web device, and/or web appliance.

In embodiments, a method may be used for providing walled garden search results and open network search results to a mobile communication facility 102 as a result of a search performed on the mobile communication facility 102. The walled garden search results may be highlighted and listed prior to other content. The walled garden search results may include provider content that is not included within an initial amount of content provided from the open network search results, where the provider content includes music, games, video, ringtones, downloads, or other content adapted for purchase.

In embodiments, a method of optimizing search results for mobile users may include tracking the on-line interactions of a mobile communication facility 102, where the tracking involves, in part, identifying an identification number associated with the mobile communication facility 102, generating a filter based, in part, on the tracked on-line interactions, and applying the filter to a search performed on the mobile communication facility 102. The identification number may include a phone number. The tracked on-line information may include tracking clicks, clickthroughs, queries, clicks following queries, WAP sites visited, WAP portals visited, information reviewed from a DEC directory (e.g., a carrier's catalog), information reviewed from a billing history associated with a user, information about payment methods, purchases, payment timing, timing of online interactions and/or the location, and speed and direction of the mobile communication facility 102 at the time of the online interaction.

Filters may include a collaborative filter, personal filter, a filter generated through a click analysis, a filter based, in part, on carrier information associated with a mobile communication facility 102, a filter based on payment method for a carrier service (e.g., pre-payment or post-payment), a filter based on the type of mobile communication facility 102 used (cell phone, PDA, etc.), and/or a filter based on demographics. Filters may also be generated, in part, based upon information specific to a user's mobile communication facility 102, for example whether it has address book information, SMS logs, email logs, or IM logs. The descriptive information stored regarding the mobile communication facility 102 may include the cost of the facility and information about whether it has a music player as a primary function, a video player as a primary function, an instant messenger or chat facility as a primary function, and whether it is a type that is marketed to a particular customer demographic (e.g., children, young adults, adults).

In embodiments, the mobile communication facility 102 may be able to update an address book. For example users may add white pages and business listings to their address book. Businesses may be charged an additional fee for the permanent adding of a listing to a local address book.

The interactions of the mobile communication facility 102 may be tracked and stored on a server, where the stored information is transferable between carriers. Similarly, filters may be stored on a server in a manner that permits their transfer between carriers and/or between mobile communication facilities.

In embodiments, the presence of an application on a mobile communication facility 102 may be enhanced by working with the wireless provider 108.

In embodiments, mobile wallet/billing-on-behalf-of may be enabled to allow users to make purchases at paid search and shopping comparison vendors.

In embodiments, data feed files may be pushed by the wireless provider 108 to a provided FTP location. This may trigger the feed processing. Data feed files may be pulled from a wireless provider 108—supplied FTP location. This may be done on a predefined schedule.

In embodiments, deck content may be used for indexing via spidering. Spidering is the process of traversing web pages, WAP pages, or other online content in an automated fashion and extracting relevant content. A spider may start at one or more root nodes and traverse the links from those pages following a set of rules. Spidering may occur on a predefined schedule and may be invoked manually when requested by the wireless provider 108. The wireless provider 108 may also request a manual spidering run if an immediate update is necessary, or if specific links or locations are identified for additional searching. A spider may traverse a WAP deck and retrieve the necessary metadata from which a search index is built. If the WAP page for a content item enumerates comprehensive mobile communication facility 102 compatibility information, the information may be retrieved and indexed. If the WAP pages are restricted to only handsets which are compatible, the spider may emulate each known mobile communication facility 102 type to derive compatibility information.

For a WAP deck search, the wireless provider 108 may provide one or more entry points to the spider. This may be a list of one or more URLs representing content roots. The wireless provider 108 may provide the necessary access privileges to the WAP pages. This may entail providing information about private headers (e.g., X-Request) that may be supplied with the HTTP requests for authentication purposes or configuring the mobile application gateway such that a spider may pass through.

In embodiments, data received from the wireless provider 108 via a data feed or spidering may be maintained on equipment which is not accessible to unauthorized personnel. Thus, this data may not be directly accessible to end users. Metadata may be extracted, and indexes prepared, from this data, which may in turn be deployed in a production environment for use with services.

In embodiments, quality assurance of the platform may be attained through unit tests, integration tests, automated regression tests for resolved issues, and/or manual testing of mobile communication facilities 102. Testing of the platform servers may be accomplished though automated testing or manual testing. Continuous testing may be used during the development stage of a project. Release qualification testing may be used when a release has entered code-freeze. A process of continuous testing may ensure that behavioral changes are intentional and that quality does not degrade over time. This may be accomplished through a combination of development policies and automated testing. Each class in the server may have unit test coverage written and maintained by developers. A specific unit test may not need to be written for each and every method since some are too small to require it and some may be difficult to test in isolation. Some or all of the individual components may be tested in isolation. Unit tests may include several groups, such as, smoke tests (a limited set of tests intended to test the most important features and run in a small amount of time), exhaustive tests (a larger set of tests intended to test all areas of the product fully), and performance tests (a set of tests that take longer to run due to the nature of the tests being performed).

In embodiments, to assist identification of quality issues a continuous build process may be used. Before each submission of code change to source control, developers may run the set of smoke tests and fix any unit tests that have been broken (if those changes are expected and desired). An automated build machine process may watch for changes in the source control system and initiate a smoke test build anytime it notices changes that have not been tested. This process may act as a consistency check for the checked-in source code. Failures in this build may be considered emergencies and may be fixed immediately by the developer who introduced the failure. Another automated build process may build the server and run the exhaustive and regression unit test suites on scheduled intervals. Failures in this automated build are may be sent to the developers who have made changes since the previous run so that issues are known about as quickly as possible. Additional automated builds include: code coverage (compute and calculate coded coverage metrics), code analysis (check for questionable code constructs and style), and performance unit test suite (run the long running performance unit tests).

In embodiments, the platform 100 may render to all versions of WAP (and CHTML or iMODE) through the use of the WALL/WURFL toolkit which detects the phone version from the user and then renders appropriately. The WAP site may take advantage of capabilities of newer WAP versions and therefore render differently on different WAP versions. Testing may be used to verify that the WAP appears and functions appropriately on different phone versions. Minimal acceptance testing may be used on previously untested phones to evaluate the phone and to locate bugs. Minimal acceptance testing may also be used on phones that have previously passed full acceptance testing after small WAP site changes. Full acceptance testing may be run on mobile communication facilities 102 that have not previously passed full acceptance testing or after major WAP changes. Testing may include, but is not limited to, the following steps: verify basic page layout, verify that the numbering is correct, that the table or list is laid out properly, and that the link traversal is correct, check that the content item names are indented correctly, verify that the Artist Name is in the correct location, verify that search term matches are highlighted, check that the colors of links are correct, follow every link and validate that page (Full Test Only), and verify the numeric access keys work. The testing protocols may include the use of emulators, profilers, debuggers, and/or network monitors.

In embodiments, search metric and business reporting may include report interpretation and product recommendations based on search data patterns and behavior. Custom reports and alternative delivery options may also be available. A search summary report may provide roll up data to view the search usage across all platforms (e.g., mobile web search, gateway error traffic and paid search). The report may include total volume, day and time of day reporting, and usage of each search system. A search volume report may indicate intraday and intraweek search volume to monitor mobile search usage. A search query stream report may detail each query and the number of times the query is sent to the search engine during the period. This report may be used for understanding the overall search behavior of the user population. An emerging queries report may indicate queries that are rapidly accelerating or decelerating in volume. This report may be used for merchandising purposes and for identifying the content, products, or services to source and promote to the user base.

In embodiments, a WAP usage report may detail the WAP search site usage patterns available in aggregate, by phone model, and by content provider (when more than one content provider is indexed.) A WAP usage report may contain the following data elements: # of Searches, # of times the search engine has at least one result, average # of results for each search, # of times each content category responds to a search, # of clicks per search result page, # of pages viewed per search, # of unique users, # of sessions, session length in time, session length in page views, total # of page views, and/or the conversion rate from search to content purchase.

In embodiments, application usage reports may detail the application usage in the aggregate and by phone model and by content provider (when more than one content provider is indexed. The report may contain the following data elements: # of searches, # of times the search engine has at least one result, average # of results for each search, # of times each content category responds to a search, # of clicks per search result page, # of pages viewed per search, # of unique users, # of sessions, session length in time, session length in page views, total # of page views, and/or the conversion rate from search to content purchase.

In embodiments, a paid search performance report may provide the performance of the paid search engine directly in response to request from the system. Reports may be segmented between WAP and application usage and include: # of requests to paid search database, # matches, match rate—% of time a paid listing is available, fill rate—% of paid listings requested that are filled by the paid search engine, click-through rate, average cost-per-click, clicks per advertiser, gross revenue per advertiser, total gross revenue, total net revenue In embodiments, application adoption reports may detail the adoption of the downloadable application during the period, including # of promotional impressions served, # of clicks to learn more, # of downloads, and the # of active applications.

In embodiments, service metrics reports may detail and summarize data regarding the operation of servers, including, average requests per second, peak requests per second, requests/second distribution, maximum request size, and/or the average response time.

In embodiments, for each report type the wireless provider 108 may request different levels of specificity for different purposes, for example, executive summaries that present a small amount of data in an aggregated way intended to give a high-level overview; a detailed summary that presents a larger set of data aggregated to provide more detailed information. This type of report may be used in circumstances where the wireless provider 108 wants analysis of the raw data and provided with digested information; and/or transaction logs that present raw data collected. This type of report may be used when the wireless provider 108 would like to do its own analysis.

In embodiments, reports may be formatted using raw line-based log file (mostly used for transaction logs), XML, HTML (formatted by applying XSL to the XML), and/or plain text (formatted by applying XSL to the XML).

In embodiments, reports may be delivered using email, where the wireless provider 108 provides an email address. The subject of the message may include the name of the report and a timestamp. Reports may also be delivered by FTP, where the wireless provider 108 provides a host name, user name, password and directory name. Reports are then delivered as file drops into the given directory. The filenames include the name of the report, a timestamp and sequence number.

In embodiments, the deployment architecture may consist of dynamically-scalable hardware and software to handle incoming requests. One element of the architecture may be a cluster. A cluster may comprise three machines, one front-end web server and two back-end service tier servers. The web server may run Red Hat Enterprise Linux and Apache HTTP Server. The service tier servers may run Red Hat Enterprise Linux, Apache HTTP Server, Apache Tomcat, and MySQL. A minimum of two clusters may be used for load balancing, fail over, and redundancy. Additional clusters may be deployed as is necessary to handle additional server load. The cluster may receive requests from the mobile communication facility 102 via HTTP and reply with results which are retrieved from cache or by querying various databases. The cluster may also be used to handle download requests for mobile communication facility 102 applications. Each cluster may handle 5 QPS or 450,000 requests per day. An incoming request may be distributed to one of the front-end web servers via load balancing hardware and then the connection between the front-end web server and a back-end service tier server may be distributed via load balancing hardware. The connections from the mobile communication facility 102 to the servers may be stateless. Each connection may be distributed appropriately. Feed servers may be used to process data feeds from the wireless provider 108, the server web logs, and the server tomcat logs. These feed servers may run Red Hat Enterprise Linux. Output from the feed servers may be stored in a data warehouse which is used for data analysis, reporting, and generation of the input tables for the MySQL databases which reside on the service tier servers. The data warehouse may run Red Hat Enterprise Linux and Oracle Database 10g.

The data center architecture may employ an administration server which ensures that the other servers are configured properly, moves log files to the feed servers, and monitors the health of the servers. The servers may utilize fibre channel RAID SAN or other redundant mass storage techniques for reliability, scalability, and performance. The drives may be backed up to tape utilizing industry standard backup procedures including offsite storage and rotation. Similar hardware and software may be used for development and QA environments. The development environment and the QA environment may each utilize their own cluster set.

In embodiments, the release of upgrades may be performed using a rolling upgrade where it is not required that the same version be available simultaneously. A service tier server may be removed from service in the load balancers while it is upgraded and verified. It may then be restored to service and the next service tier server is upgraded. Upgrades may also be performed by a maintenance upgrade where it is required that the same version be deployed and available simultaneously. A maintenance page may be deployed and all of the clusters removed from service in the load balancers while they are upgraded and verified. The clusters may then be restored to service in the load balancers. The upgrades may be scheduled during hours of minimal usage.

In embodiments, the web servers may be protected by a managed firewall deployed at the public internet. The firewall may contain ACLs which control the types of networks and traffic that can communicate with the web servers. The servers may be managed by the data center and loaded with a hardened version of the O/S and anti-virus software. The O/S may be kept up to date using automated patch management software. Outside access may be restricted to secure channels via VPN, SSH, or a private backend network. Access by data center personnel for administrative purposes may be authenticated and logged.

In embodiments, the platform may be integrated with the wireless provider's 108 existing deck using a variety of integration techniques that apply for the WAP version or the downloadable application. The results and item detail pages may be available as full WAP (1.2, 2.0) pages served directly from servers (the "hosted" option) or as XML data suitable for formatting and rendering within the wireless provider 108's deck (the "API" option). The wireless provider 108 may be responsible for selecting the appropriate DNS name for the service (e.g., search.carrier.com) and for configuring its DNS records to point to the appropriate servers. The wireless provider 108 may be responsible for selecting the appropriate customization and/or skinning options. If the wireless provider 108 wishes its users to take advantage of advanced search features (such as the recommendation engine), the wireless provider 108 may be responsible for configuring its mobile application gateway such that an agreed-upon unique ID is transmitted to the appropriate servers. The end user's mobile browser and the capabilities of the mobile communication facility 102 may be identified and the pages served directly to the end user's mobile browser.

In embodiments, the J2ME application may support a variety of over-the-air (OTA) field upgrade methods.

In embodiments, the J2ME application may periodically check for updates and notify the user that an update is available. The user may choose to update the application immediately, in which case the application initiates downloading and installing an update. The user may choose to update the application by visiting the application download WAP site and initiating an update. Or, the user may choose to request a WAP push of an update.

In embodiments, the application may use an SMS connection to receive update notifications via SMS, which causes the mobile application facility 102 AMS to run the application, which then may offer update options to the user.

In embodiments, a WAP push may be used to install or update the application.

In embodiments, BREW versions of the client may not use all the mechanisms used by J2ME versions for updating. In BREW environments, applications may poll to find updates, and application-directed SMS may be used to wake up applications to notify the user of updates. Users may download updates from a BREW provider.

In embodiments, a search facility 142 may process both structured and unstructured data. The primary categories that must be completed when defining a feed file include: primary feed file attributes, file name description, header row column descriptions, trailer row column descriptions, detail row column descriptions, non conventional file name description (if applicable), and feed production schedule.

In embodiments, a data source may uniquely define a wireless provider 108, and the feed files for a given wireless provider 108 may be referenced under the given wireless provider's 108 data source. The feed type may define the specific type or category of data that will be contained within the feed file. Some primary feed types may include the following: log (feed files that contain logged data), personal (feed files that contain provider 108 specific member profile data), and deck (feed files that contain content data). There may be many derivations of deck data, including, but not limited to, DeckArtist, DeckHandset, DeckCategory, and DeckLanguage. The feed protocol may specify whether a feed is either a request feed or a response feed. The protocol may define the intent of the sending wireless provider 108. The sending wireless provider 108 may request that the given feed be processed by the receiving provider 108. The sending provider 108 may send a feed in response to a previous feed received from the receiving provider 108 in order to complete a feed contract. A feed ID may be used to define a four part feed name which uniquely defines a given type of feed for a given provider 108. The four part feed naming convention may specify the sending partner ID, the receiving partner ID, the feed type, and the feed protocol (e.g., "Acme_Provider_Log_Request"). The feed may be inbound or outbound. Defining the feed direction may help to determine behavior in how the feed engine treats a given feed, such as the type of feed file directories that are created for a given feed.

In embodiments, the document type may specify the physical structure of a feed file. A feed file's physical structure may be defined by the fixed column format, the delimited column format, and/or the XML Format. The columns defined for a given row type may have a fixed length. The rows of a given type may have a fixed length. For example, a feed file may consist of the following cardinality of row types: 0 or 1 Header row, 0 to many Detail rows, and 0 to 1 Trailer row. Each row type may have a different fixed length. Columns defined for the rows in a given feed may be separated by a one character delimiter (e.g., a bar '|'). Each row in the feed may represent a type of XML element. A header row or a detail row may be defined by one element. Detail rows may have many different types of row elements. A detail with more than one type of row element may be defined as variant rows within a feed document. Detail rows may make up all of the rows between the header row and trailer row within a feed file. A feed file may be defined as having either one non variant row type or as two or more variant row types. When all of the detail rows within a feed file have the exact same column structure, the detail rows are said to be non variant. When some of the detail rows within a feed file have a different column structure than other detail rows within the same feed file, the detail rows are said to be variant. The sequence number may be used to uniquely define the feed file name for a given provider 108. It may also define the behavior of how a feed file is treated. The sequence number may be defined as incremental, progressive, or TimeStamp. If the sequence number is defined as incremental, each feed may follow in sequence from one feed to the next (the increment is one (1)). This type of sequence number may be used when it is important to track or receive a feed in an exact sequence. If the sequence number is defined as progressive, each feed may have a sequence number greater than the one before it. If the sequence number is defined as TimeStamp, each feed may be given a time stamp as its sequence number. The sequence number may have the full time stamp format of yyyyMMddHHmmss. The line delimiter may define the type of character or characters that are used to mark the end of a line. If the document type of a feed file is defined as delimited, then a character delimiter may be defined as the token which separates each column within each and every row within a given feed file. The column delimiter may be a bar '|'.

In embodiments, the deck platform may serve as a central place for handling the mobile search service provided by the wireless provider 108. The system may interact with portal management systems, charging system, other delivery systems, and all other wireless provider 108 (internal or 3rd party) systems needed to provide end to end mobile search service. As part of the overall search system, the deck may also provide management of the marketers relational aspects (bidding arena, report access), and may provide a unified interface for managing media & bearer agnostic search service (e.g., 3G, 2.5G, MMS, SMS, Downloadable content, streaming content).

In embodiments, the platform provides an alert and/or messaging system for the wireless provider 108 to handle events that the provider 108 may encounter during the operation of the deck system. A severity level for each message may be presented, ranging form indeterminate severity to a "warning" severity level that is likely to affect the service. A fault manager may be used to define a common structure that describes possible solution element's events and alarms. This structure may be generic and is intended to support all types of events. Additionally, performance counters may record performance/security issues.

In embodiments, the deck may utilize SNMP protocol as the means to transfer alarms and status events to the wireless provider's 108 alarm and monitor system. The wireless provider 108 may specify which network monitoring solution is being used, the access details needed to establish such a connection (SNMP server address and port) and open a tunnel through its firewall systems so SNMP traps may arrive. The deck may use a standard MIB structure to relay alarms, and may adjust to any specific MIB structure. A web tool may be hosted on a secure server which provides the wireless provider 108 with access to the contents of event and alert messages.

An aspect of the present invention relates to providing useful responses to information entered into an address bar 174 of a mobile communication facility when the information does not properly correspond with an existing URL or other website reference. In embodiments, a user of a mobile communication facility may enter information into an address bar 174 on the mobile communication facility and the information may be a misspelled URL, an unknown URL, or the like. In other situations, the user may have been entering search terms rather than a URL thinking the address bar 174 was the search query entry facility. There are many reasons that misinformation may be entered into an address bar 174 on a mobile communication facility and embodiments of the present invention serve to provide a user with useful information even after entering such misinformation.

In embodiments, misinformation entered into the address bar of a mobile communication facility may be a wrong url, a mis-typed url, may not correspond with a presently active webpage, may be a broken link, missing page, or other information that cannot be matched with a website, url, or other site indication.

Figure 12:
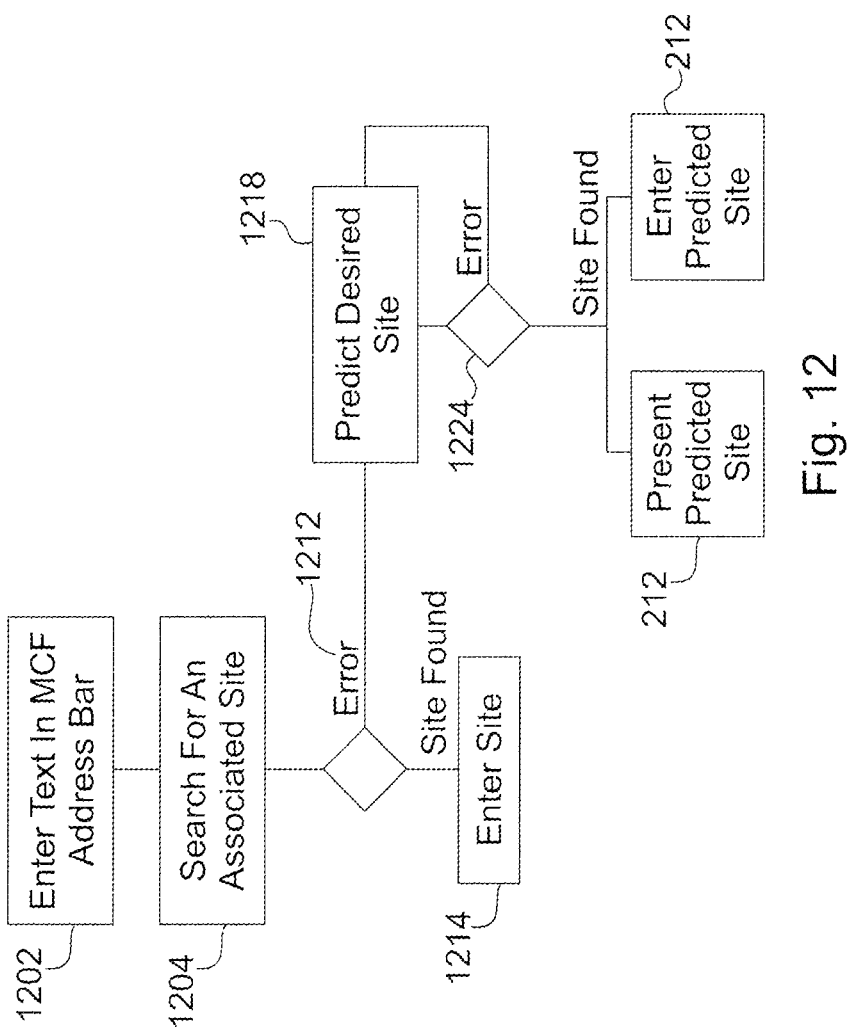
FIG. 12 illustrates a website prediction process based on misinformation entered in a mobile communication facility address bar.

FIG. 12 illustrates a prediction process associated with misinformation entered into an address bar 174 of a mobile communication facility 102. In this prediction process, a user may enter text into an address bar 174 of a mobile communication facility 1202. After entering the text, the user may initiate a search for the URL associated with the text 1204. Following the search request, the mobile communication facility may produce the related site 1214 or an error may be produced 1212 if the URL is not found or otherwise unavailable. When the error is returned, a facility designed for the prediction of the desired site may be employed. The site prediction facility may reside in the mobile communication facility, in the wireless provider, or in another related facility, for example.

The prediction associated with step 1218 may be based on a disambiguation facility (e.g. as described herein in connection with FIG. 1), a correction facility (e.g. as described herein in connection with FIG. 1), or other facility designed to predict what site the user intended to visit. For example, the text entered into the address bar 174 may have been correctly associated with a URL except for the fact that the ".com" was not included, it was mistyped, misspelled, or the true extension was ".net" or it otherwise included erroneous extension information. A prediction facility associated with step 1218 may go through a process of including or replacing extensions to find associated web sites. As another example of misinformation included in the address bar 174, the text may have included mistyping and the like associated with the prefix (e.g. typing "wwe." instead of "www." or entering a comma instead of a period before the URL). A prediction facility associated with step 1218 may go through a process of including or replacing the prefix information to find associated websites. As yet another example of misinformation included in the address bar 174, the user may have misspelled the URL, entered an abbreviated URL, entered search terms instead of a URL or the like. A prediction facility associated with step 1218 may go through a process of spell checking and correcting the text with what is perceived as the intended target site. In the course of predicting and correcting the text to associate the mis-directed text entry, the prediction facility may use other techniques for aiding the user (e.g. those described in connection with correcting, disambiguating, and otherwise aiding the user in better targeting search query, as described herein (e.g. as described herein in connection with FIG. 1)).

Once a site is predicted through step 1218, the predicted site may be entered 1220 and presented on the mobile communication facility 102. The process of predicting the desired site 1218 may also involve predicting and then searching for the predicted site 1224. If the predicted site does not exist or respond, a prediction facility associated with the prediction step 1218 may refine the prediction and search again. This process may be undertaken several times until a predicted site is located or until the process times out due to some preset timeout period, for example.

In embodiments, a process for predicting the desired site from misinformation entered into an address bar 174 of a mobile communication facility may involve the steps of predicting the desired site 1218 after receiving an indication 1212 that no site exists or responds to the misinformation. The prediction 1218 may involve correction, disambiguation or other such techniques as described herein. For example, the prediction may involve using information related to the mobile communication facility (e.g. mobile subscriber characteristic information) to assist the disambiguation or correction of the misinformation. Once a prediction is made, the prediction may be tested 1224 (e.g. a search for a related URL may be conducted), the prediction may be presented to the user as a suggestion 1222, or the site associated with the prediction may be entered and presented 1220, for example.

Figure 13:
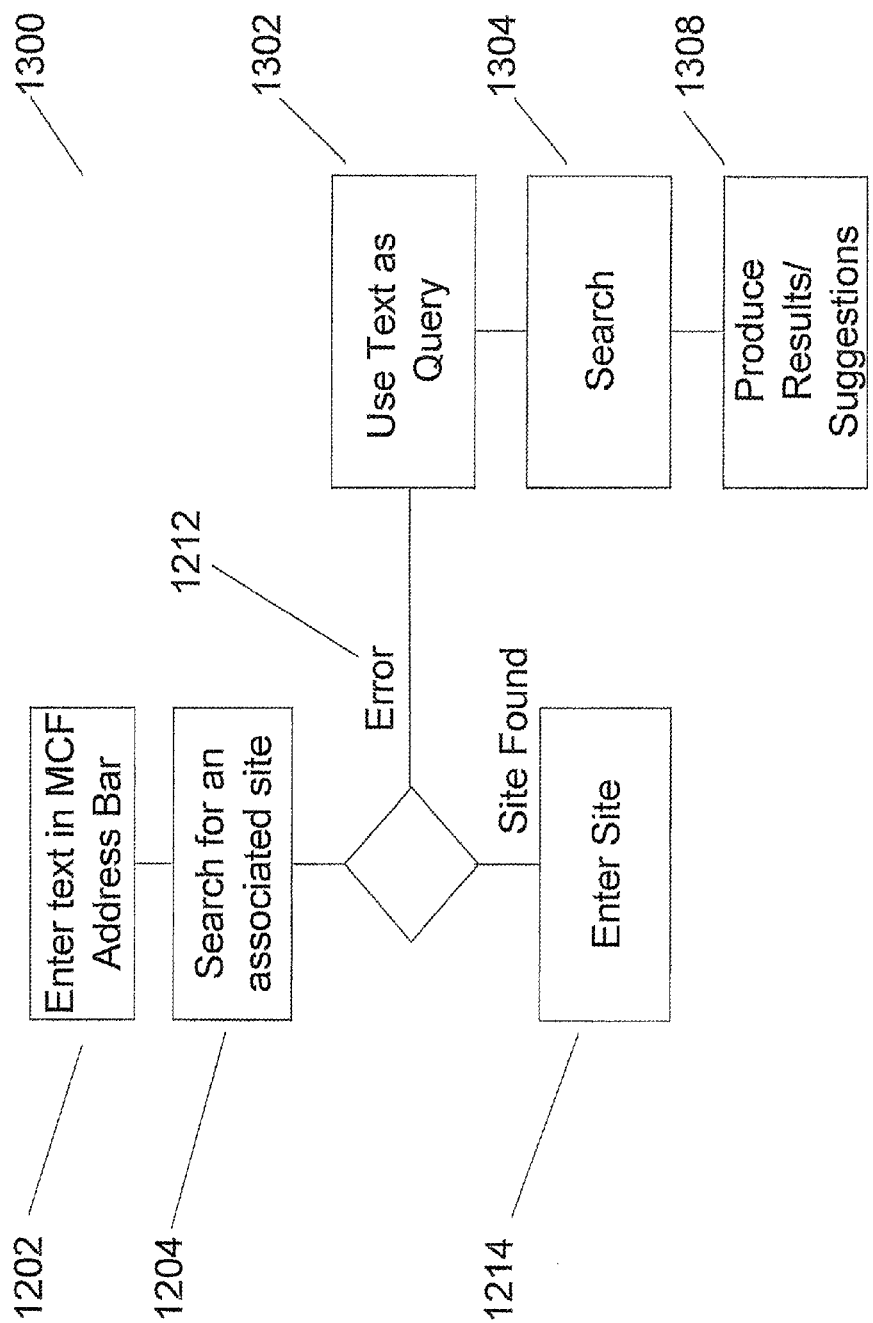
FIG. 13 illustrates a search query process based on misinformation entered in a mobile communication facility address bar.

FIG. 13 illustrates a search process based on misinformation 1300 entered into an address bar 174 associated with a mobile communication facility 102. In this search process, a user may enter text into an address bar 174 of a mobile communication facility 1202. After entering the text, the user may initiate a search for the URL associated with the text 1204. Following the search request, the mobile communication facility may produce the related site 1214 or an error may be produced 1212 if the URL is not found or otherwise unavailable. When the error is returned, a facility designed for the searching for the desired site or other information relating to the entered text may be employed. The site search facility may reside in the mobile communication facility, in the wireless provider, or in another related facility, for example.

Once an error 1212, or other indication the desired site is unavailable, is produced, the text entered into the address bar

174 may be used as a search query 1302 (e.g. in a similar fashion as if the text were entered into a search query facility as described in connection with FIG. 1). For example, the text may be disambiguated if it is ambiguous; it may be corrected (e.g. the spelling may be checked and corrected); or suggestions related to the query, disambiguated query, or corrected query may be produced for the user. Once the search query, corrected search query or disambiguated search query is determined, it may then be used to perform a search for results 1304. The search may produce results and or produce suggestions or other related information 1308. For example, as disclosed in connection with other embodiments herein (e.g. in connection with FIG. 1), the search results or suggestions may be produced in coordination with information relating to the mobile communication facility 102 (e.g. mobile subscriber characteristic information). In embodiments, an algorithm facility 144 (e.g. as illustrated in connection with FIG. 1) may be used in connection with information relating to the mobile communication facility to better predict what the user is looking for.

In embodiments, a process for searching for information relating to misinformation entered into an address bar 174 of a mobile communication facility may involve the steps of producing a search query from the text entered in the address bar 174 1302 after receiving an indication 1212 that no site exists or responds to the misinformation. The search query 1302 may involve correction, disambiguation or other such techniques as described herein. For example, the development of the search query may involve using information related to the mobile communication facility (e.g. mobile subscriber characteristic information) to assist the disambiguation or correction of the misinformation. Once a search query is made, search results and or suggestions and or recommendations or other information relating to the text entered in the address bar 174 may be presented to the user on the mobile communication facility.

Figure 14:
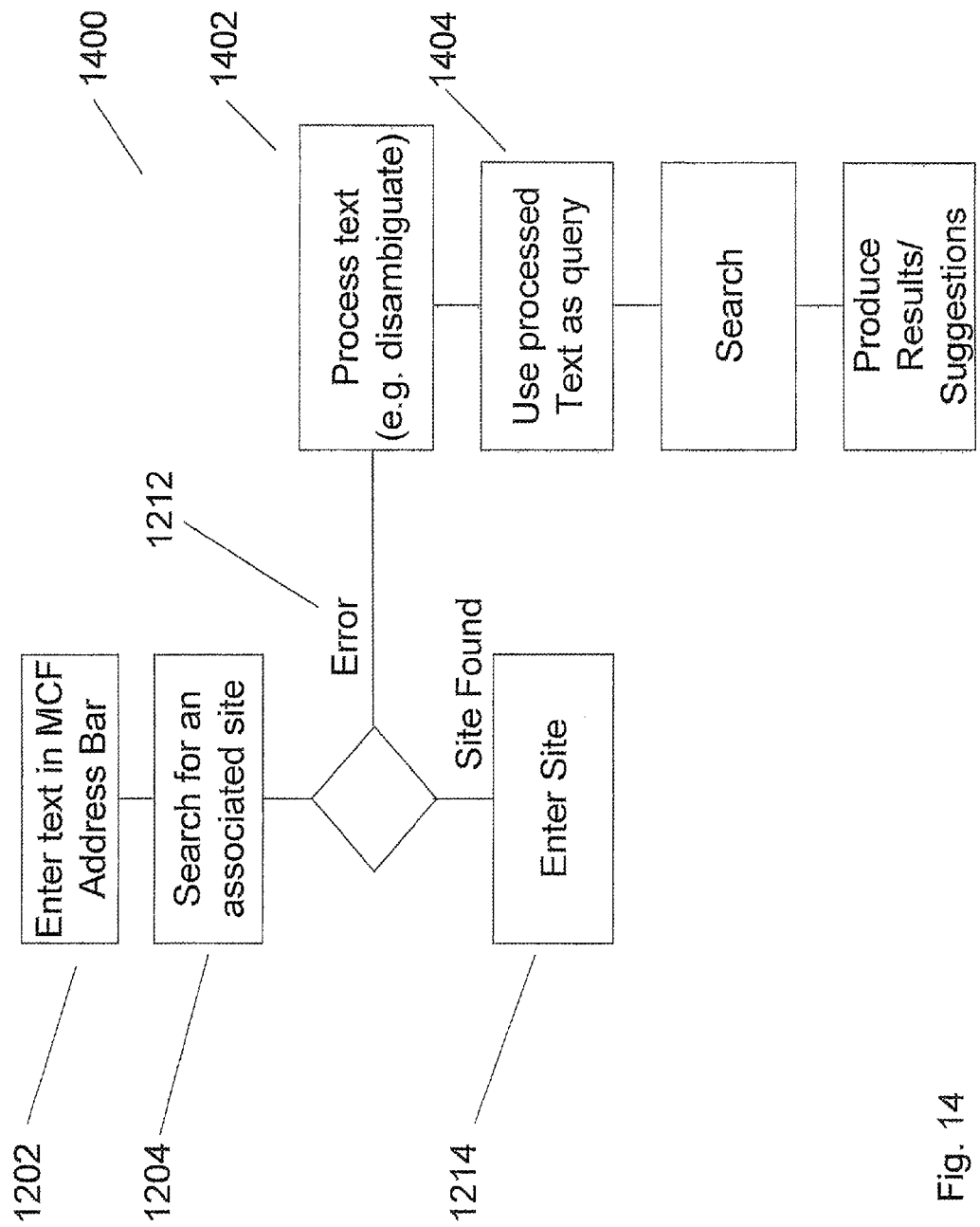
FIG. 14 illustrates a search query process based on misinformation entered in a mobile communication facility address bar.

FIG. 14 illustrates a processed search query process based on misinformation 1400 entered into an address bar 174 associated with a mobile communication facility 102. In this search process, a user may enter text into an address bar 174 of a mobile communication facility 1202. After entering the text, the user may initiate a search for the URL associated with the text 1204. Following the search request, the mobile communication facility may produce the related site 1214 or an error may be produced 1212 if the URL is not found or otherwise unavailable. When the error is returned, a facility designed for the searching for the desired site or other information relating to the entered text may be employed. The site search facility may reside in the mobile communication facility, in the wireless provider, or in another related facility, for example.

The text entered from the address bar 174 may be processed 1402 through a disambiguation facility, correction facility, or other facility adapted to modify the text into a form more appropriate for a search on the mobile communication facility. The processed query may then be used as a search query 1404 and a search may be performed. Results, suggestions, and or other information pertaining to the processed query may be produced and displayed on a display associated with the mobile communication facility 102.

Figure 15:
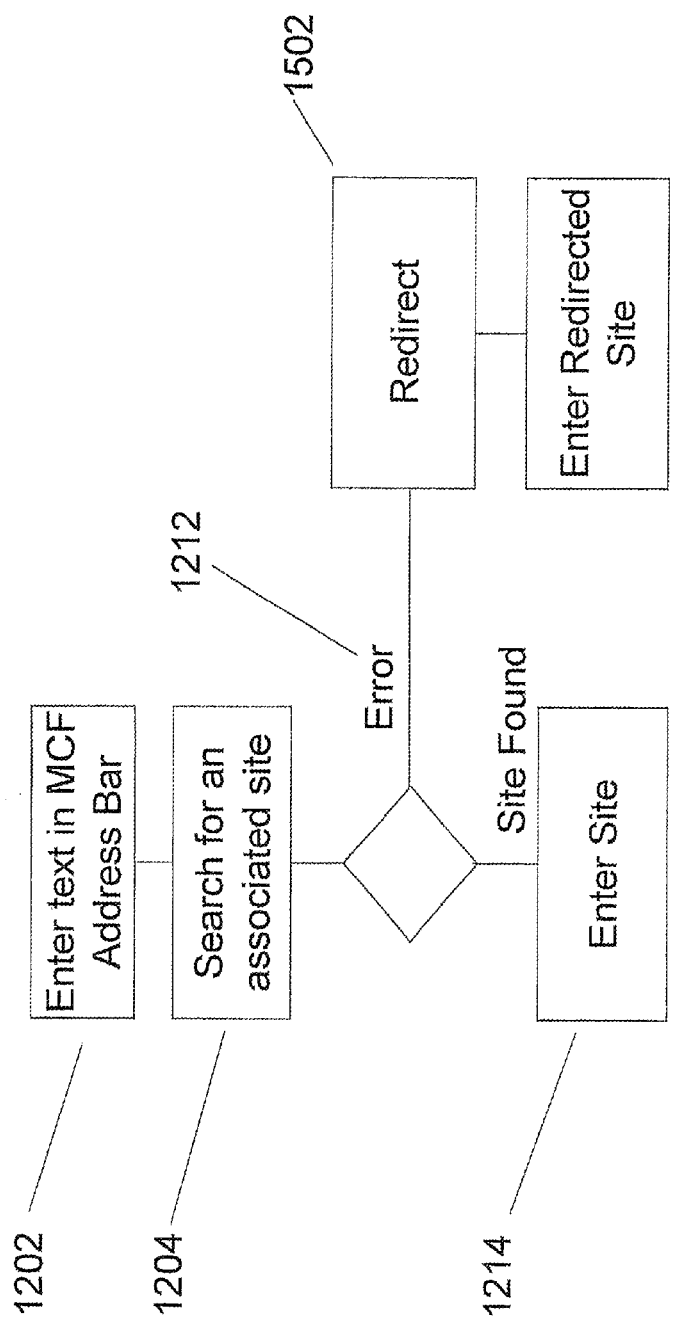
FIG. 15 illustrates a redirection process based on misinformation entered in a mobile communication facility address bar.

FIG. 15 illustrates a redirection process based on misinformation 1400 entered into an address bar 174 associated with a mobile communication facility 102. In this redirection process, a user may enter text into an address bar 174 of a mobile communication facility 1202. After entering the text, the user may initiate a search for the URL associated with the text 1204. Following the search request, the mobile communication facility may produce the related site 1214 or an error may be produced 1212 if the URL is not found or otherwise unavailable. When the error is returned, a facility designed for the searching for the desired site or other information relating to the entered text may be employed. The site search facility may reside in the mobile communication facility, in the wireless provider, or in another related facility, for example.

Following the error, or other indication that the site is unavailable, 1212, a redirected site may be chosen 1502. The redirection 1502 may be based on a table, algorithm, or information relating to the originally unavailable site indicating the correct site. For example, the unavailable site may produce information indicating there is a related site. A referenced URL may be provided for example. Given this redirection information, the mobile communication facility may be redirected to the new site.

In embodiments, information relating to the mobile communication facility may be used to redirect the user to a redirected site. For example, a user may misspell a URL and information relating to the mobile communication facility may indicate what the user intended to enter. For example, mobile characteristic information may contain information showing that the user has recently viewed a site with a very similar URL to the mistyped URL entered and the previously visited site may be presented to the user. In embodiments, an indication that the URL as entered was unavailable may also be presented to the user indicating a process of suggesting alternatives was used.

In embodiments, the redirection, search, text processing, results presentation, suggestions or other methods of managing information entered into the address bar of a mobile communication facility may be aided through an algorithm facility 144. The algorithm facility 144 may use information relating to the mobile communication facility 102 in the process of determining what information the user is most interested in. The algorithm facility may be a collaborative filter or personal, for example, and the filter may use information from the mobile characteristics database in the process of delivering user targeted results.

Another aspect of the present invention relates to processing errors related to search queries and address queries entered on a mobile communication facility. In embodiments, the error processing may be accomplished through software on the mobile communication facility. In embodiments, the error processing may be accomplished through software remote from the mobile communication facility (e.g. on a server associated with a wireless provider 108 or associated with the wireless communication facility 104). In embodiments, the error processing may be done using software processing in part on the mobile communication facility and in part on a platform remote from the mobile communication facility.

Figure 16:
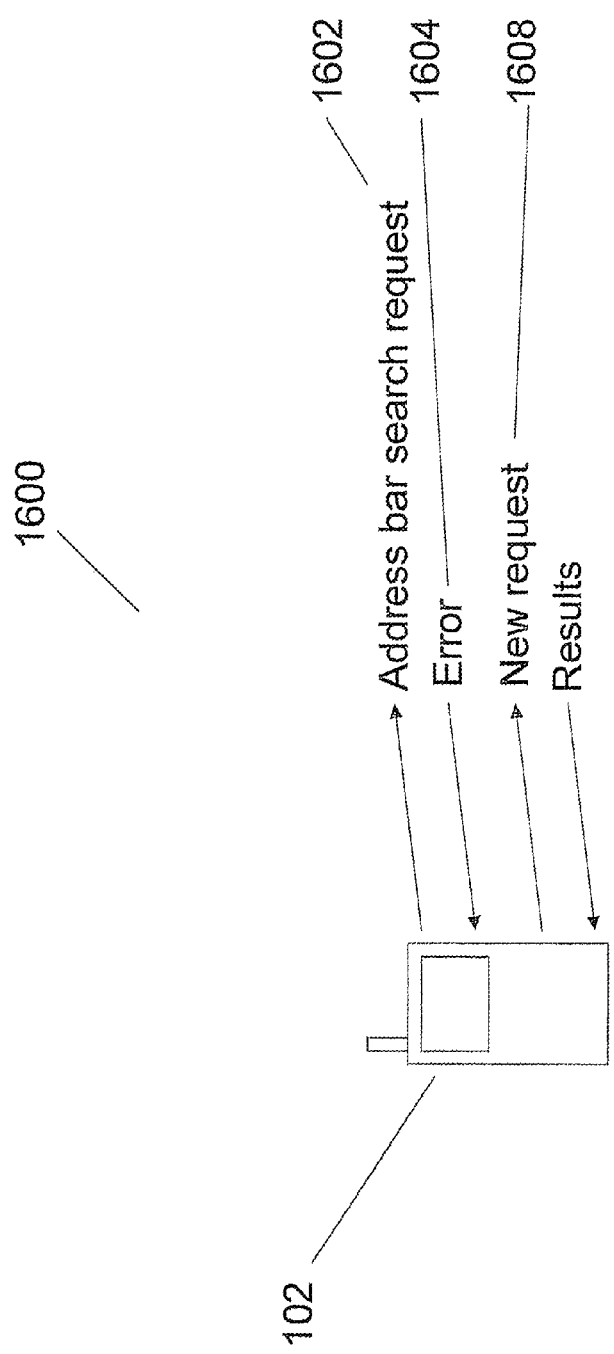
FIG. 16 illustrates a mobile communication process for managing misinformation entered in a mobile communication facility address bar.

FIG. 16 illustrates an error processing method 1600 wherein the error processing is performed, at least in part, on the mobile communication facility 102. In this embodiment, the mobile communication facility may be used to communicate an address search request (e.g. associated with an address entered into an address search bar on the mobile communication facility) to a server facility 1602. The server may be a server associated with a wireless provider for example. In the event there is no such address or URL located, or the located address is inactive or otherwise produces an error, an error 1604 may be produced in the mobile communication facility indicating such. This error may be a similar error to that described in connection with FIGS. 12-15 as error 1212.

Once an error 1604 or the like is produced, the software platform on the mobile communication facility 102 may respond to the error in a variety of ways (e.g. the error processing associated with FIGS. 12-15). For example, as indicated in connection with FIGS. 12-15, the software on the mobile communication facility 102 may predict a desired site 1218, use the text as a search query 1302, further process the text entered 1402, redirect the mobile communication facility to another website 1502 or otherwise perform a process in response to the error 1604. Following the error processing, the mobile communication facility may generate and communicate an additional request for information 1608. This may be similar to the requests for information described in connection with FIGS. 12-15. For example, a request to enter a newly predicted website (e.g. as described in connection with FIG. 12) may be made. Following the request to enter the newly predicted website, an error or the like may be produced and the process may be re-executed 1224. Ultimately, the mobile communication facility 102 may receive an indication of the predicted site or the predicted site may be presented. As another example, the new request 1608 may be formed as a search query, or a processed query (e.g. disambiguated) intended to be fed into a search engine, as described in connection with FIGS. 13-14. As yet another example, the new request 1608 may be a redirected request as described in connection with FIG. 15. It should be noted that a user may intend to place a search query into the location box intentionally.

Figure 17:
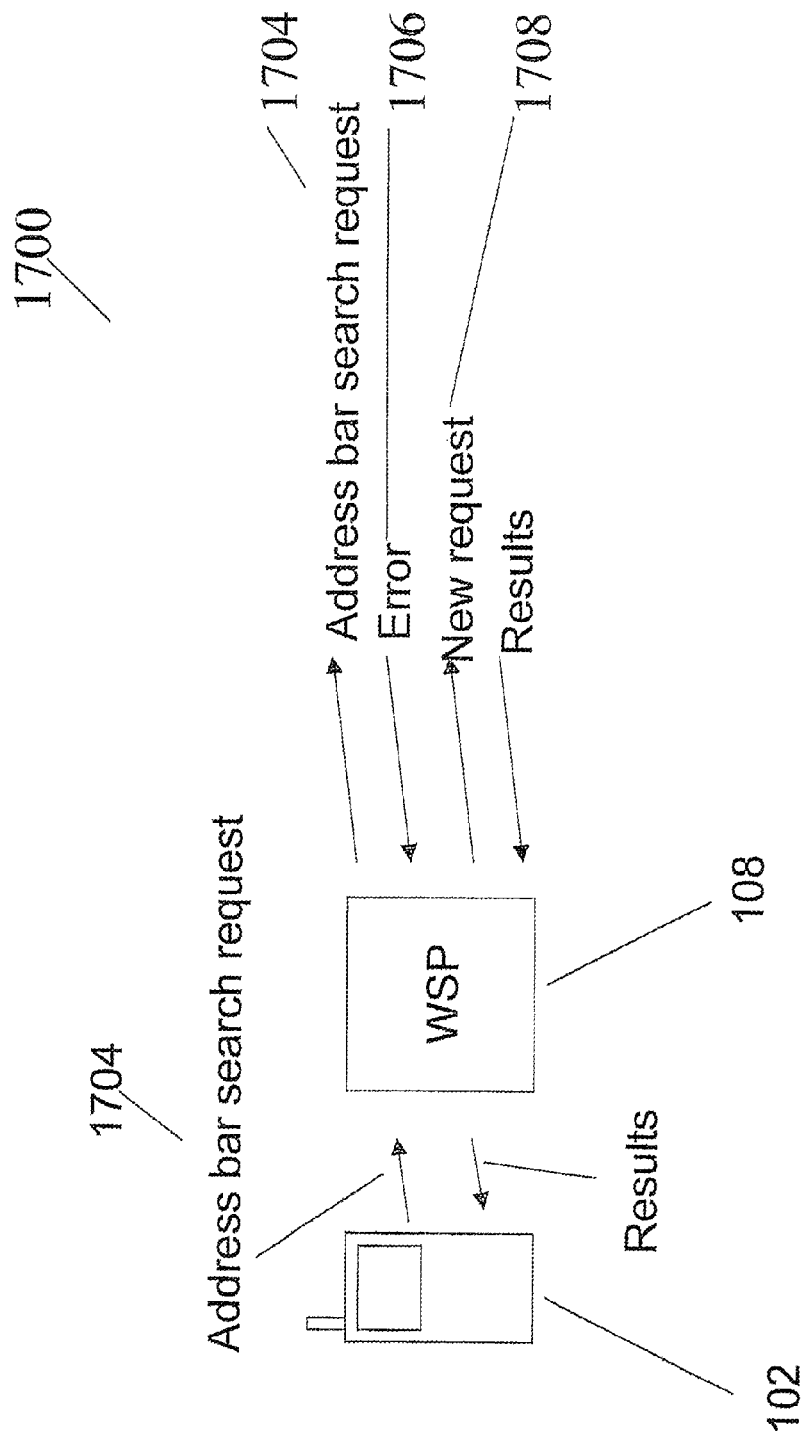
FIG. 17 illustrates a mobile communication process for managing misinformation entered in a mobile communication facility address bar, wherein at least a portion of the management is provided in association with a wireless provider.

FIG. 17 illustrates an error processing process 1700 wherein the error processing is performed, at least in part, remote from the mobile communication facility 102. In this embodiment, the mobile communication facility may be used to communicate an address search request 1704 (e.g. associated with an address entered into an address search bar on the mobile communication facility) to a server facility associated with a wireless provider 108. The server may be a server under the control of the wireless provider or it may be otherwise associated, for example. In the event there is no such address or URL located, or the located address is inactive or otherwise produces an error, an error 1706 may be produced at the server associated with the wireless provider 108 indicating such. This error may be a similar error to that described in connection with FIGS. 12-15 as error 1212.

Once an error 1706 or the like is produced, the software platform on the server associated with the wireless provider 108 may respond to the error in a variety of ways (e.g. the error processing associated with FIGS. 12-15). For example, as indicated in connection with FIGS. 12-15, the software on the server may predict a desired site 1218, use the text as a search query 1302, further process the text entered 1402, redirect the mobile communication facility to another website 1502 or otherwise perform a process in response to the error 1706. Following the error processing, the server may generate and communicate an additional request for information 1708. This may be similar to the requests for information described in connection with FIGS. 12-15. For example, a request to enter a newly predicted website (e.g. as described in connection with FIG. 12) may be made. Following the request to enter the newly predicted website, an error or the like may be produced and the process may be re-executed 1224. Ultimately, the mobile communication facility 102 may receive an indication of the predicted site or the predicted site may be presented. As another example, the new request 1708 may be formed as a search query, or a processed query (e.g. disambiguated) intended to be fed into a search engine, as described in connection with FIGS. 13-14. As yet another example, the new request 1608 may be a redirected request as described in connection with FIG. 15.

An aspect of the present invention relates to providing sponsored links. In embodiments a sponsor may be provided with an interface to allow it to enter sponsor information, such as bidding information, content to be presented in the event a bid is won, contact information, device compatible information, profiles the sponsor is targeting, locations the sponsor is targeting and the like. For example, a sponsorship facility 162 (e.g. as described in connection with FIGS. 1 and 2) may be adapted with a sponsorship entry facility. The sponsorship facility 162 may perform other functions in connection with providing sponsored links on a mobile communication facility as well. For example, the sponsorship facility 162 may facilitate a bidding process and/or present the sponsored content to the mobile communication facility. In embodiments, information relating to the mobile communication facility (e.g. mobile subscriber characteristic information) may be used in the sponsored link process.

Figure 18:
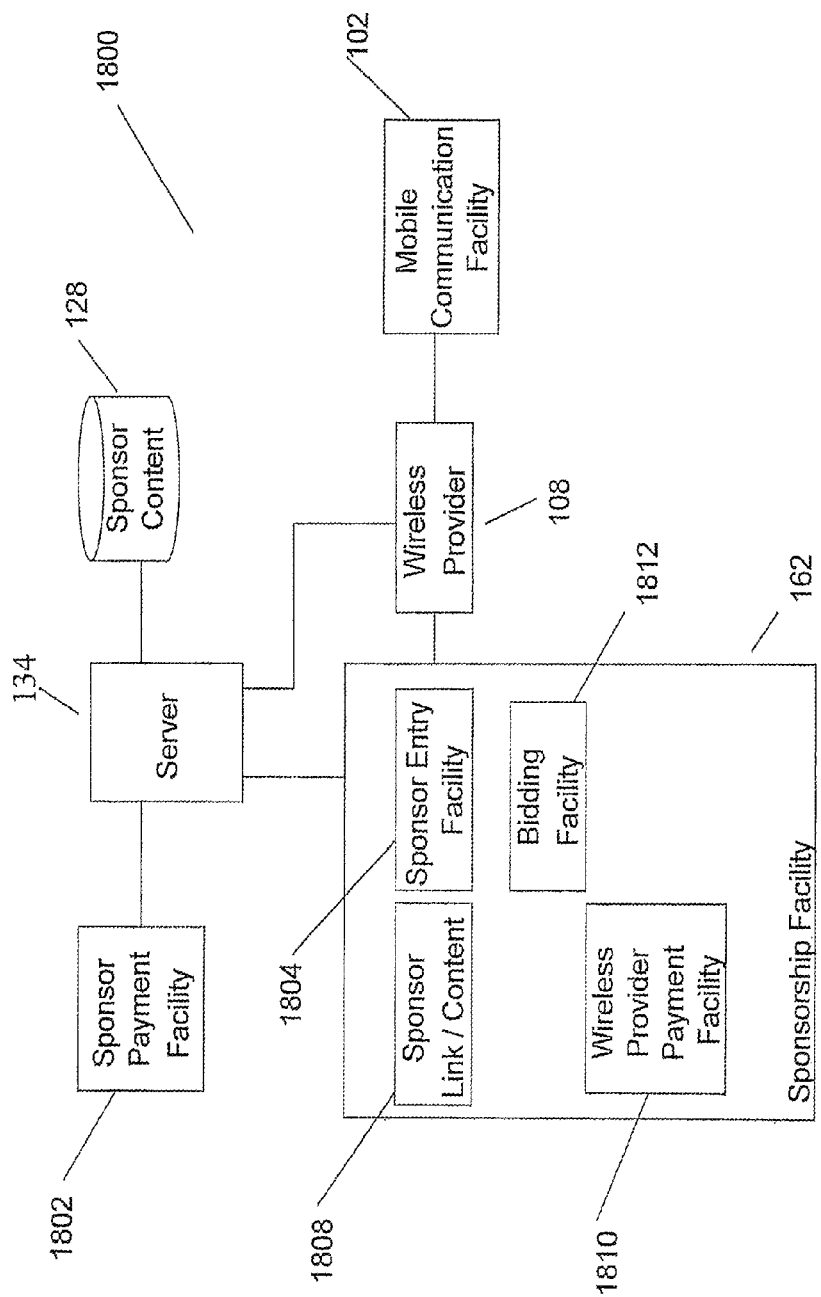
FIG. 18 illustrates a sponsored links platform.

FIG. 18 illustrates a sponsored content facility 1800 wherein a mobile communication facility 102 is in communication with a wireless provider 108. The sponsorship facility 162, which may be part of a mobile search host facility 114, includes a sponsor entry facility 1804 where a sponsor may begin the process of entering information relating to sponsored content, bids, search criteria and the like. The sponsorship facility 162 may include a bidding facility 1812 to handle a bidding process between several sponsors; a payment system 1810 to handle payment transactions associated with the sponsored content; and a sponsored link/content facility 1808 adapted to direct and/or provide the sponsored content. A sponsor may be associated with a server 134 application that is adapted to access sponsored content database 128 and a sponsor's payment facility 1802.

In embodiments, the sponsor may enter a bidding process to provide certain sponsored content to a mobile communication facility 102 through a sponsor entry facility 1804. The sponsor may provide bid information (such as max bids for certain keyword matches), content information, compatibility information and the like. Once the sponsor has entered the sponsor process through the sponsor entry facility 1804, it may be in a position to display the sponsored content on a mobile communication facility in exchange for a bid amount. A user may enter a search query on the mobile communication facility 102, the query may be transmitted to a bidding facility 1812 where a bidding process may take place to determine which sponsor's content is going to be provided to the mobile communication facility 102. The bidding process may result in the award of certain sponsored content 128 as identified in the awardees information it originally indicated during the entry process. For example, the sponsor may have indicated that upon an award, a link or other content 1808 should be presented to the mobile communication facility.

A sponsor may present the mobile communication facility 102 with purchasable content and a user may purchase the content through the mobile communication facility 102 and make payment for the content through the wireless provider 108. For example, the content may be a downloadable ringtone, music file, video file, wall paper, or the like. The sponsor may elect to provide billing for such content through the wireless provider billing facility 1810. This may provide a convenient, secure, and/or trusted user transaction. The user may be comfortable in purchasing the content through his wireless provider as it may provide more of an appearance that it is provided from a known source. This may generate more of a 'walled garden' feel from the user's perspective while allowing the user to search for and/or receive such content on the open web. When the sponsor allows for payment of the content through the wireless provider payment facility 1810, the wireless provider 108 may receive a portion of the user's payment (or some other compensation) in return for the billing service.

In embodiments, the sponsor payment facility 1802 may be used to pay for sponsored links that were awarded and/or presented to a mobile communication facility 102. For example, once sponsored content is awarded and/or presented to the mobile communication facility 102, the bidding facility 1812 may request payment for the bid amount from the sponsor payment facility 1802. The sponsor payment facility 1802 may then process payment to the wireless provider payment facility 1810, for example.

Figure 19:
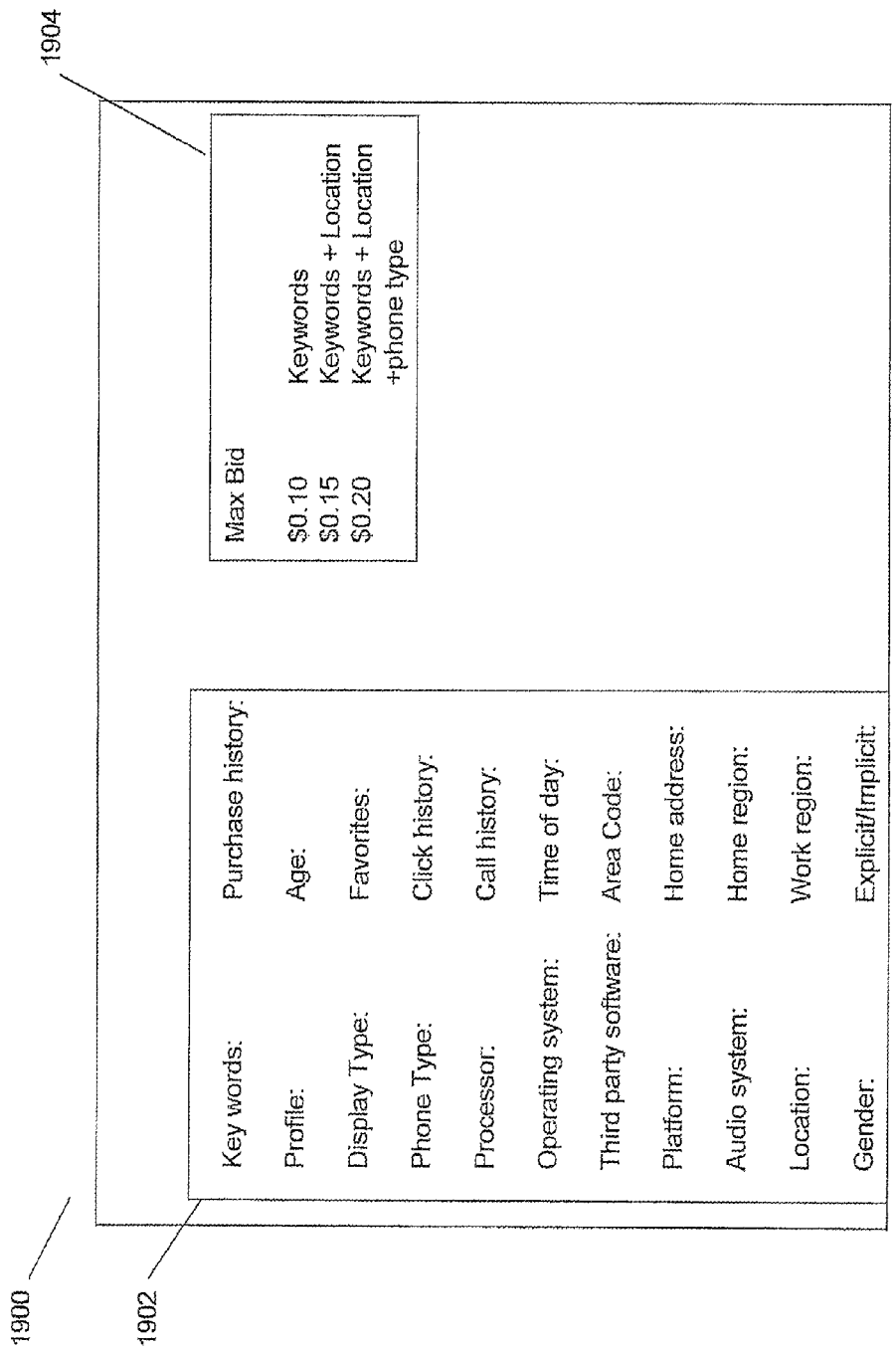
FIG. 19 illustrates a sponsor entry facility user interface.

FIG. 19 illustrates a sponsor entry facility user interface 1900 that may be provided to a sponsor when the sponsor interacts with the sponsor entry facility 1804. The user interface 1900 may include a criteria entry facility 1902 where the sponsor may enter criteria that are important to its bid for placing sponsored content. For example, the criteria entered in the criteria entry facility 1902 may relate to key words, phrases, terms, lingo, sms codes, user profile, mobile communication facility display type, mobile communication facility type, phone type, mobile communication facility, mobile communication facility processor type or capability, mobile communication facility operating system, mobile communication facility third party software, mobile communication facility platform characteristics, mobile communication facility audio system, location, user gender, user purchase history, user age, favorites, click history, call history, time of day, day of year, mobile communication facility area code, user home address, home region, work address, work region, mobile subscriber characteristics and the like.

The user interface 1900 may also include a bid entry facility 1904. The bid entry facility may provide a sponsor with the ability to enter bid amounts and corresponding bid criteria. For example, a maximum bid amount may be associated with criteria such as keyword relevancy match. In embodiments the maximum bid may be associated with simple matching criteria (e.g. such as matching a keyword) or it may be associated with a more complicated sting or weighted string of terms, events, or characteristics. For example, while a sponsor may provide a maximum bid of $0.10 for a keyword match, it may provide a bid of $0.15 for a combination of keyword and location, or $0.20 for a combination of keyword, location and phone type. As another example, the sponsor may bid $0.15 for a bid associated with a location and time of day if the search is an implicit search. While certain illustrations of bid criteria associated with bid amounts have been provided, it should be understood that the criteria matching may be any type of matching including without limitation weighted function matching, algorithm-based matching or any other type of rule-based, algorithmic, heuristic, or other matching.

In embodiments, a sponsor desirous of presenting its content on a mobile communication facility may be presented a plurality of menu formats with which to create sponsor content including, but not limited to, advertisements, promotional notices, offers, and so on. For example, the menu system may provide a sponsor an entry menu within which it may be possible for the sponsor to create a title for sponsor content, include an URL, street address, phone number, or other contact information. It may be possible to enter additional descriptive text, by line, by paragraph, and/or page.

In embodiments, a sponsor desirous of presenting its content on a mobile communication facility may be presented a plurality of menu formats with which to select the types of mobile communication facilities on which the sponsor would like to present the sponsor content. For example, the sponsor may wish to select a subset of mobile communication facility models that are best suited for presentation of the sponsor's content due to technological requirements for the content to optimally present. A sponsor may choose to present only on mobile communication facility models that are associated with other user characteristics that the sponsor would like to target (e.g., a cell phone model known to have high usage among college students).

In embodiments, a sponsor desirous of presenting its content on a mobile communication facility may be presented a plurality of menu formats with which to select the mobile communication facility platform and/or software types on which the sponsor would like to present the sponsor content. For example, a sponsor may have content that requires a Java-enabled device. Therefore, it may be desirable for the sponsor to select to present its content only on those mobile communication facilities that are Java-enabled.

In embodiments, a sponsor desirous of presenting its content on a mobile communication facility may be presented a plurality of menu formats from which to select key words and/or key phrases to associate with the sponsor's information. The menus may present individual words, lists of words, and/or phrases for which a sponsor may enter a bid amount. The bid amount may be a specific price, a price range, or a maximum price that the sponsor is willing to pay in order to have its content associated with the language.

In embodiments, a sponsor desirous of presenting its content on a mobile communication facility may be presented with keyword suggestions based upon keywords entered and/or selected by the sponsor. For example, a thesaurus may be employed to automatically present sponsors with additional keywords that are related to the keywords in which a sponsor manifests an interest in bidding.

In embodiments, a sponsor desirous of presenting its content on a mobile communication facility may be presented a plurality of menu formats from which to select geographic variables to associate with the sponsor's information. The menus may present individual area codes, city names, state names, country names, location entered by a user and/or be based upon GPS information derived from a location facility. Geographic information may also be presented in relation to other mobile subscriber characteristics. For example, a sponsor in the hotel business may be interested in having its content present to only those users that are outside of their hometown and/or normal work region.

In embodiments, a sponsor desirous of presenting its content on a mobile communication facility may be presented a plurality of menu formats from which to select demographic variables to associate with the sponsor's information. The menus may present individual demographic variables contained in the mobile subscriber characteristics database, such as, age, sex, race, address, income, billing history, purchase history, and so forth.

In embodiments, sponsors' content may be displayed on a mobile communication facility in a descending rank order based upon the sponsors' bid amounts.

In embodiments, sponsors' content may be displayed on a mobile communication facility in a descending rank order based upon the amount of shared revenue derived from sponsors.

In embodiments, sponsors' content may be displayed and/or ordered on a mobile communication facility 102 based at least in part on using time as a criteria.

In embodiments, sponsors' content may be displayed and/or ordered on a mobile communication facility 102 based at least in part on a mobile subscriber characteristic, such as, the user, device type, geography, transaction, and/or history.

In embodiments, sponsors' content may be displayed and/or ordered on a mobile communication facility 102 based at least in part on the relevancy of the sponsored content. For example, relevancy may be based upon the information contained in a sponsor's content and keywords entered by a user in a query entry facility 120. Relevancy may be based upon the sponsor's content and mobile subscriber characteristics, such as, user, device type, geography, transaction, and/or history.

In embodiments, sponsors' content may be displayed and/or ordered on a mobile communication facility 102 based at least in part on a grouping or aggregation of mobile subscriber characteristics. For example, sponsors' content may be displayed on the basis of users' age ranges (e.g., 20-30 year olds).

In embodiments, the amounts payable as a result of the sponsor billing process may be processed within the billing system of a wireless provider. For example, when the sponsor enters a wireless provider's bidding system it may enter into an agreement with the wireless provider such that any presented sponsored content is paid for. The payment may come directly from the sponsor to the wireless provider, for example. In embodiments, a user of the mobile communication facility may interact with sponsored content (e.g. click on a sponsored line) and make a transaction within the sponsored content (e.g. the user may purchase a music download, ringtone, wall paper or the like). In such embodiments, the purchase price of the purchased content may appear on the user's wireless provider bill, as opposed to being billed from the sponsor.

In embodiments, mobile communication facility users may be classified on a combination of mobile subscriber characteristics, device type, location, behavioral history, transaction history, or other parameters and the resulting classes presented in a menu format to sponsors for bidding. For example, it may be possible to statistically model the user characteristics within a population of a wireless provider's customer base that are most likely to purchase tickets for a Caribbean cruise. Once this model is known, all customers with approximately the profile described by the model could be grouped in a "Caribbean Cruisers" category. This category may then be included in a menu system, along with other categories, and presented to sponsors for bidding. Swimwear companies, sunglass companies, etc. may have an increased interest in bidding for access to the Caribbean Cruisers category because of the increased probability that users in this category have a need for their products. Summary of the many characteristics (variables) used in the model into a single category may make the bidding process less time-consuming to sponsors and may constitute a proprietary product. Furthermore, the statistical model may be continually updated to accommodate changing user preferences.

In embodiments, a sponsor's website may be evaluated to determine the frequency of the appearance of key words and/or key phrases. Once the keyword and/or key phrase frequency is known, a site relevancy score may be derived indicating the relevance of keywords to the content of a sponsor's website. This relevancy score may then be used to assist sponsors in their bidding, making it easier for sponsors to focus their finances on keywords and/or key phrases with the greatest relevancy to their content.

In embodiments, the behaviors of mobile communication facility users may be automatically collected and the bid values in the bidding system adjusted to reflect user behaviors. For example, user calls, clicks, clickthroughs, purchases, and yield optimization may be automated and used to change the value of minimum or maximum bid values associated with a keyword.

In embodiments, an editorial review process may be used to evaluate the appropriateness of sponsors' selections of criteria with which to associate their content. For example, it may be inappropriate to have a sponsor associate adult content with keywords commonly associated with the interests of children. The editorial process may assist in locating and remedying such incongruities.

In embodiments, an automated spidering tool may be used to periodically monitor changes in sponsors' content and determine the reliability of the sponsor links. For example, a sponsor may update a website to such an extent that the sponsor's content that was previously associated with keywords through a bidding process is no longer reliable (i.e., the content is no longer located where the links direct a user). When this occurs, the system may send an alert to the sponsor indicating that the reliability of the sponsor content links is insufficient. They may serve to improve the overall reliability of the system.

Figure 20:
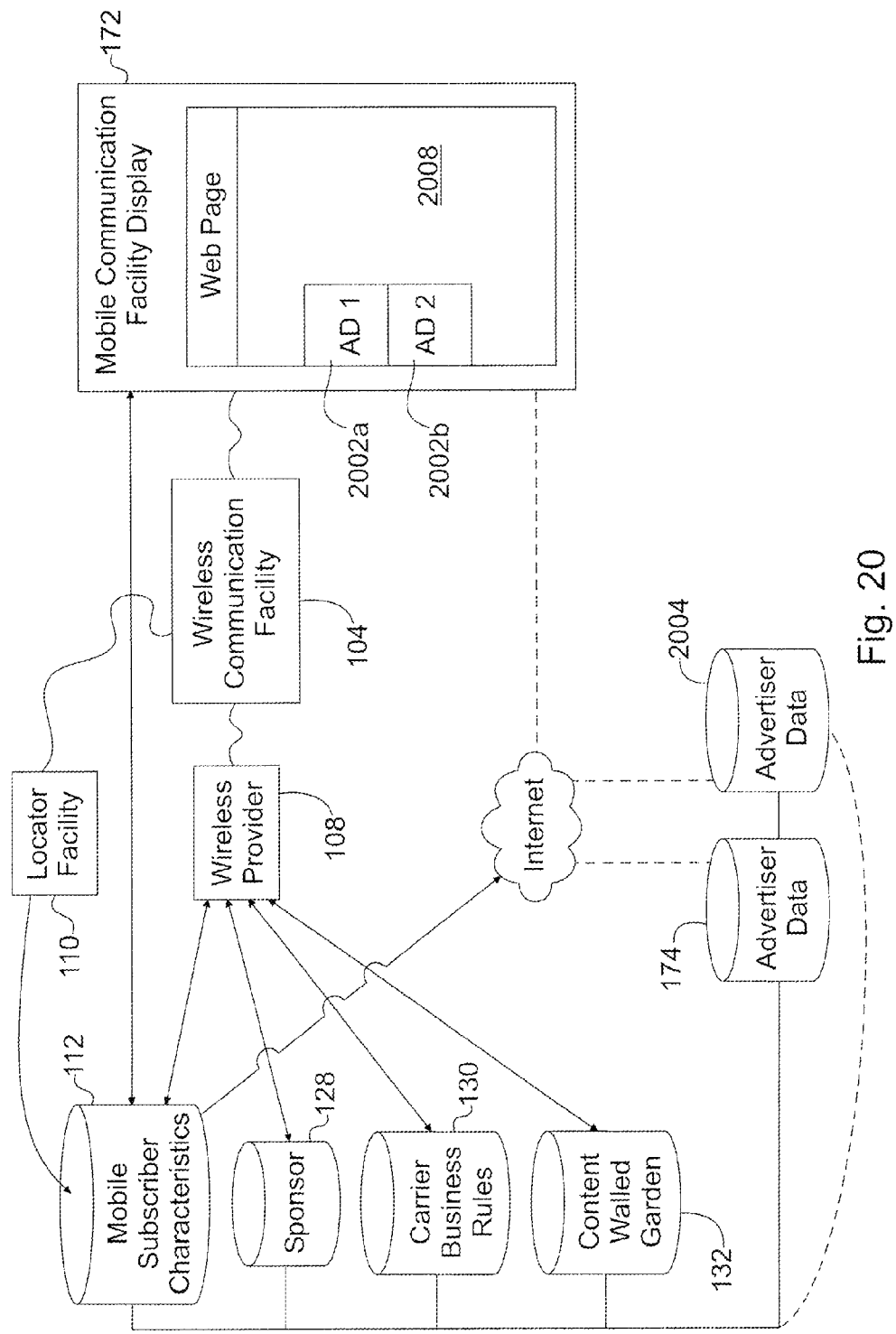
FIG. 20 illustrates a process for mobile advertisement syndication.

As illustrated in FIG. 20, an advertisement 2004 may be presented to a mobile communication facility 102 based at least in part on receiving a webpage request from the query facility of a mobile communication facility 102, receiving information associated with the mobile communication facility 102, and associating at least one advertisement 2002a with a webpage at least in part based on the information relating to the mobile communication facility 102. For example, a user of a mobile communication facility 102 may initiate a search query consisting of an explicit text query spelling a musician's name. The potential search results that may be presented to the user's mobile communication facility 102 may include advertisements 2002a, 2002b and websites for the musician's CD's, videos of his performances, etc. Alternatively, a mobile communication facility user may enter an address request (e.g., an internet URL) requesting a specific website devoted to a musician. This address request may in turn be associated with advertisements and other websites related to the musician's CD's, videos of his performances, etc. Information about the mobile communication facility 102 (e.g., its video streaming capabilities) may be used in order to determine which of the advertisement/webpage 2008 results may be presented successfully to the user's mobile communication facility 102. This information may, in turn, be used to pair webpages and advertisements 2004 that are each capable of presenting in the display of the user's mobile communication facility 102.

In embodiments, an implicit query may be received from a user of a mobile communication facility 102 and used at least in part to derive associations with advertisements 2004. For example, mobile subscriber characteristics 112, carrier business rules 130, or mobile communication facility 102 information, in conjunction with time, location, or similar situation, may suggest relevant advertisement-webpage 2008 pairing recommendations for the user. The recommended advertisements 2002 may be paired with webpages presented prior to, during, or following, the display of the advertisement 2002 results. A content request may be made by an implicit query request based at least in part on a mobile subscriber characteristic 112. For example, a user's mobile subscriber characteristics 112 may include the user's date of birth. Thus, an implicit query may be generated on the user's birthday in order to cull advertisements 2004 related to celebration of a birthday, discounts for customers on their birthdays, etc. A content request may be made an implicit query request based at least in part on a characteristic of a user's mobile communication facility 102. For example, if a mobile communication facility 102 type is associated with a demographic (e.g., age), an implicit query may be initiated to cull advertisements 2004 of probable relevance to the user of that mobile communication facility 102 type.

In embodiments, a user's prior search activities and search results may also be used to create implicit query requests for the user. Prior search activities may include transactions, search queries, visits to websites, and other acts initiated by the user on the mobile communication facility 102. The geographic location of the mobile communication facility 102 may foster implicit queries including, but not limited to, products and services in the user's current geographic vicinity. The current time may be used independently or in conjunction with other information to create implicit queries. For example, the independent fact that it is noon, may initiate an implicit query for restaurants serving lunch. As with the above restaurant example, similar processes for generating meaningful recommendations may be applied to other services and products, including, transportation, food, theater, sports, entertainment, movies, corporations, work, bank, post office, mail facility, gas, directions, locations, location, navigation, taxi, bus, train, car, airport, baby sitter, service provider, goods provider, drug store, drive through, bar, club, movie times, entertainment times, news, and local information.

In embodiments, an advertisement 2002 may be presented to a mobile communication facility 102 based at least in part on information relating to mobile subscriber characteristics 112. This information may include a user's individual demographic variables contained in the mobile subscriber characteristics database 112, such be age, sex, race, religion, an area code, zip code, a home address, a work address, a billing address, credit information, family information, income range, birth date range, birthplace, employer, job title, length of employment, an affiliation or other such information as described herein. The mobile subscriber characteristic 112 may associated with a personal filter. The mobile subscriber characteristic may be used in conjunction with a collaborative filter. The mobile subscriber characteristic 112 may include an aggregate of user characteristics or include a range of values. The range of values of a user characteristic may be a range of a user demographic. The range of values of a user characteristic may be a range of behaviors, or a range of age.

In embodiments, mobile subscriber characteristics 112 may form parameters that limit the advertisement 2002 search results to those relevant to a mobile subscriber characteristic 112 or profile of multiple characteristics. The display of advertisement 2002 result set(s) may, thus, omit information, prioritize information (e.g., presenting sponsor links prior to all others), highlight a subset of the search result set, or order the display of information based upon the presence or absence of mobile subscriber characteristics 112. Examples of representative elements that may be stored within the mobile subscriber characteristics database 112 include location, personal information relating to a user, web interactions, email interactions, messaging interactions, billing history, payment history, typical bill amount, time of day, duration of on-line interactions, number of on-line interactions, family status, occupation, transactions, previous search queries entered, history of locations, phone number, device identifier, type of content previously downloaded, content previously viewed, and sites visited.

In embodiments, at least one advertisement 2004 may be associated with at least one webpage at least in part based on the information relating to a mobile subscriber characteristic 112 and mobile communication facility 102 characteristic combination. This information may provide an indication as to what the user may be looking for at a given time and location. For example, a user may be looking for transportation, food, a theater, sports, entertainment, movies, corporations, work, a bank, post office, mail facility, gas, directions, locations, location, navigation, taxi, bus, train, car, airport, baby sitter, service provider, goods provider, drug store, drive through, bar, club, movie times, entertainment times, news, and local information.

In embodiments, an advertisement 2004 may be presented to a mobile communication facility 102 based at least in part on information relating to a mobile communication facility 102. This information may form parameters that limit the advertisement 2002 search results to those compatible with, relevant to, or preferred for presentation on a given type of mobile communication facility 102. The display of advertisement 2002 result set(s) may, thus, omit information, prioritize information (e.g., presenting sponsor links prior to all others), highlight a subset of the search result set, or order the display of information based upon the presence or absence of a mobile communication facility 102 or a feature of a mobile communication facility 102. Examples of representative elements that may be stored within the mobile subscriber characteristics database 112 include search history, a parental control, or a carrier business rule 130, display resolution, processing speed, audio capability, visual capability, and other technical characteristics. For example, an advertisement 2004 may be associated with only the subset of mobile communication facility 102 models that are best suited for presentation of the advertisement's 2004 content due to technological requirements for the content to optimally present. For example, an advertisement 2004 may have content that requires a Java-enabled device. Therefore, it may be desirable for the advertisement 2004 to present its content only on those mobile communication facilities that are Java-enabled.

In embodiments, advertising and webpage content compatibility with a type of mobile communication facility 102 may be determined at least in part by tracking a plurality of mobile communication facility 102 interactions with such content. Information may be stored pertaining to the advertising and web interactions in a database, where a portion of the information comprises identification of at least one mobile communication facility 102 from the plurality of mobile communication facilities, and predicting the compatibility of the mobile communication facility 102 with the content based, in part, on how many content interactions there were. The prediction of compatibility of the mobile communication facility 102 with content may be based, in part, on how many interactions there were in the user's past. Content may be a download, program, file, executable file, zipped file, compressed file, audio, and video. An advertising or web interaction may be a click on a hyperlink, an indication of downloaded content, and/or an indication of a downloaded program.

In embodiments, advertising content may be associated with webpage content and the at least one mobile subscriber characteristic 112 and or the at least one mobile communication facility 102 characteristic.

In embodiments, an advertisement 2004 may be associated with at least one webpage based at least in part on information relating to a mobile communication provider. The information relating to a mobile communication provider may include, but is not limited to, a graphical trademark, audible signal, a recording of a person reading the slogan trademark of a mobile communication provider, a distinctive audio tone or combinations of tones associated with a mobile communication provider, or a video stream, such as an audio-visual commercial.

In embodiments, the past performance or other information relating to a mobile communication facility may be stored, aggregated, and analyzed on a remote server 134 and database 138, wireless provider data facility 124, the mobile communication facility, or other similar facilities. Past performance may include, but is not limited to, past content interaction, content download, audio content streaming, video content streaming, content contained in java cookies, content contained in temporary internet files stored on the mobile communication facility, past transaction information, and the like.

In embodiments, an algorithm facility 144 may perform algorithms including algorithms for associating information relating to the past performance of a mobile communication facility or other information relating to the mobile communication facility. For example, an algorithm facility may include an algorithm to determine the cumulative frequency of a given past performance (e.g., downloading an MP3 file) within a single mobile communication facility 102 or group of mobile communication facilities. Content may be categorized into a yellow-pages like taxonomy and this taxonomy mapped onto the past performance of a mobile communication facility 102 or group of mobile communication facilities. The taxonomies may then be ordered according a descending order of the cumulative rank associated with the mobile communication facility or group of mobile communication facilities. For example, applying such an algorithm to a user's mobile communication facility past performance may result in a content taxonomy cumulative frequency rank similar to the following (e.g., where each number represents the cumulative, discrete content interactions): MP3: 92; Ringtones: 43; Online Musical Instrument Sites: 16; Newspaper websites; 2; Business Week Magazine Website; 1. Based on this array of data, the relevancy of content may be inferred and, as a result, content related to music (listening to and playing) given a higher priority rank than content related to news.

In embodiments, an algorithm may also correlate past performances within a single mobile communication facility 102 or group of mobile communication facilities. For example, an algorithm may compute a correlation coefficient to describe the association between the past performance of downloading an MP3 file and purchasing a concert ticket online, using a mobile communication facility 102. This coefficient may, in turn, form the basis for ordering content for presentation to a mobile communication facility 102. For example, it may be found that within a single mobile communication facility past performances, or a group of such facilities, the download of MP3 files is positively correlated with online concert ticket purchases, with a coefficient of 0.23, whereas download of MP3 files is positively correlated with the download of real estate listings with only a coefficient of 0.04. This information may be used to rank the relevancy of content such that a person with a past performance of an MP3 download is presented content related to concert ticket purchases more frequently than, with preference to, with prioritized placement within the mobile communication facility display 172 over, to the exclusion of, and so on, any content related to real estate listings. This information may also be used to infer the appropriateness and likelihood of content interaction. For example, a mobile communication facility 102 with many past performances of MP3 downloads, but no online concert ticket purchases may be a prime candidate to receive ticket purchase content and or receive ticket purchase content with priority over news content, and so forth.

In embodiments, the algorithm types described above may also be used to assess the relevancy, priority, positioning, placement, and so forth of content based upon information associated with the mobile communication facility, a capability of the mobile communication facility, a user associated with the mobile communication facility, an owner of the mobile communication facility, mobile subscriber characteristic(s), carrier information or other information that may be used as a predictor of the likelihood of an interaction with the sponsored content. The capability of a mobile communication facility may include, but is not limited to, audio capabilities, video capabilities, visual capabilities, processing capability, screen capability, and the like. User characteristics may include, but are not limited to, user history information, demographic information, transaction history, location information, user billing information, personal filters, and the like. A mobile subscriber characteristic may include, but is not limited to, user transaction history, user location, personal information relating to a user, user web interactions, email interactions, messaging interactions, billing history, payment history, typical bill amount, time of day, duration of on-line interactions, number of on-line interactions, family status, occupation, previous search queries, history of locations, phone number, device identifier, type of content previously downloaded, previous content viewed, websites visited, and the like. Mobile subscriber characteristics may also include demographic information. Demographic information may include, but is not limited to, age, sex, race, religion, an area code, zip code, a home address, a work address, a billing address, credit information, family information, income range, birth date range, birthplace, employer, job title, length of employment, or an affiliation, and the like. A mobile service provider characteristic may include, but is not limited to, a carrier business rule, the geographic region in which the mobile service provider's service is available to consumers, walled-garden content, and the like.

While the invention has been disclosed in connection with certain preferred embodiments, other embodiments will be recognized by those of ordinary skill in the art, and all such variations, modifications, and substitutions are intended to fall within the scope of this disclosure. Thus, the invention is to be understood with reference to the following claims, which are to be interpreted in the broadest sense allowable by law.

The invention claimed is:

1. A system for targeting advertising content of a first or second sponsor to a plurality of mobile communication facilities, the system comprising one or more computers having computer readable mediums having stored thereon instructions which, when executed by one or more processors of the one or more computers, causes the system to perform the steps of:
   (a) receiving from an application or a web browser respective requests for advertising content corresponding to the plurality of mobile communication facilities operated by a group of users, wherein the plurality of mobile communication facilities includes a first type of mobile communication facility and a second type of mobile communication facility, wherein a rendering capability of the first type of mobile communication facility is different from a rendering capability of the second type of mobile communication facility;
   (b) receiving a datum associated with previously presented advertising content corresponding to the group of users;
   (c) selecting respective advertising content from the first sponsor and the second sponsor based at least on a relevancy of each advertising content to the datum associated with previously presented advertising content, wherein each advertising content includes a first item and a second item, wherein the first item requires the rendering capability of the first type of mobile communication facility to be rendered thereon and wherein the second item requires the rendering capability of the second type of mobile communication facility to be rendered thereon, wherein the first item is incompatible with the second type of mobile communication facility and the second item is incompatible with the first type of mobile communication facility;

(d) receiving a bid from the first sponsor offered for delivery of the advertising content of the first sponsor to users associated with the datum associated with previously presented advertising content;

(e) receiving a bid from the second sponsor offered for delivery of the advertising content of the second sponsor to users associated with the datum associated with previously presented advertising content;

(f) attributing a priority to the delivery of the advertising content of the first sponsor over the delivery of the advertising content of the second sponsor to users associated with the datum associated with previously presented advertising content based upon a determination that a yield derived from the financial consideration of the first sponsor is greater than a yield derived from the financial consideration of the second sponsor; and (g) transmitting the first item of the advertising content of the first sponsor instead of the first item of the advertising content of the second sponsor to the first type of mobile communication facility for display thereon and transmitting the second item of the advertising content of the first sponsor instead of the second item of the advertising content of the second sponsor to the second type of mobile communication facility for display thereon.

2. The system of claim 1, wherein the datum associated with previously presented advertising content is provided at least by:
(a) a carrier;
(b) a publisher;
(c) an application developer;
(d) a handset manufacturer;
(e) an advertiser; or
(f) a provider of offline data.

3. The system of claim 1, wherein the item is:
(a) audio;
(b) text;
(c) video;
(d) an image;
(e) a banner;
(f) a ringtone;
(g) an interactive application; or
(h) a game.

4. The system of claim 1, wherein the group of users are identified via at least:
(a) a cookie;
(b) a handset identification; or
(c) a private header.

5. The system of claim 1, wherein the rendering capability comprises one or more hardware or software characteristics selected from the list consisting of:

(a) make of mobile communication facility;
(b) model of mobile communication facility;
(c) operating system of the mobile communication facility;
(d) operating system version of the mobile communication facility;
(e) MIDP support;
(f) polyphonic ringtone support;
(g) ringtone support;
(h) video download support;
(i) video streaming support;
(j) WAP push support;
(k) WML support;
(l) wallpaper support;
(m) XHTML support;
(n) touch screen support;
(o) a display resolution;
(p) a screen size;
(q) processor type of the mobile communication facility;
(r) processing speed of the mobile communication facility;
(s) storage capability of the mobile communication facility; and
(t) memory capacity of the mobile communication facility.

6. The system of claim 1, wherein each yield represents an expected revenue associated with the respective advertising content, wherein the expected revenue is expressed as one of:
(a) a cost-per-thousand impression (CPM) of the respective advertising content on the plurality of mobile communication facilities;
(b) a cost-per-click (CPC) of the respective advertising content on the plurality of mobile communication facilities, where the yield takes into consideration a historical or expected clickthrough rate;
(c) a cost-per-action (CPA), where the yield takes into consideration a historical or expected action conversion rate; and
(d) a cost-per-engagement (CPE) of the respective advertising content on the plurality of mobile communication facilities.

7. The system of claim 1, wherein each bid is determined at the time of the requests for the advertising content.

8. The system of claim 7, wherein a sponsor is competing for placement in a bidded competitive auction.

9. The system of claim 1, wherein the advertising content is displayed in a sequential presentation, and wherein the selection is fulfilling the second or subsequent request for a advertising content.

10. The system of claim 1, wherein the targeting of advertising content excludes a user upon the user's completion of a purchase of the item or service presented in a previous advertising content.

11. The system of claim 1, wherein the targeting of advertising content is open to any sponsor.

12. The system of claim 1, wherein the targeting of advertising content is open to sponsors not competing with other sponsors, wherein the targeting is based in part on a previous purchase or a category.

13. The system of claim 1, wherein the targeting of advertising content is open to a single sponsor, wherein a user previously clicked the sponsor's advertising content.

14. The system of claim 1, wherein a record of the user and a record of the user's interaction with the advertising content is stored by a third party.

* * * * *